United States Patent [19]
Takemoto et al.

[11] Patent Number: 5,446,501
[45] Date of Patent: Aug. 29, 1995

[54] THREE-DIMENSIONAL MEDIAN AND RECURSIVE FILTERING APPARATUS AND METHOD FOR VIDEO IMAGE ENHANCEMENT

[75] Inventors: Sohei Takemoto, Fremont; Kenneth A. Woodhouse, Menlo Park; Luigi C. Gallo, Woodside; John D. Stern, Menlo Park, all of Calif.

[73] Assignee: Accom, Incorporated, Menlo Park, Calif.

[21] Appl. No.: 965,937

[22] Filed: Oct. 22, 1992

[51] Int. Cl.⁶ .................................... H04N 5/213
[52] U.S. Cl. ................................ 348/620; 348/615; 348/629
[58] Field of Search ............... 358/167, 166, 36, 37, 358/105; H04N 5/213; 348/616, 620, 627, 606, 615

[56] References Cited

U.S. PATENT DOCUMENTS

| | | | |
|---|---|---|---|
| 4,058,836 | 11/1977 | Drewery et al. | 358/167 |
| 4,682,230 | 7/1987 | Perlman et al. | 358/36 |
| 4,782,389 | 11/1988 | Mayweather, III | 358/167 |
| 4,928,258 | 5/1990 | May | 364/724.17 |
| 5,068,914 | 11/1991 | Klees | 358/167 |
| 5,161,018 | 11/1992 | Matsunaga | 358/167 |
| 5,247,363 | 9/1993 | Sun et al. | 358/167 |
| 5,327,241 | 7/1994 | Ishizu et al. | 348/606 |

FOREIGN PATENT DOCUMENTS

| | | | |
|---|---|---|---|
| 2202706 | 9/1988 | United Kingdom | H04N 5/213 |
| 2251353 | 7/1992 | United Kingdom | H04N 5/213 |

OTHER PUBLICATIONS

LSI Logic Corporation, "L 64220 Rank–Value Filter (RVF)", 1991, pp. 70–82.

*Primary Examiner*—James J. Groody
*Assistant Examiner*—Jeffrey S. Murrell
*Attorney, Agent, or Firm*—D'Alessandro & Ritchie

[57] ABSTRACT

According to a presently preferred embodiment of the invention, image enhancement apparatus for digital video images comprises a two-stage filter comprising a median filter and a recursive filter. The median filter operates in one, two, and three dimensions wherein the cluster of pixels framing the center pixel are ranked, and the median value of the pixel cluster is chosen as the correct pixel value. The pixel cluster configuration is selectable, as are the planes where the pixels are located. Multiple weights may be given to the appropriate median filter inputs. A motion detector is used to prevent replacement of each pixel by its pixel cluster median value when there is excessive motion. Finally an adjustable pixel-replacement threshold is defined. Each pixel must deviate from its median value before it is replaced by that value. In the presence of rapid motion in the picture, the operation of the median filter is reduced or halted by a properly derived motion signal according to the present invention, thus preventing motion artifacts from occurring.

17 Claims, 10 Drawing Sheets

THREE-DIMENSIONAL MEDIAN AND RECURSIVE FILTERING APPARATUS AND METHOD FOR VIDEO IMAGE ENHANCEMENT

BACKGROUND OF THE INVENTION

1. Field Of The Invention

The present invention relates to video image enhancement. More particularly, the present invention relates to digital electronic noise-reduction techniques for high-quality video image improvement.

2. The Prior Art

It is known in the prior art to use median filters and temporal-recursive filters as effective methods for video image noise reduction. These two filtering methods may be used individually, or in combination, for better overall performance.

Median filtering is also known as rank-value filtering or rank-order filtering. By any name it is a well-known image-processing technique that combines pixels in a non-linear manner, and is particularly effective against impulsive noise and film grain and dirt when a three-dimensional pixel cluster is employed. Because median filters operate on discrete pixel values, the video must be in digitized form by nature.

Recursive filtering combines pixels spaced by exactly one video frame in an algebraic manner through controlled feedback, and is effective at reducing random noise by decreasing the temporal resolution in the noisy areas of the image while always preserving the horizontal and vertical resolution. Recursive filtering is not restricted to digital video images by nature, although providing an exact one-frame recursion delay is difficult by any other means. Median filtering coupled with recursive filtering gives better overall noise-reduction performance than either method when used independently.

The use of median and recursive filters for image processing has been reported in the literature. U.S. Pat. No. 4,058,836 to Drewery et al, teaches noise reduction by means of a recursive filter controlled by a motion detector. G. Wischermann, "Median Filtering of Video Signals—A Powerful Alternative", SMPTE Journal July 1991, discloses the benefit of the use of median filters in video images. A. Christopher et al., "A VLSI Median Filter for Impulse Noise Elimination in Composite or Component TV Signals", IEEE Transactions on Consumer Electronics, Vol. 34, No. 1, Feb. 1988, discloses the use of a pixel-replacement threshold to reduce median filter artifacts. U.S. Pat. No. 4,928,258 to May, teaches the use of a median filter in two and three dimensions with multiple weighted inputs, also known as multiple-input counting. British Patent Application No. GB 2 139 039 A to Storey, teaches electrical means for detecting the presence of film dirt in video signals.

In addition, at least one commercially available noise reduction system employs both median and recursive filtering. Broadcast Television Systems, Inc. of Salt Lake City Utah offers a model MNR9 Median noise reducer which employs selectable pixel clustering. The BTS product is prone to strong motion artifacts.

The state of the art in video image improvement using either median filtering or recursive filtering fails short of providing sufficient performance, closely related to noise reduction effectiveness, with acceptable motion artifacts and resolution loss in pictures with high motion content. In order of discovery, the Drewery teaching of recursive-only noise reduction is very fundamental, but the system performance reaches its limit for images with average signal-to-noise ratio (SNR) before producing noticeable motion artifacts. The concept of video random and impulsive noise reduction by means of a median filter is shown by Wischermann. While in this application the performance is quite good with still pictures, small motion in the picture produces motion artifacts and loss of video resolution. Christopher et al. implemented a manual pixel-replacement threshold logic at the output of a two-dimensional median filter in an attempt to minimize the blurring artifacts, but use of this threshold alone compromises the median filter effectiveness. May's invention is not geared toward high-quality video images, hence motion artifacts and picture resolution loss are more acceptable in his application. The Storey disclosure represents the state of the art in motion detection, although there is no suggestion to employ it in combination with a median filter.

It is an object of tile invention to provide an apparatus and method for improving digital video images by removing noise and film grain and dirt through the use of digital electronic filtering, while creating a minimum of filtering artifacts.

BRIEF DESCRIPTION OF THE INVENTION

According to a presently preferred embodiment of the invention, image enhancement apparatus for digital video images comprises a two-stage filter. The first stage of image improvement consists of a median filter selectively operable in one, two, and three dimensions (horizontal, vertical, and temporal, respectively) wherein the cluster of pixels framing the center pixel are ranked, and the median value of the pixel cluster is chosen as the correct pixel value. In absence of video image motion, this process is very effective in locating the most likely pixel value that belongs in the center of the cluster even in the presence of noise.

According to the present invention, the pixel cluster configuration of the median filter is selectable, as are the planes where the pixels are located. Multiple weights may be given to the appropriate median filter inputs. A motion detector is used to prevent replacement of each pixel by its pixel cluster median value when there is excessive motion. In addition, an adjustable pixel-replacement threshold is defined, and each pixel must deviate from its median value by a threshold amount before it is replaced by that value. In the presence of rapid motion in the picture, motion artifacts are readily generated in prior-art median filter based systems because the median filter is unable to locate the correct pixel value. The picture is thereby rendered unnatural. According to the present invention, the operation of the median filter is reduced or halted by a properly derived motion signal according to the present invention, thus preventing motion artifacts from occurring.

The second stage of image improvement makes use of the conventional recursive filter as taught by Drewery, operating in the time domain. This process is particularly effective in averaging co-sited pixels temporally spaced and its effectiveness is enhanced when preceded by a stage containing the median filter.

In the case of video signals obtained from film by a telecine, the invention is particularly useful in removing film grain scratches and dirt as well as noise in the video. The same embodiment is also most effective in handling very noisy video images containing impulsive noise. The high level of video quality improvement is made possible by the use of three-dimensional median and recursive filters operating in tandem. Both median and recursive filters are optimally controlled through the use of motion detectors whose threshold settings are coupled to the main control of noise reduction to maximize the level of image improvement and minimize motion artifacts.

By cascading two stages of independently operating noise-reduction circuits utilizing different principles of noise reduction with the aid of motion-detection processing and control, it is possible to obtain the best results of noise reduction, impulsive noise elimination, film grain reduction, removal or reduction of film dirt and scratches and stabilization of picture jerkiness with a minimum of motion artifacts and loss of video resolution.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
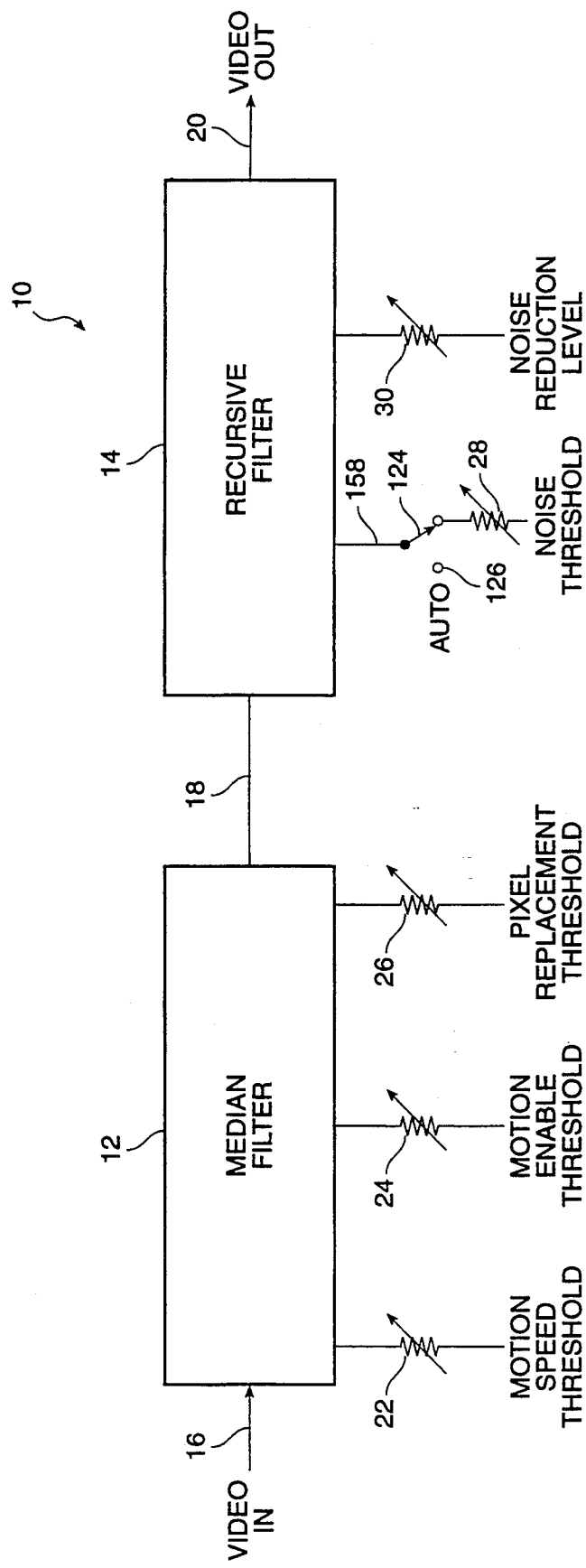
FIG. 1 is a block diagram of a presently preferred embodiment of a digital image improvement system according to the present invention.

Referring first to FIG. 1, a block diagram of a presently preferred embodiment of a digital image improvement system 10 according to the present invention is presented. The digital image improvement system 10 of the present invention comprises two main subcomponents, median filter 12 and recursive filter 14. According to the present invention, these two subcomponents are arranged in a cascade configuration. Thus a video input bus 16 presents a stream of video pixels in real time to median filter 12. The output of median filter 12 is presented as a stream of video pixels in real time on bus 18 to recursive filter 14, and the output of recursive filter 14 on bus 20 comprises the output of digital image improvement system 10.

As may be seen from FIG. 1, median filter 12 has user-selectable motion speed threshold control 22, motion enable threshold control 24, and pixel replacement threshold control 26. Recursive filter 14 has user-selectable noise threshold control 28 and noise reduction level control 30. These controls will be more fully explained herein with respect to median filter 12 and recursive filter 14.

Figure 2:
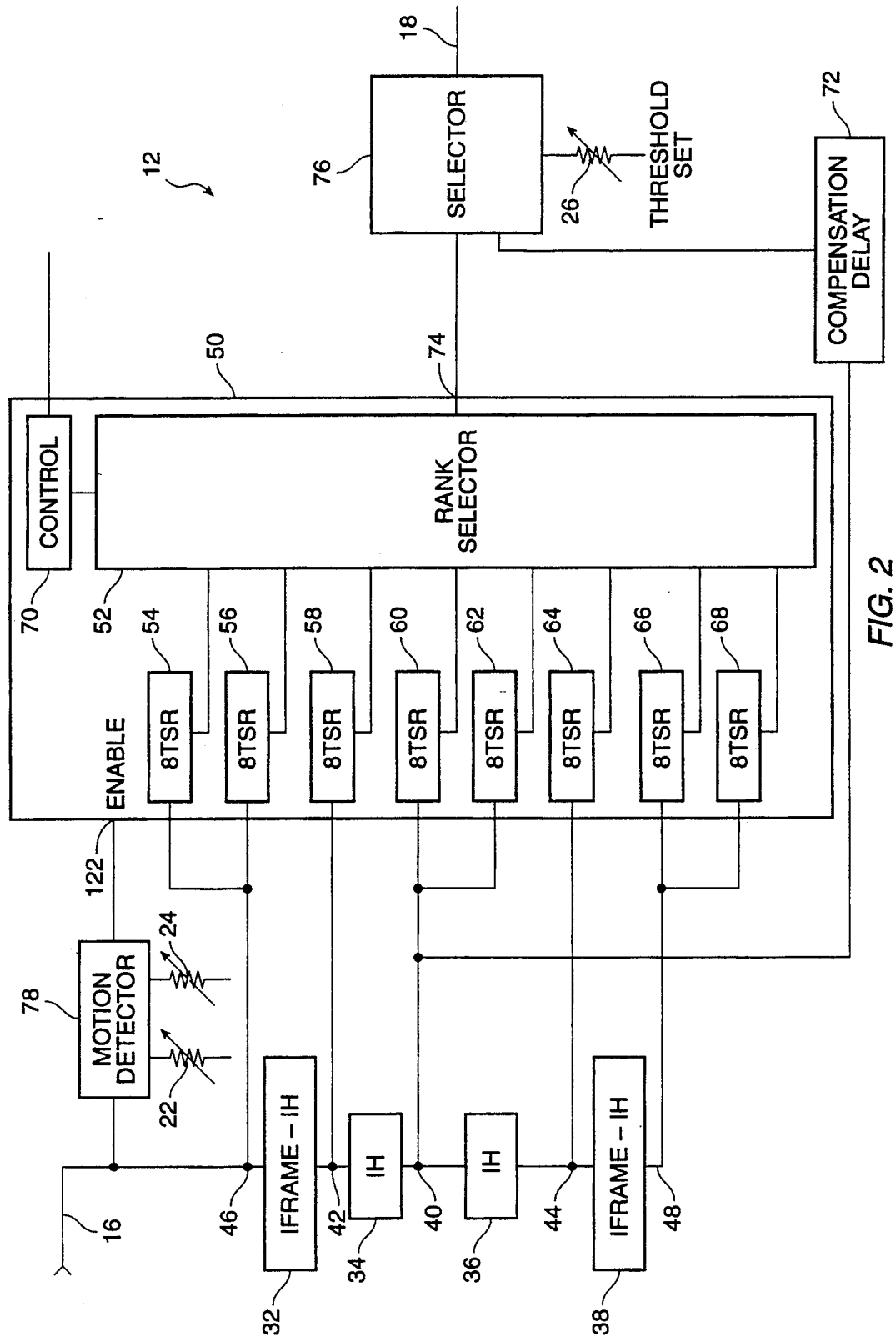
FIG. 2 is a block diagram of the computation core of the median filter of the digital image improvement system of the present invention.

Referring now to FIG. 2, median filter 12 is shown in more detail and is seen to incorporate novel features which give it additional functionality representing an improvement over the prior art.

Median filter 12 takes a multibit digital video signal from input bus 16 and passes it through delay elements 32, 34, 36, and 38. Delay elements 32 and 38 delay the video pixels by one frame minus one horizontal line, such that, at any given time, the pixel present at their outputs are from the same horizontal position one line above the pixel present at their inputs, but from the previous frame. Delay elements 34 and 36 each delay the video signal one horizontal line such that the pixel present at their outputs at any given time is from the same horizontal position one line above the pixel present at their inputs from the same frame. As will be appreciated by those of ordinary skill in the art, delay elements 32, 34, 36, and 38 may comprise conventional digital delay elements, such as serial shift register chains or the like.

The overall effects of delay elements 32, 34, 36, and 38 are such that if the current pixel of interest is present at node 40 at the output of delay element 34, the pixels present at nodes 42 and 44, the outputs of delay elements 32 and 36, respectively, will be the pixels from the same horizontal positions in the lines immediately below and above the pixel of interest. Further, the pixels present at nodes 46 and 48, the input of delay element 32, will be the pixels from the succeeding and preceding frames, respectively, occupying the same position in the those frames as the pixel of interest.

The heart of median filter 12 is rank-value filter element 50, which, according to a presently preferred embodiment of the invention, may be a L64220 rank-value filter integrated circuit, available from LSI Logic Corp., of Milpitas, Calif. The data sheet for the L64220 rank-filter integrated circuit is expressly incorporated by reference herein. Rank-value filter element 50 includes a rank-selector circuit portion 52 which takes inputs from a plurality of shift registers 54, 56, 58, 60, 62, 64, 66, and 68. The function of rank-selector circuit 52 is to select the median value from among the inputs presented.

Shift registers 54, 56, 58, 60, 62, 64, 66, and 68 are eight-bit serial shift registers in the L64220 integrated circuit, but those of ordinary skill in the art will recognize that other configurations are possible. By employing these serial shift registers, the present invention can define the median value of the pixel of interest in terms of the pixels to its immediate left and right, as well as pixels immediately above and below (from delay elements 34 and 36).

Rank-value filter element 52 is controlled by control unit 70, which selects which pixel values stored in the shift registers 54, 56, 58, 60, 62, 64, 66, and 68 are used in the median value determination. As disclosed in the L64220 Data Sheet from LSI Logic, expressly incorporated by reference herein, any pixel element in the shift registers 54, 56, 58, 60, 62, 64, 66, and 68 can be masked such that the pixel cluster used to compute the median value is selectable. Loading of the masking registers in the L64220 integrated circuit is easily and routinely accomplished by employing the address, clock, and write-enable inputs provided. Those of ordinary skill in the art will recognize that a microcontroller could easily be employed to provide selectable clusters by controlling the address, clock, and write-enable inputs to load preselected patterns into the mask registers in the control section 70 of rank-value filter element 50.

From an examination of FIG. 2, those of ordinary skill in the art will readily recognize that the pixels from nodes 40, 46, and 48 are each presented to two shift registers at the same time. Thus, the pixels present at node 46 are presented to shift registers 54 and 56, the pixels present at node 40 are presented to shift registers 60 and 62, and the pixels present at node 48 are presented to shift registers 66 and 68. This arrangement allows the possibility of double-counting these pixel values in the median value computation.

Figure 3A:
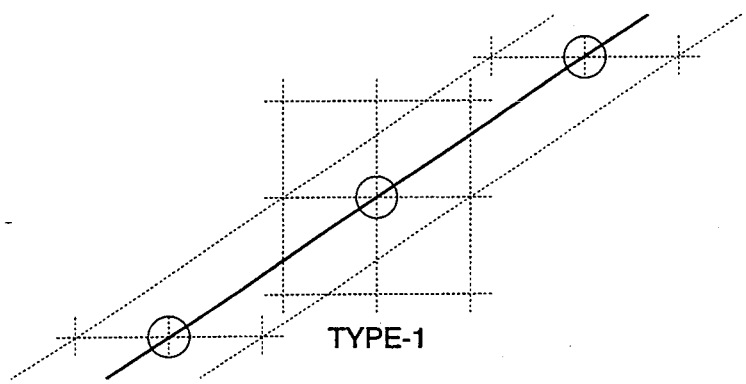
FIGS. 3a-3o are representations of various preferred median-filter cluster configurations according to the present invention.
Figure 3B:
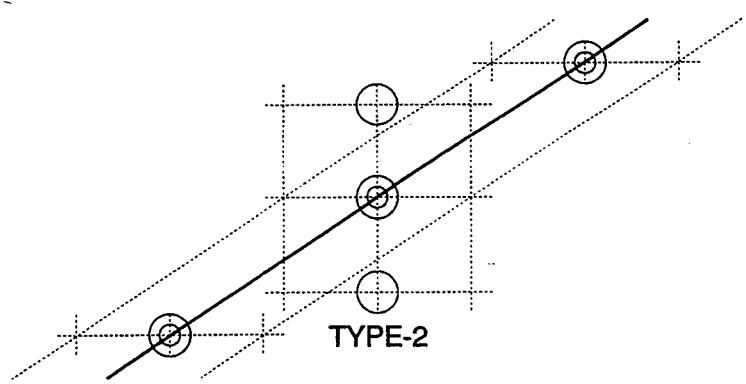
Figure 3C:
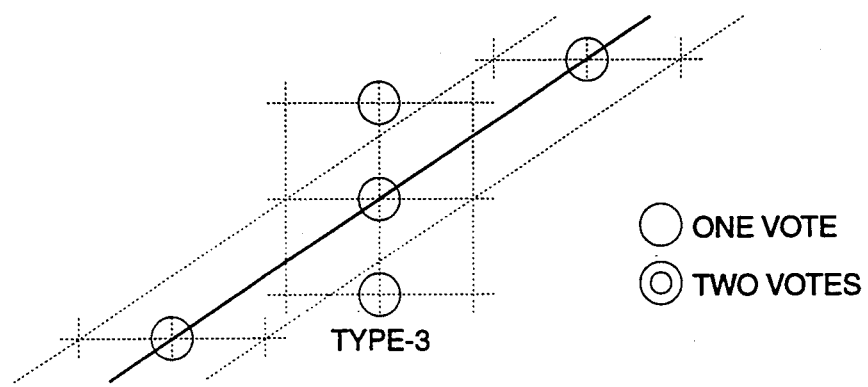
Figure 3D:
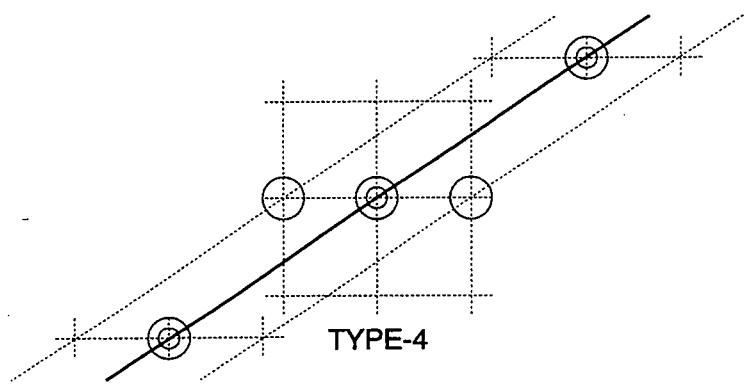
Figure 3E:
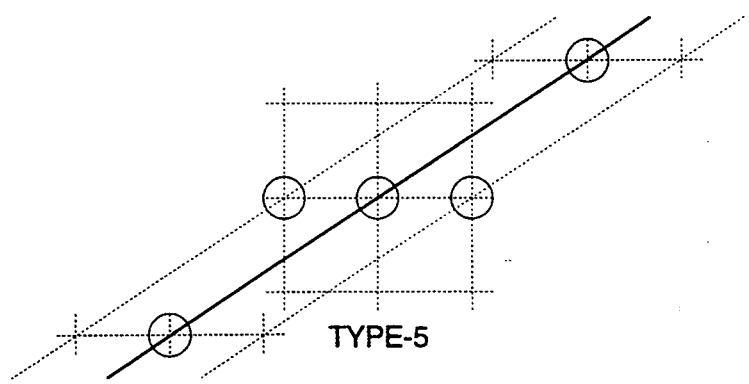
Figure 3F:
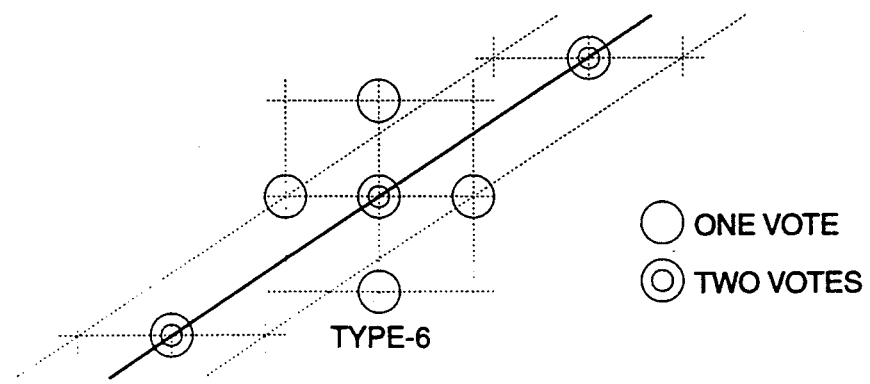
Figure 3G:
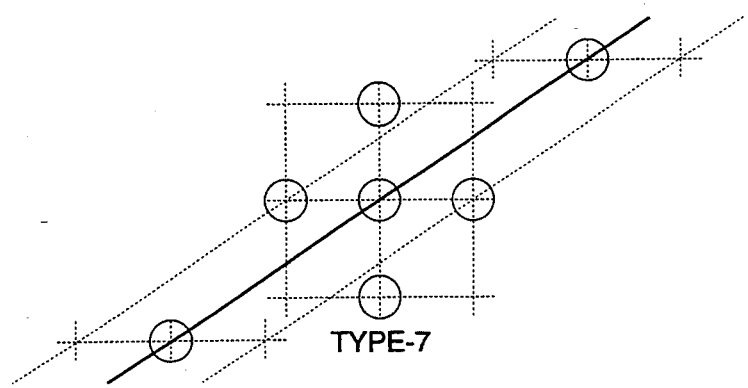
Figure 3H:
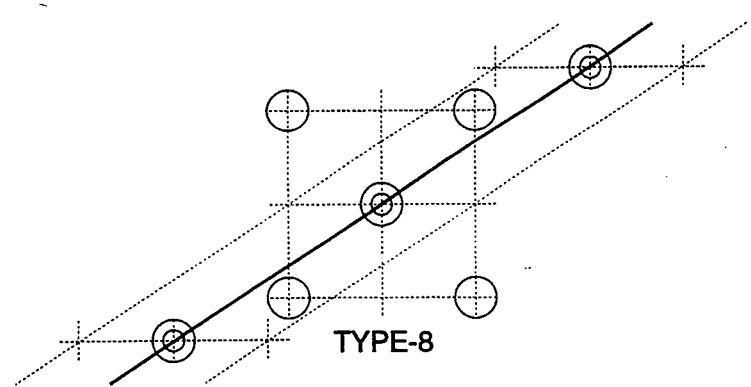
Figure 3I:
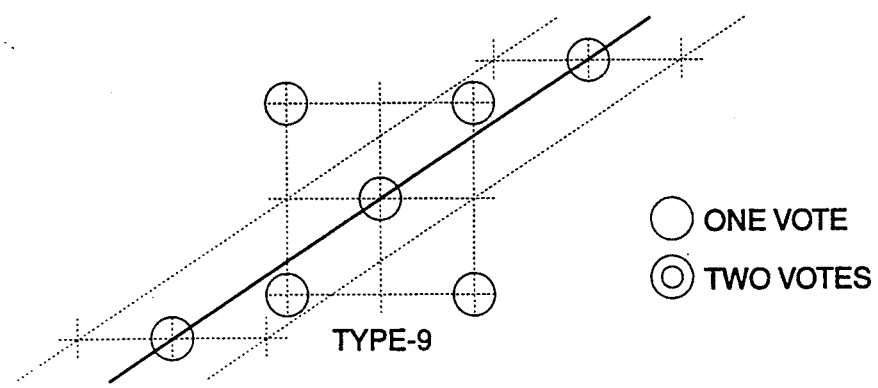
Figure 3J:
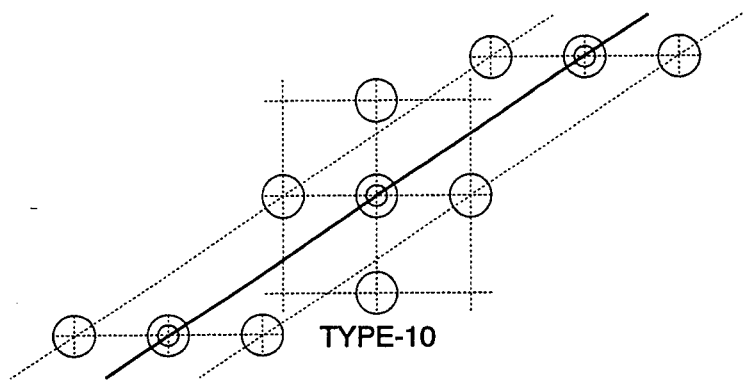
Figure 3K:
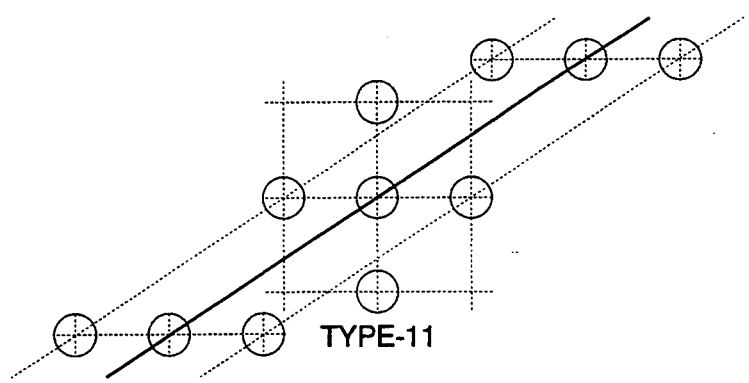
Figure 3L:
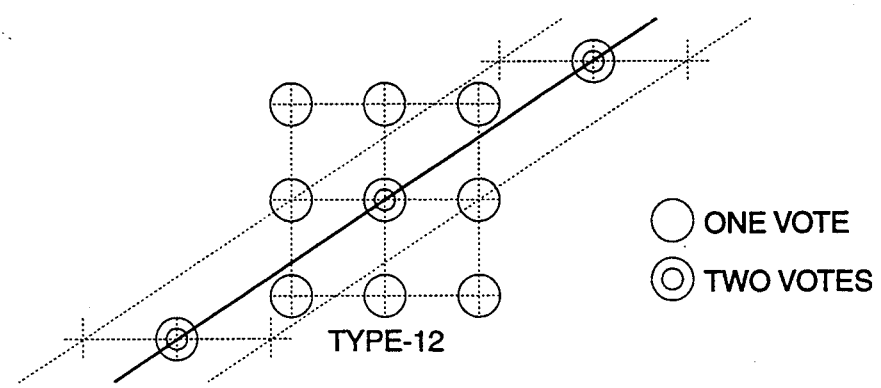
Figure 3M:
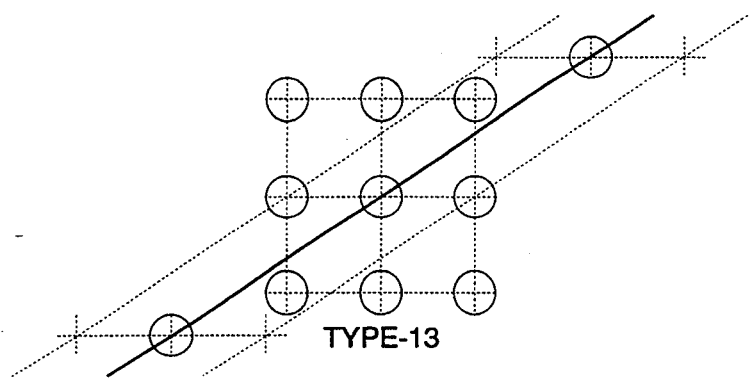
Figure 3N:
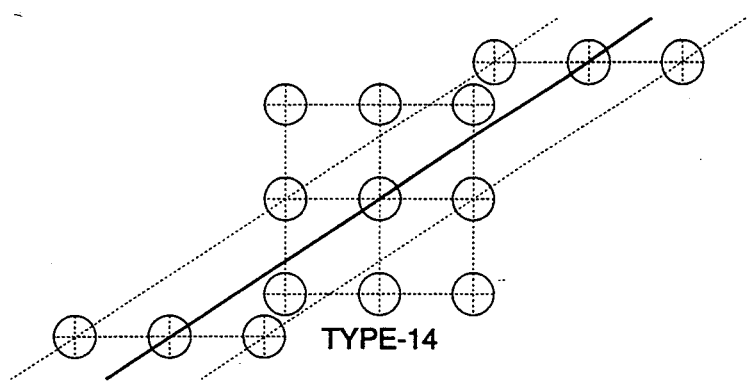
Figure 3O:
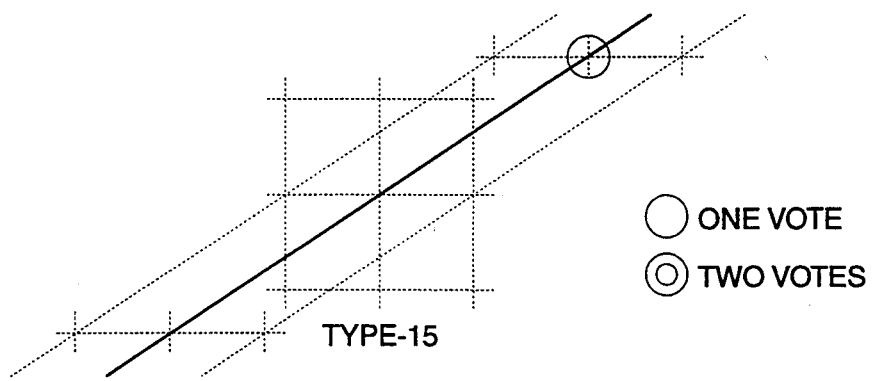

Referring now to FIGS. 3a–3o, diagrammatic representations of the various pixel clusters from which the median value can be calculated are shown according to a presently preferred embodiment of the invention. FIGS. 3a–3o show combinations of both positional and temporal clustering, using left, right, horizonal, vertical, and diagonal nearest neighbors in the positional domain, and corresponding past and next frame pixels and their immediate left, right, horizonal, and vertical neighbors in the temporal domain. From FIGS. 3a–3o, those of ordinary skill in the art can see the cluster geometries made possible by use of the delay elements 32, 34, 36, and 38. Each pixel position is represented by a circle and the double-counted pixels are shown as double circles. The present embodiment can accept any pixel cluster covering the present frame with 0, 1 or 2 votes, the preceding and following frames both with 0, 1 or 2 votes, and the lines above and below each with 0 or 1 votes. According to the presently preferred embodiment of the invention, only the corresponding pixels in the immediately preceding and succeeding frames may be double-counted by having 2 votes, since these pixels introduce the least degradation of spatial resolution, but those of ordinary skill in the art will realize that other configurations are possible by suitably modifying the delay elements and doubling of serial shift register inputs. Each cluster configuration except for that illustrated in FIG. 3o is symmetric in each of the 3 dimensions. The configuration FIG. 3o may be used when the median filter is inactive, and a minimum overall video delay is desirable. The selection of which pixel cluster to employ may be user-selectable by means of, for example, a simple selector switch.

Referring again to FIG. 2, a compensation delay 72 is connected to node 40 in order to enable complete bypassing of median filter 12. The amount of delay provided by compensation delay 72 is such as to provide at its output the pixel value whose computed median value is simultaneously present at output 74 of rank-value filter 50. The output of compensation delay 72 and the output 74 of rank-value filter 50 are provided to selector 76. The function of selector 76 is to pass the pixel value from one of compensation delay 72 and the output 74 of rank-value filter 50 to output bus in response to a threshold select signal. The structure and operation of selector 76 will be described with reference to FIG. 5.

A motion detector circuit 78 is advantageously employed in median filter 12 to reduce the amount of temporal filtering so as not to introduce blurring motion artifacts in moving areas of the image which require full temporal resolution. The structure and operation of a presently preferred motion detector 78 will be described with reference to FIG. 4, to which attention is now drawn.

Figure 4:
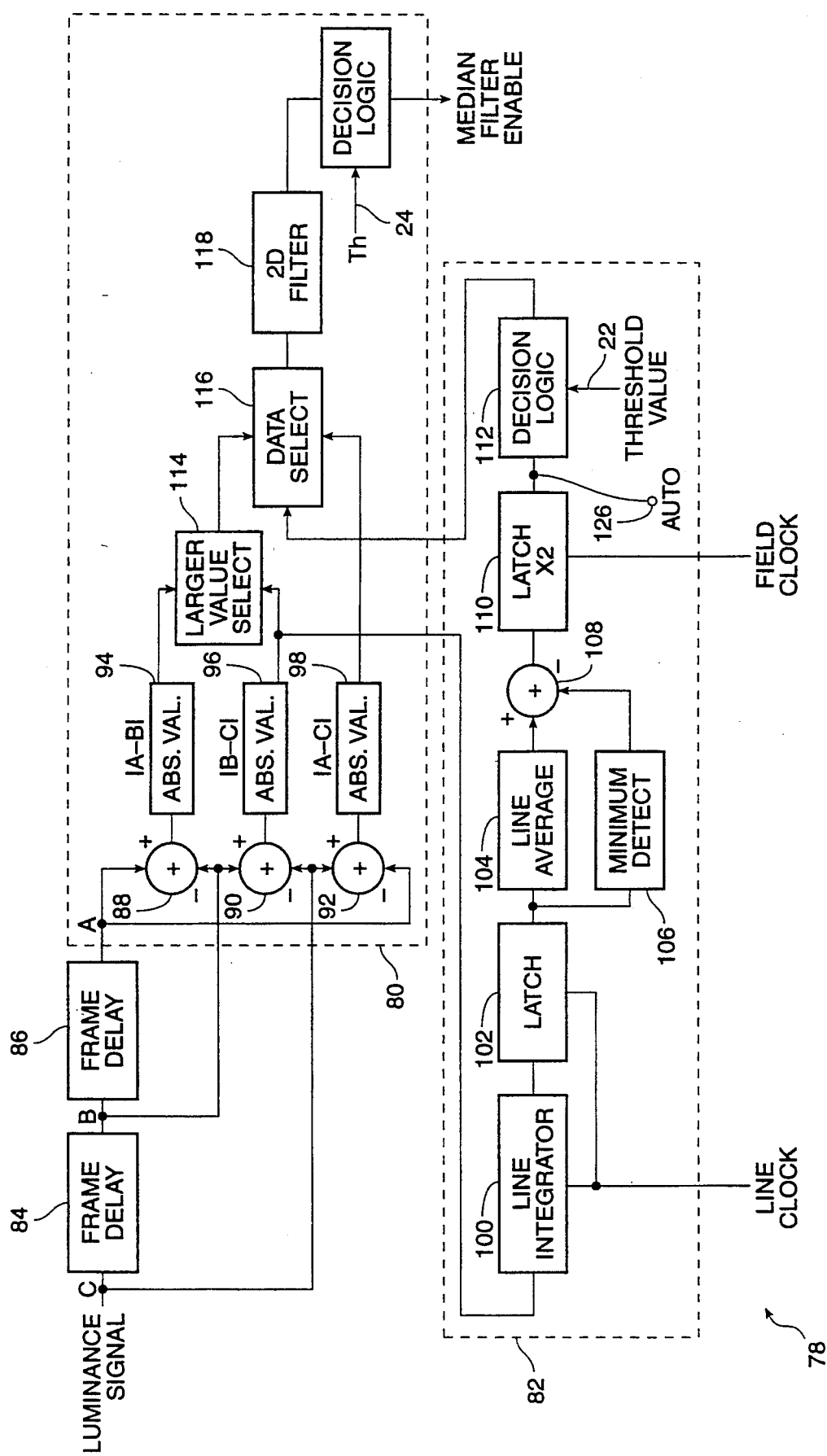
FIG. 4 is a block diagram of a median-filter motion processor for use in the digital image improvement system of FIG. 1.

Referring now to FIG. 4, it may be seen that motion detector 78 comprises two sections, motion processor 80 and global motion detector 82, both shown within dashed lines on FIG. 4. Motion processor 78 operates on the luminance portion of the digital video signal and two signals delayed by one frame each using frame delays 84 and 86, which may comprise conventional digital delay elements. As indicated on FIG. 4, the output of frame delay 86 is a pixel from frame A, the output of frame delay 84 is the corresponding pixel from frame B, and the input to frame delay 84 is the corresponding pixel from frame C, where frame B is a current video frame and frames A and C are the proceeding frame and the following frame. Where there are differences in the pixel values of the corresponding pixel in frames A, B, and C, these differences could be caused by motion in the picture or, for images originated from film, from dirt and or scratches on the film. It is therefore imperative to derive motion information from the video itself if the frame contains interframe motion, in order to prevent erroneous operation of the median filter which will smear the image by misinterpreting motion as noise or dirt.

Motion processor 80 derives three signals, IA-BI, IB-CI, and IA-CI, using digital subtractor circuits 88, 90, and 92, and absolute value circuits 94, 96, and 98, which may comprise ROM look-up tables, as is known in the art. The Global Motion Detector 82 operates by processing the absolute frame difference IB-CI from absolute value circuit 96. The IB-CI difference is processed through a line integrator circuit 100, comprising an accumulator active each pixel and reset each line, latch 102, line average circuit 104 which may comprise an accumulator active each line and reset each field, and minimum detect circuit 106, which may comprise a digital comparator active each line and reset each field to compare the latest line integration value with the minimum line integration value, to determine the floor of video activity of every active video line, and the average value of motion through a frame by the Line Average circuit. The higher the motion content in the frame, the larger is the output of the line average circuit 104.

At the end of the video frame, the minimum detect and line average values are subtracted in subtractor circuit 108, and the difference is latched at each field time in latch 110. The value stored in latch 110 is compared with a threshold value supplied on motion-speed threshold line 22 in decision logic 112 to determine if the frame is considered to contain fast motion or slow motion. According to a presently preferred embodiment of the invention, the threshold value is user-selectable, for example, under computer control as is well known in the art. The fast-motion/slow-motion determination at the output of decision logic 112 is a binary on/off decision.

In the Motion Processor block, three interframe comparisons of temporally co-sited pixels, IA-BI, IB-CI, and IA-CI are made in subtractor circuits 88, 90, and 92 and absolute value circuits 94, 96, and 98. According to a presently preferred embodiment of the invention, it has been determined that the larger of the first two comparison levels is the better representation of motion for fast-moving motion content. This selection is made by larger-value select circuit 114, which may comprise a digital-word comparator. For slow-moving images, the IA-CI comparison is best. Data select circuit 116, which may comprise a digital multiplexer, is used to select the output representing fast or slow motion depending on the output of decision logic 112.

The most suitable motion signal selected by data select circuit 116 is subsequently filtered in two dimensions (horizontally and vertically) by 2D filter circuit 118 to enhance the signal-to-noise ratio of the motion signal. 2D filter circuit 118 may preferably comprise a horizontal filter of seven points and a vertical filter of three points, although other configurations are possible. If the selected and filtered signal is above the motion-enable threshold 24, decision logic 120 will disable the operation of the median filter in a binary on/off fashion at its enable input 122 (FIG. 2). The threshold setting of decision logic circuit 120 is user-adjustable by loading a selected threshold value into a register inside decision logic circuit 120, for example, under computer control as is well known in the art.

Figure 5:
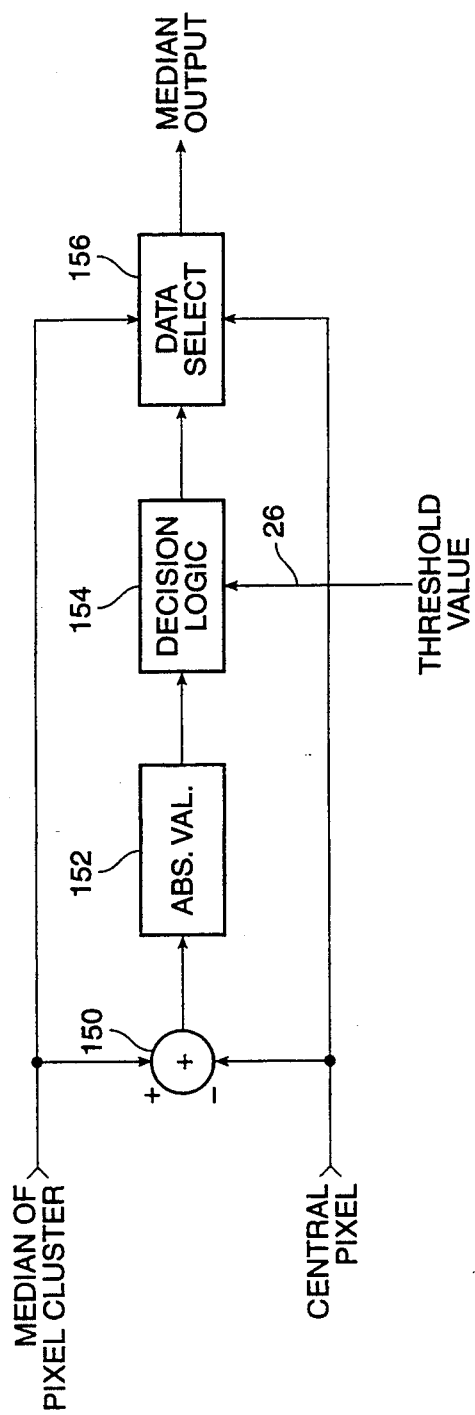
FIG. 5 is a block diagram of a presently preferred embodiment of the selector circuit of FIG. 2.

Pixel-replacement Threshold Logic selector 76 (FIG. 2) compares the median filter output to the corresponding pixel at the center of the pixel cluster and, if the difference is above the threshold value 26 set by the user, the median value is selected. Referring now to FIG. 5, the structure and operation of selector 76 will be described. The comparison of the median filter output and the central pixel value is made in subtractor circuit 150 and absolute-value circuit 152. Decision logic 154, which may comprise a digital-word comparator, decides if the compared value exceeds pixel replacement threshold 26 and issues a binary on/off output in response. Data selector circuit 156, which may comprise a multiplexer, selects either the computed median or the central pixel value for ultimate median filter output. The threshold settings for decision logic 154 are adjustable by user control, for example, under computer control as is well known in the art.

Figure 6:
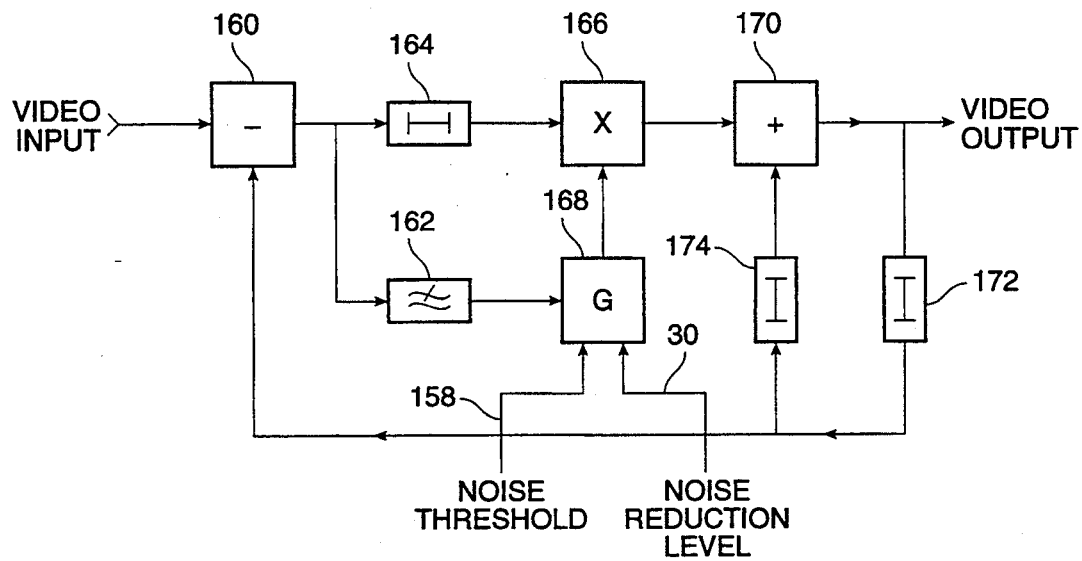
FIG. 6 is a block diagram of a recursive filter for use in a presently preferred embodiment of the present invention.

FIG. 6 is a block diagram of recursive filter 14 according to a presently preferred embodiment of the invention. As disclosed with regard to FIG. 1, the operation of recursive filter 14 is controlled by the noise threshold adjustment 28 and by the noise reduction level, adjustment 30, in the Manual Threshold mode. According to a presently preferred embodiment of the invention, recursive filter 14 may be a filter such as the one set forth in U.S. Pat. No. 4,058,836, expressly incorporated herein by reference.

Figure 7:
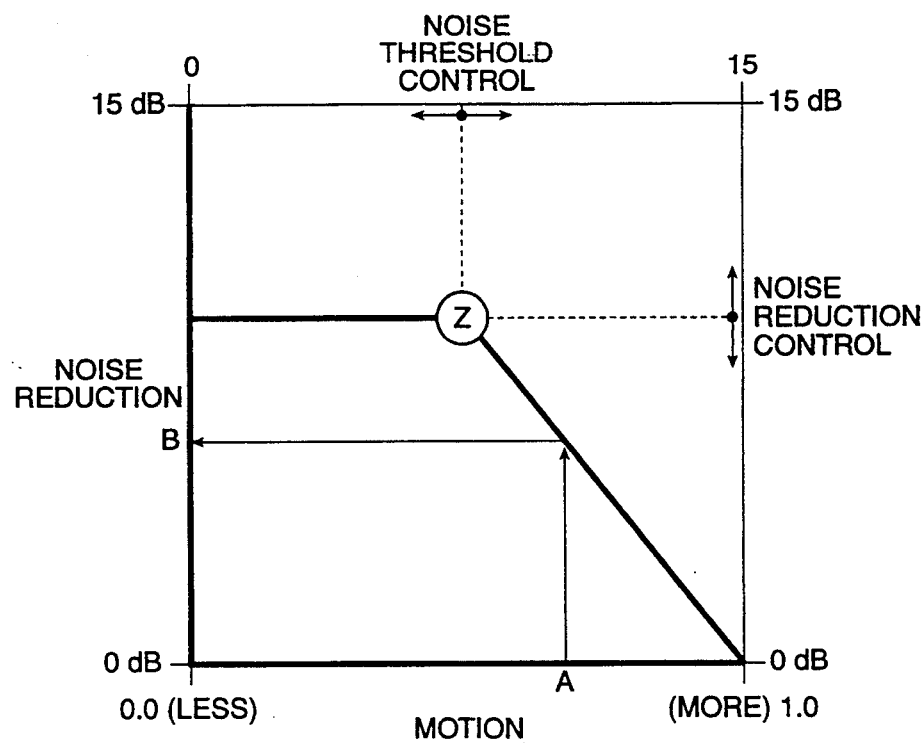
FIG. 7 is a diagram illustrating a preferred transfer function for the non-linear transfer block of the recursive filter of the present invention.

According to a presently preferred embodiment of the invention, an automatic mode of operation of recursive filter 14 is provided wherein the noise threshold adjustment is replaced by the Global Motion Detector level, updated every frame instant. This is illustrated symbolically by switch 124, which is switchable to an automatic operating node comprising the output of global motion detector 82 at automatic node 126. Switch 124 thus provides either a manual user-adjustable noise threshold control or an automatically determined noise threshold control at point 158. FIG. 6 is a block diagram illustrating a recursive filter similar to the one disclosed in U.S. Pat. No. 4,058,836. Video input is provided to one input of subtraction circuit 160. The output of subtraction circuit 160 is presented to the input of low pass filter 162, which is configured to smooth the difference signal as disclosed in U.S. Pat. No. 4,058,836. The output of subtractor 160 is also presented to compensating delay 164, which compensates for the delay through low pass filter 162. The output of compensating delay 164 is presented to one input of multiplier 166. The other input of multiplier 166 is supplied by non-linear transfer block 168. Non-linear transfer block 168 is preferably configured to produce an output signal which is a function of input signals noise threshold 158 and noise reduction level 30 which has a transfer characteristic as shown in the graph of FIG. 7. The inputs 158 and 30 select an operating curve above which detected motion will not permit noise reduction, in order to prevent motion artifacts. As will be appreciated by those of ordinary skill in the art, non-linear transfer block 168 may be configured from a ROM lookup table. An example of a suitable ROM lookup table is provided in Appendix I.

The output of multiplier 166 is presented to one input of adder 170. The output of adder 170 forms the video output of the recursive filter. It also serves as a feedback point and is connected to frame delay 172, which introduces a delay of one frame. The output of frame delay 170 is presented to the other input of subtractor 160, as well as to the input of delay 174, which matches the delay produced by delay 164. Other than the function of non-linear transfer block 168, the operation of recurslye filter 14 is disclosed in U.S. Pat. No. 4,058,836.

A set of schematic diagrams for the circuitry which implements an actual embodiment of the invention is filed herewith as Appendix I. Specifications for the programmable devices shown thereon, is filed herewith as Appendix II. The program-control source code for an Intel 8031 microcontroller which accepts the user commands and interfaces to the system bus of the actual embodiment of the present invention described in Appendices I and II is filed herewith as Appendix III. These diagrams and other information, which describe an actual working embodiment of the present invention, are expressly incorporated herein by reference.

Those of ordinary skill in the art will recognize that the settings for the various threshold values specified herein are somewhat subjective. The possibilities of combinations of dirt, noise, and motion in video sequences are virtually infinite and thus the threshold settings at any moment may depend on the particular video material being viewed.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

APPENDIX I
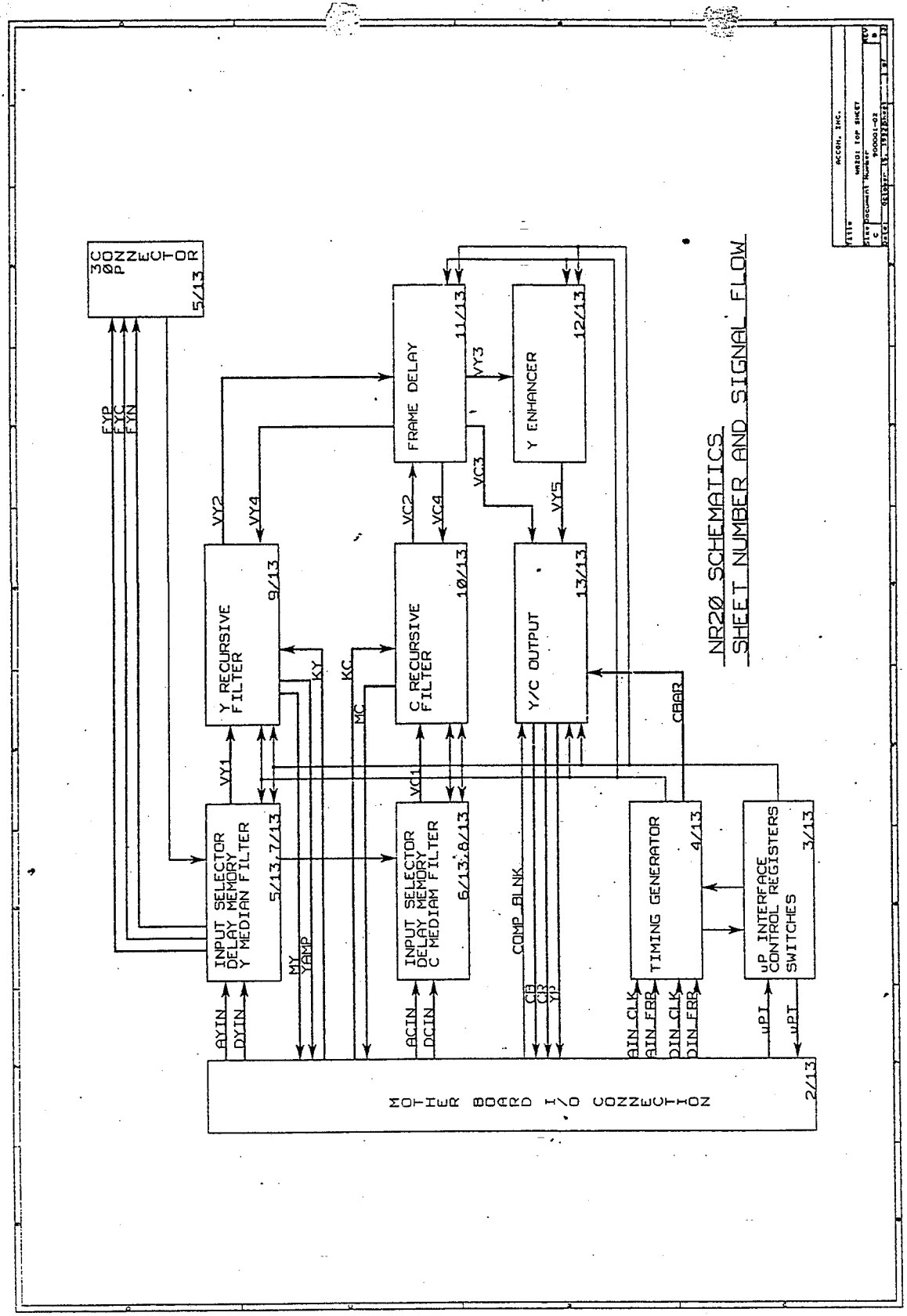

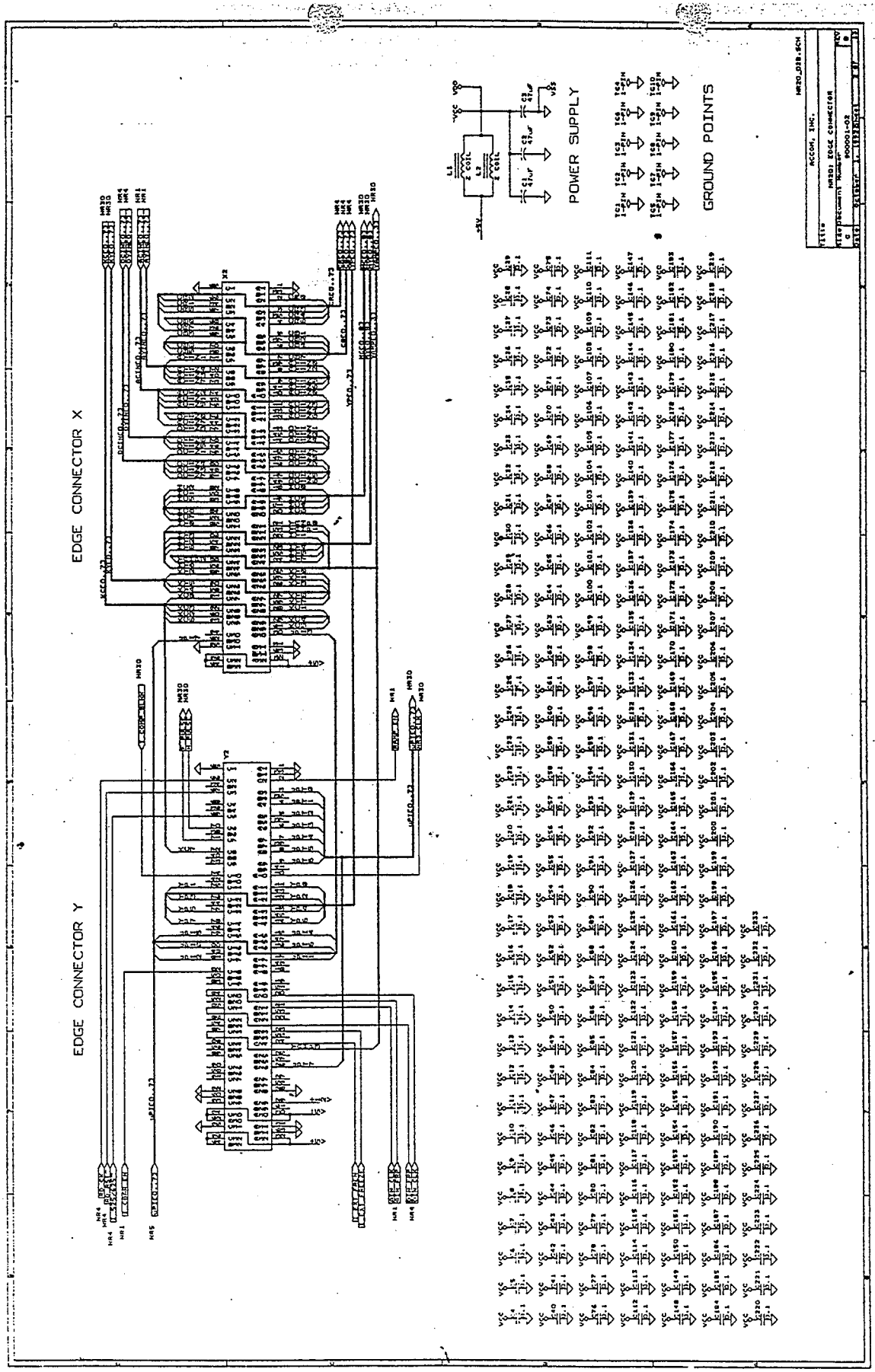

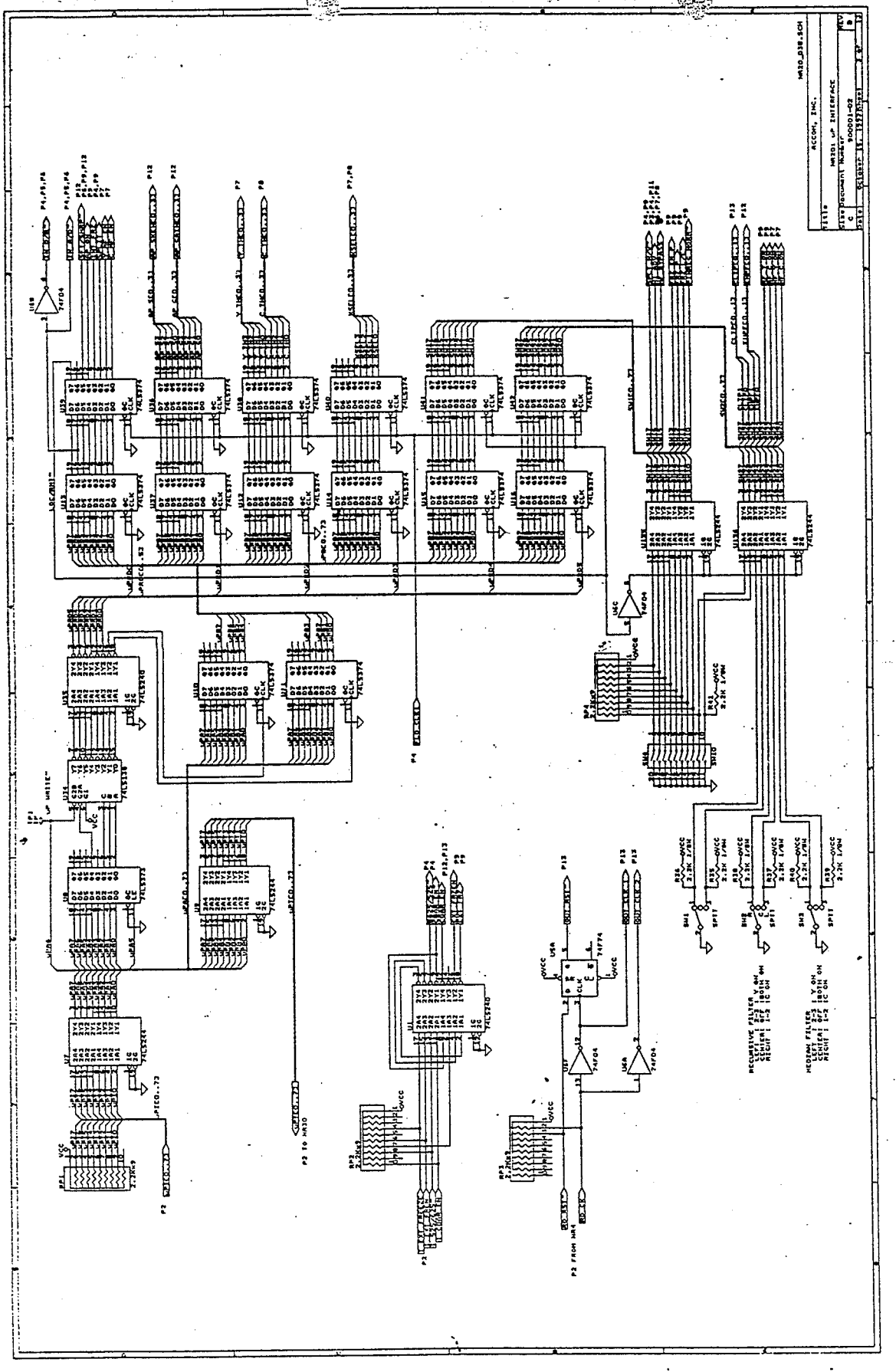

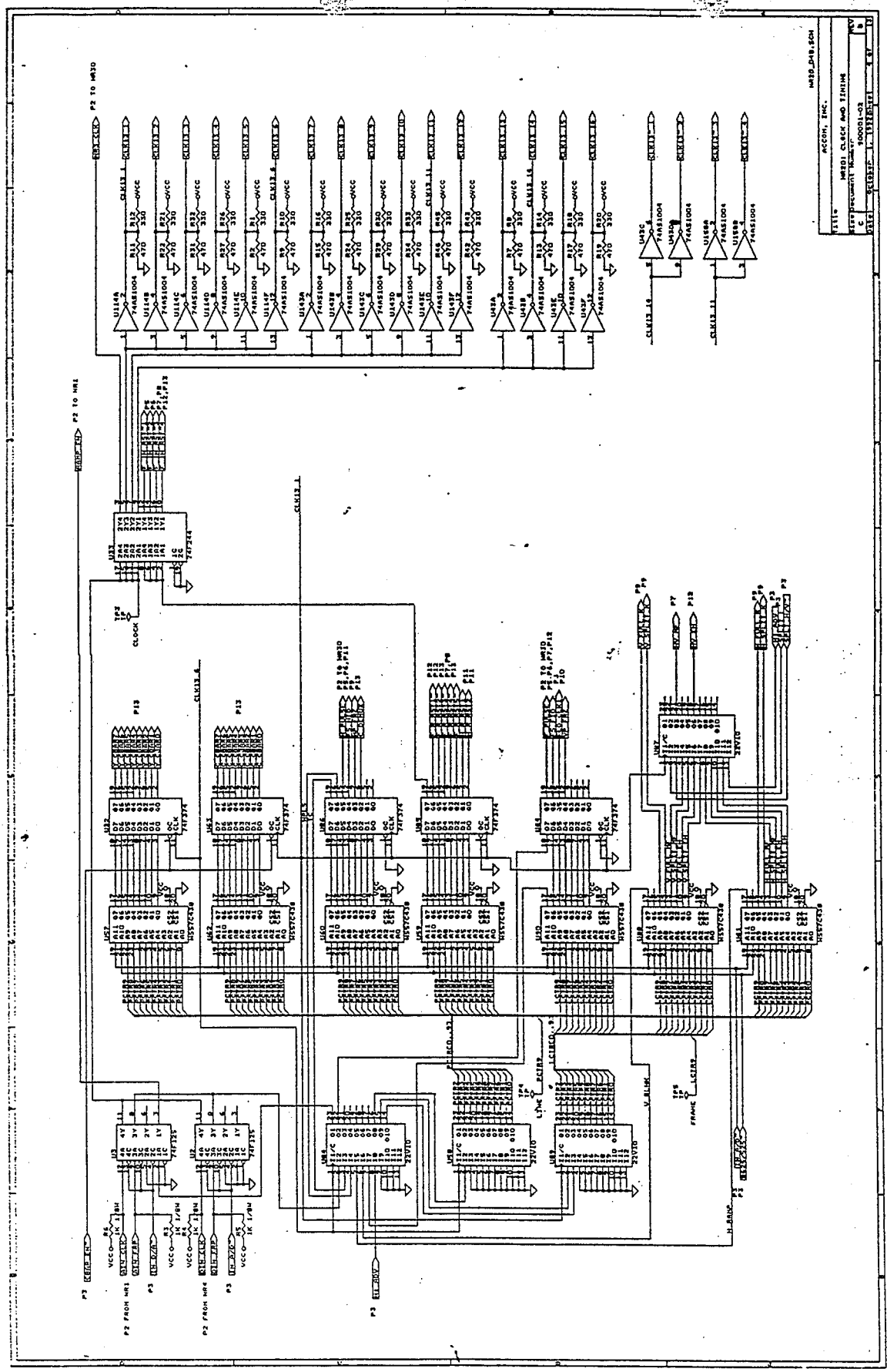

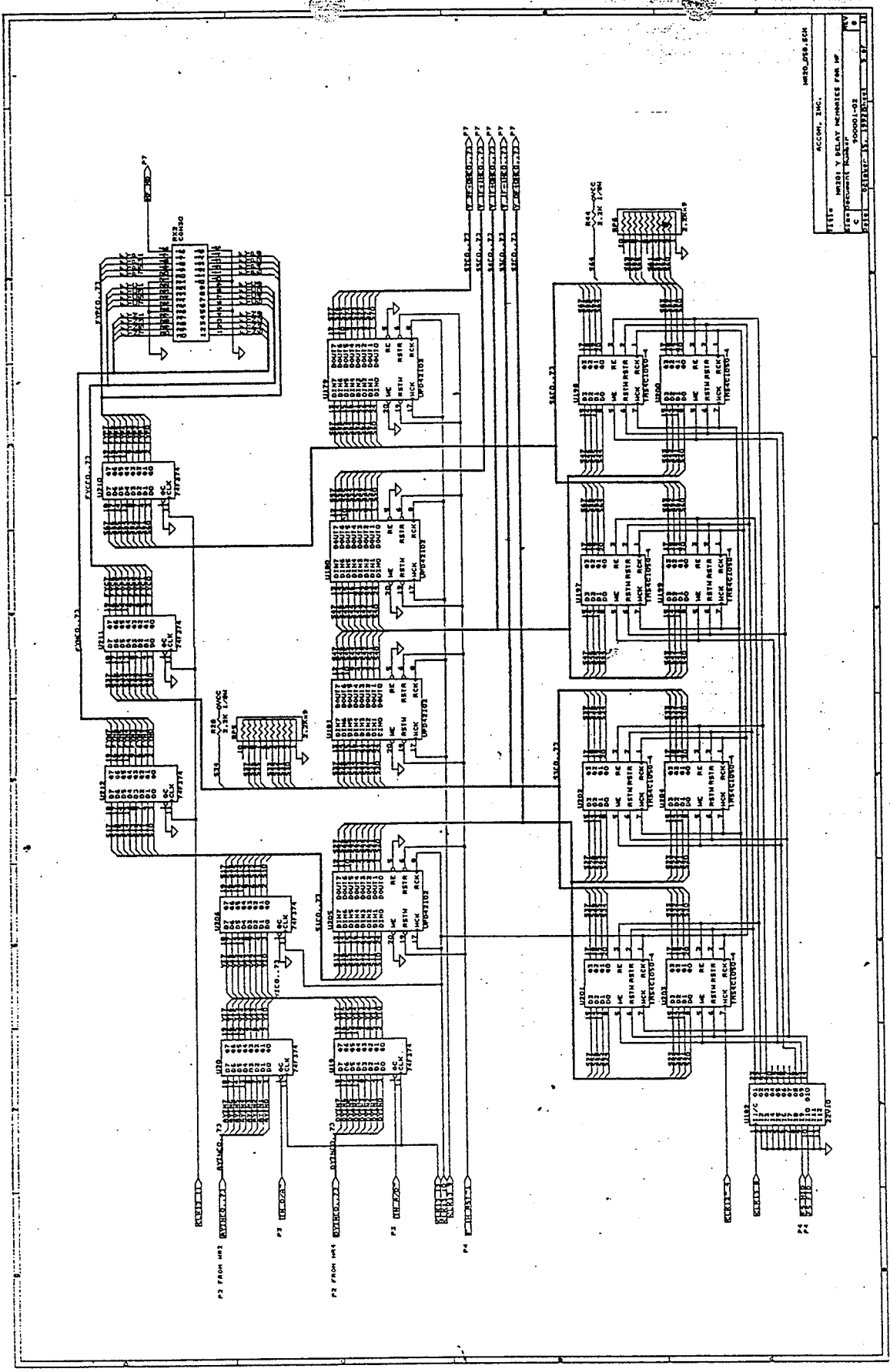

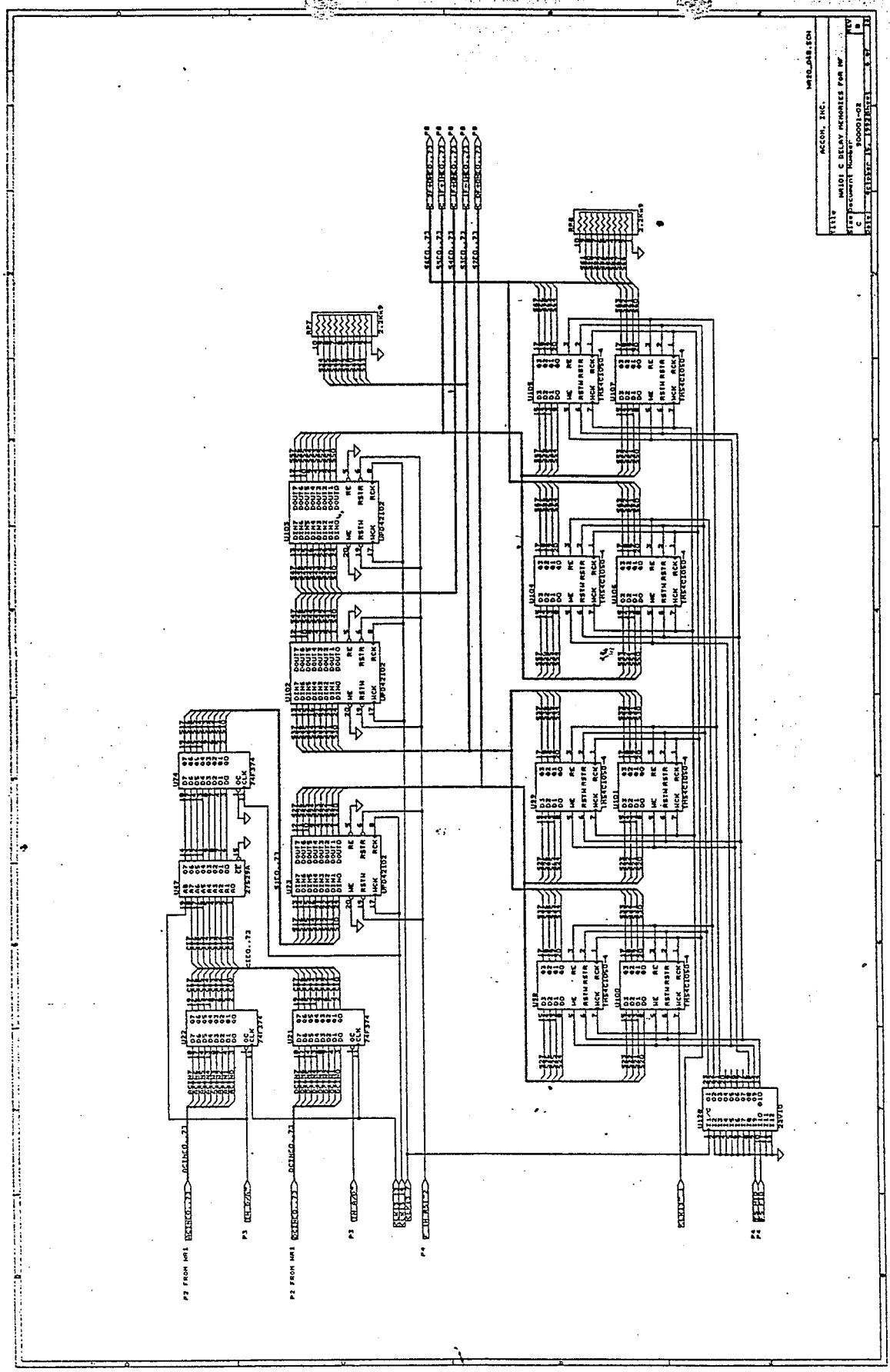

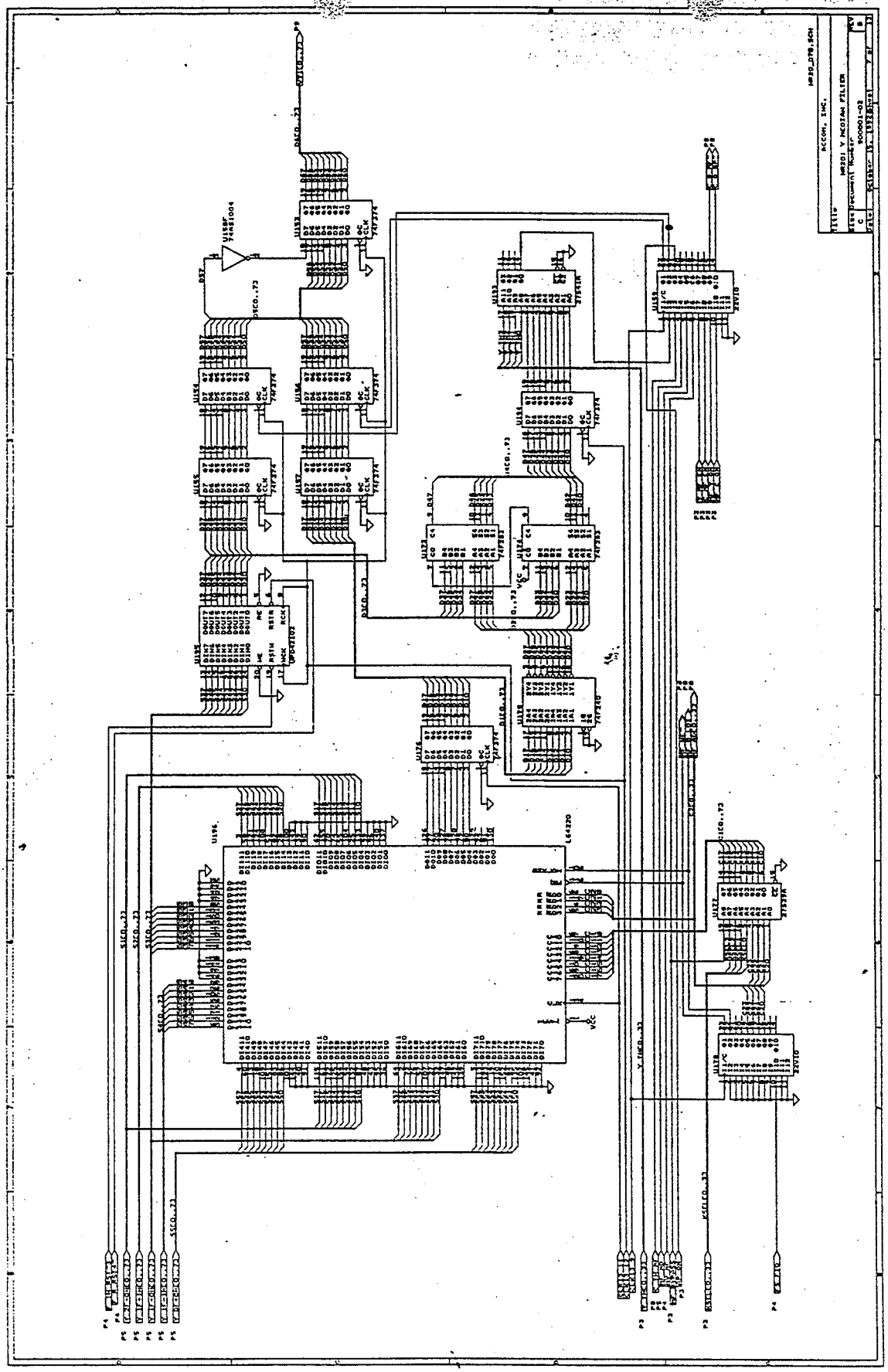

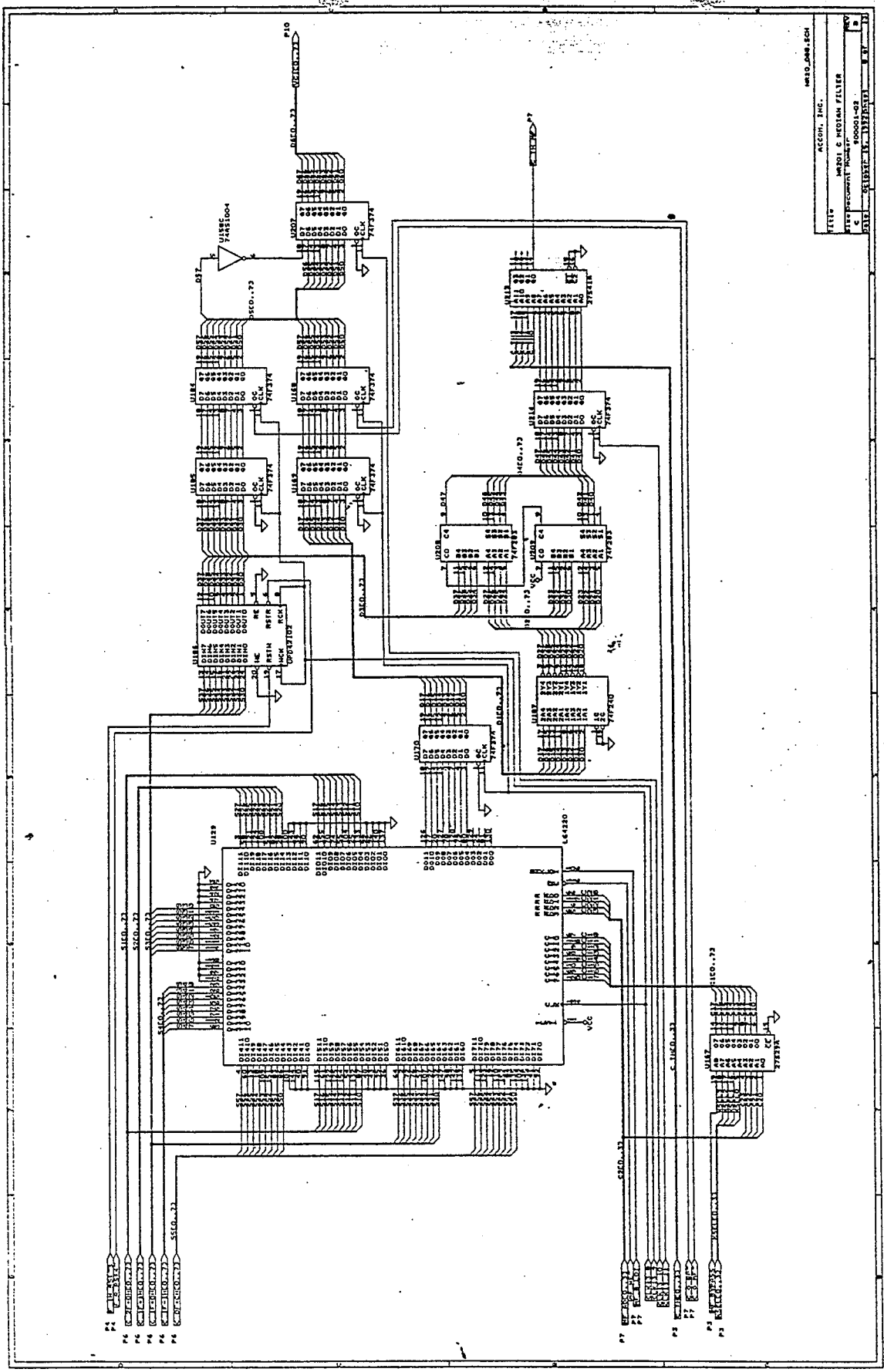

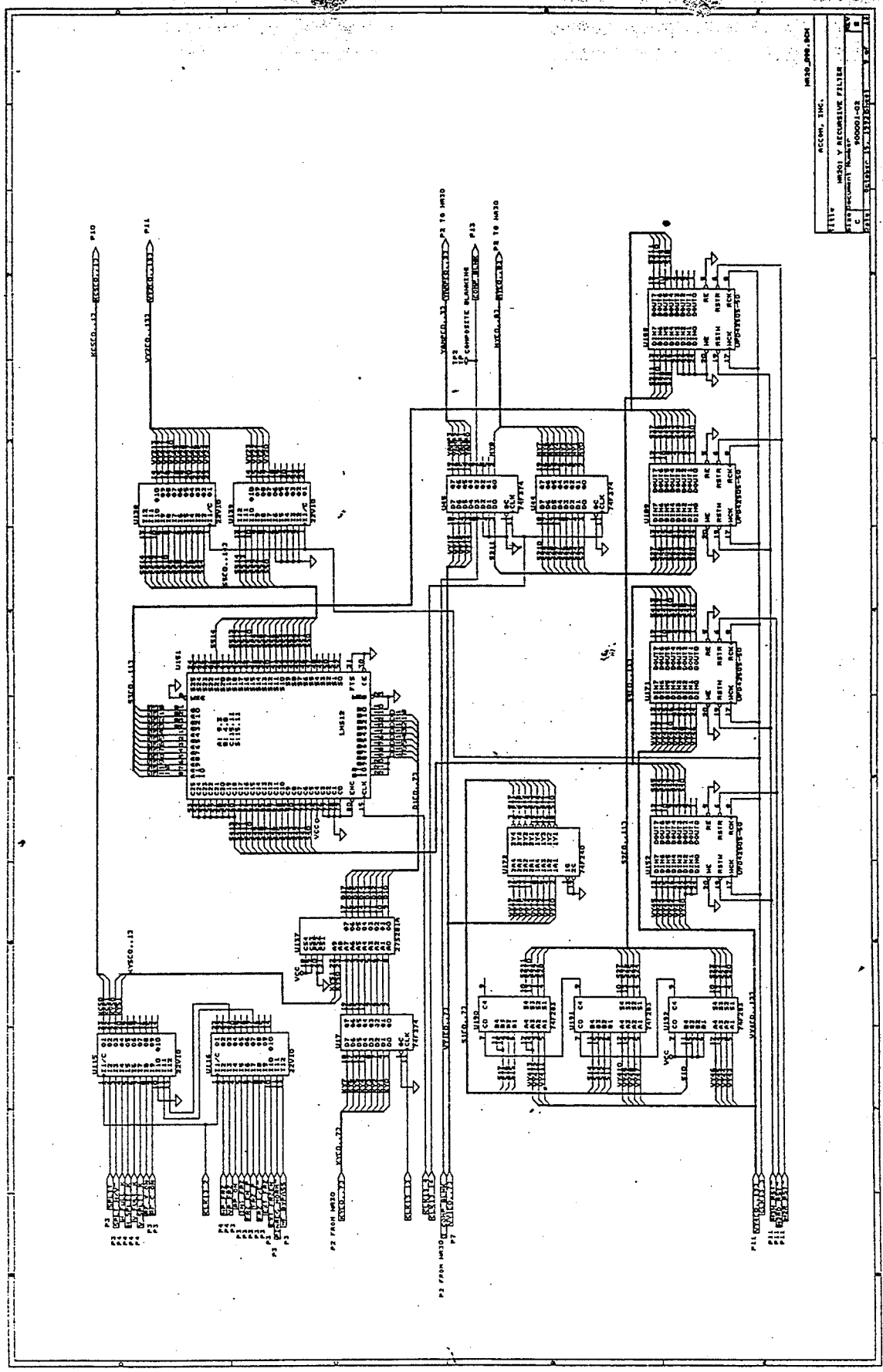

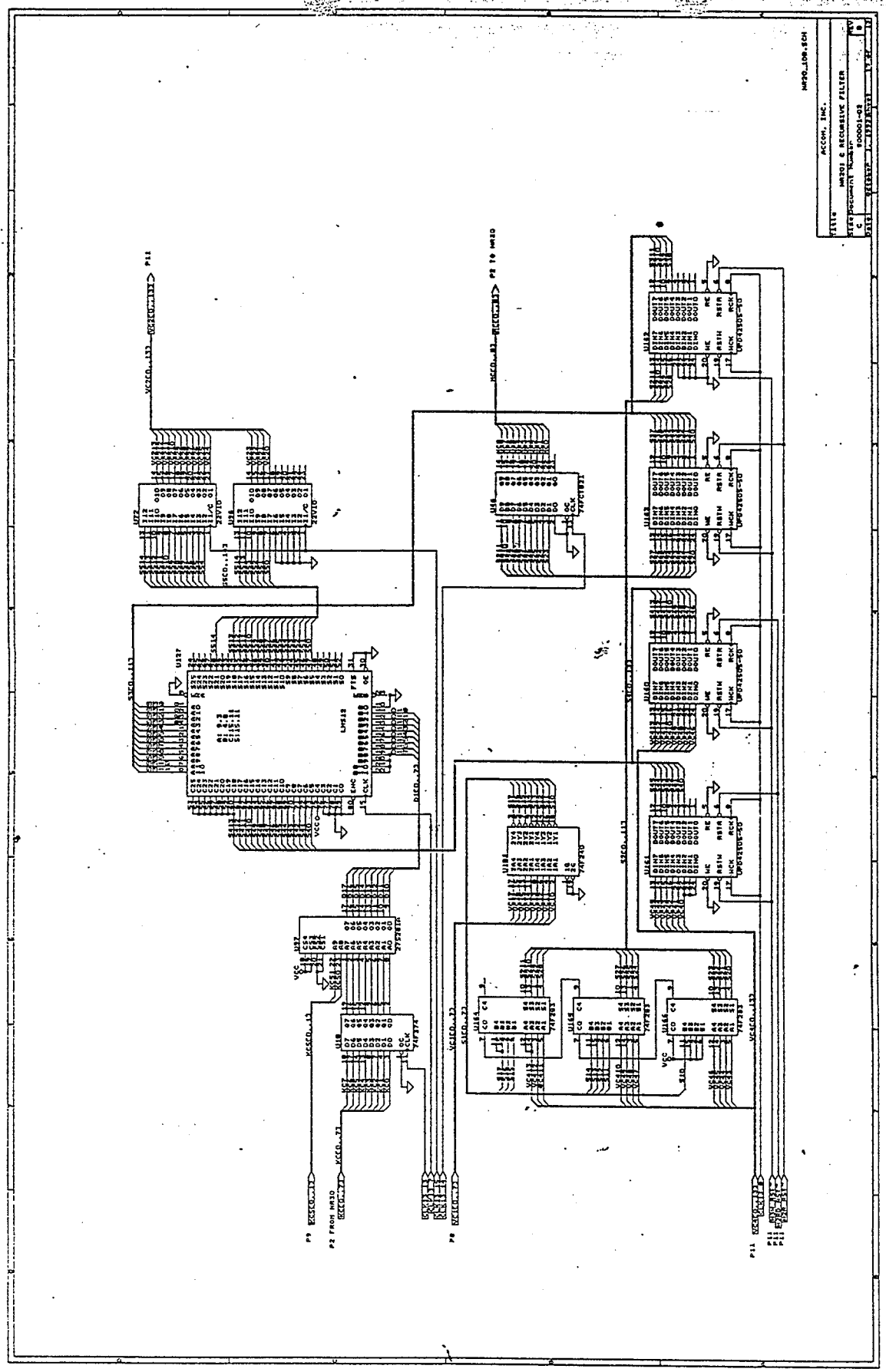

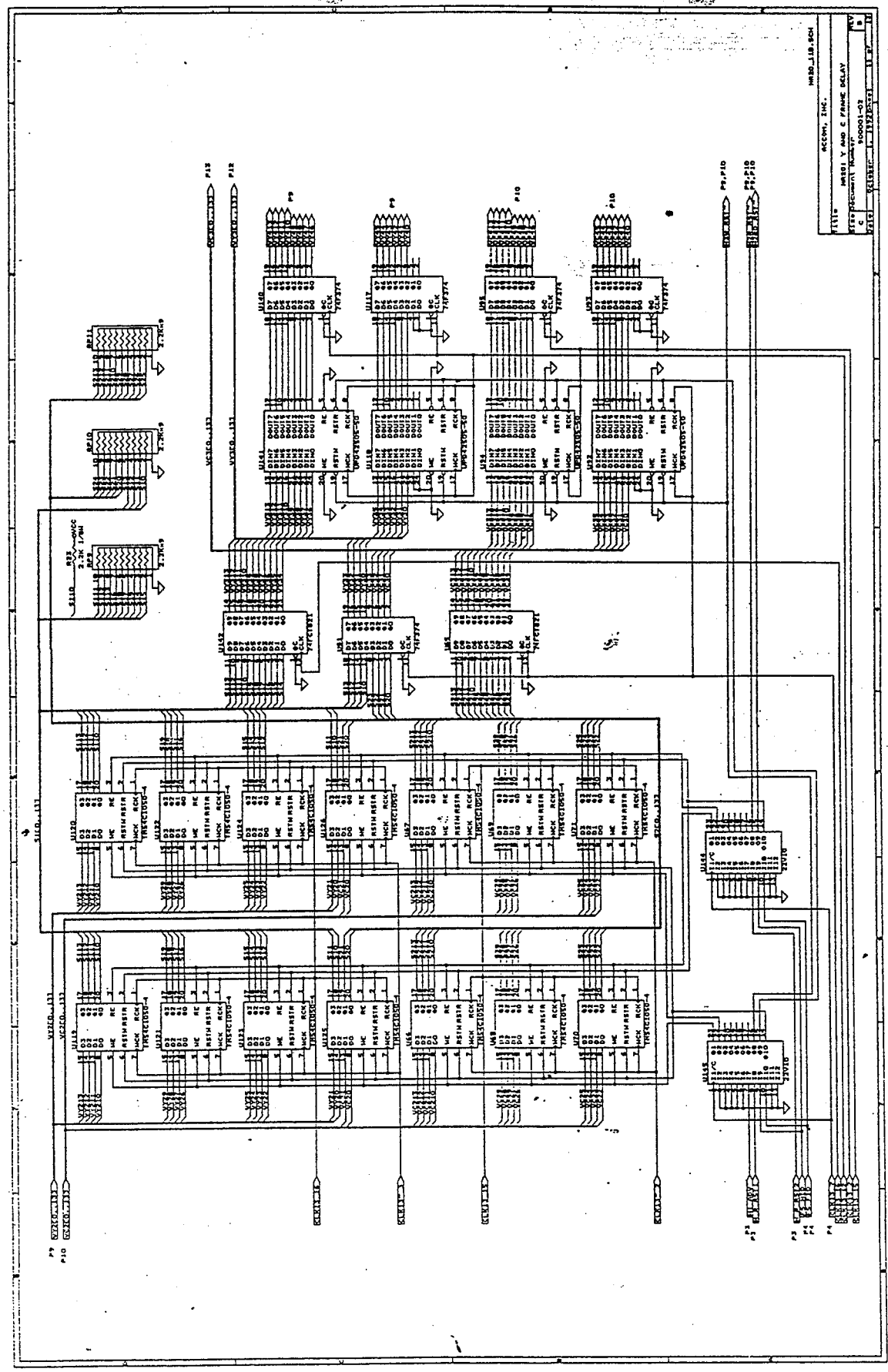

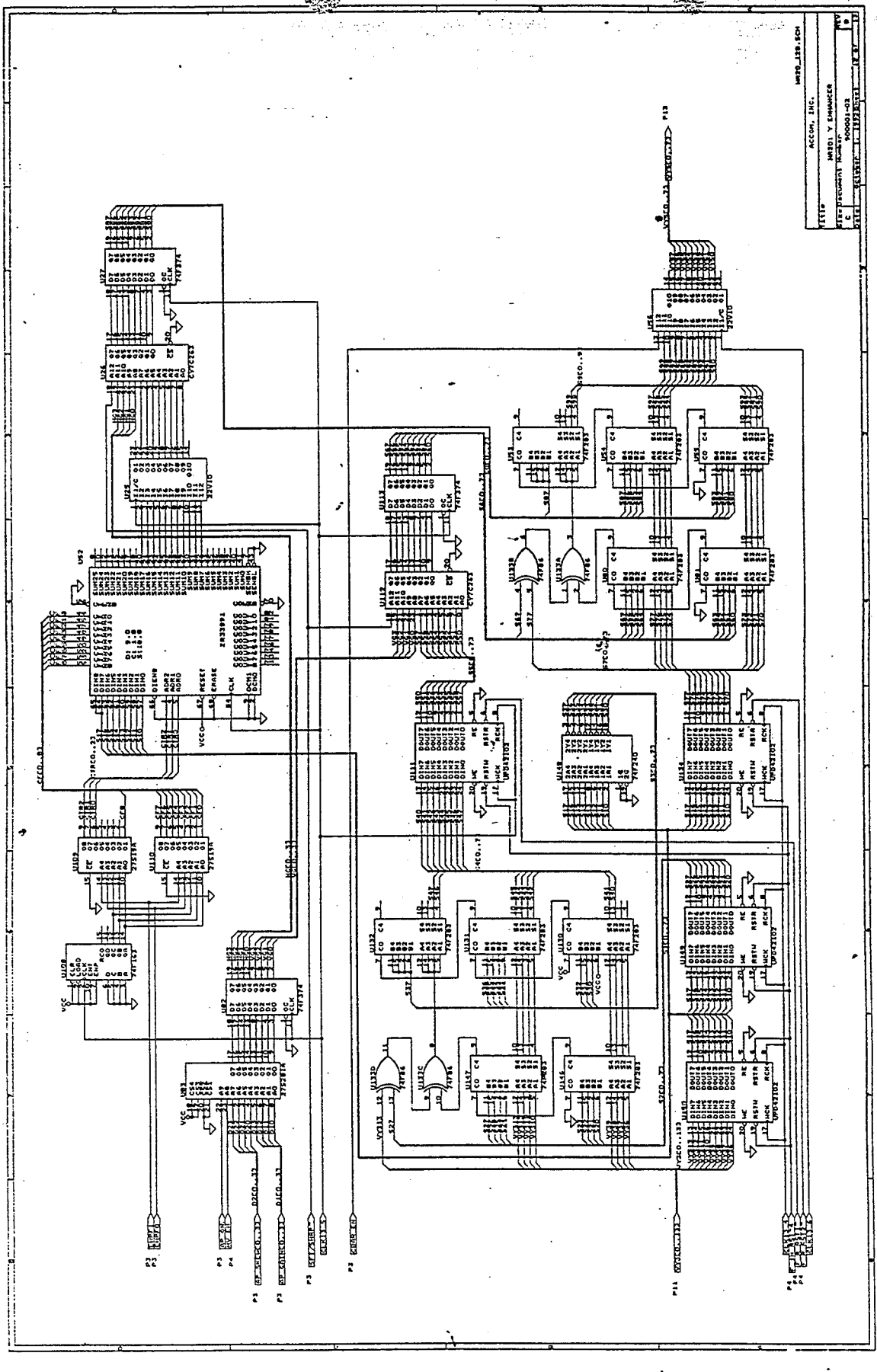

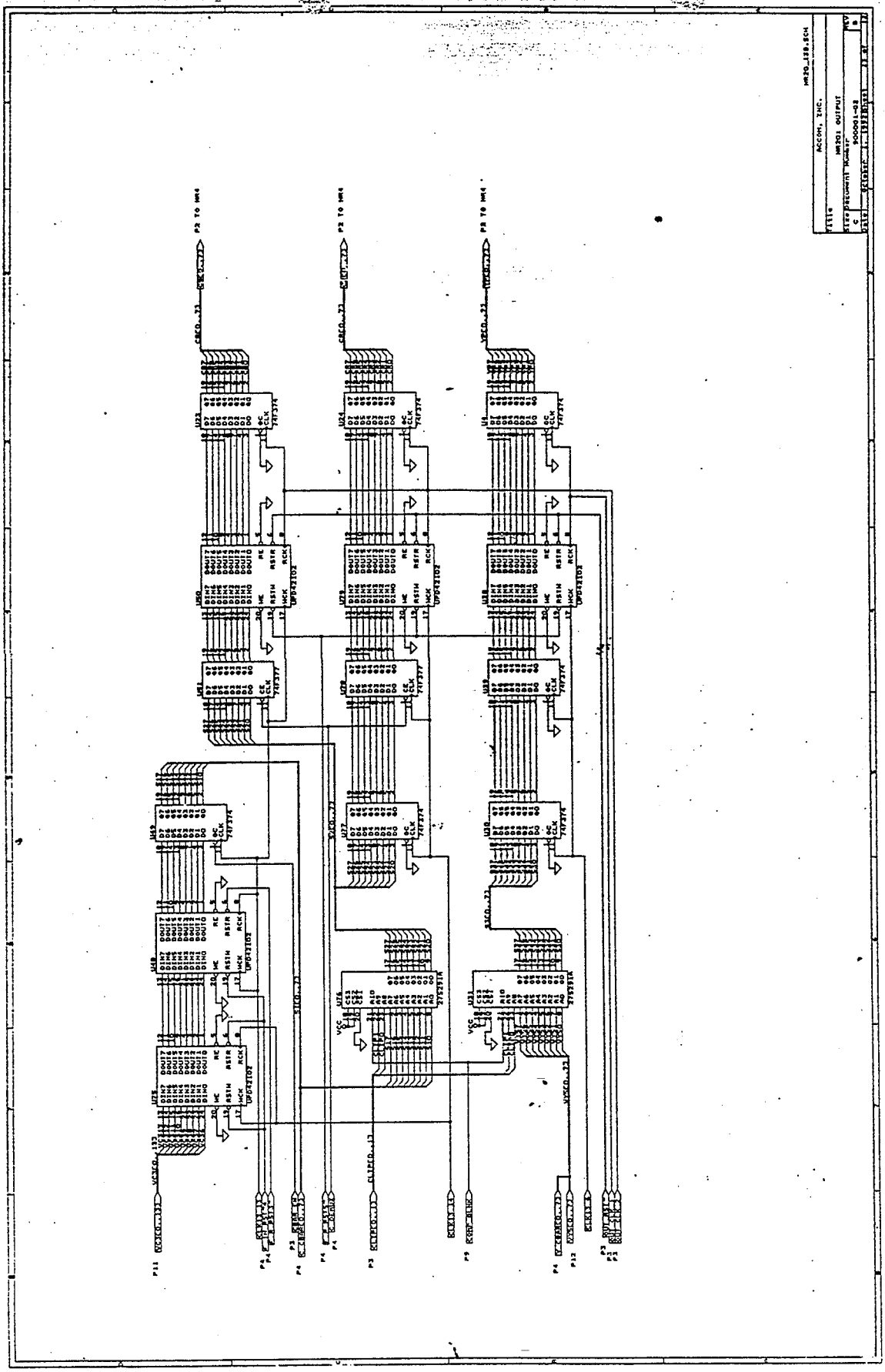

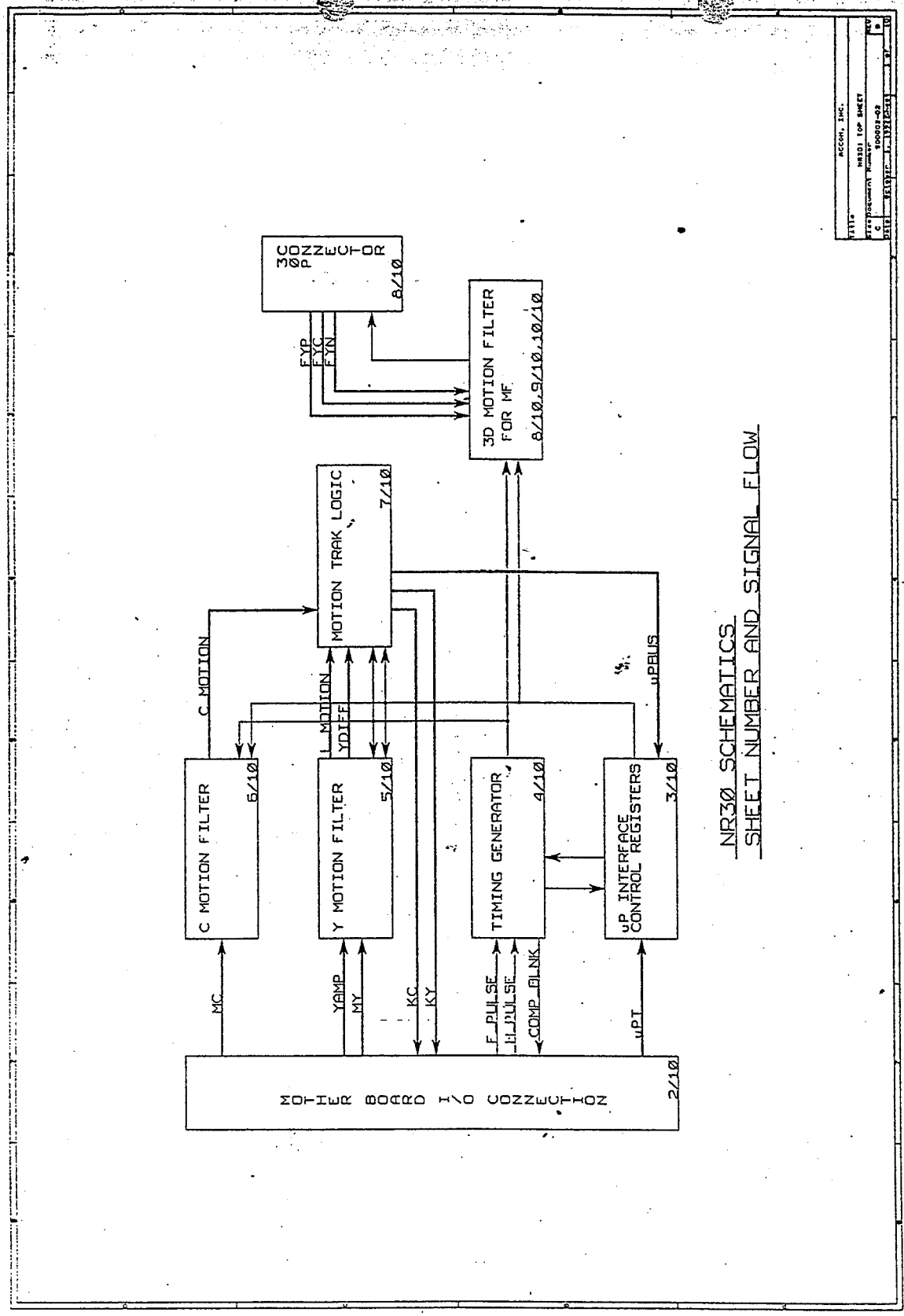

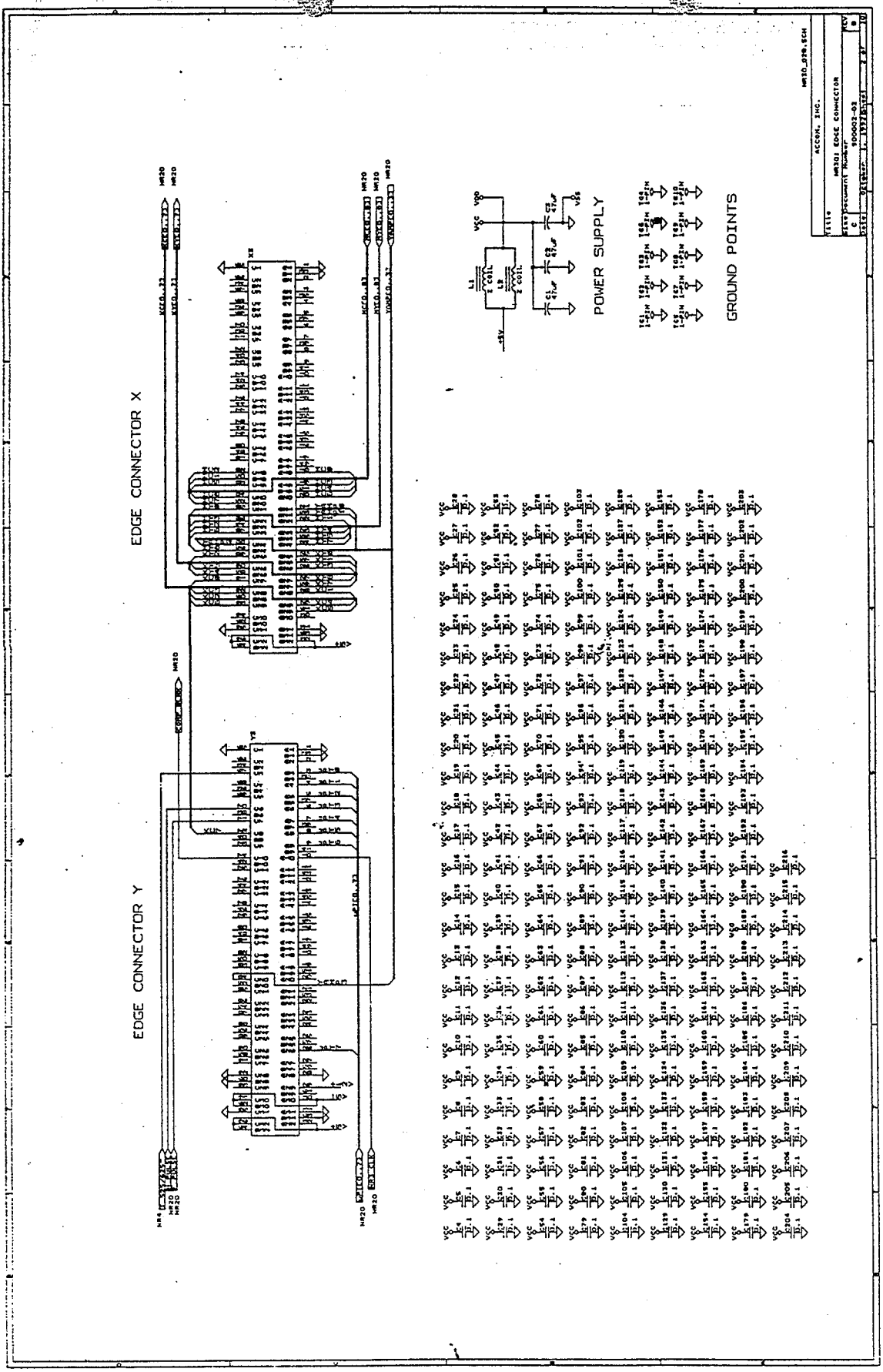

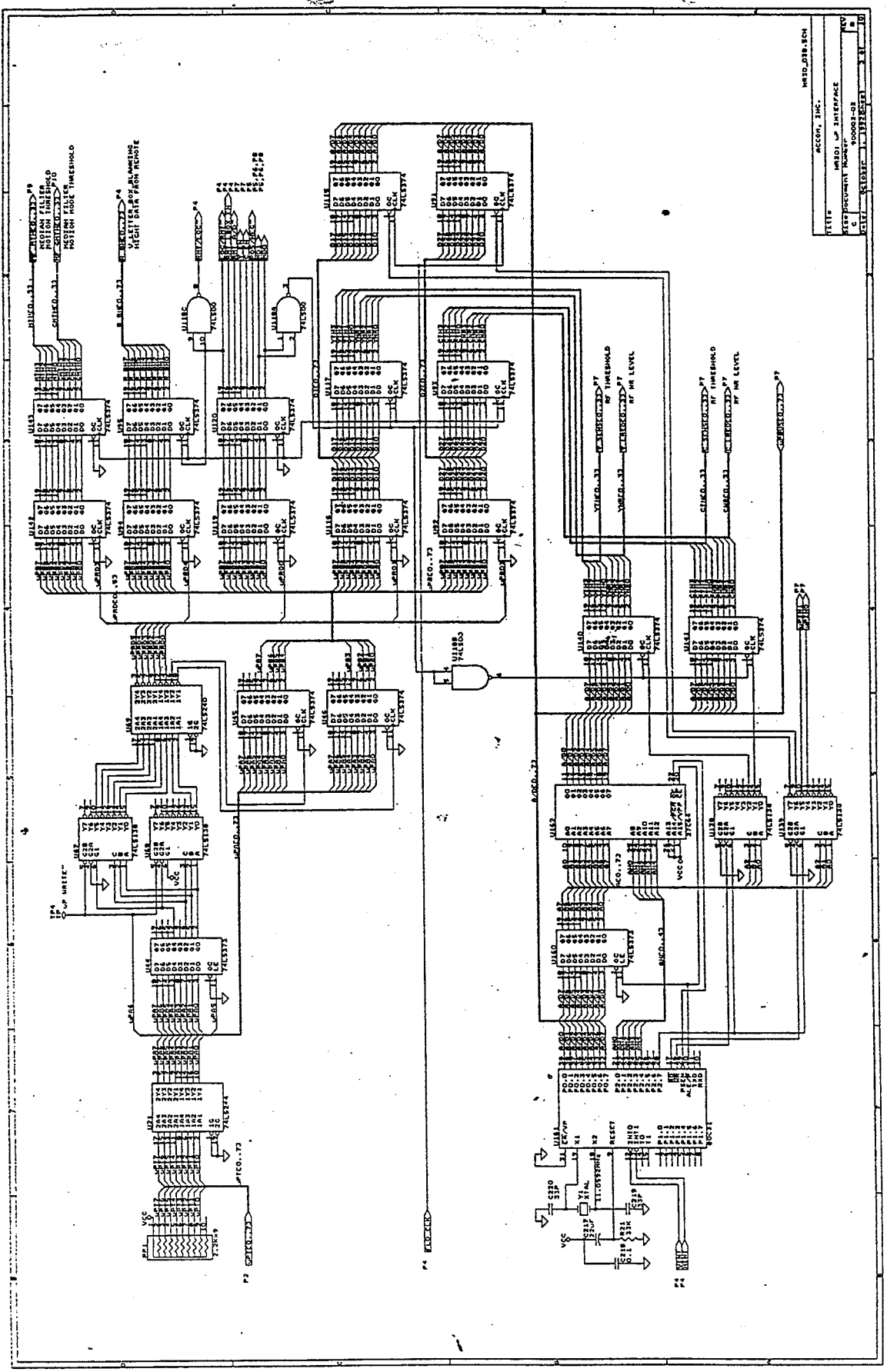

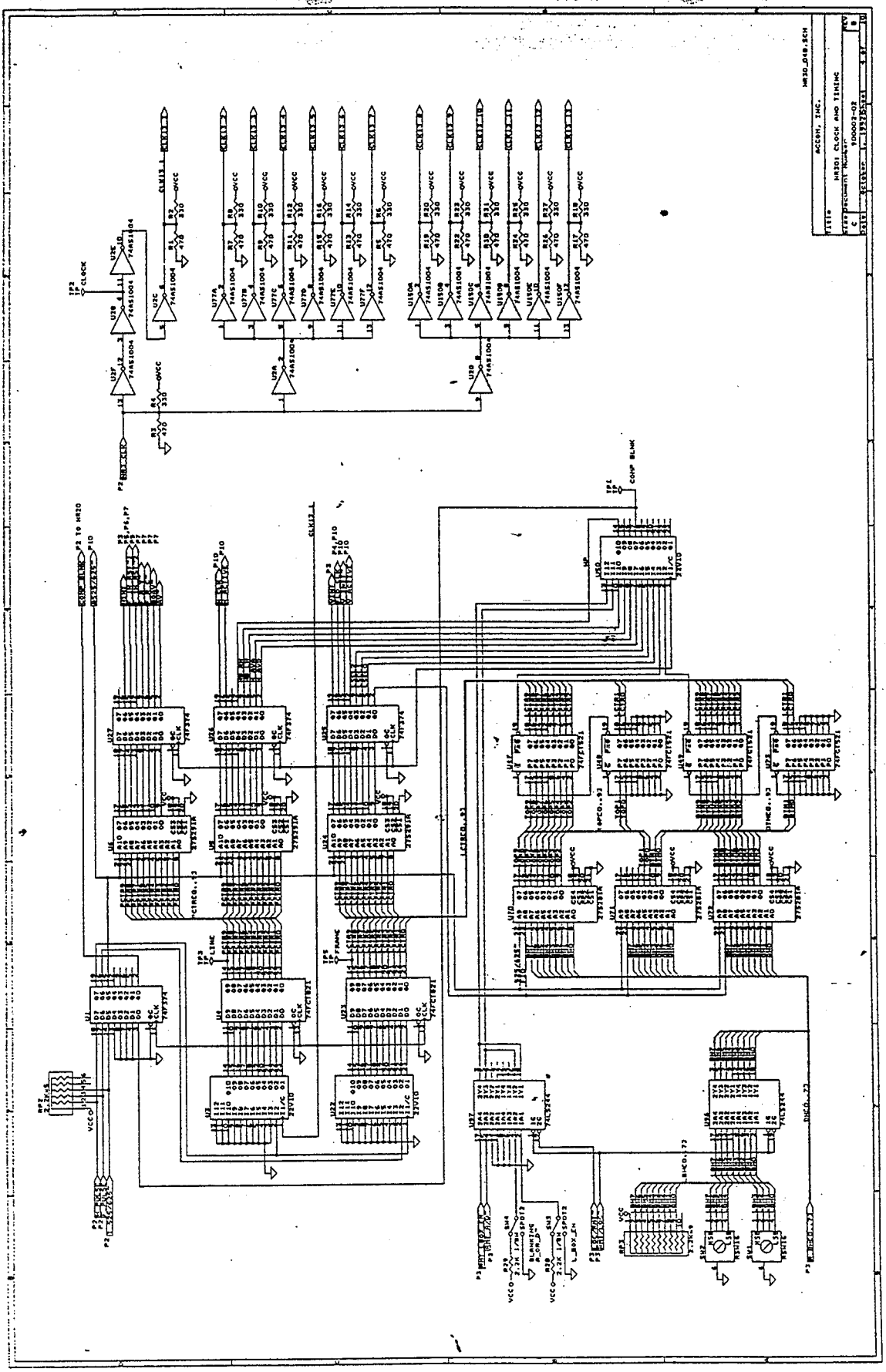

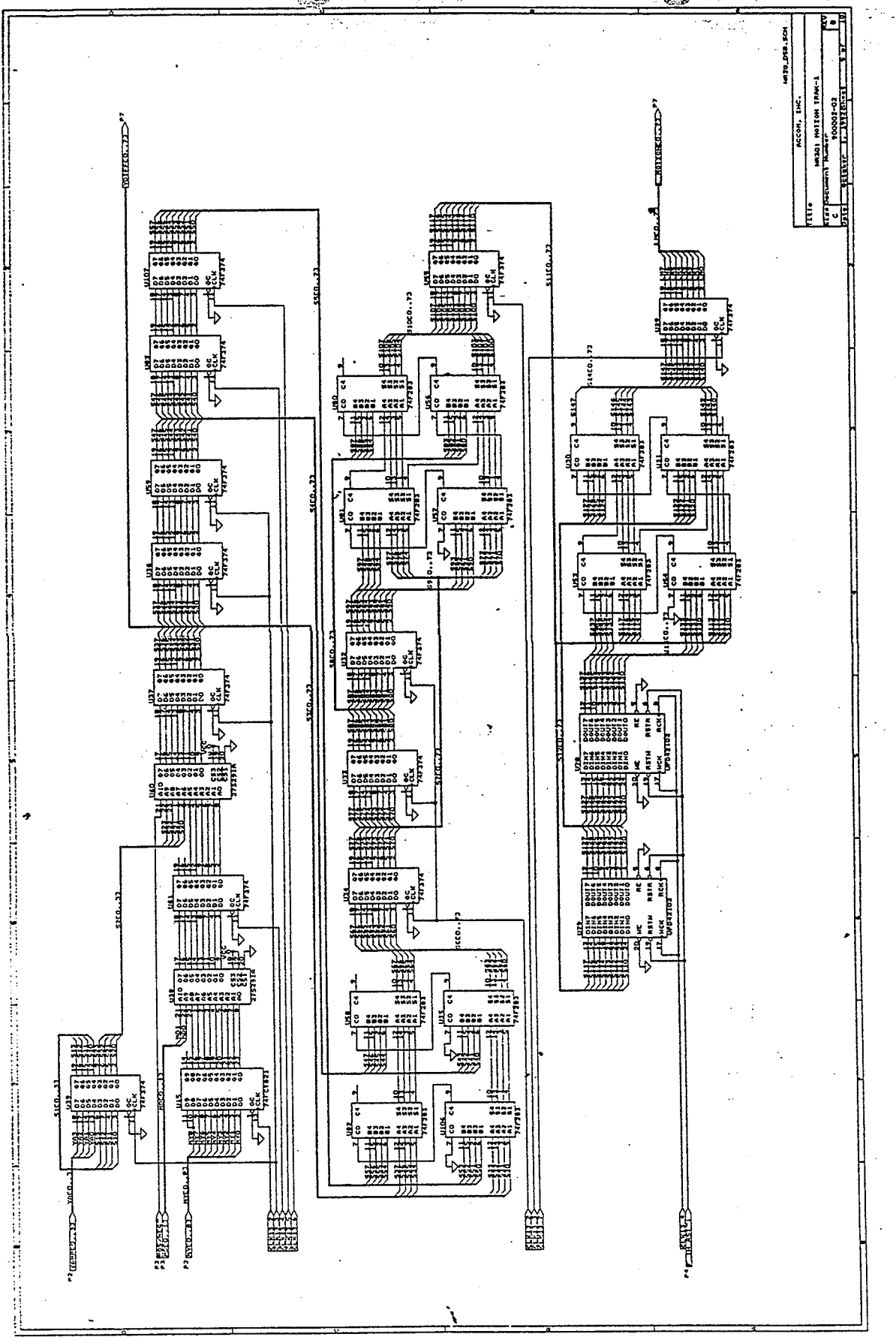

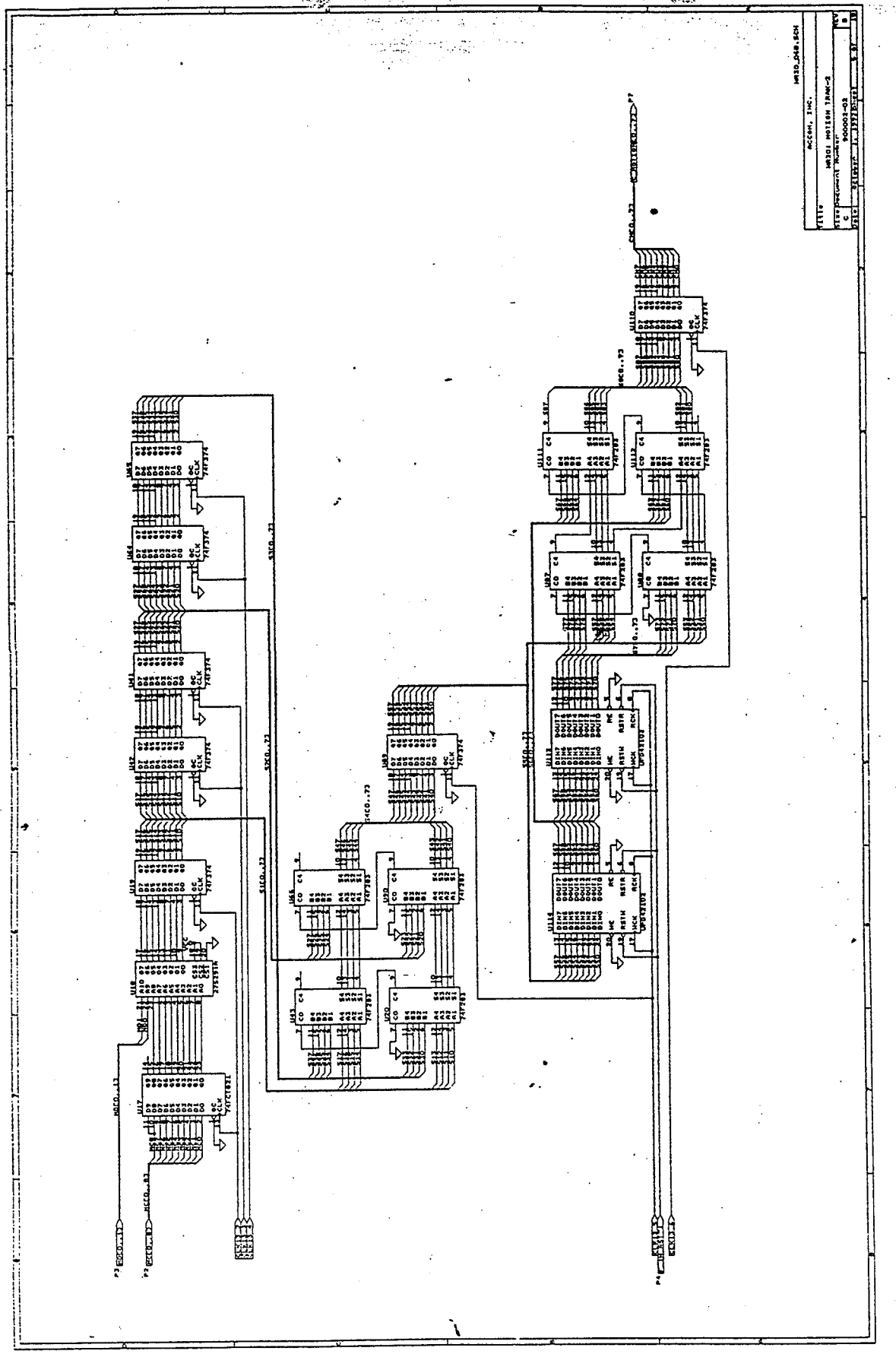

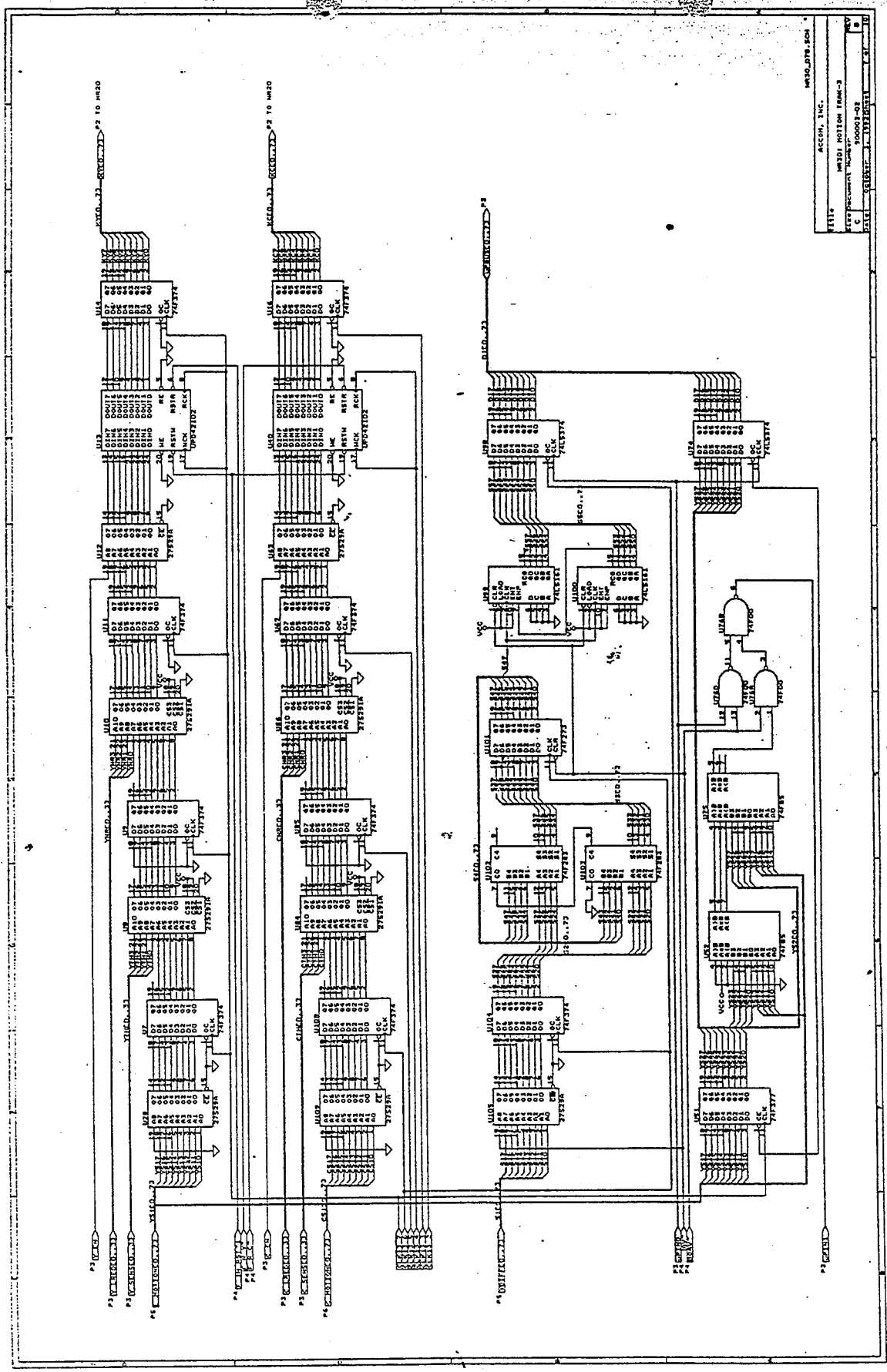

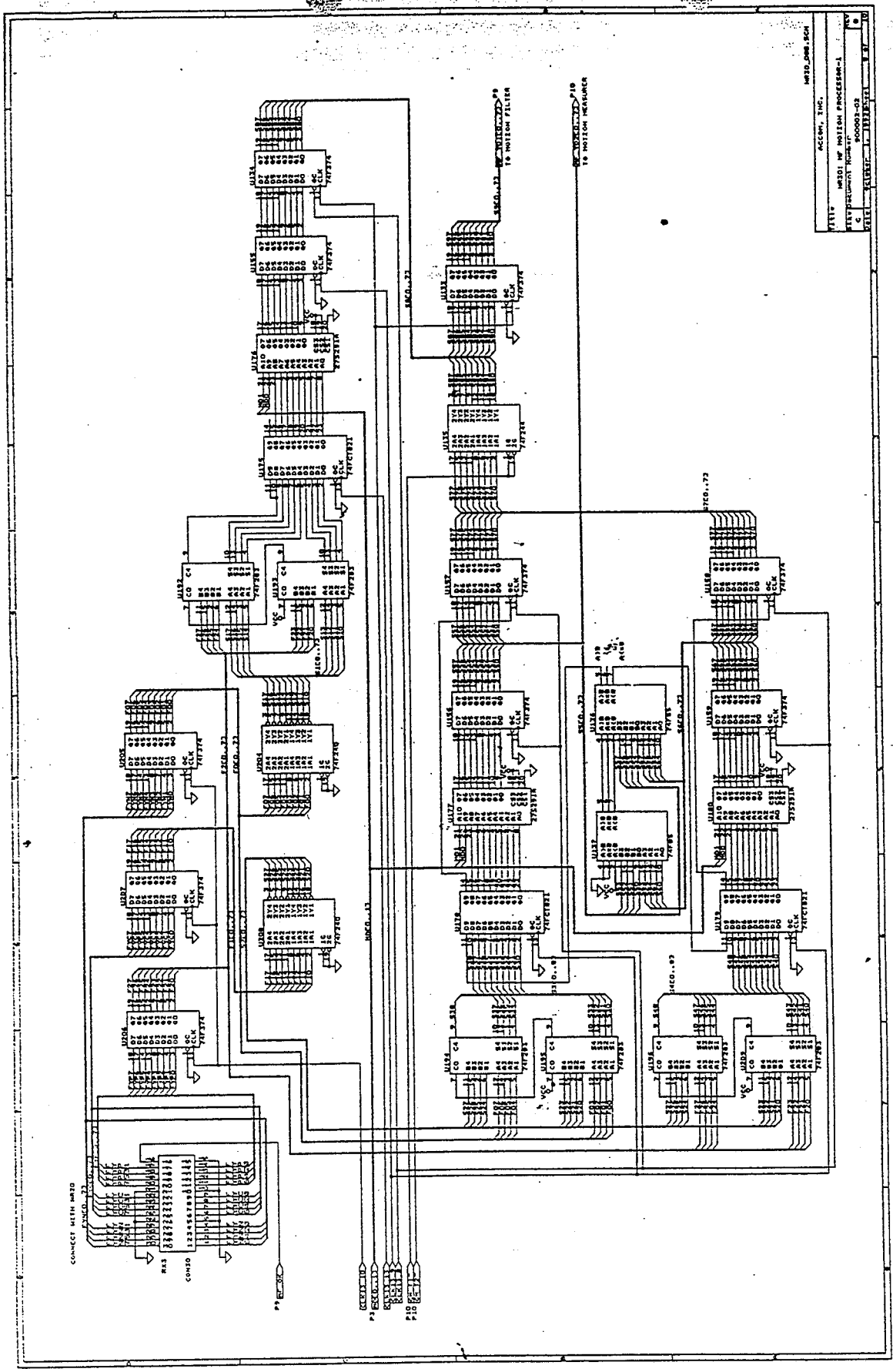

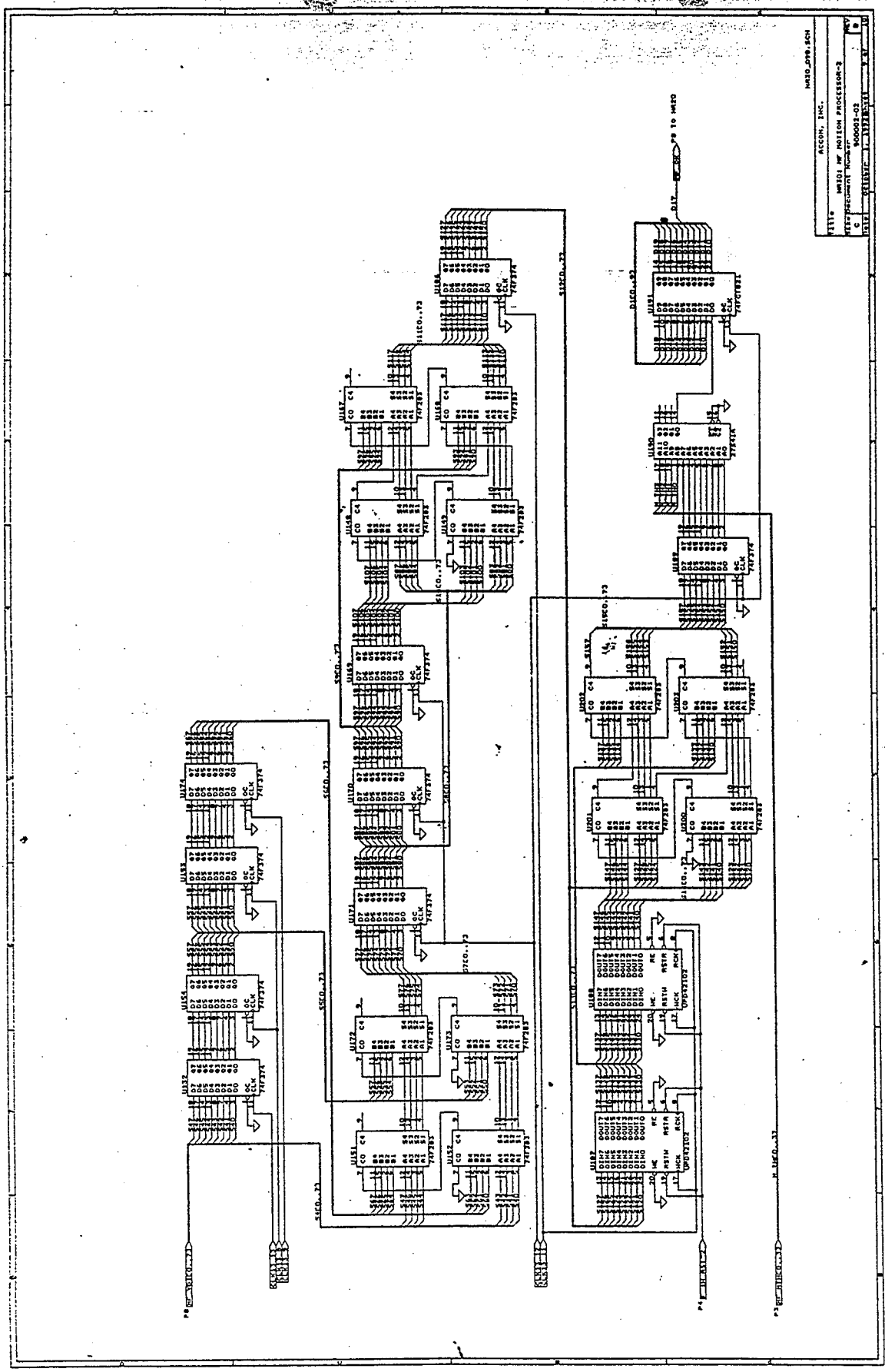

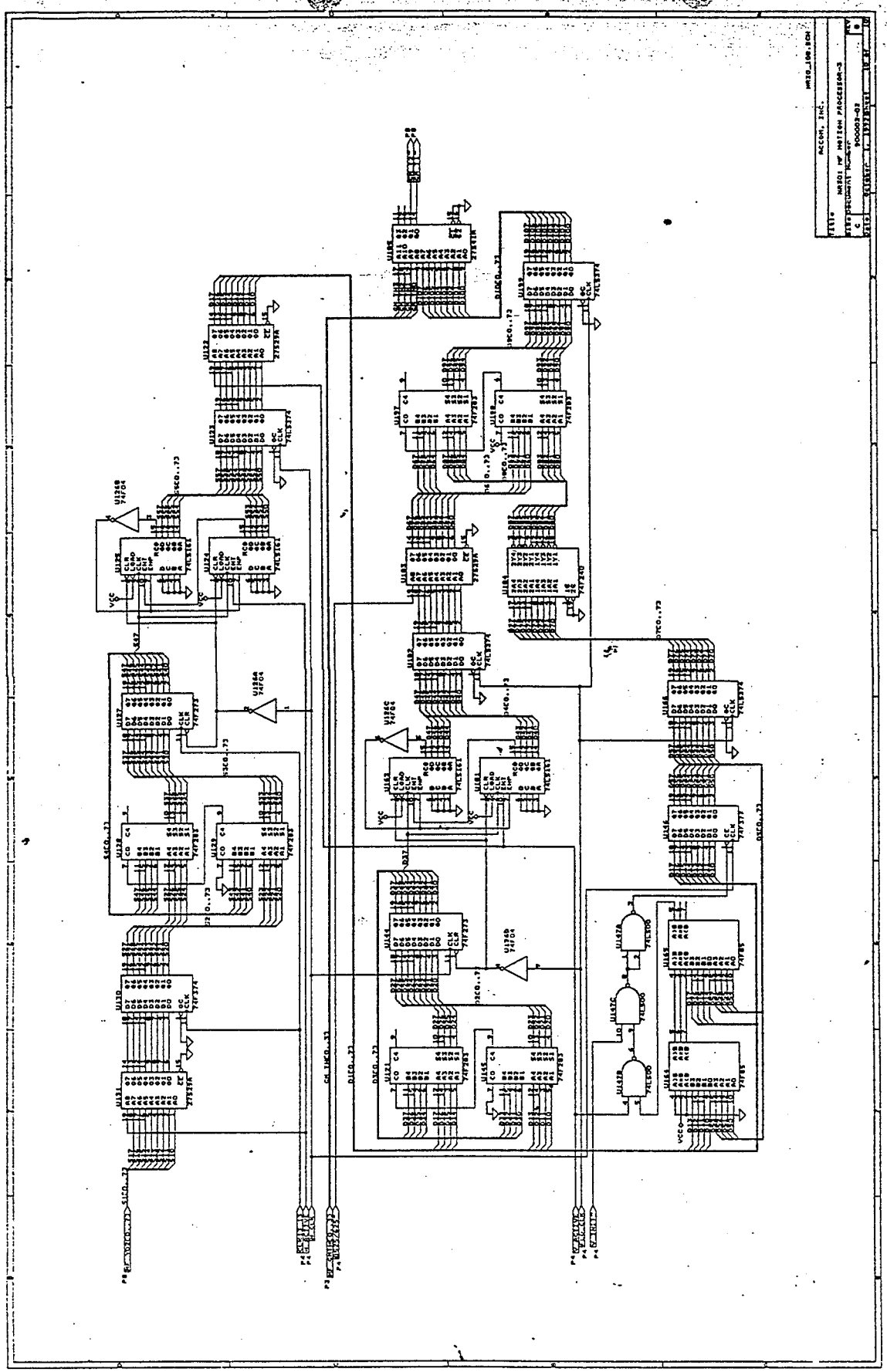

APPENDIX II

[NR20 REV-B BOARD, LIST OF PROGRAMMABLE DEVICES] : FWNR20BA01

[PROM]

| Location | Label | File Name | CSum | Part No. | Package | Size | PROM Name |
|---|---|---|---|---|---|---|---|
| 1. U109 | NR20BA109A | N20_M01A.BIN | 0E10 | 423-00013 | 16P 300 | 32x8 | 27S19A |
| 2. U110 | NR20BA110A | N20_M02A.BIN | 1000 | 423-00013 | 16P 300 | 32x8 | 27S19A |
| 3. U47 | NR20BA047A | N20_M03A.BIN | FF00 | 423-00029 | 20P 300 | 512x8 | 27S29A |
| 4. U167 | NR20BA167A | N10_M04A.BIN | 3958 | 423-00029 | 20P 300 | 512x8 | 27S29A |
| 5. U177 | NR20BA177A | N10_M05A.BIN | 34BC | 423-00029 | 20P 300 | 512x8 | 27S29A |
| 6. U83 | NR20BA083A | N20_M06A.BIN | 5FA0 | 423-00281 | 24P 300 | 1Kx8 | 27S281A |
| 7. U97 | NR20BA097A | N20_M07A.BIN | FE00 | 423-00281 | 24P 300 | 1Kx8 | 27S281A |
| 8. U137 | NR20BA137A | N20_M08A.BIN | FE00 | 423-00281 | 24P 300 | 1Kx8 | 27S281A |
| 9. U31 | NR20BA031A | N20_M09A.BIN | 3D2E | 423-00006 | 24P 300 | 2Kx8 | 27S291A |
| 10. U76 | NR20BA076A | N20_M10A.BIN | FE10 | 423-00006 | 24P 300 | 2Kx8 | 27S291A |
| 11. U193 | NR20BA193A | N10_M11A.BIN | 04DD | 423-00020 | 20P 300 | 4Kx4 | 27S41A |
| 12. U213 | NR20BA213A | N10_M11A.BIN | 04DD | 423-00020 | 20P 300 | 4Kx4 | 27S41A |
| 13. U57 | NR20BA057A | N20_M12A.BIN | 55AD | 423-00019 | 24P 300 | 4Kx8 | WS57C43B |
| 14. U59 | NR20BA059A | N20_M13A.BIN | B8B8 | 423-00019 | 24P 300 | 4Kx8 | WS57C43B |
| 15. U60 | NR20BA060A | N20_M14A.BIN | ACE0 | 423-00019 | 24P 300 | 4Kx8 | WS57C43B |
| 16. U61 | NR20BA061A | N20_M15A.BIN | 270E | 423-00019 | 24P 300 | 4Kx8 | WS57C43B |
| 17. U62 | NR20BA062A | N20_M16A.BIN | 6DD1 | 423-00019 | 24P 300 | 4Kx8 | WS57C43B |
| 18. U88 | NR20BA088A | N20_M17A.BIN | AE70 | 423-00019 | 24P 300 | 4Kx8 | WS57C43B |
| 19. U90 | NR20BA090A | N20_M18A.BIN | 4A80 | 423-00019 | 24P 300 | 4Kx8 | WS57C43B |
| 20. U26 | NR20BA026A | N20_M19A.BIN | EE78 | 423-61263 | 24P 300 | 8Kx8 | CY7C263-35,WS57C49B-35 |
| 21. U112 | NR20BA112A | N20_M20A.BIN | F670 | 423-61263 | 24P 300 | 8Kx8 | CY7C263-35,WS57C49B-35 |

[NR30 REV-B BOARD, LIST OF PROGRAMMABLE DEVICES] : FWNR30BA01

[PROM]

| Location | Label | File Name | CSum | Part No. | Package | Size | PROM Name |
|---|---|---|---|---|---|---|---|
| 1. U12 | NR30BA012A | N30_M01A.BIN | FF80 | 423-00029 | 20P 300 | 512x8 | 27S29A |
| 2. U28 | NR30BA028A | N30_M02A.BIN | 8782 | 423-00029 | 20P 300 | 512x8 | 27S29A |
| 3. U63 | NR30BA063A | N30_M01A.BIN | FF80 | 423-00029 | 20P 300 | 512x8 | 27S29A |
| 4. U105 | NR30BA105A | N30_M03A.BIN | 5FC0 | 423-00029 | 20P 300 | 512x8 | 27S29A |
| 5. U109 | NR30BA109A | N30_M04A.BIN | 8782 | 423-00029 | 20P 300 | 512x8 | 27S29A |
| 6. U122 | NR30BA122A | N30_M05A.BIN | 6300 | 423-00029 | 20P 300 | 512x8 | 27S29A |
| 7. U131 | NR30BA131A | N30_M06A.BIN | 2679 | 423-00029 | 20P 300 | 512x8 | 27S29A |
| 8. U183 | NR30BA183A | N30_M07A.BIN | FEFF | 423-00029 | 20P 300 | 512x8 | 27S29A |
| 9. U70 | NR30BA070A | N30_M08A.BIN | C0C0 | 423-00281 | 24P 300 | 1Kx8 | 27S281A |
| 10. U71 | NR30BA071A | N30_M09A.BIN | 1E00 | 423-00281 | 24P 300 | 1Kx8 | 27S281A |
| 11. U72 | NR30BA072A | N30_M10A.BIN | 8980 | 423-00281 | 24P 300 | 1Kx8 | 27S281A |
| 12. U5 | NR30BA005A | N30_M11A.BIN | AB7A | 423-00006 | 24P 300 | 2Kx8 | 27S291A |
| 13. U6 | NR30BA006A | N30_M12A.BIN | DA82 | 423-00006 | 24P 300 | 2Kx8 | 27S291A |
| 14. U8 | NR30BA008A | N30_M13A.BIN | D9D7 | 423-00006 | 24P 300 | 2Kx8 | 27S291A |
| 15. U10 | NR30BA010A | N30_M14A.BIN | 8382 | 423-00006 | 24P 300 | 2Kx8 | 27S291A |
| 16. U18 | NR30BA018A | N30_M15A.BIN | E2BA | 423-00006 | 24P 300 | 2Kx8 | 27S291A |

```
17. U24  : NR30BA024A : N30_M16A.BIN : 2672 : 423-00006 : 24P 300 : 2Kx8 : 27S291A
18. U38  : NR30BA038A : N30_M17A.BIN : 2288 : 423-00006 : 24P 300 : 2Kx8 : 27S291A
19. U60  : NR30BA060A : N30_M18A.BIN : D3AA : 423-00006 : 24P 300 : 2Kx8 : 27S291A
20. U84  : NR30BA084A : N30_M19A.BIN : D9D7 : 423-00006 : 24P 300 : 2Kx8 : 27S291A
21. U86  : NR30BA086A : N30_M20A.BIN : 8382 : 423-00006 : 24P 300 : 2Kx8 : 27S291A
22. U176 : NR30BA176A : N30_M21A.BIN : 2288 : 423-00006 : 24P 300 : 2Kx8 : 27S291A
23. U177 : NR30BA177A : N30_M21A.BIN : 2288 : 423-00006 : 24P 300 : 2Kx8 : 27S291A
24. U180 : NR30BA180A : N30_M21A.BIN : 2288 : 423-00006 : 24P 300 : 2Kx8 : 27S291A

25. U185 : NR30BA185A : N30_M22A.BIN : 1169 : 423-00020 : 20P 300 : 4Kx4 : 27S41A
26. U190 : NR30BA190A : N30_M23A.BIN : 03ED : 423-00020 : 20P 300 : 4Kx4 : 27S41A

27. U162 : NR30BA162A : AUTONR.D     : 9696 : 423-00010 : 28P 600 : 8Kx8 : 27C64
```

[PAL]
```
Location : Label      : File Name   : CSum : Part No.  : Package : PAL Name
-----------------------------------------------------------------------------
1. U3    : NR30BA003A : N30_L01A.JED : 4E67 : 427-00001 : 24P 300 : 22V10
2. U22   : NR30BA022A : N30_L02A.JED : 4DF6 : 427-00001 : 24P 300 : 22V10
3. U50   : NR30BA050A : N30_L03A.JED : 7E9C : 427-00001 : 24P 300 : 22V10
```

```pascal
{------------------------------------------------------------------}
{   Main program for PROM code generation                          }
{              April 1987              Sohei Takemoto              }
{   Turbo Pascal 3.0                                               }
{   PROMLIB.SYS and PROMLIB.PAS need to be included                }
{          DIE125M          Fall 1992                              }
{------------------------------------------------------------------}

{$G256,P256}   {for I/O redirection} const
  DSize = 1024;
type
  MaxWord = 0..DSize;   {maximum size of PROM code in words}

{$I c:\work\prom\promlib.sys}   {type declarations}
{$I c:\work\prom\promlib.pas}   {procedures}

{------------------------------------------------------------------}
{Special addition for conversion of filter coefficients}
type
  Range1 = 0..36;
  HHexText = string [10];
  RAry1 = array [Range1] of real;
  IAry1 = array [Range1] of integer;
  HAry1 = array [Range1] of HHexText;
  DCond = record      {for condition}
    IQ   : integer;  {given filter length}
    ITQ  : integer;  {converted filter length}
    IWL  : integer;  {number of bits per word}
  end;
  LCoef = record      {for a set of coefficients}
    Coef   : RAry1;  {real coefficient}
    TCoef  : RAry1;  {real coefficient after truncation}
    ICoef  : IAry1;  {integer, word-limited coefficient}
    IUCoef : IAry1;  {ICoef truncated}
    HCoef  : HAry1;  {Hex form of ICoef}
```

```
    DCon      : DCond; {condition}
    ICSum     : integer; {sum of ICoef}
  end;

procedure PtTrunc(TN: integer; var Lag: LCoef);
{truncate number of active points to TN (even)
  N points in Coef to TN points in TCoef
  with adjustment for unity gain at DC} function RSum(RealC: RAry1; n: integer): real;
  var k: integer;
      sum: real;
  begin
    sum := 0.0;
    for k := 0 to n-1 do
      sum := sum + RealC[k];
    RSum := sum;
  end; {function RSum} function ISum(IntC: IAry1; n: integer): integer;
  var sum, k: integer;
  begin
    sum := 0;
    for k := 0 to n-1 do
      sum := sum + IntC[k];
    ISum := sum;
  end; {function ISum} var
  CM, IC: IAry1;
  RC1, RC2: RAry1;
  nd, mid, ifact, sum, kmax, i: integer;
  rfact, rs, dmax, diff: real;
begin {procedure PtTrunc}
  if (Lag.DCon.ITQ mod 2) = 0 then  mid := 100
  else  mid := (TN div 2) -1;
  nd := (Lag.DCon.ITQ - TN) div 2;
  ifact := 1;
  for i := 1 to Lag.DCon.IWL-1 do
    ifact := ifact * 2;
  rfact := ifact;
  for i := 0 to TN-1 do
    RC1[i] := Lag.Coef[i+nd];
  for i := 0 to TN-1 do
  begin
    IC[i] := Round(RC1[i] * rfact);
    RC2[i] := IC[i] / rfact;
  end; {for i, setup data}

(* Adjustment for DC gain 1.0 is removed *)

for i := 0 to TN-1 do
  begin
    Lag.TCoef[i] := 0.0;
    Lag.ICoef[i] := 0;
  end;
  for i := 0 to TN-1 do
  begin
```

```
      Lag.TCoef[i+nd] := RC2[i];
      Lag.ICoef[i+nd] := IC[i];
      Lag.IUCoef[i] := IC[i];
    end;
    Lag.ICSum := ISum(Lag.IUCoef, TN);
{   Writeln('Sum check = ', Lag.ICSum:5);}
  end; {procedure PtTrunc} procedure Hn_input (Name: Header; var Ln: integer; var HnIn: RAry1);
{data input for Impulse response from a text file}
  var
    hnfile : Text;   {file identifier}
    i : integer;
  begin {procedure Hn_input}
    Assign (hnfile, Name);
    Reset (hnfile);
    Readln (hnfile, Ln);
    for i := 0 to Ln-1 do
      Readln (hnfile, HnIn[i]);
    Close (hnfile);
  end; {procedure Hn_input}
procedure FLMod (IL, OL: integer; var HnIn: RAry1);
{modify Impulse response
   extend by adding 0's on both side
     IL : length of input
     OL : length of output
   if OL-IL is odd then one less 0 at left than right
   if OL <= IL do nothing }
  var
    i, dif: integer;
    Buf: RAry1;
  begin {procedure FLMod}
    if OL > IL then
    begin
      dif := (OL - IL) div 2;
      for i := 0 to OL-1 do
        Buf[i] := 0.0;
      for i := 0 to IL-1 do
        Buf[i+dif] := HnIn[i];
      HnIn := Buf;
    end; {if OL}
  end; {procedure FLMod} procedure HN_Shift (nCS, OL: integer; var IHn: IAry1);
{modify Impulse response
   circular shift : [i] <- [i+nCS]
   OL : length of impulse response   }
  var
    i: integer;
    Buf: IAry1;
  begin {procedure HN_Shift}
    Buf := IHn;
    for i := 0 to OL-1 do
      if (i+nCS) < OL then
        IHn[i] := Buf[i+nCS]
      else IHn[i] := Buf[(i+nCS) mod OL];
  end; {procedure HN_Shift}
```

```
procedure YFill(Gain:real; FNI:Header; ConI:DCond; var IAI:IntData;
                Ist:integer);
{ read I filtercharacteristics from file FNI,
  modify the length,
  convert them to the limited conditions given by ConI,
  fill PROM data array IAI starting from word Ist }
var
  FltrI: LCoef;
  i, j: integer;
begin  {procedure YFill}
  Hn_input(FNI, ConI.IQ, FltrI.Coef);    {read a file for I}
  for i := 0 to ConI.IQ-1 do
     FltrI.Coef[i] := FltrI.Coef[i] * Gain;
  PLMod(ConI.IQ, ConI.ITQ, FltrI.Coef);
  FltrI.DCon := ConI;
  PtTrunc(ConI.ITQ, FltrI);         {conversion for I}
  HN_Shift(2, ConI.ITQ, FltrI.IUCoef);
  i := Ist;
  for j := 0 to ConI.ITQ-1 do
  begin
     IAI[i] := FltrI.IUCoef[j];
     i := i + 1;
It is then truncated (expanded) and converted into fixed word length.
  PtTrunc is the procedure.  }

{Control pulses, repeat every 8 words}
  for i := 0 to 7 do
  begin
     OP1[i] := 0;
     if i in [1,3,5,7] then  OP1[i] := OP1[i] + 32;  {CT0=H}
     if i in [2,3,6,7] then  OP1[i] := OP1[i] + 64;  {CT1=H}
     if i in [4,5,6,7] then  OP1[i] := OP1[i] + 128; {CT2=H}
  end; {for i}
  i := 0;
  for j := 0 to 3 do
     for k := 0 to 7 do
     begin
        IA3[i] := OP1[k];
        i := i + 1;
     end;

{common condition}
  CondI.ITQ := 8;         {filter length}
  CondI.IWL := 9;         {coefficient, word length}

{clear PROM's, make it all-stop}
  for i := 0 to PS1.Nword-1 do
     IA1[i] := 0;

{#0; from 0; one unit of controls and coefficients, 8 words}
  YFill(1.0, 'hn7m', CondI, IA1, 0);
{#1; from 8; one unit of controls and coefficients, 8 words}
  YFill(1.0, 'hn7l', CondI, IA1, 8);
{#2; from 16; one unit of controls and coefficients, 8 words}
  YFill(1.0, 'hn7h', CondI, IA1, 16);
{#3; from 24; one unit of controls and coefficients, 8 words}
  YFill(1.0, 'hn7m', CondI, IA1,24);

{check the result before splicing}
```

```
HPrint(IA3, PS1.Nword, 8, 8, 'Y H-BPF control');   Write(^L);
HPrint(IA1, PS1.Nword, 9, 8, 'Y H-BPF coefficient');   Write(^L);

{splicing }
  for i := 0 to PS1.Nword-1 do
  begin
    IA3[i] := IA3[i] or ((IA1[i] shr 8) and 1);
    IA1[i] := IA1[i] and 255;
  end; {for i}

HexPrint (IA3, IA4, PS1);   Write(^L);
  HexPrint (IA1, IA4, PS2);
  WriteBinFile (IA3, IA4, PS1);
  WriteBinFile (IA1, IA4, PS2);
end.
```

```
/*----------------------------------------------------------*/
/*  Main program for PROM code generation                   */
/*       April 1987 (Fortran -> Pascal)                     */
/*       November 1990 (Pascal -> C)       Sohei Takemoto   */
/*                                                          */
/*     PROMDEF.H and PROMLIB.H need to be included          */
/*     NR20B and NR30B boards, DIE125M project, Fall '92    */
/*----------------------------------------------------------*/ include <stdio.h>
include <stdlib.h>
include <math.h> define MaxWord 1024    /* Max code words */
define LName   80      /* Max length of name string*/
#include "promdef.h"    /* type definitions */
include "promlib.h"    /* library */

/* procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile       */ void main()
{
   IntData   IntAry1, IntAry2;   /* integer data array */
   RealData  RealAry;            /* real data array */
   SpecTable prom;               /* PROM specifications */
   char      ofname[LName];
   float     coef, max, min;
   int       ibit, fbit, loc, i;
   int       *ID1, *ID2, *ID3;
   float     *RD1;

/* define prom specifications */
/* C input LUTs: 512x8
    To suppress ADC offset oscillation
      input:
        A8 : L/H for ADC/D1 input
        A7..0 : 8-bit C data, natural binary, 128 as baseline
      output:
        O7..0 : 8-bit C data       */
```

```
    prom.Kbit = 9;      /* no. of bits for address input */
    prom.Kmod = 8;      /* no. of bits for PROM module output, <=16 */
    prom.Kic = 8;       /* no. of bits for PROM chip output, <=8 */
    prom.Stadrs = 0;    /* input start address */
    prom.Ioffset = 0;   /* (input value)=(address)+ioffset */
    prom.Nword = IPower(2, prom.Kbit);  /* no. of words to generate */
    prom.Csbit = 16;    /* bit length of check-sum data */ strcpy(prom.FNames[1], "N20_M03A.Bin");
    strcpy(prom.PNames[1], "C input LUTs, U47");

/* generate prom code */
/* ???? adjust suppression range around 128 appropriately */
    ID1 = IntAry1;
    for (i = 0; i < prom.Nword; i++, ID1++) {
      *ID1 = i % 256;   /* 8-bit congruency */
      if ((i & 256) == 0 && (*ID1 <= 128+1) && (*ID1 >= 128-1))
        *ID1 = 128;     /* force to 128 */
    }

/* Output */
    strcpy (ofname, OutFileName());  /* ask for output file name */ i = HexPrint(IntAry1, prom, ofname);
    printf("HexPrint..........%2d\n",i);
    i = WriteBinFile(IntAry1, prom);
    printf("WriteBinFile......%2d\n",i);
}
/*--------------------------------------------------------------*/
/*    Main program for PROM code generation                     */
/*          April 1987 (Fortran -> Pascal)                      */
/*          November 1990 (Pascal -> C)        Sohei Takemoto   */
/*                                                              */
/*    PROMDEF.H and PROMLIB.H need to be included               */
/*    NR20B and NR30B boards, DIE125M project, Fall '92         */
/*--------------------------------------------------------------*/ include <stdio.h>
include <stdlib.h>
include <math.h> define MaxWord 2048   /* Max code words */
define LName   80     /* Max length of name string*/
#include "promdef.h"   /* type definitions */
include "promlib.h"   /* library */ void main()
{
    IntData  IntAry1, IntAry2;   /* integer data array */
    RealData RealAry;            /* real data array */
    SpecTable prom;              /* PROM specifications */
    char     ofname[LName];
    float    coef, max, min;
    int      ibit, fbit, loc, i, j;
    int      *ID1, *ID2, *ID3;
    float    *RD1;
```

```c
/* data sets of configurations, 10-words/set */
int  config [17] [16] = {
    { 0, 0,16, 0, 0, 0, 0, 0,63,255},    /* 0, OFF, 0_1_0 */
    {16, 0,16, 0,16, 0, 0, 0,62,255},    /* 1, T3, 1_1_1 */
    {84, 0,84, 0,84, 0, 0, 0,59,255},    /* 2, 3_3_3 */
    {16, 0,84, 0,16,16,16,16,59,255},    /* 3, 1*2_1*2+2_1*2 */
    {16,16,16,16,16,16,16,16,59,255},    /* 4, 1*2_1*2+2_1*2 */
    {84,16,84,16,84,84,84,84,53,255},    /* 5, 3*2_3*2+2_3*2 */
    {16,16,84,16,16,16,16,16,58,255},    /* 6, 1*2_1*2+4_1*2 */
    {84,16,84,16,84,16,16,16,56,255},    /* 7, 1*2+2_1*2+4_1*2+2 */
    {16,68,16,68,16,16,16,16,58,255},    /* 8, 1*2_1*2+4_1*2 */
    {84,68,16,68,84,16,16,16,56,255},    /* 9, 1*2+2_1*2+4_1*2+2 */
    {84,84,84,84,84,84,84,84,51,255},    /*10, 3*2_3*2+6_3*2 */
    {84,84,84,84,84,16,16,16,54,255},    /*11, 1*2+2_1*2+8_1*2+2 */
    {16,84,84,84,16,16,16,16,56,255},    /*12, 1*2_1*2+8_1*2 */
    {84,84,84,84,84, 0, 0, 0,56,255},    /*13, 3_9_3 */
    {68, 0,16, 0,68, 0, 0, 0,61,255},    /*14, 2_1_2 */
    { 0, 0, 0, 0,16, 0, 0, 0,63,255}     /*15, SHIFT, 0_0_1 */
};

/* define prom specifications */
/* C median filter controller: 512x8
   Third set of kernel shapes: 9/21/92
     input:
        A8 : H for filter bypass
        A7..4 : 4-bit, 16 selections of configurations
        A3..0 : 4-bit address for a block of 16-byte data
     output:
        O7..0 : 8-bit configuration data          */ prom.Kbit = 9;       /* no. of bits for address input */
  prom.Kmod = 8;       /* no. of bits for PROM module output, <=16 */
  prom.Kic = 8;        /* no. of bits for PROM chip output, <=8 */
  prom.Stadrs = 0;     /* input start address */
  prom.Ioffset = 0;    /* (input value)=(address)+ioffset */
  prom.Nword = IPower(2, prom.Kbit);  /* no. of words to generate */
  prom.Csbit = 16;     /* bit length of check-sum data */ strcpy(prom.FNames[1], "N20_M04A.Bin");
  strcpy(prom.PNames[1], "C median filter control, U167");

/*    procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile         */

/* generate prom code */

ID1 = IntAry1;
  for (i = 0, ID1 = IntAry1; i < prom.Nword; i++)
    *ID1++ = 0;

ID1 = IntAry1;
  for (i = 0; i < 16; i++) {     /* filter is ON */
     for (j = 0; j < 16; j++)
        *ID1++ = config[i][j];
  };
```

```c
        for (i = 0; i < 16; i++) {     /* filter is bypass */
            for (j = 0; j < 16; j++)
                *ID1++ = config[15][j];
        };

/* Output */
    strcpy (ofname, OutFileName());  /* ask for output file name */ i = HexPrint(IntAry1, prom, ofname);
    printf("HexPrint.........%2d\n",i);
    i = WriteBinFile(IntAry1, prom);
    printf("WriteBinFile.....%2d\n",i);
}
/*--------------------------------------------------------------*/
/*  Main program for PROM code generation                       */
/*         April 1987 (Fortran -> Pascal)                       */
/*         November 1990 (Pascal -> C)      Sohei Takemoto      */
/*                                                              */
/*    PROMDEF.H and PROMLIB.H need to be included               */
/*    NR20B and NR30B boards, DIE125H project, Fall '92         */
/*--------------------------------------------------------------*/ include <stdio.h>
include <stdlib.h>
include <math.h> define MaxWord 2048    /* Max code words */
define LName   80      /* Max length of name string*/
#include "promdef.h"    /* type definitions */
include "promlib.h"    /* library */ void main()
{
    IntData   IntAry1, IntAry2;  /* integer data array */
    RealData  RealAry;           /* real data array */
    SpecTable prom;              /* PROM specifications */
    char      ofname[LName];
    float     coef, max, min;
    int       ibit, fbit, loc, i, j;
    int       *ID1, *ID2, *ID3;
    float     *RD1;

/* data sets of configurations, 10-words/set */
    int config [17] [16] = {
        { 0, 0,16, 0, 0, 0, 0, 0,63,255},   /* 0, OFF, 0_1_0 */
        {16, 0,16, 0,16, 0, 0, 0,62,255},   /* 1, T3, 1_1_1 */
        {56, 0,56, 0,56, 0, 0, 0,59,255},   /* 2, 3_3_3 */
        {16, 0,56, 0,16,16,16,16,59,255},   /* 3, 1*2_1*2+2_1*2 */
        {16,16,16,16,16,16,16,16,59,255},   /* 4, 1*2_1*2+2_1*2 */
        {56,16,56,16,56,56,56,56,53,255},   /* 5, 3*2_3*2+2_3*2 */
        {16,16,56,16,16,16,16,16,58,255},   /* 6, 1*2_1*2+4_1*2 */
        {56,16,56,16,56,16,16,16,56,255},   /* 7, 1*2+2_1*2+4_1*2+2 */
        {16,40,16,40,16,16,16,16,58,255},   /* 8, 1*2_1*2+4_1*2 */
        {56,40,16,40,56,16,16,16,56,255},   /* 9, 1*2+2_1*2+4_1*2+2 */
        {56,56,56,56,56,56,56,56,51,255},   /*10, 3*2_3*2+6_3*2 */
        {56,56,56,56,56,16,16,16,54,255},   /*11, 1*2+2_1*2+8_1*2+2 */
        {16,56,56,56,16,16,16,16,56,255},   /*12, 1*2_1*2+8_1*2 */
        {56,56,56,56,56, 0, 0, 0,56,255},   /*13, 3_9_3 */
        {40, 0,40, 0,40, 0, 0, 0,61,255},   /*14, 2_1_2 */
```

```
    { 0, 0, 0, 0,16, 0, 0, 0,63,255}   /*15, SHIFT, 0_0_1 */
};

/* define prom specifications */
/* Y median filter controller: 512x8

Third set of kernel shapes: 9/21/92
     input:
       A8    : H for filter bypass
       A7..4 : 4-bit, 16 selections of configurations
       A3..0 : 4-bit address for a block of 16-byte data
     output:
       O7..0 : 8-bit configuration data          */ prom.Kbit = 9;       /* no. of bits for address input */
  prom.Kmod = 8;       /* no. of bits for PROM module output, <=16 */
  prom.Kic = 8;        /* no. of bits for PROM chip output, <=8 */
  prom.Stadrs = 0;     /* input start address */
  prom.Ioffset = 0;    /* (input value)=(address)+ioffset */
  prom.Nword = IPower(2, prom.Kbit);  /* no. of words to generate */
  prom.Csbit = 16;     /* bit length of check-sum data */ strcpy(prom.PNames[1], "N20_M05A.Bin");
  strcpy(prom.PNames[1], "Y median filter control, U177");

/*  procedures in PROMLIB.H
      *ToBin, *ToHex, IPower, WordToBinary, WordToHex,
      Input, Limit, Mask, IMask, UnMask, Mply, Roff,
      RToI, Slice, *OutFileName, BinPrint, HexPrint,
      HPrint, WriteBinFile        */

/* generate prom code */

ID1 = IntAry1;
  for (i = 0, ID1 = IntAry1; i < prom.Nword; i++)
     *ID1++ = 0;

ID1 = IntAry1;
  for (i = 0; i < 16; i++) {    /* filter is ON */
     for (j = 0; j < 16; j++)
        *ID1++ = config[i][j];
  };
  for (i = 0; i < 16; i++) {    /* filter is bypass */
     for (j = 0; j < 16; j++)
        *ID1++ = config[15][j];
  };

/* Output */
  strcpy (ofname, OutFileName());  /* ask for output file name */ i = HexPrint(IntAry1, prom, ofname);
  printf("HexPrint..........%2d\n",i);
  i = WriteBinFile(IntAry1, prom);
  printf("WriteBinFile......%2d\n",i);
}
```

```
/*------------------------------------------------------------*/
/* Main program for PROM code generation                      */
/*       April 1987 (Fortran -> Pascal)                       */
/*       November 1990 (Pascal -> C)       Sohei Takemoto     */
/*                                                            */
/*    PROMDEF.H and PROMLIB.H need to be included             */
/*    NR20B and NR30B boards, DIE125M project, Fall '92       */
/*------------------------------------------------------------*/ include <stdio.h>
include <stdlib.h>
include <math.h> define MaxWord 2048    /* Max code words */
define LName   80      /* Max length of name string*/
#include "promdef.h"    /* type definitions */
include "promlib.h"    /* library */

/*   procedures in PROMLIB.H
          *ToBin, *ToHex, IPower, WordToBinary, WordToHex,
          Input, Limit, Mask, IMask, UnMask, Mply, Roff,
          RToI, Slice, *OutFileName, BinPrint, HexPrint,
          HPrint, WriteBinFile      */ void main()
{
   IntData   IntAry1, IntAry2;   /* integer data array */
   RealData  RealAry;            /* real data array */
   SpecTable prom;               /* PROM specifications */
   char      ofname[LName];
   float     coef, max, min;
   int       ibit, fbit, loc, i, j, k;
   int       *ID1, *ID2, *ID3;
   float     *RD1;
   int       igain, iskew, hout, vout;
   float     hg, vg;

/* define prom specifications */
/* Y enhancer, gain and skew control: 1Kx8
    input:
       A9 : H for enhancer enable
       A8 : H for active window
       A7..4 : H/V skew level [0..15] (iskew)
             0 as H only, 15 as V only
             7 and 8 for full H and V
             0 to 7: V increases in step of 1/7
             8 to 15: H decreases in step of 1/7
               hg = (15 - iskew) / 7.0  limited to 1.0
               vg = iskew / 7.0  limited to 1.0
       A3..0 : gain level [0..15] (igain)
             real meaning of these levels are built into enhancer
             LUTs in U26 and U112
    output:
       O7..4 : H enhancer LUTs selection [0,15]
             if A9=A8=H   hout = igain * hg
             else   hout = 0
       O3..0 : V enhancer LUTs selection [0,15]
             if A9=A8=H   vout = igain * vg
             else   vout = 0                           */
```

```
    prom.Kbit = 10;      /* no. of bits for address input */
    prom.Kmod = 8;       /* no. of bits for PROM module output, <=16 */
    prom.Kic = 8;        /* no. of bits for PROM chip output, <=8 */
    prom.Stadrs = 0;     /* input start address */
    prom.Ioffset = 0;    /* (input value)=(address)+ioffset */
    prom.Nword = IPower(2, prom.Kbit);  /* no. of words to generate */
    prom.Csbit = 16;     /* bit length of check-sum data */ strcpy(prom.PNames[1], "N20_M06A.Bin");
    strcpy(prom.PNames[1], "Y enhancer control, U83");

/* generate prom code */
    ID1 = IntAry1;
    for (i = 0; i < prom.Nword; i++, ID1++) {
        iskew = i >> 4 & 15;
        igain = i & 15;
        if (i >> 9 & 1) {         /* enhancement enabled */
            if (i >> 8 & 1) {     /* in the active window */
                hg = (15 - iskew) / 7.0;
                    if (hg > 1.0) hg = 1.0;
                vg = iskew / 7.0;
                    if (vg > 1.0) vg = 1.0;
                hout = igain * hg + 0.5;
                    if (hout > 15) hout = 15;
                vout = igain * vg + 0.5;
                    if (vout > 15) vout = 15;

printf("i, iskew, igain, hout, vout  %d  %d  %d  %d  %d\n",
                        i, iskew, igain, hout, vout);
            }
        } else hout = vout = 0;
        *ID1 = hout * 16 + vout;
    }

/* Output */
    strcpy (ofname, OutFileName());  /* ask for output file name */ i = HexPrint(IntAry1, prom, ofname);
    printf("HexPrint..........%2d\n",i);
    i = WriteBinFile(IntAry1, prom);
    printf("WriteBinFile......%2d\n",i);
}
/*------------------------------------------------------------*/
/*  Main program for PROM code generation                     */
/*         April 1987 (Fortran -> Pascal)                     */
/*         November 1990 (Pascal -> C)       Sohei Takemoto   */
/*                                                            */
/*    PROMDEF.H and PROMLIB.H need to be included             */
/*    NR20B and NR30B boards, DIE125M project, Fall '92       */
/*------------------------------------------------------------*/ include <stdio.h>
include <stdlib.h>
include <math.h> define MaxWord 2048   /* Max code words */
define LName   80     /* Max length of name string*/
#include "promdef.h"   /* type definitions */
```

```c
#include "promlib.h"   /* library */

/*  procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile        */ void main()
{
   IntData   IntAry1, IntAry2;   /* integer data array */
   RealData  RealAry;            /* real data array */
   SpecTable prom;               /* PROM specifications */
   char      ofname[LName];
   float     coef, max, min;
   int       ibit, fbit, loc, i, j, k;
   int       *ID1, *ID2, *ID3;
   float     *RD1;

/* define prom specifications */
/* KC LUTs: 1Kx8
      input:
        A9..8 : LUTs selection
                00 and 01: out = in
                10        : out = 128   (KC = -1.0 for flush)
                11        : out = 0     (KC =  0.0 for freeze)
        A7..0 : KC input, negative only, 2's complement
                [128,255] and 0 for [-1.0,0.0]
      output:
        O7..0 : KC output, [0,128] for [-1.0,0.0]
                for positive KC input, make it negative  */ prom.Kbit = 10;      /* no. of bits for address input */
   prom.Kmod = 8;       /* no. of bits for PROM module output, <=16 */
   prom.Kic  = 8;       /* no. of bits for PROM chip output, <=8 */
   prom.Stadrs = 0;     /* input start address */
   prom.Ioffset = 0;    /* (input value)=(address)+ioffset */
   prom.Nword = IPower(2, prom.Kbit);  /* no. of words to generate */
   prom.Csbit = 16;     /* bit length of check-sum data */ strcpy(prom.FNames[1], "N20_M07A.Bin");
   strcpy(prom.PNames[1], "KC LUTs, U97");
/* generate prom code */
   ID1 = IntAry1;
   for (i = 0; i < prom.Nword; i++, ID1++)
      switch (i >> 8 & 3) {
         case 0:  /* out = in */
         case 1:  /* out = in */
            j = i % 256;
            if (j >= 128) *ID1 = j;              /* negative values */
            else *ID1 = (256 - j) % 256;         /* zero and positive values */
            break;
         case 2: *ID1 = 128; break;   /* out = -1.0 */
         case 3: *ID1 =   0; break;   /* out =  0.0 */
      }

/* Output */
   strcpy (ofname, OutFileName());  /* ask for output file name */
```

```c
    i = HexPrint(IntAry1, prom, ofname);
    printf("HexPrint.........%2d\n",i);
    i = WriteBinFile(IntAry1, prom);
    printf("WriteBinFile......%2d\n",i);
}
/*--------------------------------------------------------------*/
/*   Main program for PROM code generation                      */
/*           April 1987 (Fortran -> Pascal)                     */
/*           November 1990 (Pascal -> C)     Sohei Takemoto     */
/*                                                              */
/*   PROMDEF.H and PROMLIB.H need to be included                */
/*   NR20B and NR30B boards, DIE125M project, Fall '92          */
/*--------------------------------------------------------------*/ include <stdio.h>
include <stdlib.h>
include <math.h> define MaxWord 2048  /* Max code words */
define LName   80    /* Max length of name string*/
#include "promdef.h"  /* type definitions */
#include "promlib.h"  /* library */

/*  procedures in PROMLIB.H
       *ToBin, *ToHex, IPower, WordToBinary, WordToHex,
       Input, Limit, Mask, IMask, UnMask, Mply, Roff,
       RToI, Slice, *OutFileName, BinPrint, HexPrint,
       HPrint, WriteBinFile        */ void main()
{
    IntData  IntAry1, IntAry2;   /* integer data array */
    RealData RealAry;            /* real data array */
    SpecTable prom;              /* PROM specifications */
    char     ofname[LName];
    float    coef, max, min;
    int      ibit, fbit, loc, i, j, k;
    int      *ID1, *ID2, *ID3;
    float    *RD1;

/* define prom specifications */
/* KY LUTs: 1Kx8
      input:
        A9..8 : LUTs selection
                00 and 01: out = in
                10       : out = 128  (KY = -1.0 for flush)
                11       : out = 0    (KY =  0.0 for freeze)
        A7..0 : KY input, negative only, 2's complement
                [-128,0] <-> [128,255] and 0 <-> [-1.0,0.0]
                though not intended to use positive values [1,127]
                just make them usable by 2's complement conversion
                    256 - pos-value
      output:
        O7..0 : KY output, [128..255,0] for [-1.0,0.0]      */ prom.Kbit = 10;    /* no. of bits for address input */
    prom.Kmod = 8;     /* no. of bits for PROM module output, <=16 */
    prom.Kic  = 8;     /* no. of bits for PROM chip output, <=8 */
```

```
   prom.Stadrs = 0;      /* input start address */
   prom.Ioffset = 0;     /* (input value)=(address)+ioffset */
   prom.Nword = IPower(2, prom.Kbit); /* no. of words to generate */
   prom.Csbit = 16;      /* bit length of check-sum data */ strcpy(prom.FNames[1], "N20_M08A.Bin");
   strcpy(prom.PNames[1], "KY LUTs, U137");

/* generate prom code */
   ID1 = IntAry1;
   for (i = 0; i < prom.Nword; i++, ID1++)
      switch (i >> 8 & 3) {
         case 0:   /* out = in */
         case 1:   /* out = in */
            j = i % 256;
            if (j >= 128) *ID1 = j;      /* negative values */
            else *ID1 = (256 - j) % 256; /* zero and positive values */
            break;
         case 2:  *ID1 = 128; break;  /* out = -1.0 */
         case 3:  *ID1 =   0; break;  /* out =  0.0 */
      }

/* Output */
   strcpy (ofname, OutFileName());  /* ask for output file name */ i = HexPrint(IntAry1, prom, ofname);
   printf("HexPrint..........%2d\n",i);
   i = WriteBinFile(IntAry1, prom);
   printf("WriteBinFile......%2d\n",i);
}
/*------------------------------------------------------------*/
/*   Main program for PROM code generation                    */
/*         April 1987 (Fortran -> Pascal)                     */
/*         November 1990 (Pascal -> C)       Sohei Takemoto   */
/*                                                            */
/*   PROMDEF.H and PROMLIB.H need to be included              */
/*   NR20B and NR30B boards, DIE125M project, Fall '92        */
/*------------------------------------------------------------*/ include <stdio.h>
include <stdlib.h>
include <math.h> define MaxWord 2048   /* Max code words */
define LName     80   /* Max length of name string*/
#include "promdef.h"   /* type definitions */
include "promlib.h"   /* library */

/* procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile     */ void main()
{
   IntData IntAry1, IntAry2;  /* integer data array */
   RealData RealAry;          /* real data array */
```

```
    SpecTable   prom;                 /* PROM specifications */
    char        ofname[LName];
    float       coef, max, min;
    int         ibit, fbit, loc, i;
    int         *ID1, *ID2, *ID3;
    float       *RD1;
    int         blank, tc, bc, val, out, black, white;
    int         TClip[4] = {254,242,242,235};
    int         BClip[4] = {1,1,9,16};

/* define prom specifications */
/* Y Output LUTs: 2Kx8
        1. enforce blanking
        2. apply clipping
            level [16,235] as [0,100]% dynamic range
        3. code conversion (MSB inversion)
        4. avoid 00 and FF output input:
        A10   : H for blanking
        A9..8 : clipping selection [0,3]
                0: [-6.8,108.7]% as [1,254], full 8-bit range
                1: [-6.8,103.2]% as [1,242]
                2: [-3.2,103.2]% as [9,242]
                3: [0,100]% as [16,235]
        A7..0 : 8-bit Y signal input, pos/neg 2's complement
    output:
        O7..0 : 8-bit Y signal output, natural binary     */ prom.Kbit = 11;       /* no. of bits for address input */
    prom.Kmod = 8;        /* no. of bits for PROM module output, <=16 */
    prom.Kic = 8;         /* no. of bits for PROM chip output, <=8 */
    prom.Stadrs = 0;      /* input start address */
    prom.Ioffset = 0;     /* (input value)=(address)+ioffset */
    prom.Nword = IPower(2, prom.Kbit);  /* no. of words to generate */
    prom.Csbit = 16;      /* bit length of check-sum data */ strcpy(prom.FNames[1], "N20_M09A.Bin");
    strcpy(prom.PNames[1], "Y Output LUTs, U31");

/* generate prom code */ black = 16;   white = 235;
    ID1 = IntAry1;
    for (i = 0; i < prom.Nword; i++, ID1++) {
        blank = i >> 10 & 1;    /* if 1 then blanking period */
        tc = TClip[i >> 8 & 3];
        bc = BClip[i >> 8 & 3];
        val = (i & 255) ^ 128;  /* get 8-bit input and MSB invert */
        if (blank) out = black; /* blank level */
        else {
            out = val;
            if (val <= bc) out = bc;  /* black clip */
            if (val >= tc) out = tc;  /* white clip */
        }
        if (out == 0)   out = 1;    /* avoid 00 */
        if (out == 255) out = 254;  /* avoid FF */
        *ID1 = out;
    }
```

```c
/* Output */
  strcpy (ofname, OutFileName());  /* ask for output file name */ i = HexPrint(IntAry1, prom, ofname);
  printf("HexPrint.........%2d\n",i);
  i = WriteBinFile(IntAry1, prom);
  printf("WriteBinFile......%2d\n",i);
}
/*--------------------------------------------------------------*/
/*   Main program for PROM code generation                      */
/*         April 1987 (Fortran -> Pascal)                       */
/*         November 1990 (Pascal -> C)        Sohei Takemoto    */
/*                                                              */
/*     PROMDEF.H and PROMLIB.H need to be included              */
/*     NR20B and NR30B boards, DIE125M project, Fall '92        */
/*--------------------------------------------------------------*/ include <stdio.h>
include <stdlib.h>
include <math.h> define MaxWord 2048   /* Max code words */
define LName   80     /* Max length of name string*/
#include "promdef.h"   /* type definitions */
include "promlib.h"   /* library */

/*   procedures in PROMLIB.H
       *ToBin, *ToHex, IPower, WordToBinary, WordToHex,
       Input, Limit, Mask, IMask, UnMask, Mply, Roff,
       RToI, Slice, *OutFileName, BinPrint, HexPrint,
       HPrint, WriteBinFile      */ void main()
{
   IntData  IntAry1, IntAry2;   /* integer data array */
   RealData RealAry;            /* real data array */
   SpecTable prom;              /* PROM specifications */
   char     ofname[LName];
   float    coef, max, min;
   int      ibit, fbit, loc, i;
   int      *ID1, *ID2, *ID3;
   float    *RD1;
   int      blank, tc, bc, val, out, black, bottom, top;
   int      TClip[4] = {254,254,254,240};
   int      BClip[4] = {1,1,1,16};

/* define prom specifications */
/* C Output LUTs: 2Kx8
        1. enforce blanking
        2. apply clipping
             level [16,240] as [0,100]% dynamic range
             cf. N20_m09a.c for Y clipping
        3. code conversion (MSB inversion)
        4. avoid 00 and FF output input:
     A10   : H for blanking
     A9..8 : clipping selection [0,3]
```

```
            0: [-6.7,106.3]% as [1,254], full 8-bit range
            1: [-6.7,106.3]% as [1,254]
            2: [-6.7,106.3]% as [1,254]
            3: [0,100]% as [16,240]
    A7..0 : 8-bit C signal input, pos/neg 2's complement
output:
    O7..0 : 8-bit C signal output, natural binary        */ prom.Kbit = 11;      /* no. of bits for address input */
    prom.Kmod = 8;       /* no. of bits for PROM module output, <=16 */
    prom.Kic = 8;        /* no. of bits for PROM chip output, <=8 */
    prom.Stadrs = 0;     /* input start address */
    prom.Ioffset = 0;    /* (input value)=(address)+ioffset */
    prom.Nword = IPower(2, prom.Kbit);  /* no. of words to generate */
    prom.Csbit = 16;     /* bit length of check-sum data */ strcpy(prom.FNames[1], "N20_M10A.Bin");
    strcpy(prom.PNames[1], "C Output LUTs, U76");

/* generate prom code */ black = 128;   bottom = 16;   top = 240;
    ID1 = IntAry1;
    for (i = 0; i < prom.Nword; i++, ID1++) {
        blank = i >> 10 & 1;      /* if 1 then blanking period */
        tc = TClip[i >> 8 & 3];
        bc = BClip[i >> 8 & 3];
        val = (i & 255) ^ 128;    /* get 8-bit input and MSB invert */
        if (blank)  out = black;  /* blank level */
        else {
            out = val;
            if (val <= bc)  out = bc;  /* black clip */
            if (val >= tc)  out = tc;  /* white clip */
        }
        if (out == 0)   out = 1;   /* avoid 00 */
        if (out == 255) out = 254; /* avoid FF */
        *ID1 = out;
    }

/* Output */
    strcpy (ofname, OutFileName());  /* ask for output file name */ i = HexPrint(IntAry1, prom, ofname);
    printf("HexPrint..........%2d\n",i);
    i = WriteBinFile(IntAry1, prom);
    printf("WriteBinFile......%2d\n",i);
}
/*--------------------------------------------------------------*/
/*  Main program for PROM code generation                       */
/*        April 1987 (Fortran -> Pascal)                        */
/*        November 1990 (Pascal -> C)      Sohei Takemoto       */
/*                                                              */
/*    PROMDEF.H and PROMLIB.H need to be included               */
/*    NR20B and NR30B boards, DIE125M project, Fall '92         */
/*--------------------------------------------------------------*/ include <stdio.h>
include <stdlib.h>
```

```c
include <math.h> define MaxWord 4096    /* Max code words */
define LName   80      /* Max length of name string*/
#include "promdef.h"    /* type definitions */
include "promlib.h"    /* library */

/*  procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile     */ void main()
{
    IntData IntAry1, IntAry2;   /* integer data array */
    RealData RealAry;           /* real data array */
    SpecTable prom;             /* PROM specifications */
    char    ofname[LName];
    float   coef, max, min;
    int     ibit, fbit, loc, i;
    int     *ID1, *ID2, *ID3;
    float   *RD1;
    int     sign, th, val;
    int     Thld[16] = {0,2,4,8,12,16,20,24,32,40,48,56,64,
                        80,96,128};

/* define prom specifications */
/* Post median filter, threshold logic: 4Kx4
     input:
        A11..8 : threshold level selection [0,15]
                0 for straight take of median filter output
                th = Thld[A11..8]
        A7..0 : 8-bit MSP of 8-bit subtraction
                A7 is sign bit
                    A7=1: A6..0 is positive
                    A7=0: A6..0 is negative, 2's complement
                    val = ABS(A6..0)
     output:
        O3..1 : not used
        O0    : L to take median filter output, if val >= th    */ prom.Kbit = 12;     /* no. of bits for address input */
    prom.Kmod = 8;      /* no. of bits for PROM module output, <=16 */
    prom.Kic = 8;       /* no. of bits for PROM chip output, <=8 */
    prom.Stadrs = 0;    /* input start address */
    prom.Ioffset = 0;   /* (input value)=(address)+ioffset */
    prom.Nword = IPower(2, prom.Kbit);  /* no. of words to generate */
    prom.Csbit = 16;    /* bit length of check-sum data */ strcpy(prom.FNames[1], "N20_M11A.Bin");
    strcpy(prom.PNames[1], "Post median filter, threshold logic");

/* generate prom code */

ID1 = IntAry1;
    for (i = 0; i < prom.Nword; i++, ID1++) {
        sign = i >> 7 & 1;          /* if 0 then negative value */
```

```
        th = Thld[i >> 8 & 15];
        val = i & 127;                  /* get 7-bit LSP */
        if (sign == 0)  val = 128 - val;   /* absolute value */
        if (val < th)   *ID1 = 1;       /* 00=1, take bypass data */
        else  *ID1 = 0;                 /* 01=0, take median output */
    }

/* Output */
    strcpy (ofname, OutFileName());  /* ask for output file name */ i = HexPrint(IntAry1, prom, ofname);
    printf("HexPrint..........%2d\n",i);
    i = WriteBinFile(IntAry1, prom);
    printf("WriteBinFile......%2d\n",i);
}
```

```
{--------------------------------------------------------}
{   Main program for PROM code generation                }
{             April 1987           Sohei Takemoto        }
{   Turbo Pascal 3.0                                     }
{   PROMLIB.SYS and PROMLIB.PAS need to be included      }
{        DIE125M         Fall 1992                       }
{   copied for NR20 color-bar generator,  march 30, 1992 }
{--------------------------------------------------------}

{$G256,P256}    {for I/O redirection} const
  DSize = 4096;
  DLSize = 1024;
type
  MaxWord = 0..DSize;    {maximum size of PROM code in words}
  MLWord  = 0..DLSize;
  LIData = array [MLWord] of integer;
  LRData = array [MLWord] of real;
  I10Ary = Array [0..9] of integer;
  CBar = record
    NBar : integer;     {number of bars, <= 10}
    Wd10 : I10Ary;      {width of bars}
    Y10  : I10Ary;      {Y values}
    Cb10 : I10Ary;      {Cb values}
    Cr10 : I10Ary;      {Cr values}
  end;

{$I c:\work\prom\promlib.sys}  {type declarations}
{$I c:\work\prom\promlib.pas}  {procedures}

{--------------------------------------------------------}
procedure PutTP(PBgn:integer; IAryY,IAryC:LIData; var AryY,AryC:IntData;
             BSize:integer; PStart, POffset, HL:integer);
{Copy a test pattern data in IAryY and IAryC to AryY and AryC
    from PStart to PStart+HL-1 cyclically,
    with the relative position specified by POffset:
      IAryY[pt] -> AryY[PBgn+i]
        where pt = PStart + (HL - POffset + i) mod HL
              0 <= PStart + HL < BSize
              -HL <= POffset < HL          }
  var i, pt : integer;
```

```
    begin {procedure PutTP}
      for i := 0 to BSize-1 do
      begin
        pt := PStart + (HL - POffset + i) mod HL;
        AryY[PBgn+i] := IAryY[pt] xor 128;         {MSB inversion}
        AryC[PBgn+i] := IAryC[pt];
      end; {for i}
    end; {procedure PutTP} procedure MapBar(NS:integer; var YAry, CAry: LIData; ICBar: CBar);
  {Fill YAry and CAry with color bar data specified by ICBar.
    Start from NS word [0..NWord-1]. }
    var
      i, j, k: integer;
    begin {procedure MapBar}
      k := NS;
      for j := 0 to ICBar.NBar-1 do
      begin
        for i := 1 to ICBar.Wdl0[j] do
        begin
          YAry[k] := ICBar.Yl0[j];
          if (i mod 2) = 1 then CAry[k] := ICBar.Cr10[j]
          else CAry[k] := ICBar.Cb10[j];
          k := (k + 1) mod DLSize;
        end;
      end;
    end; {procedure MapBar} procedure BGSlopeD2(NS, YT, CT: integer; var YAry, CAry: LIData; ICBar: CBar);
  {For the given definition of color bars, ICBar, make smooth transition of bars
    to its realized data YAry and CAry.
    NS : first word in the array for the bar ICBar
    YT : number of samples cross-fade takes for YAry
    CT : number of samples cross-fade takes for CAry
    YAry : Y data, sample train by 13.5MHz
    CAry : C data, multiplexed train of co-sited sample-pairs by 6.75 MHz
    Slope is characterized by 0% to 100% transition as follows.
        Sqr(Sin(x))=(1-Cos(2*x))/2
        mag = Sqr(Sin((time+0.8470*BUTime)*PI/2.0))
          BUTime: 10-90% build-up time.
          If MMin < MMax then positive slope.
          If MMin > MMax then negative slope.
          50% point of the Slope is aligned at time=0,
      It takes about 1.6940 * BUTime from 0% to 100%.
    For Y, YT-sample period for 1.6940*BUTime, last sample of the preceding bar
      is placed at time=0.
    For C, (CT/2)-sample period for 1.6940*BUTime, time=0 is placed in the
      middle of the last and the first sample-pairs of two bars.
    For all the bar-boundaries defined by ICBar,
      apply cross-fade for those related YT and CT samples. }
    var
      YV, CV1, CV2, time, rmag, lmag: real;
      i, j, k, l, yp, yn, cp, cn: integer;
    begin {procedure BGSlopeD2}
      i := NS;
      yn := (YT div 2) * 2 + 1;   {no. of related samples}
      yp := (yn - 1) div 2;
      cn := ((CT + 2) div 4) * 2;  {no. of related samples}
      cp := cn div 2;
```

```
      for j := 0 to ICBar.NBar-2 do
      begin
        i := i + ICBar.Wd10[j];   {start of the next bar}
        for k := 0 to yn-1 do
        begin
          time := (k - yp) / YT;
          if time < -0.5 then time := -0.5;
          if time > 0.5 then time := 0.5;
          rmag := (1.0 - Cos(2.0 * ((time + 0.5) * PI/2.0))) / 2.0;
          lmag := 1.0 - rmag;
          YV := lmag * YAry[i-1-yp-1] + rmag * YAry[i+yp];
          YAry[i-1+k-yp] := Round(YV);
          { Writeln('k=',k:2,' i=',i:4,' lmag=',lmag:8:5,' rmag=',rmag:8:5,^J^M,
                   ' LV=',YAry[i-1-yp-1]:4,' RV=',YAry[i+yp]:4,' MV=',
                   YAry[i-1+k-yp]:4,' P=',i-1+k-yp:4); }
        end; {for k}
        for k := 0 to cn-1 do
        begin
          time := (2*(k-cp)+1) / CT;
          if time < -0.5 then time := -0.5;
          if time > 0.5 then time := 0.5;
          rmag := (1.0 - Cos(2.0 * ((time + 0.5) * PI/2.0))) / 2.0;
          lmag := 1.0 - rmag;
          CV1 := lmag * CAry[i-2*cp-2] + rmag * CAry[i+2*cp+2];
          CAry[i+2*(k-cp)] := Round(CV1);
          CV2 := lmag * CAry[i-2*cp-1] + rmag * CAry[i+2*cp+3];
          CAry[i+2*(k-cp)+1] := Round(CV2);
          { Writeln('k=',k:2,' i=',i:4,' lmag=',lmag:8:5,' rmag=',rmag:8:5,^J^M,
                   ' LV1=',CAry[i-2*cp-2]:4,' RV1=',CAry[i+2*cp+2]:4,' MV1=',
                   CAry[i+2*(k-cp)]:4,' P=',i+2*(k-cp):4,^J^M,
                   ' LV2=',CAry[i-2*cp-1]:4,' RV2=',CAry[i+2*cp+3]:4,' MV2=',
                   CAry[i+2*(k-cp)+1]:4,' P=',i+2*(k-cp)+1:4); }
        end; {for k}
      end; {for j}
   end;  {procedure BGSlopeD2}

{--------------------------------------------------------------} var
  IntAryY, IntAryC, IntAry1: IntData;   {integer data array}
  IAryY, IAryC, IAry1: LIData;
  RAry: LRData;
  PROMSpec, PSpec1: SpecTable;
  coef, max, min, time1, time2, HAD, FSp1: real;
  tsp1, tadj, rt1, rt2, rt3: real;
  ibit, fbit, loc: integer;
  i, j, k, black, white: integer;
  CBar1 : CBar;
  PStart1, PStart2, POffset1, POffset2, POffset3, POffset4: integer;
  I525, I625: integer;

begin {main program}
{4 lines of test patterns, 1024 words each, 8 bits/word.
 All paterns are the same color bars, but timings are different for
 four different addressing timings for ADC/D1 and 625/525.
   Input:
      A11 : H/L for ADC/D1 input timing selections
      A10 : H/L for 625/525 system selections
      A9..A0 : PCTR output
```

```
Output:
    O7..0 : 8-bit color bar, pos/neg 2's complement
           for C, CR-CB multiplexed
    note: MSB of Y must be inverted (by PutTp)         } with PROMSpec do {specifications}
begin
  Kbit := 12;     {no. of bits for PROM module input}
  Kmod := 8;      {<16, no. of bits for PROM module output}
  Kic  := 8;      {no. of bits for PROM chip output}
  Stadrs := 0;    {start address of the prom code word}
  Ioffset := -128; {input offset value, (input value)=(address)+ioffset}
  Nword := IPower (2, PROMSpec.Kbit); {no. of code words to generate}
  Csbit := 16;    {bit length of check-sum data}
  {PName for title of printout, FName for name of binary file, 1..10}
  PNames[1] := 'N20_M12A, Color bar, Y, U57';
  FNames[1] := 'N20_M12A.BIN';
end; {with}
PSpec1 := PROMSpec;
PSpec1.PNames[1] := 'N20_M16A, Color bar, CR/CB, U62';
PSpec1.FNames[1] := 'N20_M16A.BIN';

with CBar1 do    {CBar1 definition, 100/0/75/0}
begin
  NBar := 8;
  Wd10[0] := 150+90; Y10[0] := 235; Cb10[0] :=   0; Cr10[0] :=   0;
  Wd10[1] :=  90;    Y10[1] := 162; Cb10[1] := -84; Cr10[1] :=  14;
  Wd10[2] :=  90;    Y10[2] := 131; Cb10[2] :=  28; Cr10[2] := -84;
  Wd10[3] :=  90;    Y10[3] := 112; Cb10[3] := -56; Cr10[3] := -70;
  Wd10[4] :=  90;    Y10[4] :=  84; Cb10[4] :=  56; Cr10[4] :=  70;
  Wd10[5] :=  90;    Y10[5] :=  65; Cb10[5] := -28; Cr10[5] :=  84;
  Wd10[6] :=  90;    Y10[6] :=  35; Cb10[6] :=  84; Cr10[6] := -14;
  Wd10[7] := 90+154; Y10[7] :=  16; Cb10[7] :=   0; Cr10[7] :=   0;
end;

MapBar(0, IAryY, IAryC, CBar1);
BGSlopeD2(0, 4, 6, IAryY, IAryC, CBar1);

{Timing adjustment
    IAryX[150] is the intended first active sample of 720 samples.
       Cr and Cb are multiplexed in IAryC as Cr first then Cb.
    PStart = 150 points first active sample
    POffsetX adjusts the position with respect to the line definition
    made by PCTR counter.
       e.g. POffsetX = K means the active data starts K samples after the
            start of PCTR.    (-DLSize <= POffsetX < DLSize)

For Rev-A, NR20 & NR30:
       PStart1 = 150-68, PStart2 = 150-72, POffset1..4 = 510
    For Rev-B, NR20 & NR30:
       POffset1..4 adjustment of -7       9/21/92
    For Rev-C(renamed as Rev-A 10/13/92), NR20 & NR30:
       PStart, POffset adjustment         10/12/92       } l525 := 858;           {525 line length}
  l625 := 864;           {625 line length}
  PStart1 := 150 - 68;   {525 start sample, middle of H-blank}
```

```
    PStart2 := 150 - 68;       {625 start sample, middle of H-blank}
    POffset1 := 510 - 9;       {D1 and 525}
    POffset2 := 510 - 15;      {D1 and 625}
    POffset3 := 510 - 9 + 2;   {ADC and 525}
    POffset4 := 510 - 15 + 12; {ADC and 625}

{ #0. [0..1023]    D1 and 525 }
    PutTP(0, IAryY, IAryC, IntAryY, IntAryC, DLSize, PStart1, POffset1, 1525);

{ #1. [1024..2047] D1 and 625}
    PutTP(1024, IAryY, IAryC, IntAryY, IntAryC, DLSize, PStart2, POffset2, 1625);

{ #2. [2048..3071] ADC and 525}
    PutTP(2048, IAryY, IAryC, IntAryY, IntAryC, DLSize, PStart1, POffset3, 1525);

{ #3. [3072..4095] ADC and 625}
    PutTP(3072, IAryY, IAryC, IntAryY, IntAryC, DLSize, PStart2, POffset4, 1625);

{ BinPrint (IntAry1, IntAry3, PROMSpec);}
    HexPrint (IntAryY, IntAry1, PROMSpec);
    Write(^L);
    HexPrint (IntAryC, IntAry1, PSpec1);
    { HPrint (IntAry1, PROMSpec.Nword, PROMSpec.Kic, 20, PROMSpec.PNames[1]);}
    WriteBinFile (IntAryY, IntAry1, PROMSpec);
    WriteBinFile (IntAryC, IntAry1, PSpec1);
  end.
```

```c
/*--------------------------------------------------------------*/
/*   Main program for PROM code generation                      */
/*         April 1987 (Fortran -> Pascal)                       */
/*         November 1990 (Pascal -> C)      Sohei Takemoto      */
/*                                                              */
/*   PROMDEF.H and PROMLIB.H need to be included                */
/*   NR20B and NR30B boards, DIE125M project, Fall '92          */
/*--------------------------------------------------------------*/ include <stdio.h>
include <stdlib.h>
include <math.h> define MaxWord 4096   /* Max code words */
define LName   80     /* Max length of name string*/
#include "promdef.h"   /* type definitions */
include "promlib.h"   /* library */

/*   procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile      */ void main()
{
   IntData   IA1, IA2, IA3;   /* integer data array */
   RealData  RA;              /* real data array */
   SpecTable prom, PR1, PR2;  /* PROM specifications */
   char      ofname[LName];
   float     coef, max, min;
```

```
int      ibit, fbit, loc, i, j, k;
int      *ID1, *ID2, *ID3;
float    *RD1;
int      id, idt, val, lh525, lh625, lh, R0;
int      XA5, XA6, XD5, XD6, p0, p1, p2, p3, p4, p5, p6, p7, x;
int      ofset[4], TD1, TD2, TD3, TD4, TD5, P15, P25, P16, P26;
int      val1, val2, val3, Ival1, Ival2, Ival3, of, ic;
```

/* define prom specifications */
/* Horizontal timing, PCTR decoders: 4Kx8; U59,U60,U61
   FRP(frame pulse from input video) determines PCTR reset timing.
   FRP vs. video timing is different depending on the selected input.

!!! Use ofset values for ADC/D1 and 525/625 to make proper pulse
       positioning to the active line of video.

input:
       A11  : H/L for ADC/D1 selection
       A10  : H/L for 625/525 TV system
       A9..0 : 10-bit PCTR output, [0,857] or [0,863]
               (pixel-#)-[PCTR] be compensated by ofset[]

U59: This decoder generates FIFO reset pulses.
        Relative position of the pulses are fixed, moreover they are
        the same for ADC/D1 and 525/625.
   !!! F_R_RST5 is used for write reset of the output FIFO.
        Its relative position to the input SYNC needs individual
        adjustment for ADC/D1 and 525/625 to make exact H-positioning
        of the pictures. Defined with respect to PCTR.
   !!! H_R_RST1 and H_R_RST2 must be linked with FS_HID (M14A)
        ofset[] and TD4 must be copied from M14A.

output: U59
       07   : F_1H_RST: L in [R0]
       06   : F_R_RST1: L in [R0+9]
       05   : F_R_RST2: L in [R0+10]
       04   : F_R_RST3: L in [R0+10]
       03   : F_R_RST4: L in [R0+18]
       02   : F_R_RST5: L in [X]
       03   : H_R_RST1: H, linked to FS_HID
       02   : H_R_RST2: H, linked to FS_HID
            where X is the adjusted position of F_R_RST5 output: U60
       07   : TC: H at terminal count minus two
       06   : HPLS: H for LCTR count timing.(2T ahead)
       05   : H_PULSE: HID to NR30
       04   : FS_HID: H, 1T wide, frame-delay H-timing
       03   : HP_FRZ: H in []
       02   : C_DEMUX: !!! needs right phase !!!
       01   : not used
       00   : not used output: U61
       07   : H_RAMP: L for 694T in the middle of active-H
       06   : not used
       05   : H_FULL_K: H in [X-392+10]
       04   : H_SPLIT_K: H in [X-392+11]
       03   : H_FULL_HF: H

```
      02    : H_SPLIT_MF: H
      01    : H_FULL_EH: H
      00    : H_SPLIT_EH: H              */ prom.Kbit = 12;      /* no. of bits for address input */
    prom.Kmod = 8;       /* no. of bits for PROM module output, <=16 */
    prom.Kic = 8;        /* no. of bits for PROM chip output, <=8 */
    prom.Stadrs = 0;     /* input start address */
    prom.Ioffset = 0;    /* (input value)=(address)+ioffset */
    prom.Nword = IPower(2, prom.Kbit);  /* no. of words to generate */
    prom.Csbit = 16;     /* bit length of check-sum data */

PR1 = PR2 = prom;
    strcpy(prom.FNames[1], "N20_M13A.Bin");
    strcpy(prom.PNames[1], "H timing, PCTR decoder-1, U59");
    strcpy(PR1.FNames[1], "N20_M14A.Bin");
    strcpy(PR1.PNames[1], "H timing, PCTR decoder-2, U60");
    strcpy(PR2.FNames[1], "N20_M15A.Bin");
    strcpy(PR2.PNames[1], "H timing, PCTR decoder-3, U61");

/* generate prom code */ lh525 = 858;         /* pixels per H, 525 */
    lh625 = 864;         /* pixels per H, 625 */

/* !!! X to adjust for U59:F_R_RST5 !!!
       Rev-B signal prop delay is 7T shorter than Rev-A*/
        end; {for j}
      end; {procedure YFill} procedure TYFill(OPI:IAryl; ConI:DCond; var IAI:IntData; Ist:integer);
{ take OPI and fill PROM data array IAI starting from word Ist }
  var
    i, j: integer;
  begin {procedure TYFill}
    i := Ist;
    for j := 0 to ConI.ITQ-1 do
    begin
      IAI[i] := OPI[j];
      i := i + 1;
    end; {for j}
  end; {procedure TFill} var
  CondI: DCond;
  OP1, OP2, OP3, OP4: IAryl;    {PROM words}
{-------------------------------------------------------------} var
  IA1, IA2, IA3, IA4, IA5: IntData;   {integer data array}
  PS1, PS2, PS3: SpecTable;
  coef, max, min, xstep : real;
  ibit, fbit, loc: integer;
  i, j, k: integer;

begin {main program}
  with PS1 do {specifications}
```

```
begin
  Kbit := 5;        {no. of bits for PROM module input}
  Kmod := 8;        {<16, no. of bits for PROM module output}
  Kip := 8;         {no. of bits for PROM chip output}
  Stadrs := 0;      {start address of the prom code word}
  Ioffset := 0;     {input offset value, (input value)=(address)+Ioffset}
  Nword := IPower (2, PS1.Kbit);  {no. of code words to generate}
  Csbit := 16;      {bit length of check-sum data}
  {PName for title of printout, FName for name of binary file, 1..10}
  PNames[1] := 'N20_M01A, Y enhancer H-HPF, CTRL and MSB, U109';
  FNames[1] := 'N20_M01A.BIN';
end; {with}
PS2 := PS1;
PS2.PNames[1] := 'N20_M02A, Y enhancer H-HPF, LSP 8-bit, U110';
PS2.FNames[1] := 'N20_M02A.BIN';
```

{Y H-enhancer BPF control and coefficients

27S19A 32x8 PROM, 8 words accommodate 1 coefficient and control.
Four characteristics are programmed and selected by 2 MSP address input.
  10 for low,    Fp = 3.50MHz
  11 for midium, Fp = 5.00MHz
  01 for high,   Fp = 6.75MHz
  00 not used,   Fp = 5.00MHz
For coefficient, externally prepared files of impulse responses are
  reffered. One file for one impulse response.
  Hn_input is the procedure.
  Passband gain is 1.0.

```
XA6 = 13;           /* ADC and 625, XD6+12 about right */
XA5 = 9;            /* ADC and 525, XD5+2 about right */
XD6 = 1;            /* D1 and 625, Right!! */
XD5 = 7;            /* D1 and 525, Right!! */

/* !!! other values to adjust !!! */
ofset[3] = 3;       /* ADC and 625, ofset[1]-12 */
ofset[2] = 7;       /* ADC and 525, ofset[0]-2 */
ofset[1] = 15;      /* D1 and 625, RIGHT!! */
ofset[0] = 9;       /* D1 and 525, RIGHT!! */
TD1 = 2;            /* relative delay to median filter */
TD2 = 23;           /* relative delay to VY4 */
TD3 = 424;          /* relative delay to K and Freeze */
TD4 = 429;          /* relativr delay to Frame-store */
TD5 = 440;          /* relative delay to enhancer */
P25 = 0;            /* [1] C_DEMUX phase for 525, RIGHT!! */
P26 = 0;            /* [1] C_DEMUX phase for 625, RIGHT!! */

ID1 = IA1;  ID2 = IA2;  ID3 = IA3;
RO = 10;  Ival1 = 255 - 3;  Ival2 = Ival3 = 0;

for (i = 0; i < 4; i++) {
   switch (i) {
      case 0:  x = XD5; break;
      case 1:  x = XD6; break;
      case 2:  x = XA5; break;
      case 3:  x = XA6; break;
   }
   of = ofset[i];
```

```
   if (i & 1) lh = lh625;
   else lh = lh525;

p7 = (lh + RO) % lh;
   p6 = (lh + RO + 9) % lh;
   p5 = (lh + RO + 10) % lh;
   p4 = (lh + RO + 10) % lh;
   p3 = (lh + RO + 18) % lh;
   p2 = (lh + x) % lh;

for (j = 0; j < 1024; j++) {
      ic = j % lh;              /* PCTR */
      id = (lh + ic + of)% lh;  /* pixel number */

/* U59 */
   val1 = Ival1;
   if (id == p7) val1 &= -128;
   if (id == p6) val1 &= -64;
   if (id == p5) val1 &= -32;
   if (id == p4) val1 &= -16;
   if (id == p3) val1 &= -8;
   if (ic == p2) val1 &= -4;    /* refered to PCTR */

/* 01: H_R_RST1: H at 454/448T after FS_HID
      00: H_R_RST2: H at 402T after FS_HID */
   if (i & 1) {            /* 625 timing */
      if (id == (454+TD4+143)%lh) val1 |= 2;
      if (id == (402+TD4+143)%lh) val1 |= 1;
   }
   else {                  /* 525 timing */
      if (id == (448+TD4+137)%lh) val1 |= 2;
      if (id == (402+TD4+137)%lh) val1 |= 1;
   }

/* U60 and U61 */
   val2 = val3 = 0;

if (i & 1) {            /* 625 timing */
/* U60: val2
      07: TC: H at [863-2]
      06: HPLS: H at [15-2]
      05: H_PULSE: H in [0..143]
      04: FS_HID: H, 1T wide, [TD4+143]
      03: HP_FRZ: H in [TD3+64]
      02: C_DEMUX: if (id & 1) == P26, !!! needs right phase !!! */ if (ic == lh-3) val2 |= 128;
      if (id == 13) val2 |= 64;
      if ((id >= 0) && (id <= 143)) val2 |= 32;
      if (id == TD4+143) val2 |= 16;
      if (id == TD3+64) val2 |= 8;
      if ((id & 1) == P26) val2 |= 4;

/* U61: val3
      07: H_RAMP: L in [157,850]
      05: H_FULL_K: H in [TD3+144-3,TD3+863-3]
      04: H_SPLIT_K: H in [TD3+144-3,TD3+503-3]
      03: H_FULL_MF: H in [TD1+145-1+19,TD1+862-1+19]
      02: H_SPLIT_MF: H in [TD1+145-1+19,TD1+503-1+19]
      01: H_FULL_EH: H in [TD5+147-3,TD5+860-3]
      00: H_SPLIT_EH: H in [TD5+147-3,TD5+503-3]  */
```

```
    if (!((id >= 157) && (id <= 850))) val3 |= 128;

if (TD3 + 860 >= 1h) {
        if ((id <= (TD3+860)%1h) || (id >= TD3+141)) val3 |= 32;
    } else
        if ((id >= TD3+141) && (id <= TD3+860)) val3 |= 32;

if (TD3 + 500 >= 1h) {
        if ((id <= (TD3+500)%1h) || (id >= TD3+141)) val3 |= 16;
    } else
        if ((id >= TD3+141) && (id <= TD3+500)) val3 |= 16;

if (TD1 + 880 >= 1h) {
        if ((id <= (TD1+880)%1h) || (id >= TD1+163)) val3 |= 8;
    } else
        if ((id >= TD1+163) && (id <= TD1+880)) val3 |= 8;

if ((id >= TD1+163) && (id <= TD1+521)) val3 |= 4;

if (TD5 + 857 >= 1h) {
        if ((id <= (TD5+857)%1h) || (id >= TD5+144)) val3 |= 2;
    } else
        if ((id >= TD5+144) && (id <= TD5+857)) val3 |= 2;

if (TD5 + 500 >= 1h) {
        if ((id <= (TD5+500)%1h) || (id >= TD5+144)) val3 |= 1;
    } else
        if ((id >= TD5+144) && (id <= TD5+500)) val3 |= 1;

} /* U60, U61 if, 625 timing */ else {                              /* 525 timing */
/* U60: val2
    07: TC: H at [857-2]
    06: HPLS: H at [11-2]
    05: H_PULSE: H in [0..137]
    04: FS_HID: H, 1T wide, [TD4+137]
    03: HP_FRZ: H in [TD3+64]
    02: C_DEMUX: if (id & 1) == P25, !!! needs right phase !!! */ if (ic == 1h-3) val2 |= 128;
    if (id == 9) val2 |= 64;
    if ((id >= 0) && (id <= 137)) val2 |= 32;
    if (id == TD4+137) val2 |= 16;
    if (id == TD3+64) val2 |= 8;
    if ((id & 1) == P25) val2 |= 4;

/* U61: val3
    07: H_RAMP: L in [151,844]
    05: H_FULL_K: H in [TD3+138-3,TD3+857-3]
    04: H_SPLIT_K: H in [TD3+138-3,TD3+497-3]
    03: H_FULL_MF: H in [TD1+139-1+19,TD1+856-1+19]
    02: H_SPLIT_MF: H in [TD1+139-1+19,TD1+497-1+19]
    01: H_FULL_EH: H in [TD5+141-3,TD5+854-3]
    00: H_SPLIT_EH: H in [TD5+141-3,TD5+497-3]    */ if (!((id >= 151) && (id <= 844))) val3 |= 128;

if (TD3 + 854 >= 1h) {
        if ((id <= (TD3+854)%1h) || (id >= TD3+135)) val3 |= 32;
    } else
        if ((id >= TD3+135) && (id <= TD3+854)) val3 |= 32;
```

```
        if (TD3 + 494 >= 1h) {
            if ((id <= (TD3+494)%1h) || (id >= TD3+135)) val3 |= 16;
        } else
            if ((id >= TD3+135) && (id <= TD3+494)) val3 |= 16;

if (TD1 + 874 >= 1h) {
            if ((id <= (TD1+874)%1h) || (id >= TD1+157)) val3 |= 8;
        } else
            if ((id >= TD1+157) && (id <= TD1+874)) val3 |= 8;

if ((id >= TD1+157) && (id <= TD1+515)) val3 |= 4;

if (TD5 + 851 >= 1h) {
            if ((id <= (TD5+851)%1h) || (id >= TD5+138)) val3 |= 2;
        } else
            if ((id >= TD5+138) && (id <= TD5+851)) val3 |= 2;

if (TD5 + 494 >= 1h) {
            if ((id <= (TD5+494)%1h) || (id >= TD5+138)) val3 |= 1;
        } else
            if ((id >= TD5+138) && (id <= TD5+494)) val3 |= 1;

} /* U60, U61 else, 525 timing */

*ID1++ = val1; *ID2++ = val2; *ID3++ = val3;

} /* for j */
    } /* for i */

/* Output */
    strcpy (ofname, OutFileName());  /* ask for output file name */ i = HexPrint(IA1, prom, ofname);
    printf("HexPrint..........%2d\n",i);
    i = HexPrint(IA2, PR1, ofname);
    printf("HexPrint..........%2d\n",i);
    i = HexPrint(IA3, PR2, ofname);
    printf("HexPrint..........%2d\n",i);
    i = WriteBinFile(IA1, prom);
    printf("WriteBinFile......%2d\n",i);
    i = WriteBinFile(IA2, PR1);
    printf("WriteBinFile......%2d\n",i);
    i = WriteBinFile(IA3, PR2);
    printf("WriteBinFile......%2d\n",i);

}

/*--------------------------------------------------------------*/
/*  Main program for PROM code generation                       */
/*        April 1987 (Fortran -> Pascal)                        */
/*        November 1990 (Pascal -> C)        Sohei Takemoto     */
/*                                                              */
/*    PROMDEF.H and PROMLIB.H need to be included               */
/*    NR20B and NR30B boards, DIE125M project, Fall '92         */
/*--------------------------------------------------------------*/ include <stdio.h>
include <stdlib.h>
include <math.h>
```

```
#define MaxWord 4096    /* Max code words */
define LName   80      /* Max length of name string*/
#include "promdef.h"    /* type definitions */
include "promlib.h"    /* library */

/*  procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile      */ void main()
{
    IntData   IA1, IA2, IA3;    /* integer data array */
    RealData  RA;               /* real data array */
    SpecTable prom, PR1, PR2;   /* PROM specifications */
    char      ofname[LName];
    float     coef, max, min;
    int       ibit, fbit, loc, i, j, k;
    int       *ID1, *ID2, *ID3;
    float     *RD1;
    int       ofset[4] = {3, 0, 3, 0}, id, val1, val2;
    int       L525 = 525, L625 = 625, ln;

/* define prom specifications */
/* Vertical timing, LCTR decoders: 4Kx8; U88,U90
    input:
        A11   : H/L for ADC/D1 selection
        A10   : H/L for 625/525 TV system
        A9..0 : 10-bit LCTR output, [0,524] or [0,624]
                "0" vs. line-0 be compensated by ofset[]

output: U88
        07   : H as V_BLNK for RAMP
        06   : not used
        05   : H as V_FULL_K,  (2H delayed)
        04   : H as V_SPLIT_K, (2H delayed)
        03   : H as V_FULL_MF, (1H delayed)
        02   : H as V_SPLIT_MF,(1H delayed)
        01   : H as V_FULL_EH, (2H advanced)
        00   : H as V_SPLIT_EH,(2H advanced)

output: U90
        07   : SFID, 1H advanced FID
        06   : FS_FID
        05   : H as FLD_CLK1, for uP shadow registers
        04   : H as VP_FRZ, for freeze control
        03..0 : not used                            */ prom.Kbit = 12;      /* no. of bits for address input */
    prom.Kmod = 8;       /* no. of bits for PROM module output, <=16 */
    prom.Kic  = 8;       /* no. of bits for PROM chip output, <=8 */
    prom.Stadrs = 0;     /* input start address */
    prom.Ioffset = 0;    /* (input value)=(address)+ioffset */
    prom.Nword = IPower(2, prom.Kbit);  /* no. of words to generate */
    prom.Csbit = 16;     /* bit length of check-sum data */
```

```
    PR1 = prom;
    strcpy(prom.FNames[1], "N20_M17A.Bin");
    strcpy(prom.PNames[1], "V timing, LCTR decoder-1, U88");
    strcpy(PR1.FNames[1], "N20_M18A.Bin");
    strcpy(PR1.PNames[1], "V timing, LCTR decoder-2, U90");

/* generate prom code */

ID1 = IA1;  ID2 = IA2;

for (i = 0; i < 4; i++) {       /* ADC/D1-, 625/525- */
       if (i & 1) ln = L625; else ln = L525;

for (j = 0; j < 1024; j++) {
          val1 = val2 = 0;
          id = (ln + j + ofset[i]) % ln;

if (i & 1) {    /* 625 timing */

/* U88 : val1
            07: V_BLNK: H in [623..21,310..334] for RAMP
            05: V_FULL_K: (2H delay) H in [25..310,338..623]
            04: V_SPLIT_K: (2H delay) H in [25..167,338..480]
            03: V_FULL_MF: (1H delay) H in [24..309,337..622]
            02: V_SPLIT_MF: (1H delay) H in [24..166,337..479]
            01: V_FULL_EH: (2H adv) H in [21..306,334..619]
            00: V_SPLIT_EH: (2H adv) H in [21..163,334..476]        */ if ((id >= 623) || (id <= 21))  val1 |= 128;
             if ((id >= 310) && (id <= 334)) val1 |= 128;

if ((id >= 25) && (id <= 310)
                || (id >= 338) && (id <= 623)) val1 |= 32;

if ((id >= 25) && (id <= 167)
                || (id >= 338) && (id <= 480)) val1 |= 16;

if ((id >= 24) && (id <= 309)) val1 |= 8;
             if ((id >= 337) && (id <= 622)) val1 |= 8;

if ((id >= 24) && (id <= 166)) val1 |= 4;
             if ((id >= 337) && (id <= 479)) val1 |= 4;

if ((id >= 21) && (id <= 306)) val1 |= 2;
             if ((id >= 334) && (id <= 619)) val1 |= 2;

if ((id >= 21) && (id <= 163)) val1 |= 1;
             if ((id >= 334) && (id <= 476)) val1 |= 1;

/* U90 : val2
            07: SFID: (1H advance) H in [311..623]
            06: FS_FID: H in [312..624]
            05: FLD_CLK1: H in [0, 312]
            04: VP_FRZ: H in [10]            */ if ((id >= 311) && (id <= 623))  val2 |= 128;

if ((id >= 312) && (id <= 624))  val2 |= 64;

if ((id == 0) || (id == 312))  val2 |= 32;
```

```c
            if (id == 10) val2 |= 16;

} /* if 625 timing */ else {          /* 525 timing */

/* U88 : val1
    07: V_BLNK: H in [0..19,263..282] for RAMP
    05: V_FULL_K: (2H delay) H in [23..263,286..524,0]
    04: V_SPLIT_K: (2H delay) H in [23..143,286..406]
    03: V_FULL_MF: (1H delayed) H in [22..262,285..524]
    02: V_SPLIT_MF: (1H delayed) H in [22..142,285..405]
    01: V_FULL_EH: (2H adv) H in [19..259,282..521]
    00: V_SPLIT_EH: (2H adv) H in [19..139,282..402]     */ if (id <= 19)  val1 |= 128;
            if ((id >= 263) && (id <= 282)) val1 |= 128;

if ((id >= 23) && (id <= 263)
                || (id >= 286) || (id <= 0)) val1 |= 32;

if ((id >= 23) && (id <= 143)
                || (id >= 286) && (id <= 406)) val1 |= 16;

if ((id >= 22) && (id <= 262))  val1 |= 8;
            if ((id >= 285) && (id <= 524)) val1 |= 8;

if ((id >= 22) && (id <= 142))  val1 |= 4;
            if ((id >= 285) && (id <= 405)) val1 |= 4;

if ((id >= 19) && (id <= 259))  val1 |= 2;
            if ((id >= 282) && (id <= 521)) val1 |= 2;

if ((id >= 19) && (id <= 139))  val1 |= 1;
            if ((id >= 282) && (id <= 402)) val1 |= 1;

/* U90 : val2
    07: SFID: (1H advance) H in [264..524,0..1]
    06: PS_FID: H in [265..524,0..2]
    05: FLD_CLK1: H in [3, 265]
    04: VP_FRZ: H in [10]                    */ if ((id >= 264) || (id <= 1))  val2 |= 128;

if ((id >= 265) || (id <= 2))  val2 |= 64;

if ((id == 3) || (id == 265))  val2 |= 32;

if (id == 10) val2 |= 16;

} /* if 525 timing */

*ID1++ = val1; *ID2++ = val2;
    }
}

/* Output */
    strcpy (ofname, OutFileName()); /* ask for output file name */
```

```
i = HexPrint(IA1, prom, ofname);
printf("HexPrint.........%2d\n",i);
i = HexPrint(IA2, PR1, ofname);
printf("HexPrint.........%2d\n",i);
i = WriteBinFile(IA1, prom);
printf("WriteBinFile......%2d\n",i);
i = WriteBinFile(IA2, PR1);
printf("WriteBinFile......%2d\n",i);
}

/*-----------------------------------------------------------*/
/*    Main program for PROM code generation                  */
/*          April 1987 (Fortran -> Pascal)                   */
/*          November 1990 (Pascal -> C)      Sohei Takemoto  */
/*                                                           */
/*    PROMDEF.H and PROMLIB.H need to be included            */
/*    NR20B and NR30B boards, DIE125M project, Fall '92      */
/*-----------------------------------------------------------*/ include <stdio.h>
include <stdlib.h>
include <math.h> define MaxWord 8192   /* Max code words */
define LName   80     /* Max length of name string*/
#include "promdef.h"   /* type definitions */
include "promlib.h"   /* library */

/*    procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile       */ float FSharpen (float gmax, float pwr, float n, float k)
/* gain factor for sharpening
     gmax : maximum gain (db) to reach
     pwr  : power factor to define a non-linear curve in db
     n    : total number of non-zero sharpening steps
     k    : current step number to find the gain factor
        gdb = gmax * pow(k / n, pwr)
        gf  = pow(10.0, gdb / 20.0) - 1.0     */
{
   float gf;
   if (k == 0)  gf = 0.0;
   else
      gf = pow(10.0, gmax * pow(k / n, pwr) / 20.0) - 1.0;
   return gf;
} float FSoften (float gmax, float pwr, float n, float k)
/* gain factor for softening
     gmax : maximum softening level in [-1.0, 0.0]
            0 for no softening, -1.0 for ultimate softening
     pwr  : power factor to define a non-linear curve
     n    : total number of non-zero softening steps
     k    : current step number to find the gain factor
        gf = gmax * pow(k / n, pwr)           */
```

```
    {
        float   gf;
        if (gmax < -1.0 || gmax > 0.0)  gmax = -1.0;
        if (k == 0)  gf = 0.0;
        else  gf = gmax * pow(k / n, pwr);
        return gf;
    } void main()
{

IntData IntAry1, IntAry2;   /* integer data array */
    RealData RealAry;           /* real data array */
    SpecTable prom;             /* PROM specifications */
    char    ofname[LName];
    float   coef, max, min;
    int     ibit, fbit, loc, i, j, k, val;
    int     lvl, core, sgn;
    int     *ID1, *ID2, *ID3;
    float   *RD1, f, skew, fval;
    int     acore[16] = {0,0,0,0,1,1,1,1,2,2,2,2,3,3,3,3};
    int     score[16] = {0,0,0,0,1,1,1,1,2,2,2,2,3,3,3,3};

/* define prom specifications */
/* Y Horizontal enhancer LUTs: 8Kx8
    input:
        A12  : H/L for soften/sharpen
        A11..8: LUTs selection [0,15]
                gain factor for each selection is defined by
                    FSharpen() for sharpening (0 or positive) and
                    FSoften() for softening ([-1.0,0.0])
                coring level is given by acore[] and score[] for
                    sharpening and softening
        A7..0 : signal input, pos/neg 2's complement
                [-128,127]
    output:
        O7..0 : signal output, [-128,127]           */ prom.Kbit = 13;         /* no. of bits for address input */
    prom.Kmod = 8;          /* no. of bits for PROM module output, <=16 */
    prom.Kic  = 8;          /* no. of bits for PROM chip output, <=8 */
    prom.Stadrs = 0;        /* input start address */
    prom.Ioffset = 0;       /* (input value)=(address)+ioffset */
    prom.Nword = IPower(2, prom.Kbit);  /* no. of words to generate */
    prom.Csbit = 16;        /* bit length of check-sum data */ strcpy(prom.FNames[1], "N20_M19A.Bin");
    strcpy(prom.PNames[1], "Y H-enhancer LUTs, U26");

/* generate prom code */ skew = 1.4;             /* gamma related gain for negative value */
    ID1 = IntAry1;
    for (i = 0; i < 32; i++) {    /* 32 tables to generate */
        lvl = i & 15;
        if (i >> 4 & 1) {         /* get the factor */
            f = FSoften(-1.0, 1.0, 15, lvl);
            core = score[lvl];
```

```
    }
    else {
       f = FSharpen(15.0, 1.0, 15, lvl);
       core = acore[lvl];
    } printf("lvl, f and core  %d  %f  %d\n",lvl,  f, core);

for (j = 0; j < 256; j++, ID1++) {
       val = j;                    /* get the input value */
       sgn = val >> 7;
       if (sgn)  val = 256 - val;     /* make it positive */
          if (val <= core)  val = 0;     /* coring */
          if (sgn)  val = -val;          /* restore sign.*/
          fval = f * val;                /* apply gain factor */
          if (fval < 0)  fval *= skew;   /* apply skew */
          val = fval + 0.5;
          if (val > 127)  val = 127;     /* limit */
          if (val < -128)  val = -128;   /* limit */
          *ID1 = val & 255;              /* make it 8-bit */
       }
    }

/* Output */
   strcpy (ofname, OutFileName());  /* ask for output file name */ i = HexPrint(IntAry1, prom, ofname);
   printf("HexPrint..........%2d\n",i);
   i = WriteBinFile(IntAry1, prom);
   printf("WriteBinFile......%2d\n",i);
}

/*-------------------------------------------------------------*/
/*   Main program for PROM code generation                     */
/*         April 1987 (Fortran -> Pascal)                      */
/*         November 1990 (Pascal -> C)      Sohei Takemoto     */
/*                                                             */
/*   PROMDEF.H and PROMLIB.H need to be included               */
/*   NR20B and NR30B boards, DIE125M project, Fall '92         */
/*-------------------------------------------------------------*/ include <stdio.h>
include <stdlib.h>
include <math.h> define MaxWord 8192   /* Max code words */
define LName    80    /* Max length of name string*/
#include "promdef.h"   /* type definitions */
include "promlib.h"   /* library */

/*   procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile     */
```

```
float FSharpen (float gmax, float pwr, float n, float k)
/* gain factor for sharpening
      gmax : maximum gain (db) to reach
      pwr  : power factor to define a non-linear curve in db
      n    : total number of non-zero sharpening steps
      k    : current step number to find the gain factor
       gdb = gmax * pow(k / n, pwr)
       gf  = pow(10.0, gdb / 20.0) - 1.0        */
{
   float gf;
   if (k == 0) gf = 0.0;
   else
      gf = pow(10.0, gmax * pow(k / n, pwr) / 20.0) - 1.0;
   return gf;
} float FSoften (float gmax, float pwr, float n, float k)
/* gain factor for softening
      gmax : maximum softening level in [-1.0, 0.0]
             0 for no softening, -1.0 for ultimate softening
      pwr  : power factor to define a non-linear curve
      n    : total number of non-zero softening steps
      k    : current step number to find the gain factor
       gf  = gmax * pow(k / n, pwr)             */
{
   float gf;
   if (gmax < -1.0 || gmax > 0.0)  gmax = -1.0;
   if (k == 0)  gf = 0.0;
   else  gf = gmax * pow(k / n, pwr);
   return gf;
} void main()
{
   IntData  IntAry1, IntAry2;    /* integer data array */
   RealData RealAry;             /* real data array */
   SpecTable prom;               /* PROM specifications */
   char     ofname[LName];
   float    coef, max, min;
   int      ibit, fbit, loc, i, j, k, val;
   int      lvl, core, sgn;
   int      *ID1, *ID2, *ID3;
   float    *RD1, f, skew, ratio, fval;
   int      acore[16] = {0,0,0,0,1,1,1,1,2,2,2,2,3,3,3,3};
   int      score[16] = {0,0,0,0,1,1,1,1,2,2,2,2,3,3,3,3};

/* define prom specifications */
/* Y Vertical enhancer LUTs: 8Kx8
      input:
         A12   : H/L for soften/sharpen
         A11..8: LUTs selection [0,15]
                  gain factor for each selection is defined by
                     FSharpen() for sharpening (0 or positive) and
                     FSoften() for softening ([-1.0,0.0])
                  coring level is given by acore[] and score[] for
                     sharpening and softening
```

```
            A7..0 : signal input, pos/neg 2's complement
                    [-128,127]
                    input is negated, sign alteration is required
        output:
            O7..0 : signal output, [-128,127]               */ prom.Kbit = 13;         /* no. of bits for address input */
    prom.Kmod = 8;          /* no. of bits for PROM module output, <=16 */
    prom.Kic = 8;           /* no. of bits for PROM chip output, <=8 */
    prom.Stadrs = 0;        /* input start address */
    prom.Ioffset = 0;       /* (input value)=(address)+ioffset */
    prom.Nword = IPower(2, prom.Kbit);  /* no. of words to generate */
    prom.Csbit = 16;        /* bit length of check-sum data */ strcpy(prom.FNames[1], "N20_M20A.Bin");
    strcpy(prom.PNames[1], "Y V-enhancer LUTs, U112");

/* generate prom code */ skew = 1.4;             /* gamma related gain for negative value */
    ratio = 0.4;            /* relative gain to H-enhancer */

ID1 = IntAry1;
    for (i = 0; i < 32; i++) {      /* 32 tables to generate */
        lvl = i & 15;
        if (i >> 4 & 1) {           /* get the factor */
            f = FSoften(-1.0, 1.0, 15, lvl);
            core = score[lvl];
        }
        else {
            f = FSharpen(15.0, 1.0, 15, lvl);
            core = acore[lvl];
        } printf("lvl, f and core  %d  %f  %d\n", lvl, f, core);

for (j = 0; j < 256; j++, ID1++) {
            val = j;                        /* get the input value */
            sgn = val >> 7;
            if (sgn)  val = 256 - val;      /* make it positive */
            if (val <= core)  val = 0;      /* coring */
            if (sgn)  val = -val;           /* restore sign */
            fval = ratio * f * val;         /* apply gain factor */
            if (fval < 0)  fval *= skew;    /* apply skew */
            val = - (fval + 0.5);           /* !!! sign alteration */
            if (val > 127)   val = 127;     /* limit */
            if (val < -128)  val = -128;    /* limit */
            *ID1 = val & 255;               /* make it 8-bit */
        }
    }

/* Output */
    strcpy (ofname, OutFileName());  /* ask for output file name */ i = HexPrint(IntAry1, prom, ofname);
    printf("HexPrint..........%2d\n",i);
    i = WriteBinFile(IntAry1, prom);
    printf("WriteBinFile......%2d\n",i);
}
```

```
MODULE N20_L01_A  flag '-r3'
TITLE '10.1 bits pos/neg to 8 bits overflow control
NR20B
Sohei Takemoto   3/31/92'

"DESCRIPTION

"L01A: 3/31/92
"This PAL converts 10.1 bits of 2's complement data to 8-bit data.
"  Just ignore the fractional bit.
"  Input range is [-512, +511].
"  Assume that actual input is limited to [-256, +255].
"  Output is limited to [-128, +127].
"  inputs are,
"     i10..i1 : 10-bit pos/neg 2's complement data input.
"               Note that i10 and i9 are always true sign bits.
"     i0      : fractional bit
"  outputs are,
"     o8..o1  : 8-bit pos/neg 2's complement data.
"

"DECLARATIONS

N20_L01A           device    'P22V10';

clk,i10,i9,i8,i7,i6,i5       pin 1,2,3,4,5,6,7;
     i4,i3,i2,i1,i0               pin 8,9,10,11,13;
     o1,o2,o3,o4,o5               pin 15,16,17,18,19;
     o6,o7,o8                     pin 20,21,22;
     o8,o7,o6,o5,o4,o3,o2,o1  ISTYPE  'pos,reg';
     C,X,Z,H,L  =   .C.,.X.,.Z.,1,0;

"SET DEFINITIONS input  = [i8..i1];
     output = [o8..o1];
     any8   = [X,X,X,X,X,X,X,X];

EQUATIONS
     o1 := !(i10 $ i8) & i1 # (i10 $ i8) & !i10;
     o2 := !(i10 $ i8) & i2 # (i10 $ i8) & !i10;
     o3 := !(i10 $ i8) & i3 # (i10 $ i8) & !i10;
     o4 := !(i10 $ i8) & i4 # (i10 $ i8) & !i10;
     o5 := !(i10 $ i8) & i5 # (i10 $ i8) & !i10;
     o6 := !(i10 $ i8) & i6 # (i10 $ i8) & !i10;
     o7 := !(i10 $ i8) & i7 # (i10 $ i8) & !i10;
     o8 := i10;

TEST_VECTORS
([clk,i10,input] -> [output])
[0,X, any8 ] -> [any8 ];
[C,0, ^hFF ] -> [^h7F ]; "  255  ->  127
[C,0, ^h80 ] -> [^h7F ]; "  128  ->  127
[C,0, ^h0F ] -> [^h0F ]; "   15  ->   15
[C,0, ^h01 ] -> [^h01 ]; "    1  ->    1
[C,0, ^h00 ] -> [^h00 ]; "    0  ->    0
[C,1, ^hFF ] -> [^hFF ]; "   -1  ->   -1
[C,1, ^hF1 ] -> [^hF1 ]; "  -15  ->  -15
[C,1, ^h7F ] -> [^h80 ]; " -129  -> -128
```

[C,1,^h00 ] -> [^h80 ]; " -256 -> -128

END N20_L01_A↵

MODULE N20_L02_A flag '-r3'
TITLE '10 bits pos/neg to 8 bits overflow control
NR20B
Sohei Takemoto    3/31/92'

"DESCRIPTION

"L02A: 3/31/92
"This PAL converts 10-bit of 2's complement data to 8-bit data.
" Input range is [-512, +511].
" Assume that the sign bit is always right.
" Output is limited to [-128, +127].
" inputs are,
"    i10..i1 : 10-bit pos/neg 2's complement data input.
"              Note that i10 and i9 are always true sign bits.
"    OE-     : L for output enable
" outputs are,
"    o8..o1  : 8-bit pos/neg 2's complement data.
"

"DECLARATIONS

N20_L02A      device    'P22V10';

clk,i1,i2,i3,i4,i5,i6          pin 1,2,3,4,5,6,7;
    i7,i8,i9,i10,OE-               pin 8,9,10,11,13;
    o8,o7,o6,o5,o4                 pin 15,16,17,18,19;
    o3,o2,o1                       pin 20,21,22;
    o8,o7,o6,o5,o4,o3,o2,o1   ISTYPE   'pos,reg';
    C,X,Z,H,L     =    .C.,.X.,.Z.,1,0;

"SET DEFINITIONS input  = [i9..i1];
    output = [o8..o1];
    any9   = [X,X,X,X,X,X,X,X,X];
    any8   = [X,X,X,X,X,X,X,X];
    any8z  = [Z,Z,Z,Z,Z,Z,Z,Z];

EQUATIONS
    o1 := (i10 & i9 & i8 # !i10 & !i9 & !i8) & i1
        # !(i10 & i9 & i8 # !i10 & !i9 & !i8) & !i10;
    o2 := (i10 & i9 & i8 # !i10 & !i9 & !i8) & i2
        # !(i10 & i9 & i8 # !i10 & !i9 & !i8) & !i10;
    o3 := (i10 & i9 & i8 # !i10 & !i9 & !i8) & i3
        # !(i10 & i9 & i8 # !i10 & !i9 & !i8) & !i10;
    o4 := (i10 & i9 & i8 # !i10 & !i9 & !i8) & i4
        # !(i10 & i9 & i8 # !i10 & !i9 & !i8) & !i10;
    o5 := (i10 & i9 & i8 # !i10 & !i9 & !i8) & i5
        # !(i10 & i9 & i8 # !i10 & !i9 & !i8) & !i10;
    o6 := (i10 & i9 & i8 # !i10 & !i9 & !i8) & i6
        # !(i10 & i9 & i8 # !i10 & !i9 & !i8) & !i10;
    o7 := (i10 & i9 & i8 # !i10 & !i9 & !i8) & i7
        # !(i10 & i9 & i8 # !i10 & !i9 & !i8) & !i10;
    o8 := i10;

```
    enable o1 = !OE-;
    enable o2 = !OE-;
    enable o3 = !OE-;
    enable o4 = !OE-;
    enable o5 = !OE-;
    enable o6 = !OE-;
    enable o7 = !OE-;
    enable o8 = !OE-;

TEST_VECTORS
([clk,i10,input,OE-] -> [output])
[0,X, any9 ,0] -> [any8 ];
[C,X, any9 ,1] -> [any8z];
[C,0, ^h1FF ,0] -> [^h7F ]; "  511 ->  127
[C,0, ^h100 ,0] -> [^h7F ]; "  256 ->  127
[C,0, ^h080 ,0] -> [^h7F ]; "  128 ->  127
[C,0, ^h00F ,0] -> [^h0F ]; "   15 ->   15
[C,0, ^h001 ,0] -> [^h01 ]; "    1 ->    1
[C,0, ^h000 ,0] -> [^h00 ]; "    0 ->    0
[C,1, ^h1FF ,0] -> [^hFF ]; "   -1 ->   -1
[C,1, ^h1F1 ,0] -> [^hF1 ]; "  -15 ->  -15
[C,1, ^h180 ,0] -> [^h80 ]; " -128 -> -128
[C,1, ^h17F ,0] -> [^h80 ]; " -129 -> -128
[C,1, ^h100 ,0] -> [^h80 ]; " -256 -> -128
[C,1, ^h080 ,0] -> [^h80 ]; " -384 -> -128
[C,1, ^h000 ,0] -> [^h80 ]; " -512 -> -128

END N20_L02_A
```

MODULE N20_L03_A flag '-r3'
TITLE '10-Bit binary counter with count enable and reset
DIE125M
Sohei Takemoto    2/13/9, 3/31/92, 9/22/92'

"DESCRIPTION

"This is 10-bit binary counter
"NR2_L01A: count enable (L) and clear (L)
"       13.5MHz pixel counter and line counter
"N20_L04A: 3/31/92
"N20_L03A: 9/22/92 renamed " 1. Clear L input resets the counter. It supercedes any other action.
" 2. Enable L allows the counter to count-up.
"    Modulo 858/864 and 525/625 counters for pixel and line counting are
"    realized on the same PAL logic by appropriate clear control.
"
"   inputs are,
"       clk       : 13.5MHz
"       CLR       : L active
"       CEN       : L active
"   outputs are,
"       Q[0..9]   : 10-bit count bits
"

"DECLARATIONS

N20_L03A    device    'P22V10';

clk,CLR,ENB         pin 1,2,3;

```
Q2,Q3,Q4,Q5,Q9        pin 23,22,21,20,19;
Q0,Q1,Q6,Q7,Q8        pin 14,15,16,17,18;

C,X,Z,H,L       =     .C.,.X.,.Z.,1,0;
CTR             =     [Q9..Q0];
CAny            =     [X,X,X,X,X,X,X,X,X,X];

EQUATIONS
    Q0  :=  CLR & ENB & Q0
          # CLR & !ENB & !Q0;
    Q1  :=  CLR & ENB & Q1
          # CLR & !ENB & (Q1 & !Q0 # !Q1 & Q0);
    Q2  :=  CLR & ENB & Q2
          # CLR & !ENB & (Q2 & (!Q1 # !Q0) # !Q2 & Q1 & Q0);
    Q3  :=  CLR & ENB & Q3
          # CLR & !ENB & (Q3 & (!Q2 # !Q1 # !Q0) # !Q3 & Q2 & Q1 & Q0);
    Q4  :=  CLR & ENB & Q4
          # CLR & !ENB & (Q4 & (!Q3 # !Q2 # !Q1 # !Q0)
                    # !Q4 & Q3 & Q2 & Q1 & Q0);
    Q5  :=  CLR & ENB & Q5
          # CLR & !ENB & (Q5 & (!Q4 # !Q3 # !Q2 # !Q1 # !Q0)
                    # !Q5 & Q4 & Q3 & Q2 & Q1 & Q0);
    Q6  :=  CLR & ENB & Q6
          # CLR & !ENB & (Q6 & (!Q5 # !Q4 # !Q3 # !Q2 # !Q1 # !Q0)
                    # !Q6 & Q5 & Q4 & Q3 & Q2 & Q1 & Q0);
    Q7  :=  CLR & ENB & Q7
          # CLR & !ENB & (Q7 & (!Q6 # !Q5 # !Q4 # !Q3 # !Q2 # !Q1 # !Q0)
                    # !Q7 & Q6 & Q5 & Q4 & Q3 & Q2 & Q1 & Q0);
    Q8  :=  CLR & ENB & Q8
          # CLR & !ENB
            & (Q8 & (!Q7 # !Q6 # !Q5 # !Q4 # !Q3 # !Q2 # !Q1 # !Q0)
                    # !Q8 & Q7 & Q6 & Q5 & Q4 & Q3 & Q2 & Q1 & Q0);
    Q9  :=  CLR & ENB & Q9
          # CLR & !ENB
            & (Q9 & ( !Q8 # !Q7 # !Q6 # !Q5 # !Q4 # !Q3 # !Q2 # !Q1 # !Q0)
                    # !Q9 & Q8 & Q7 & Q6 & Q5 & Q4 & Q3 & Q2 & Q1 & Q0);

TEST_VECTORS
    ([clk,CLR,ENB] -> CTR)
    [0,X,X]  ->    0;
    [C,1,0]  ->    1;
    [C,1,0]  ->    2;
    [C,1,0]  ->    3;
    [C,1,0]  ->    4;
    [C,1,1]  ->    4;
    [C,1,0]  ->    5;
    [C,0,X]  ->    0;
    [C,0,1]  ->    0;
    [C,1,0]  ->    1;
    [C,1,0]  ->    2;
    [C,1,0]  ->    3;
    [C,1,0]  ->    4;

END N20_L03_A
```

MODULE N20_L04_A flag '-r3'
TITLE '11 bits pos/neg to 10 bits overflow control
NR20B
Sohei Takemoto    9/22/92'

"DESCRIPTION

"L04A: 9/22/92  L01A copied and modified
"L04A: 10/5/92  input bit-order is reversed "This PAL converts 11 bits of 2's complement data to 10-bit data.
"  Input range is [-1024, +1023].
"  Assume that MSB is always right.
"  Output is limited to [-512, +511].
"  inputs are,
"     i11..i1 : 11-bit pos/neg 2's complement data input.
"  outputs are,
"     o10..o1 : 10-bit pos/neg 2's complement data.
"

"DECLARATIONS

N20_L04A              device    'P22V10';

clk,i11,i10,i9,i8,i7,i6      pin 1,13,11,10,9,8,7;
    i5,i4,i3,i2,i1               pin 6,5,4,3,2;
    o1,o2,o3,o4,o5               pin 23,22,21,20,19;
    o6,o7,o8,o9,o10              pin 18,17,16,15,14;
    o10,o9,o8,o7,o6,o5,o4,o3,o2,o1   ISTYPE  'pos,reg';
    C,X,Z,H,L    =    .C.,.X.,.Z.,1,0;

"SET DEFINITIONS input  = [i10..i1];
    output = [o10..o1];
    any10  = [X,X,X,X,X,X,X,X,X,X];

EQUATIONS
    o1 := !(i11 $ i10) & i1 # (i11 $ i10) & !i11;
    o2 := !(i11 $ i10) & i2 # (i11 $ i10) & !i11;
    o3 := !(i11 $ i10) & i3 # (i11 $ i10) & !i11;
    o4 := !(i11 $ i10) & i4 # (i11 $ i10) & !i11;
    o5 := !(i11 $ i10) & i5 # (i11 $ i10) & !i11;
    o6 := !(i11 $ i10) & i6 # (i11 $ i10) & !i11;
    o7 := !(i11 $ i10) & i7 # (i11 $ i10) & !i11;
    o8 := !(i11 $ i10) & i8 # (i11 $ i10) & !i11;
    o9 := !(i11 $ i10) & i9 # (i11 $ i10) & !i11;
    o10:= i11;

TEST_VECTORS
([clk,i11,input] -> [output])
[0,X, any10 ] -> [any10 ];
[C,0, ^h3FF ] -> [^h1FF ]; " 1023 -> 511
[C,0, ^h300 ] -> [^h1FF ]; "  768 -> 511
[C,0, ^h200 ] -> [^h1FF ]; "  512 -> 511
[C,0, ^h1FF ] -> [^h1FF ]; "  511 -> 511
[C,0, ^h0FF ] -> [^h0FF ]; "  255 -> 255
[C,0, ^h080 ] -> [^h080 ]; "  128 -> 128
[C,0, ^h00F ] -> [^h00F ]; "   15 ->  15

```
[C,0, ^h001 ] -> [^h001 ]; "    1 ->    1
[C,0, ^h000 ] -> [^h000 ]; "    0 ->    0
[C,1, ^h3FF ] -> [^h3FF ]; "   -1 ->   -1
[C,1, ^h3F1 ] -> [^h3F1 ]; "  -15 ->  -15
[C,1, ^h37F ] -> [^h37F ]; " -129 -> -129
[C,1, ^h300 ] -> [^h300 ]; " -256 -> -256
[C,1, ^h2FF ] -> [^h2FF ]; " -257 -> -257
[C,1, ^h200 ] -> [^h200 ]; " -512 -> -512
[C,1, ^h1FF ] -> [^h200 ]; " -513 -> -512
[C,1, ^h100 ] -> [^h200 ]; " -767 -> -512
[C,1, ^h000 ] -> [^h200 ]; "-1024 -> -512

END N20_L04_A
```

```
MODULE N20_L05_A flag '-r3'
TITLE 'PCTR AND LCTR counter control
DIE125M
Sohei Takemoto    3/7/92, 3/31/92, 9/22/92, 10/21/92'

"DESCRIPTION

"NR2_L09A: 3/7/92
"N20_L03A: 3/31/92
"N20_L05A: 9/22/92 renemed, ADV moved
"N20_L05A: 10/21/92 P_CLR logic is corrected "This PLD generates control pulses to PCTR and LCTR counters.
"  Some other pulses are also processed in this PLD.
"
"  functions are,
"    1. make PCTR clear pulse combined with terminal count and frame reset
"         (TC or FRP negative edge)
"           TC takes 2-clocks to make the effect
"           inhibit TC right after FRP induced reset  10/21/92
"    2. make LCTR clear from frame reset
"         (FRP negative edge clocked by HPLS)
"    3. make LCTR count enable rom PCTR timing
"         (HPLS inverted)
"    4. make RAMP generator enable pulse
"    5. make FID pulse for NR30, refrecting 1H advanced or not "  Inputs are,
"    1. clk: 13.5MHz
"    2. FRP  : frame pulse, negative edge as about to start field-1
"    3. TC   : H as terminal count of PCTR for PCTR reset
"    4. HPLS : H, 1-clock wide, for LCTR counter timing
"    5. H_RAMP : L for active line period for RAMP generator
"    6. V_BLNK : L for active field period for RAMP generator
"    7? SFID  : FID source for NR30
"    8. ADV   : H as 1H advanced mode "  Outputs are,
"    1. P_CLR : L for PCTR clear
"    2. L_CLR : L for LCTR clear
"    3. L_EN  : L for LCTR count enable
"    4. RAMP  : RAMP generator pulse
"    5. FID   : FID to NR30
```

"DECLARATIONS

```
    N20_L05A        device    'P22V10';

clk,FRP,TC,HPLS         pin 1,2,3,4;
    H_RAMP,V_BLNK           pin 5,6;
    SFID,ADV                pin 7,8;
    P_CLR,L_CLR,L_EN        pin 16,15,14;
    dp1,dp2,dp3,dl1,dl2     pin 17,18,19,20,21;
    RAMP                    pin 23;
    FID                     pin 22;

C,X,Z,H,L    =    .C. , .X. , .Z. , 1,0;
```

"SET DEFINITIONS

```
    states     =    [dp3,dp2,dp1];
      idleL    =    [1,1,0];    "wait for L->H of FRP
      idleH    =    [1,1,1];    "wait for H->L of FRP
      count0   =    [0,0,0];
      count1   =    [0,0,1];
      count2   =    [0,1,1];
      count3   =    [0,1,0];
      count4   =    [1,0,0];
      countEnd =    [1,0,1];

STATE_DIAGRAM    states
    STATE  idleL   : IF FRP  THEN idleH ELSE idleL;
    STATE  idleH   : IF !FRP THEN count0 ELSE idleH;
    STATE  count0  : GOTO count1;
    STATE  count1  : GOTO count2;
    STATE  count2  : GOTO count3;    "PCTR=0
    STATE  count3  : GOTO count4;
    STATE  count4  : GOTO countEnd;
    STATE  countEnd: IF FRP THEN idleH ELSE idleL;

EQUATIONS
    dl1      :=  FRP & HPLS # !HPLS & dl1;
    dl2      :=  dl1;
    P_CLR    :=  !((states == count0) # dp3 & TC);
    L_CLR    :=  !(!dl1 & dl2);
    L_EN     :=  !HPLS;
    RAMP     :=  !(!H_RAMP & !V_BLNK);
    FID      :=  ADV & SFID # !ADV & (SFID & !L_EN # L_EN & FID);

END N20_L05_A

MODULE N20_L06_A flag '-r3'
TITLE 'Full or split active window
DIE125H
Sohei Takemoto    2/28/92, 3/31/92, 4/10/92, 9/22/92'
```

"DESCRIPTION

"NR2-L08A: 2/28/92
"N20_L05A: 3/31/92
"N20_L05B: 4/10/92 HV_MF_C delayed
"N20_L06A: 9/22/92 renamed, HV_MF_C removed "This PAL generates composite active windows in which picture processing
"  is enabled.
"  Basic modes are,
"    1. full picture,
"    2. horizontal split (left active),
"    3. vertical split (top active).
"
"  Four timing pulses are supplied.
"    1. V_FULL,  2. V_SPLIT,  3. H_FULL,  4. H_SPLIT.
"  They are properly combined on SPLIT_H/V- condition.

"  There are three processes to deal with. They are,
"    1. Median filter,
"    2. Recursive filter, (cf. N20_L08A.ABL)
"    3. Y enhancer.
"  OH/1H advance selection needs to be reflected on Y enhancer timing.

"  Inputs are,
"    1. clk: 13.5MHz
"    2. SPLIT: H for split
"    3. H_V- : H/L for horizontal/vertical split
"    4. H_F_MF : H for active full part
"    5. H_S_MF : H for active split part
"    6. V_F_MF : H for active full part, median filter
"    7. V_S_MF : H for active split part
"    8. H_F_EH : H for active full part
"    9. H_S_EH : H for active split part
"    10. V_F_EH : H for active full part, median filter
"    11. V_S_EH : H for active split part
"    12. H_ADV  : H for 1H advance
"  Outputs are,
"    1. HV_MF  : H for active part, Y and C median filters
"    2. HV_EH  : H for active part, Y enhancer

"DECLARATIONS

N20_L06A            device      'P22V10';

clk,SPLIT,H_V-                  pin 1,2,3;
    H_F_MF,H_S_MF,V_F_MF,V_S_MF     pin 8,9,4,5;
    H_F_EH,H_S_EH,V_F_EH,V_S_EH     pin 10,11,6,7;
    H_ADV                           pin 13;
    HV_MF_Y                         pin 21;
    dH1,dH2,dV1,dV2,HV_EH           pin 15,14,17,16,18;

C,X,Z,H,L   =   .C. , .X. , .Z. , 1,0;

"SET DEFINITIONS

EQUATIONS
    HV_MF_Y   :=  !SPLIT & ( V_F_MF & H_F_MF
                          # !V_F_MF & H_F_MF & HV_MF_Y)

```
            # SPLIT &  H_V~ & ( V_F_MF & H_S_MF
                             # !V_F_MF & H_S_MF & HV_MF_Y)
            # SPLIT & !H_V~ & ( V_S_MF & H_F_MF
                             # !V_S_MF & H_F_MF & HV_MF_Y);

dH1     := !SPLIT &  H_F_EH
            #  SPLIT &  H_V~ & H_S_EH
            #  SPLIT & !H_V~ & H_F_EH;
    dH2     := dH1;
    dV1     := dH1 & !dH2
             & ( !SPLIT &  V_F_EH
                #  SPLIT &  H_V~ & V_F_EH
                #  SPLIT & !H_V~ & V_S_EH)
             # !(dH1 & !dH2) & dV1;
    dV2     := dH1 & !dH2 & dV1 # !(dH1 & !dH2) & dV2;
    HV_EH   := H_ADV & dV1 & dH2 # !H_ADV & dV2 & dH2;

END N20_L06_A

MODULE N20_L07_A  flag '-r3'
TITLE '15 bits pos/neg to 14 bits overflow control-2
NR20B
Sohei Takemoto    9/23/92'

"DESCRIPTION

"L07A: 9/23/92  L04A copied and modified

"This is one of two PALs to convert 15 bits of 2's complement data to
"  14-bit data.
"  10-bit MSP is taken care of L04A.  This one handles 4-bit LSP.
"  Assume that MSB is always right.
"  inputs are,
"     i14,i13 : 2-bit MSP of 15-bit pos/neg 2's complement data input.
"     i3..i0  : 4-bit LSP
"  outputs are,
"     o3..o0  : 4-bit LSP of 14-bit pos/neg 2's complement data.
"

"DECLARATIONS

N20_L07A              device   'P22V10';

clk                             pin 1;
    i0,i1,i2,i3,i13,i14             pin 7,8,9,10,11,13;
    o0,o1,o2,o3                     pin 17,16,15,14;
    o3,o2,o1,o0           ISTYPE   'pos,reg';
    C,X,Z,H,L      =     .C.,.X.,.Z.,1,0;

"SET DEFINITIONS input  = [i3..i0];
    output = [o3..o0];
    any4   = [X,X,X,X];

EQUATIONS
    o0 := !(i14 $ i13) & i0 # (i14 $ i13) & !i14;
    o1 := !(i14 $ i13) & i1 # (i14 $ i13) & !i14;
    o2 := !(i14 $ i13) & i2 # (i14 $ i13) & !i14;
    o3 := !(i14 $ i13) & i3 # (i14 $ i13) & !i14;
```

```
TEST_VECTORS
([clk,i14,i13,input] -> [output])
[0,X,X, any4 ] -> [any4 ];
[C,0,1, any4 ] -> [^hF ]; " pos OF
[C,0,0, ^h8  ] -> [^h8 ]; " pos in -> out
[C,0,0, ^h4  ] -> [^h4 ]; " pos in -> out
[C,0,0, ^h2  ] -> [^h2 ]; " pos in -> out
[C,0,0, ^h1  ] -> [^h1 ]; " pos in -> out
[C,0,0, ^h0  ] -> [^h0 ]; " pos in -> out
[C,1,1, ^h8  ] -> [^h8 ]; " neg in -> out
[C,1,1, ^h4  ] -> [^h4 ]; " neg in -> out
[C,1,1, ^h2  ] -> [^h2 ]; " neg in -> out
[C,1,1, ^h1  ] -> [^h1 ]; " neg in -> out
[C,1,1, ^h0  ] -> [^h0 ]; " neg in -> out
[C,1,0, any4 ] -> [^h0 ]; " neg OF

END N20_L07_A
```

MODULE N20_L08_A flag '-r3'
TITLE 'K-value LUTs selection: flush, freeze and split-screen control-2
NR20B
Sohei Takemoto    2/20/92, 2/28/92, 3/31/92, 9/23/92'

"DESCRIPTION
"L08A: 9/23/92 L10A copied and modified for Rev-B NR20
"L08A: 10/6/92 correction FREEZE <- FLUSH <- NORMAL "This is to control K-value LUTs selections.
" Freeze, flush, split-screen are realized through K-values.
" K-value for Y and C is chosen among four LUTs, 2-bit code,
"    0. normal K (Motion Trak output),
"    1. normal K,
"    2. flush: K=-1.0,
"    3. freeze: K=0.0.

" Normal K-value is used only within the active picture period.
"    Two kinds of pulses to specify active picture period both for V and H
"      are supplied. One covers full picture and the other covers part of
"      the picture for split-screen.
" Freeze works only on the active picture defined as above.
" Remaining area is always in flush mode.
" Note that freeze supersedes flush.

" Since H-active timings are about 1/2H off from Line timing, re-clocked
"    V timing dV1 is necessary.

" Inputs are,
"   1. clk    : 13.5MHz clock
"   2. H_FL   : H as H-active period for full picture
"   3. H_SS   : H as H-active period for V-split picture
"   4. V_FL   : H as V-active period for full picture
"   5. V_SS   : H as V-active period for H-split picture
"   6. FRZ    : H as freeze request
"   7. FLSH   : H as flush request
"   8. SPLIT  : H as split-screen on
"   9. SS_H   : H/L as Horizontal/Vertical split
"  10..Y_ON   : H as to enable Y recursive filter
"  11..C_ON   : H as to enable C recursive filter
"
" Outputs are,

```
"       Y_S0..1 : 2-bit Y LUTs selection code
"       C_S0..1 : 2-bit C LUTs selection code

"DECLARATIONS

N20_L08A        device   'P22V10';

clk,SPLIT,SS_H              pin 1,2,3;
    H_FL,H_SS,V_FL,V_SS         pin 4,5,6,7;
    Y_ON,C_ON                   pin 8,9;
    FRZ,FLSH                    pin 11,13;

C_S0,C_S1                   pin 23,22;
    Y_S0,Y_S1                   pin 21,20;
    dV1,dH1,dH2                 pin 19,15,14;

C,X,Z,H,L       =     .C.,.X.,.Z.,1,0;

EQUATIONS
    dH1    :=    !SPLIT & H_FL
              #  SPLIT & SS_H & H_SS
              #  SPLIT & !SS_H & H_FL;
    dH2    :=    dH1;
    dV1    :=    dH1 & !dH2 & ( !SPLIT & V_FL
                             #  SPLIT & SS_H & V_FL
                             #  SPLIT & !SS_H & V_SS)
              #  !(dH1 & !dH2) & dV1;
    C_S0   :=            FRZ & dH2 & dV1;        "freeze active
    C_S1   :=    !FLSH & !FRZ & !(dH2 & dV1)     "normal flush
              #  !FLSH & !FRZ & !C_ON            "no RF action
              #          FRZ & dH2 & dV1         "freeze active
              #          FRZ & !(dH2 & dV1)      "flush in freeze
              #   FLSH & !FRZ;                   "flush
    Y_S0   :=            FRZ & dH2 & dV1;        "freeze active
    Y_S1   :=    !FLSH & !FRZ & !(dH2 & dV1)     "normal flush
              #  !FLSH & !FRZ & !Y_ON            "no RF action
              #          FRZ & dH2 & dV1         "freeze active
              #          FRZ & !(dH2 & dV1);     "flush in freeze
              #   FLSH & !FRZ;                   "flush

END N20_L08_A

MODULE N20_L09_A flag '-r3'
TITLE 'Flush and freeze control
DIE125H
Sohei Takemoto   2/19/92, 3/7/92, 3/31/92, 9/23/92, 10/10/92, 10/12/92'

"DESCRIPTION

"NR2_L02B: 3/7/92  addition of AP_ON conditioning
"N20_L11A: 3/31/92
"L09A: 9/23/92 renamed and modified for NR20 Rev-B
"L09A: 10/5/92 addition of !AP_ON to FLSH_ON
"L09A: 10/6/92 correction to dFLSH1
"L09B: 10/10/92 change of edge-sensitive operation
"L09C: 10/13/92 add MF_BYPASS control
"L09A: 10/13/92 renamed
"L09A: 10/14/92 correction to FLSH_ON
```

```
"This is to control frame-store flush and freeze throuth the manipulation
" of K-value to be multiplied to (Feedback-Input).
"     let K=-1.0 to flush the memory: 100% Input->memory
"     let K= 0.0 to freeze the memory: 100% Feedback->memory
" Actual selection code to the K LUTs will be made by another PLD.
" This PLD only provides Flush/Freeze request through logical combination
"    and re-timing of internal and external controls.
" Disabling recursive filter is realized by continuous flush request.

" There are four groups of control inputs.
"  1. External freeze control
"       EXT_FRZ pulse
"       EXT_FRZEN
"       four mode selections accompanied are,
"         POS_EN  : H/L for High/Low active EXT_FRZEN
"         POS_FRZ : H/L for High(Pos)/Low(Neg) active EXT_FRZ
"         LVL_SENS: H/L for Level/Edge sensitivity for EXT_FRZ
"         PR_MODE : H/L for CIS/Nomal pin-register mode
"                    (CIS mode needs flush after freeze)
"  2. Internal freeze control
"       INT_FRZ  : H (level) for active freeze
"  3. Action enable
"       AP_ON    : H for action enable for external freeze control
"                  L for no NR, equivalent to FLSH_ON
" Other inputs are
"    clk    : 13.5MHz clock
"    LN_1P  : 1-clock wide (H) once-per-line pulse
"    FRM_1H : 1-H wide (H) once-per-frame pulse
"             FRM_1H & LN_1P gives proper moment in a TV-frame
"    MF_BYPASS: H for median filter bypassed
" Outputs are,
"    FRZ_ON : H : freeze request
"       Internal freeze takes effect from the next frame from INT_FRZ
"       If MF_BYPASS=L,
"       External freeze takes effect from the second next frame
"          Level-sensitive freeze responds to EXT_FRZ
"          Edge-sensitive freeze responds to EXT_FRZEN
"            EXT_FRZ momentarily thaw for 1 frame period in the second
"              next frame from EXT_FRZ edge
"            EXT_FRZ is sampled at line rate
"            EXT_FRZ pulse minimum cycle is 1 frame
"       If MF_BYPASS=H,
"          External freeze takes effect from the next frame
"       Internal and external freeze are ORed
"    FLSH_ON : H : flush request
"       Level-sensitive freeze may be followed with flush when PR_MODE=H
"       Flush takes effect in the next frame from the end of freeze "Priority order is taken care of the companion PLD.
"    freeze <- flush <- normal

"DECLARATIONS

N20_L09A    device    'P22V10';

clk,LN_1P,FRM_1H              pin 1,2,3;
    AP_ON,INT_FRZ                 pin 4,5;
    POS_EN,POS_FRZ,LVL_SENS       pin 6,7,8;
```

```
        EXT_FRZ,EXT_FRZEN,PR_MODE       pin 9,10,11;
        MF_BYPASS                        pin 13;
        FRZ_ON,FLSH_ON                   pin 17,21;
        eFRZ1,eFRZ2,tFRZ,dFRZ            pin 14,15,16,18;
        dFLSH1,dFLSH2                    pin 23,22;

C,X,Z,H,L     =    .C.,.X.,.Z.,1,0;

EQUATIONS
        eFRZ1   :=  !LVL_SENS & AP_ON
                & (EXT_FRZEN & POS_EN # !EXT_FRZEN & !POS_EN)
                & (EXT_FRZ & POS_FRZ # !EXT_FRZ & !POS_FRZ)
                & LN_1P
              # !LVL_SENS & eFRZ1 & !LN_1P;
        eFRZ2   := eFRZ1 & LN_1P # eFRZ2 & !LN_1P;
        tFRZ    := (eFRZ1 & !eFRZ2 # tFRZ) & !(FRM_1H & LN_1P);
        dFRZ    := !LVL_SENS & tFRZ & FRM_1H & LN_1P
              # LVL_SENS & AP_ON
                & (EXT_FRZEN & POS_EN # !EXT_FRZEN & !POS_EN)
                & (EXT_FRZ & POS_FRZ # !EXT_FRZ & !POS_FRZ)
                & FRM_1H & LN_1P
              # !(FRM_1H & LN_1P) & dFRZ;
        FRZ_ON  := FRM_1H & LN_1P & INT_FRZ           "internal freeze
              # (!MF_BYPASS & AP_ON & FRM_1H & LN_1P  "!MF_BYPASS
                & (LVL_SENS & dFRZ                    "external (level) freeze
                # !LVL_SENS & !dFRZ                   "external (edge) frreze
                  & (EXT_FRZEN & POS_EN # !EXT_FRZEN & !POS_EN)))
              # (MF_BYPASS & AP_ON & FRM_1H & LN_1P   "MF_BYPASS
                & (LVL_SENS                           "external (level) freeze
                  & (EXT_FRZEN & POS_EN # !EXT_FRZEN & !POS_EN)
                  & (EXT_FRZ & POS_FRZ # !EXT_FRZ & !POS_FRZ)
                # !LVL_SENS & !tFRZ                   "external (edge) frreze
                  & (EXT_FRZEN & POS_EN # !EXT_FRZEN & !POS_EN)))
              # !(FRM_1H & LN_1P) & FRZ_ON;
        dFLSH1  := AP_ON & LVL_SENS & PR_MODE & FRZ_ON & FRM_1H & LN_1P
              # !(FRM_1H & LN_1P) & dFLSH1;
        dFLSH2  := dFLSH1 & FRM_1H & LN_1P # !(FRM_1H & LN_1P) & dFLSH2;
        FLSH_ON := !AP_ON                             "no NR
              # AP_ON & LVL_SENS & PR_MODE            "flush for CIS mode
                & !FRZ_ON & dFLSH1;

END N20_L09_A

MODULE N20_L10_A flag '-r3'
    TITLE 'Frame delay write and read control
    DIE125M
    Sohei Takemoto    7/14/92, 9/23/92'

"DESCRIPTION

"N10_L03A: 7/14/92 copied from N20_L20A
"L10A: 9/23/92 renamed

"This PAL generates write and read control pulses for the frame delay memory.
" FID and HID timing come from delayed V and H counters.
" HID pulse-width is 1-clock period.
" Memory TMS4C1050 requires minimum 15 nsec of holdtime, thus read control
"   pulses are generated in combinatrial mode. (Address reset is positive
"   edge triggered).
```

```
" Right after FID pulse transition (both pos and neg), 12T pixel counter
" counts clock pulses.
" Write and read address reset, RSTW and RSTR, and write and read enable
"    gates, W1, W2 and R1 and R2, are generated appropriately.
" Input to output delay is exactly one-frame minus one-line period.

" Inputs are,
"    1. clk: 13.5MHz,
"    2. FID: field ID, L/H for field 1/2
"    3. HID: H : 1 clock period
" Outputs are,
"    1. RSTW : H : write address counters reset pulse,
"    2. W1   : H : write enable gate for field1 store
"    3. W2   : H : write enable gate for field2 store
"    4. RSTR : H : read address counters reset pulse,
"    5. R1   : H : read enable gate for field1 store
"    6. R2   : H : read enable gate for field2 store
"
"The sequence of events is as follows.
"1) If in idleL, detect L->H transition of FID, idleL to count0.
"   If in idleH, detect H->L transition of FID, idleH to count0.
"2) Count clock for 13H periods.
"3) If FID=H, goto idleH.
"   If FID=L, goto idleL.
"
"

"DECLARATIONS

N20_L10A           device    'P22V10';

clk,FID,HID                  pin 1,10,9;
    RSTW,W1,W2,RSTR,R1,R2        pin 14,15,16,23,22,21;
    s3,s2,s1,s0                  pin 20,19,18,17;

s3,s2,s1,s0        ISTYPE    'neg, reg';

C,X,Z,H,L    =    .C. , .X. , .Z. , 1,0;

"SET DEFINITIONS states     =    [s3,s2,s1,s0];
      idleL    =    [1,1,1,0];     "wait for L->H of FID
      idleH    =    [1,1,0,1];     "wait for H->L of FID
      count0   =    [1,1,0,0];
      count1   =    [1,0,0,0];
      count2   =    [1,0,0,1];
      count3   =    [1,0,1,1];
      count4   =    [1,0,1,0];
      count5   =    [0,0,1,0];
      count6   =    [0,0,1,1];
      count7   =    [0,0,0,1];
      count8   =    [0,0,0,0];
      count9   =    [0,1,0,0];
      countA   =    [0,1,0,1];
      countB   =    [0,1,1,1];
      countC   =    [0,1,1,0];
      countEnd =    [1,1,1,1];
```

```
EQUATIONS
    RSTR    =   (states == count0);
    R1      =   !FID & ((states == countA) # (states == countB)
                        # (states == countC) # (states == countEnd))
                # (states == idleL);
    R2      =   FID & ((states == countA) # (states == countB)
                        # (states == countC) # (states == countEnd))
                # (states == idleH);
    RSTW    :=  (states == count1);
    W1      :=  !FID & ((states == countB) # (states == countC)
                        # (states == countEnd))
                # (states == idleL)
                # FID & (states == count0);
    W2      :=  FID & ((states == countB) # (states == countC)
                        # (states == countEnd))
                # (states == idleH)
                # !FID & (states == count0);

STATE_DIAGRAM    states
    STATE   idleL  : IF (FID & HID) THEN count0 ELSE idleL;
    STATE   idleH  : IF (!FID & HID) THEN count0 ELSE idleH;
    STATE   count0 : IF HID THEN count1 ELSE count0;
    STATE   count1 : IF HID THEN count2 ELSE count1;
    STATE   count2 : IF HID THEN count3 ELSE count2;
    STATE   count3 : IF HID THEN count4 ELSE count3;
    STATE   count4 : IF HID THEN count5 ELSE count4;
    STATE   count5 : IF HID THEN count6 ELSE count5;
    STATE   count6 : IF HID THEN count7 ELSE count6;
    STATE   count7 : IF HID THEN count8 ELSE count7;
    STATE   count8 : IF HID THEN count9 ELSE count8;
    STATE   count9 : IF HID THEN countA ELSE count9;
    STATE   countA : IF HID THEN countB ELSE countA;
    STATE   countB : IF HID THEN countC ELSE countB;
    STATE   countC : IF HID THEN countEnd ELSE countC;

STATE   countEnd: CASE HID & !FID : idleL;
                          HID & FID  : idleH;
                          !HID       : countEnd;
                      ENDCASE;

TEST_VECTORS
([clk,FID,HID] -> [states,R1,R2,RSTR,W1,W2,RSTW])
[0,X,X] -> [countEnd,X,X,0,0,0,0];
[C,0,0] -> [countEnd,1,0,0,1,0,0];
[C,0,0] -> [countEnd,1,0,0,1,0,0];
[C,1,0] -> [countEnd,0,1,0,0,1,0];
[C,1,0] -> [countEnd,0,1,0,0,1,0];
[C,0,0] -> [countEnd,1,0,0,1,0,0];
[C,0,1] -> [idleL   ,1,0,0,1,0,0];
[C,0,X] -> [idleL   ,1,0,0,1,0,0];
[C,1,0] -> [idleL   ,1,0,0,1,0,0];
[C,1,1] -> [count0  ,0,0,1,1,0,0];
[C,1,0] -> [count0  ,0,0,1,1,0,0];
[C,1,1] -> [count1  ,0,0,0,1,0,0];
[C,1,0] -> [count1  ,0,0,0,0,0,1];
[C,1,1] -> [count2  ,0,0,0,0,0,1];
[C,1,0] -> [count2  ,0,0,0,0,0,0];
[C,1,1] -> [count3  ,0,0,0,0,0,0];
[C,1,0] -> [count3  ,0,0,0,0,0,0];
```

```
[C,1,1] -> [count4   ,0,0,0,0,0,0];
[C,1,0] -> [count4   ,0,0,0,0,0,0];
[C,1,1] -> [count5   ,0,0,0,0,0,0];
[C,1,0] -> [count5   ,0,0,0,0,0,0];
[C,1,1] -> [count6   ,0,0,0,0,0,0];
[C,1,0] -> [count6   ,0,0,0,0,0,0];
[C,1,1] -> [count7   ,0,0,0,0,0,0];
[C,1,0] -> [count7   ,0,0,0,0,0,0];
[C,1,1] -> [count8   ,0,0,0,0,0,0];
[C,1,0] -> [count8   ,0,0,0,0,0,0];
[C,1,1] -> [count9   ,0,0,0,0,0,0];
[C,1,0] -> [count9   ,0,0,0,0,0,0];
[C,1,1] -> [countA   ,0,1,0,0,0,0];
[C,1,0] -> [countA   ,0,1,0,0,0,0];
[C,1,1] -> [countB   ,0,1,0,0,0,0];
[C,1,0] -> [countB   ,0,1,0,0,1,0];
[C,1,1] -> [countC   ,0,1,0,0,1,0];
[C,1,0] -> [countC   ,0,1,0,0,1,0];
[C,1,1] -> [countEnd,0,1,0,0,1,0];
[C,1,0] -> [countEnd,0,1,0,0,1,0];
[C,1,1] -> [idleH    ,0,1,0,0,1,0];
[C,1,X] -> [idleH    ,0,1,0,0,1,0];
[C,1,X] -> [idleH    ,0,1,0,0,1,0];
[C,0,0] -> [idleH    ,0,1,0,0,1,0];
[C,0,1] -> [count0   ,0,0,1,0,1,0];
[C,0,0] -> [count0   ,0,0,1,0,1,0];
[C,0,1] -> [count1   ,0,0,0,0,1,0];
[C,0,0] -> [count1   ,0,0,0,0,0,1];
[C,0,1] -> [count2   ,0,0,0,0,0,1];
[C,0,0] -> [count2   ,0,0,0,0,0,0];
[C,0,1] -> [count3   ,0,0,0,0,0,0];
[C,0,0] -> [count3   ,0,0,0,0,0,0];
[C,0,1] -> [count4   ,0,0,0,0,0,0];
[C,0,0] -> [count4   ,0,0,0,0,0,0];
[C,0,1] -> [count5   ,0,0,0,0,0,0];
[C,0,0] -> [count5   ,0,0,0,0,0,0];
[C,0,1] -> [count6   ,0,0,0,0,0,0];
[C,0,0] -> [count6   ,0,0,0,0,0,0];
[C,0,1] -> [count7   ,0,0,0,0,0,0];
[C,0,0] -> [count7   ,0,0,0,0,0,0];
[C,0,1] -> [count8   ,0,0,0,0,0,0];
[C,0,0] -> [count8   ,0,0,0,0,0,0];
[C,0,1] -> [count9   ,0,0,0,0,0,0];
[C,0,0] -> [count9   ,0,0,0,0,0,0];
[C,0,1] -> [countA   ,1,0,0,0,0,0];
[C,0,0] -> [countA   ,1,0,0,0,0,0];
[C,0,1] -> [countB   ,1,0,0,0,0,0];
[C,0,0] -> [countB   ,1,0,0,1,0,0];
[C,0,1] -> [countC   ,1,0,0,1,0,0];
[C,0,0] -> [countC   ,1,0,0,1,0,0];
[C,0,1] -> [countEnd,1,0,0,1,0,0];
[C,0,0] -> [countEnd,1,0,0,1,0,0];
[C,0,1] -> [idleL    ,1,0,0,1,0,0];
[C,0,X] -> [idleL    ,1,0,0,1,0,0];

END N20_L10_A
```

```
MODULE N20_L11_A flag '-r3'
TITLE 'Frame store read control
DIE125M
Sohei Takemoto    2/28/92, 3/31/92, 8/20/92, 9/23/92'

"DESCRIPTION

"copied from KY3_L36A
"L12A: 3/31/92
"L12B: 8/20/92  dH2R added
"L11A: 9/23/92  renamed "This PAL generates read control pulses for the frame delay memory.
"   HID pulse-width is 1-clock period.
"   Memory TMS4C1050 requires minimum 15 nsec of holdtime, thus read control
"    pulses are generated in combinatrial mode.
"
"   Right after FID pulse transition (both pos and neg), 10H line counter
"   counts HID pulses.
"   Write address reset, RSTR, and read enable gates, R1 and R2, are generated.
"   For the first ten lines, read is disabled.
"   On the 11-th line, first active sample is read out from the first address.

"   1.5H FIFO read reset is also generated.
"    H2R is for 1.5H, dH2R is for 1.5H+1T
"    Write reset is common to 2.5H/3.5H FIFO and generated by Framestore
"      write reset controller N20_L12A.ABL.

"   Inputs are,
"    1. clk: 13.5MHz,
"    2. FID: field ID, L/H for field 1/2
"    3. HID: H : 1 clock period
"    4. H_R_RST2: Read reset timing for 1.5H FIFO
"   Outputs are,
"    1? RSTR : H : read address counter reset pulse,
"    2. R1   : H : read enable gate for field1 store
"    3. R2   : H : read enable gate for field2 store
"    4. H2R  : L : 1.5H FIFO read reset
"    5. dH2R : L : 1.5H+1T FIFO read reset
"
"The sequence of events is as follows.
"1) If in idleL, detect L->H transition of FID, idleL to count0.
"   If in idleH, detect H->L transition of FID, idleH to count0.
"2) Count HID for 11H period.
"3) If FID=H, goto idleH.
"   If FID=L, goto idleL.

"DECLARATIONS

N20_L11A         device    'P22V10';

clk,FID,HID,H_R_RST2        pin 1,10,9,8;
    RSTR,R1,R2                  pin 14,23,22;
    s4,s3,s2,s1,s0              pin 21,20,19,18,17;
    H2R,dH2R                    pin 16,15;

s4,s3,s2,s1,s0   ISTYPE  'neg, reg';

C,X,Z,H,L   =    .C. , .X. , .Z. , 1,0;
```

"SET DEFINITIONS

```
    states    =   [s4,s3,s2,s1,s0];
      idleL   =   [1,1,1,1,0];     "wait for L->H of FID
      idleH   =   [1,1,1,0,1];     "wait for H->L of FID
      count0  =   [1,1,1,0,0];     "wait for HID=H
      count1  =   [1,1,0,0,0];     "wait for HID=H
      count2  =   [1,1,0,0,1];     "wait for HID=H
      count3  =   [1,1,0,1,1];     "wait for HID=H
      count4  =   [1,1,0,1,0];     "wait for HID=H
      count5  =   [1,0,0,1,0];     "wait for HID=H
      count6  =   [1,0,0,1,1];     "wait for HID=H
      count7  =   [1,0,0,0,1];     "wait for HID=H
      count8  =   [1,0,0,0,0];     "wait for HID=H
      count9  =   [1,0,1,0,0];     "wait for HID=H
      count10 =   [1,0,1,0,1];     "wait for HID=H
      count11 =   [1,0,1,1,1];     "wait for HID=H
      count12 =   [1,0,1,1,0];     "wait.for HID=H
      count13 =   [0,0,1,1,0];     "wait for HID=H
      count14 =   [0,0,1,1,1];     "wait for HID=H
      count15 =   [0,0,1,0,1];     "wait for HID=H
      count16 =   [0,0,1,0,0];     "wait for HID=H
      count17 =   [0,0,0,0,0];     "wait for HID=H
      count18 =   [0,0,0,0,1];     "wait for HID=H
      count19 =   [0,0,0,1,1];     "wait for HID=H
      count20 =   [0,0,0,1,0];     "wait for HID=H
      count21 =   [0,1,0,1,0];     "wait for HID=H
      count22 =   [0,1,0,1,1];     "wait for HID=H
      count23 =   [0,1,0,0,1];     "wait for HID=H
      count24 =   [0,1,0,0,0];     "wait for HID=H
      count25 =   [0,1,1,0,0];     "wait for EID=H
      countEnd1 = [0,1,1,0,1];
      countEnd2 = [0,1,1,1,1];
      countEnd3 = [1,1,1,1,1];     "wait for HID=H EQUATIONS
    RSTR     =  (states == countEnd2);
    R1       =  !FID
                & ((states == countEnd2)
                 # (states == countEnd3)
                 # (states == idleL)
                 # (states == idleH));
    R2       =  FID
                & ((states == countEnd2)
                 # (states == countEnd3)
                 # (states == idleL)
                 # (states ==.idleH));

!H2R     := H_R_RST2 & (states == count2);
    dH2R     := H2R;

STATE_DIAGRAM   states
    STATE idleL  : IF  FID & HID THEN count0 ELSE idleL;
    STATE idleH  : IF !FID & HID THEN count0 ELSE idleH;
    STATE count0 : IF  HID THEN count1 ELSE count0 ;
    STATE count1 : IF  HID THEN count2 ELSE count1 ;
    STATE count2 : IF  HID THEN count3 ELSE count2 ;
    STATE count3 : IF  HID THEN count4 ELSE count3 ;
```

```
STATE  count4 : IF  HID THEN count5     ELSE count4 ;
STATE  count5 : IF  HID THEN count6     ELSE count5 ;
STATE  count6 : IF  HID THEN count7     ELSE count6 ;
STATE  count7 : IF  HID THEN count8     ELSE count7 ;
STATE  count8 : IF  HID THEN count9     ELSE count8 ;
STATE  count9 : IF  HID THEN countEnd1  ELSE count9 ;

STATE  count10: IF  HID THEN count11    ELSE count10;
STATE  count11: IF  HID THEN count12    ELSE count11;
STATE  count12: IF  HID THEN count13    ELSE count12;
STATE  count13: IF  HID THEN count14    ELSE count13;
STATE  count14: IF  HID THEN count15    ELSE count14;
STATE  count15: IF  HID THEN count16    ELSE count15;
STATE  count16: IF  HID THEN count17    ELSE count16;
STATE  count17: IF  HID THEN count18    ELSE count17;
STATE  count18: IF  HID THEN count19    ELSE count18;
STATE  count19: IF  HID THEN count20    ELSE count19;
STATE  count20: IF  HID THEN count21    ELSE count20;
STATE  count21: IF  HID THEN count22    ELSE count21;
STATE  count22: IF  HID THEN count23    ELSE count22;
STATE  count23: IF  HID THEN count24    ELSE count23;
STATE  count24: IF  HID THEN countEnd1  ELSE count24;

STATE  countEnd1: GOTO countEnd2;
STATE  countEnd2: GOTO countEnd3;

STATE  countEnd3: CASE HID & !FID : idleL;
                       HID & FID  : idleH;
                       !HID       : countEnd3;
                  ENDCASE;

TEST_VECTORS
([clk,FID,HID] -> [states,R1,R2,RSTR])
[0,X,X] -> [countEnd3,X,X,0];
[C,0,0] -> [countEnd3,1,0,0];
[C,0,0] -> [countEnd3,1,0,0];
[C,0,0] -> [countEnd3,1,0,0];
[C,1,0] -> [countEnd3,0,1,0];
[C,1,0] -> [countEnd3,0,1,0];
[C,1,0] -> [countEnd3,0,1,0];
[C,0,0] -> [countEnd3,1,0,0];
[C,0,1] -> [idleL    ,1,0,0];
[C,0,X] -> [idleL    ,1,0,0];
[C,0,X] -> [idleL    ,1,0,0];
[C,0,X] -> [idleL    ,1,0,0];
[C,0,1] -> [idleL    ,1,0,0];
[C,1,1] -> [count0   ,0,0,0];
[C,1,0] -> [count0   ,0,0,0];
[C,1,0] -> [count0   ,0,0,0];
[C,1,1] -> [count1   ,0,0,0];
[C,1,0] -> [count1   ,0,0,0];
[C,1,1] -> [count2   ,0,0,0];
[C,1,0] -> [count2   ,0,0,0];
[C,1,1] -> [count3   ,0,0,0];
[C,1,0] -> [count3   ,0,0,0];
[C,1,1] -> [count4   ,0,0,0];
[C,1,0] -> [count4   ,0,0,0];
[C,1,1] -> [count5   ,0,0,0];
[C,1,0] -> [count5   ,0,0,0];
```

```
[C,1,1] -> [count6   ,0,0,0];
[C,1,0] -> [count6   ,0,0,0];
[C,1,1] -> [count7   ,0,0,0];
[C,1,0] -> [count7   ,0,0,0];
[C,1,1] -> [count8   ,0,0,0];
[C,1,0] -> [count8   ,0,0,0];
[C,1,1] -> [count9   ,0,0,0];
[C,1,0] -> [count9   ,0,0,0];
[C,1,1] -> [countEnd1,0,0,0];
[C,1,0] -> [countEnd2,0,1,1];
[C,1,0] -> [countEnd3,0,1,0];
[C,1,0] -> [countEnd3,0,1,0];
[C,1,0] -> [countEnd3,0,1,0];
[C,1,0] -> [countEnd3,0,1,0];
[C,0,0] -> [countEnd3,1,0,0];
[C,0,0] -> [countEnd3,1,0,0];
[C,0,0] -> [countEnd3,1,0,0];
[C,1,0] -> [countEnd3,0,1,0];
[C,1,0] -> [countEnd3,0,1,0];
[C,1,1] -> [idleH    ,0,1,0];
[C,1,X] -> [idleH    ,0,1,0];
[C,1,X] -> [idleH    ,0,1,0];
[C,1,X] -> [idleH    ,0,1,0];
[C,0,0] -> [idleH    ,1,0,0];
[C,0,1] -> [count0   ,0,0,0];
[C,0,0] -> [count0   ,0,0,0];
[C,0,1] -> [count1   ,0,0,0];
[C,0,0] -> [count1   ,0,0,0];

END N20_L11_A

MODULE N20_L12_A flag '-r3'
TITLE 'Frame store write control
DIE125M
Sohei Takemoto    2/27/92, 3/31/92, 9/23/92'

"DESCRIPTION

"Copied from KY3_L35B: 8/21/91    FID ANDed with HID
"N20_L13A: 3/31/92
"L12A: 9/23/92 renamed "This PAL generates control pulses for the frame memory.
"  HID in this case has the pulse width of only 1-clock.
"    FID and HID are sharerd with read control.
"      Read timing is exactly 4H/5H ahead of write timing to get 0H/1H
"      advanced picture at the final output.
"    Depending the 0H/1H selection, write control makes pulses which are
"      4H/5H later than those of read control.

"  Right after FID pulse transition (both pos and neg), 26H line counter
"  counts HID pulses.
"    If H_ADV=L second stage is skipped.
"  Write address reset, RSTW, and write enable gates, W1 and W2, are generated.
"  As for the read action which makes 1Frame-(4H/5H) data delay,
"    for the first ten lines, memory read is disabled,
"    on the 11-th line, first active sample is read out from the first address.
"  For the write action which follows read action by 4H/5H of lag,
"    for the ten lines starting from fifth line, write is disabled,
"    on the 15th line, first active sample is written into the first address.
```

```
" The line counter is also used to generate 2.5H/3.5H FIFO W and R reset.
"  HID to H_R_RST specifies proper value of about 0.5H.
"
" Inputs are,
"  1. clk: 13.5MHz,
"  2. FID: field ID, L/H for field 1/2
"  3. HID: H for 1-clock period (about the start of active line)
"  4. H_ADV: H for memory length 1H short
"  5. H_R_RST
" Outputs are,
"  1. RSTW : H : write address counter reset pulse,
"  2. W1   : H : write enable gate for field1 store
"  3. W2   : H : write enable gate for field2 store
"  4. H3W  : L : 2.5H/3.5H FIFO write reset
"  5. H3R  : L : 2.5H/3.5H FIFO read reset
"
"The sequence of events is as follows.
"1) If in idleL, detect L->H transition of FID, idleL to count0.
"   If in idleH, detect H->L transition of FID, idleH to count0.
"2) Count HID for 26H period.
"3) If FID=H, goto idleH.
"   If FID=L, goto idleL.
"
"

"DECLARATIONS"

N20_L12A    device    'P22V10';
    clk,FID,HID,H_R_RST,H_ADV      pin 1,10,9,8,7;
    RSTW,W1,W2                     pin 14,23,22;
    s4,s3,s2,s1,s0                 pin 21,20,19,18,17;
    H3W,H3R                        pin 16,15;

s4,s3,s2,s1,s0     ISTYPE  'neg, reg';
    W1,W2              ISTYPE  'pos, reg';

C,X,Z,H,L    =   .C. , .X. , .Z. , 1,0;

"SET DEFINITIONS states     =   [s4,s3,s2,s1,s0];
      idleL    =   [1,1,1,1,0];    "wait for L->H of FID
      idleH    =   [1,1,1,0,1];    "wait for H->L of FID
      count0   =   [1,1,1,0,0];    "wait for HID=H
      count1d  =   [1,1,0,0,0];    "wait for HID=H
      count1   =   [1,1,0,0,1];    "wait for HID=H
      count2   =   [1,1,0,1,1];    "wait for HID=H
      count3   =   [1,1,0,1,0];    "wait for HID=H
      count4   =   [1,0,0,1,0];    "wait for HID=H
      count5   =   [1,0,0,1,1];    "wait for HID=H
      count6   =   [1,0,0,0,1];    "wait for HID=H
      count7   =   [1,0,0,0,0];    "wait for HID=H
      count8   =   [1,0,1,0,0];    "wait for HID=H
      count9   =   [1,0,1,0,1];    "wait for HID=H
      count10  =   [1,0,1,1,1];    "wait for HID=H
      count11  =   [1,0,1,1,0];    "wait for HID=H
      count12  =   [0,0,1,1,0];    "wait for HID=H
      count13  =   [0,0,1,1,1];    "wait for HID=H
      count14  =   [0,0,1,0,1];    "wait for HID=H
```

```
         count15    =   [0,0,1,0,0];      "wait for HID=H
         count16    =   [0,0,0,0,0];      "wait for HID=H
         count17    =   [0,0,0,0,1];      "wait for HID=H
         count18    =   [0,0,0,1,1];      "wait for HID=H
         count19    =   [0,0,0,1,0];      "wait for HID=H
         count20    =   [0,1,0,1,0];      "wait for HID=H
         count21    =   [0,1,0,1,1];      "wait for HID=H
         count22    =   [0,1,0,0,1];      "wait for HID=H
         count23    =   [0,1,0,0,0];      "wait for HID=H
         count24    =   [0,1,1,0,0];      "wait for HID=H
         countEnd1  =   [0,1,1,0,1];
         countEnd2  =   [0,1,1,1,1];
         countEnd3  =   [1,1,1,1,1];      "wait for HID=H EQUATIONS
     RSTW   :=   HID & (states == count13);          "start of 15th
     W1     :=   !FID & HID & (states == count13)    "start of 15th
                 # !(states == count4) & W1;         "start of 5th
     W2     :=   FID & HID & (states == count13)
                 # !(states == count4) & W2;
    !H3W    :=   (states == count0) & HID;
    !H3R    :=   (states == count3) & H_R_RST;

STATE_DIAGRAM    states
     STATE idleL  : IF  FID & HID THEN count0 ELSE idleL;
     STATE idleH  : IF !FID & HID THEN count0 ELSE idleH;
     STATE count0 : CASE HID &  H_ADV : count1d;
                         HID & !H_ADV : count1;

!HID : count0;
              ENDCASE;
     STATE count1d: IF  HID THEN count1  ELSE count1d;
     STATE count1 : IF  HID THEN count2  ELSE count1 ;
     STATE count2 : IF  HID THEN count3  ELSE count2 ;
     STATE count3 : IF  HID THEN count4  ELSE count3 ;
     STATE count4 : IF  HID THEN count5  ELSE count4 ;
     STATE count5 : IF  HID THEN count6  ELSE count5 ;
     STATE count6 : IF  HID THEN count7  ELSE count6 ;
     STATE count7 : IF  HID THEN count8  ELSE count7 ;
     STATE count8 : IF  HID THEN count9  ELSE count8 ;
     STATE count9 : IF  HID THEN count10 ELSE count9 ;
     STATE count10: IF  HID THEN count11 ELSE count10;
     STATE count11: IF  HID THEN count12 ELSE count11;
     STATE count12: IF  HID THEN count13 ELSE count12;
     STATE count13: IF  HID THEN count14 ELSE count13;
     STATE count14: IF  HID THEN count15 ELSE count14;
     STATE count15: IF  HID THEN count16 ELSE count15;
     STATE count16: IF  HID THEN count17 ELSE count16;
     STATE count17: IF  HID THEN count18 ELSE count17;
     STATE count18: IF  HID THEN count19 ELSE count18;
     STATE count19: IF  HID THEN count20 ELSE count19;
     STATE count20: IF  HID THEN countEnd1 ELSE count20;

STATE count21: IF  HID THEN count22 ELSE count21;
     STATE count22: IF  HID THEN count23 ELSE count22;
     STATE count23: IF  HID THEN count24 ELSE count23;
     STATE count24: IF  HID THEN countEnd1 ELSE count24;

STATE countEnd1: GOTO countEnd2;
     STATE countEnd2: GOTO countEnd3;
```

```
STATE countEnd3: CASE HID & !FID : idleL;
                      HID & FID : idleH;
                      !HID : countEnd3;
                ENDCASE;

TEST_VECTORS
([clk,FID,HID,H_ADV] -> [states,W1,W2,RSTW])
[0,X,X,X] -> [countEnd3,0,0,0];
[C,0,0,X] -> [countEnd3,0,0,0];
[C,0,0,X] -> [countEnd3,0,0,0];
[C,0,0,X] -> [countEnd3,0,0,0];
[C,0,0,X] -> [countEnd3,0,0,0];
[C,1,0,X] -> [countEnd3,0,0,0];
[C,1,0,X] -> [countEnd3,0,0,0];
[C,0,0,X] -> [countEnd3,0,0,0];
[C,0,1,X] -> [idleL    ,0,0,0];
[C,0,X,X] -> [idleL    ,0,0,0];
[C,0,X,X] -> [idleL    ,0,0,0];
[C,0,X,X] -> [idleL    ,0,0,0];
[C,1,0,X] -> [idleL    ,0,0,0];
[C,1,1,0] -> [count0   ,0,0,0];
[C,1,0,0] -> [count0   ,0,0,0];
[C,1,1,0] -> [count1   ,0,0,0];
[C,1,0,0] -> [count1   ,0,0,0];
[C,1,1,X] -> [count2   ,0,0,0];
[C,1,0,X] -> [count2   ,0,0,0];
[C,1,1,X] -> [count3   ,0,0,0];
[C,1,0,X] -> [count3   ,0,0,0];
[C,1,1,X] -> [count4   ,0,0,0];
[C,1,0,X] -> [count4   ,0,0,0];
[C,1,1,X] -> [count5   ,0,0,0];
[C,1,0,X] -> [count5   ,0,0,0];
[C,1,1,X] -> [count6   ,0,0,0];
[C,1,0,X] -> [count6   ,0,0,0];
[C,1,1,X] -> [count7   ,0,0,0];
[C,1,0,X] -> [count7   ,0,0,0];
[C,1,1,X] -> [count8   ,0,0,0];
[C,1,0,X] -> [count8   ,0,0,0];
[C,1,1,X] -> [count9   ,0,0,0];
[C,1,0,X] -> [count9   ,0,0,0];
[C,1,1,X] -> [count10  ,0,0,0];
[C,1,0,X] -> [count10  ,0,0,0];
[C,1,1,X] -> [count11  ,0,0,0];
[C,1,0,X] -> [count11  ,0,0,0];
[C,1,1,X] -> [count12  ,0,0,0];
[C,1,0,X] -> [count12  ,0,0,0];
[C,1,1,X] -> [count13  ,0,0,0];
[C,1,0,X] -> [count13  ,0,0,0];
[C,1,1,X] -> [count14  ,0,1,1];
[C,1,0,X] -> [count14  ,0,1,0];
[C,1,1,X] -> [count15  ,0,1,0];
[C,1,0,X] -> [count15  ,0,1,0];
[C,1,1,X] -> [count16  ,0,1,0];
[C,1,0,X] -> [count16  ,0,1,0];
[C,1,1,X] -> [count17  ,0,1,0];
[C,1,0,X] -> [count17  ,0,1,0];
[C,1,1,X] -> [count18  ,0,1,0];
[C,1,0,X] -> [count18  ,0,1,0];
[C,1,1,X] -> [count19  ,0,1,0];
```

```
[C,1,0,X] -> [count19  ,0,1,0];
[C,1,1,X] -> [count20  ,0,1,0];
[C,1,0,X] -> [count20  ,0,1,0];
[C,1,1,X] -> [countEnd1,0,1,0];
[C,1,X,X] -> [countEnd2,0,1,0];
[C,1,X,X] -> [countEnd3,0,1,0];
[C,1,X,X] -> [countEnd3,0,1,0];
[C,1,X,X] -> [countEnd3,0,1,0];
[C,1,0,X] -> [countEnd3,0,1,0];
[C,1,1,X] -> [idleH    ,0,1,0];
[C,1,X,X] -> [idleH    ,0,1,0];
[C,1,X,X] -> [idleH    ,0,1,0];
[C,1,X,X] -> [idleH    ,0,1,0];
[C,0,0,X] -> [idleH    ,0,1,0];
[C,0,1,1] -> [count0   ,0,1,0];
[C,0,0,1] -> [count0   ,0,1,0];
[C,0,1,1] -> [count1d  ,0,1,0];
[C,0,0,1] -> [count1d  ,0,1,0];
[C,0,1,1] -> [count1   ,0,1,0];
[C,0,0,1] -> [count1   ,0,1,0];
[C,0,1,1] -> [count2   ,0,1,0];
[C,0,0,1] -> [count2   ,0,1,0];
[C,0,1,X] -> [count3   ,0,1,0];
[C,0,0,X] -> [count3   ,0,1,0];
[C,0,1,X] -> [count4   ,0,1,0];
[C,0,0,X] -> [count4   ,0,0,0];
[C,0,1,X] -> [count5   ,0,0,0];
[C,0,0,X] -> [count5   ,0,0,0];
[C,0,1,X] -> [count6   ,0,0,0];
[C,0,0,X] -> [count6   ,0,0,0];
[C,0,1,X] -> [count7   ,0,0,0];
[C,0,0,X] -> [count7   ,0,0,0];
[C,0,1,X] -> [count8   ,0,0,0];
[C,0,0,X] -> [count8   ,0,0,0];
[C,0,1,X] -> [count9   ,0,0,0];
[C,0,0,X] -> [count9   ,0,0,0];
[C,0,1,X] -> [count10  ,0,0,0];
[C,0,0,X] -> [count10  ,0,0,0];
[C,0,1,X] -> [count11  ,0,0,0];
[C,0,0,X] -> [count11  ,0,0,0];
[C,0,1,X] -> [count12  ,0,0,0];
[C,0,0,X] -> [count12  ,0,0,0];
[C,0,1,X] -> [count13  ,0,0,0];
[C,0,0,X] -> [count13  ,0,0,0];
[C,0,1,X] -> [count14  ,1,0,1];
[C,0,0,X] -> [count14  ,1,0,0];

END N20_L12_A
```

MODULE N20_L13_A flag '-r3'
TITLE 'Post MF threshold process, data enable control
NR20B
Sohei Takemoto    7/14/92, 7/31/92, 9/23/92'

"DESCRIPTION

"B: split screen ctrl is added, 7/31/92
"L13A: 9/23/92 renamed and modified for NR20 Rev-B
"L13A: 10/6/92 AP_ON added "This PAL generates Y and C data selection pulses to choose either one of
" two signals, median filter output or bypass circuit output.

."Data selection depends on following conditions,
"  1. Y and C leval threshold judgements
"  2. motion signal, 2D processed, (common to Y and C)
"  3. median filtering window
"  4. median filter bypass command
"  5. Y and C median filter enables
"  6. Y and C median filter enable qualifiers
"  7. primary enable (AP_ON)

" Inputs are,
"   1. clk: 13.5MHz,
"   2. Y_TH  : Y threshold judgement, H/L for bypass/MF selection
"   3. C_TH  : C threshold judgement, H/L for bypass/MF selection
"   4. M_MD  : motion judgement, H to allow median filtering
"   5. HV_MF : H/L for active/non-active period (i.e. bypass when L)
"   6. PASS  : H for special median filter mode
"   7. Y_EN  : H for Y median filter enable
"   8. C_EN  : H for C median filter enable
"   9. Y_CN  : H to qualify Y median filter enable
"  10. C_CN  : H to qualify C median filter enable
"  11. AP_ON : H to enable median filters " Outputs are,
"   1. C_O_MF- : L to choose C median filter output
"   2. C_O_BP- : L to choose C bypass circuit output
"   3. Y_O_MF- : L to choose Y median filter output
"   4. Y_O_BP- : L to choose Y bypass circuit output

"DECLARATIONS

N20_L13A   device   'P22V10';

clk,Y_TH,C_TH,M_MD,HV_MF          pin 1,2,3,4,5;
    PASS,Y_EN,C_EN,Y_ON,C_ON          pin 6,7,8,9,10;
    C_O_MF-,C_O_BP-,Y_O_MF-,Y_O_BP-   pin 15,14,23,22;
    AP_ON                             pin 21;

AP_ON      ISTYPE    'feed_pin';

C,X,Z,H,L   =    .C. , .X. , .Z. , 1,0;

EQUATIONS
    !Y_O_MF- :=  PASS
              # !PASS & AP_ON & Y_ON & Y_EN & HV_MF & M_MD & !Y_TH;
     Y_O_BP- :=  PASS
              # !PASS & AP_ON & Y_ON & Y_EN & HV_MF & M_MD & !Y_TH;
    !C_O_MF- :=  PASS
              # !PASS & AP_ON & C_ON & C_EN & HV_MF & M_MD & !C_TH;
     C_O_BP- :=  PASS
              # !PASS & AP_ON & C_ON & C_EN & HV_MF & M_MD & !C_TH;

END N20_L13_A

MODULE N20_L14_A flag '-r3'
TITLE 'MF L64220 configuration preset control
NR20B
Sohei Takemoto    6/17/92, 9/23/92'

"DESCRIPTION

"L14A: 9/23/92 copied from N10_L01A and renamed

"This PAL generates control pulses for the L64220 to set 10 words of
"  configuration data.
"  FID timing comes from input sync generator.

"Two counters are used.
"  Right after FID pulse transition (both pos and neg), count gate is opened
"  and 4-bit binary counter starts counting on devided-by-3 clock.
"  When the counter reaches the terminal stage, the count gate closes.
"  During the counting, 2-bit counter repeats 01-11-10 sequence and provides
"  count pulse to the 4-bit counter and write-enable pulse source.

"4-bit counter output is used as address data to both L64220 master registers
"  and a PROM from which the configuration data is retrieved.

"  Inputs are,
"    1. clk: 13.5MHz,
"    2. FID: field ID, L/H for field 1/2
"  Outputs are,
"    1. ADRS[0..3]: address data to PROM and L64220
"    2. WE-       : write enable (LOW)
"    3. BNKLDI    : master to slave transfer enable (HIGH)

"The sequence of events is as follows.
"1) If in idleL, detect L->H transition of FID, idleL to count.
"   If in idleH, detect H->L transition of FID, idleH to count.
"2) In count, two counters are enabled.
"     CTR1 : 2-bit mod 3 cyclic counter, on the clk
"     CTR2 : 4-bit binary counter on the CTR1 cycle -> ADRS[0..3]
"3) When CTR2 counter reaches the terminal count,
"     if FID=H, goto idleH.
"     if FID=L, goto idleL.

"DECLARATIONS

N20_L14A   device    'P22V10';

clk,FID                         pin 1,10;
    CTR10,CTR11                     pin 14,15;
    ADRS0,ADRS1,ADRS2,ADRS3         pin 16,17,18,19;
    WE-,BNKLDI                      pin 23,22;
    M0,M1                           pin 21,20;

ADRS3,ADRS2,ADRS1,ADRS0,WE-,M1,M0   ISTYPE  'neg, reg';
    CTR11,CTR10                         ISTYPE  'pos, reg';

C,X,Z,H,L     =    .C. , .X. , .Z. , 1,0;

"SET DEFINITIONS
    CTR2     =    [ADRS3,ADRS2,ADRS1,ADRS0];
    CTR1     =    [CTR11,CTR10];

```
     p0        =    [0,0];
     p1        =    [0,1];
     p2        =    [1,1];
     p3        =    [1,0];

states    =    [M1,M0,ADRS3,ADRS2,ADRS1,ADRS0];
        idleL  =    [0,0,1,1,1,1];    "wait for L->H of FID
        idleH  =    [1,0,1,1,1,1];    "wait for H->L of FID
        count0 =    [0,1,0,0,0,0];
        count1 =    [0,1,0,0,0,1];
        count2 =    [0,1,0,0,1,0];
        count3 =    [0,1,0,0,1,1];
        count4 =    [0,1,0,1,0,0];
        count5 =    [0,1,0,1,0,1];
        count6 =    [0,1,0,1,1,0];
        count7 =    [0,1,0,1,1,1];
        count8 =    [0,1,1,0,0,0];
        count9 =    [0,1,1,0,0,1];
        count10 =   [1,1,1,0,1,0];
        count11 =   [1,1,1,0,1,1];
        count12 =   [1,1,1,1,0,0];
        count13 =   [1,1,1,1,0,1];
        count14 =   [1,1,1,1,1,0];
        count15 =   [1,1,1,1,1,1];

EQUATIONS
     WE-       := !(!M1 & M0 & !CTR11 & CTR10);
     BNKLDI    = (states == count11);

STATE_DIAGRAM    states
     STATE idleL   : IF FID THEN count0 ELSE idleL;
     STATE idleH   : IF !FID THEN count0 ELSE idleH;
     STATE count0  : IF !CTR10 THEN count1 ELSE count0;
     STATE count1  : IF !CTR10 THEN count2 ELSE count1;
     STATE count2  : IF !CTR10 THEN count3 ELSE count2;
     STATE count3  : IF !CTR10 THEN count4 ELSE count3;
     STATE count4  : IF !CTR10 THEN count5 ELSE count4;
     STATE count5  : IF !CTR10 THEN count6 ELSE count5;
     STATE count6  : IF !CTR10 THEN count7 ELSE count6;
     STATE count7  : IF !CTR10 THEN count8 ELSE count7;
     STATE count8  : IF !CTR10 THEN count9 ELSE count8;
     STATE count9  : IF !CTR10 THEN count10 ELSE count9;
     STATE count10 : IF !CTR10 THEN count11 ELSE count10;
     STATE count11 : IF !CTR10 THEN count12 ELSE count11;
     STATE count12 : IF !CTR10 THEN count13 ELSE count12;
     STATE count13 : IF !CTR10 THEN count14 ELSE count13;
     STATE count14 : IF !CTR10 THEN count15 ELSE count14;
     STATE count15 : CASE !FID : idleL;
                          FID : idleH;
                     ENDCASE;

STATE_DIAGRAM    CTR1
     STATE p0 : GOTO p1;
     STATE p1 : IF M0 THEN p2 ELSE p1;
     STATE p2 : IF M0 THEN p3 ELSE p1;
     STATE p3 : IF M0 THEN p1 ELSE p1;

TEST_VECTORS
([clk,FID] -> [CTR1,states,WE-,BNKLDI])
[0,X] -> [p0,count15,1,0];
```

```
[C,0] -> [p1,idleL  ,1,0];
[C,0] -> [p1,idleL  ,1,0];
[C,1] -> [p1,count0 ,1,0];
[C,1] -> [p2,count0 ,0,0];
[C,1] -> [p3,count0 ,1,0];
[C,1] -> [p1,count1 ,1,0];
[C,1] -> [p2,count1 ,0,0];
[C,1] -> [p3,count1 ,1,0];
[C,1] -> [p1,count2 ,1,0];
[C,1] -> [p2,count2 ,0,0];
[C,1] -> [p3,count2 ,1,0];
[C,1] -> [p1,count3 ,1,0];
[C,1] -> [p2,count3 ,0,0];
[C,1] -> [p3,count3 ,1,0];
[C,1] -> [p1,count4 ,1,0];
[C,1] -> [p2,count4 ,0,0];
[C,1] -> [p3,count4 ,1,0];
[C,1] -> [p1,count5 ,1,0];
[C,1] -> [p2,count5 ,0,0];
[C,1] -> [p3,count5 ,1,0];
[C,1] -> [p1,count6 ,1,0];
[C,1] -> [p2,count6 ,0,0];
[C,1] -> [p3,count6 ,1,0];
[C,1] -> [p1,count7 ,1,0];
[C,1] -> [p2,count7 ,0,0];
[C,1] -> [p3,count7 ,1,0];
[C,1] -> [p1,count8 ,1,0];
[C,1] -> [p2,count8 ,0,0];
[C,1] -> [p3,count8 ,1,0];
[C,1] -> [p1,count9 ,1,0];
[C,1] -> [p2,count9 ,0,0];
[C,1] -> [p3,count9 ,1,0];
[C,1] -> [p1,count10,1,0];
[C,1] -> [p2,count10,1,0];
[C,1] -> [p3,count10,1,0];
[C,1] -> [p1,count11,1,1];
[C,1] -> [p2,count11,1,1];
[C,1] -> [p3,count11,1,1];
[C,1] -> [p1,count12,1,0];
[C,1] -> [p2,count12,1,0];
[C,1] -> [p3,count12,1,0];
[C,1] -> [p1,count13,1,0];
[C,1] -> [p2,count13,1,0];
[C,1] -> [p3,count13,1,0];
[C,1] -> [p1,count14,1,0];
[C,1] -> [p2,count14,1,0];
[C,1] -> [p3,count14,1,0];
[C,1] -> [p1,count15,1,0];
[C,1] -> [p2,idleH  ,1,0];
[C,1] -> [p1,idleH  ,1,0];
[C,0] -> [p1,count0 ,1,0];
[C,0] -> [p2,count0 ,0,0];
[C,0] -> [p3,count0 ,1,0];
[C,0] -> [p1,count1 ,1,0];
[C,0] -> [p2,count1 ,0,0];
[C,0] -> [p3,count1 ,1,0];
[C,0] -> [p1,count2 ,1,0];
[C,0] -> [p2,count2 ,0,0];
[C,0] -> [p3,count2 ,1,0];
[C,0] -> [p1,count3 ,1,0];
```

```
        [C,0] -> [p2,count3 ,0,0];
        [C,0] -> [p3,count3 ,1,0];
        [C,0] -> [p1,count4 ,1,0];
        [C,0] -> [p2,count4 ,0,0];
        [C,0] -> [p3,count4 ,1,0];
        [C,0] -> [p1,count5 ,1,0];
        [C,0] -> [p2,count5 ,0,0];
        [C,0] -> [p3,count5 ,1,0];
        [C,0] -> [p1,count6 ,1,0];
        [C,0] -> [p2,count6 ,0,0];
        [C,0] -> [p3,count6 ,1,0];
        [C,0] -> [p1,count7 ,1,0];
        [C,0] -> [p2,count7 ,0,0];
        [C,0] -> [p3,count7 ,1,0];
        [C,0] -> [p1,count8 ,1,0];
        [C,0] -> [p2,count8 ,0,0];
        [C,0] -> [p3,count8 ,1,0];
        [C,0] -> [p1,count9 ,1,0];
        [C,0] -> [p2,count9 ,0,0];
        [C,0] -> [p3,count9 ,1,0];
        [C,0] -> [p1,count10,1,0];
        [C,0] -> [p2,count10,1,0];
        [C,0] -> [p3,count10,1,0];
        [C,0] -> [p1,count11,1,1];
        [C,0] -> [p2,count11,1,1];
        [C,0] -> [p3,count11,1,1];
        [C,0] -> [p1,count12,1,0];
        [C,0] -> [p2,count12,1,0];
        [C,0] -> [p3,count12,1,0];
        [C,0] -> [p1,count13,1,0];
        [C,0] -> [p2,count13,1,0];
        [C,0] -> [p3,count13,1,0];
        [C,0] -> [p1,count14,1,0];
        [C,0] -> [p2,count14,1,0];
        [C,0] -> [p3,count14,1,0];
        [C,0] -> [p1,count15,1,0];
        [C,0] -> [p2,idleL   ,1,0];
        [C,0] -> [p1,idleL   ,1,0];
        [C,0] -> [p1,idleL   ,1,0];

END N20_L14_A

/*----------------------------------------------------------------*/
/*   Main program for PROM code generation                        */
/*          April 1987 (Fortran -> Pascal)                        */
/*          November 1990 (Pascal -> C)       Sohei Takemoto      */
/*                                                                */
/*      PROMDEF.H and PROMLIB.H need to be included               */
/*      NR20B and NR30B boards, DIE125M project, Fall '92         */
/*----------------------------------------------------------------*/ include <stdio.h>
include <stdlib.h>
include <math.h> define MaxWord 1024   /* Max code words */
define LName   80     /* Max length of name string*/
#include "promdef.h"   /* type definitions */
include "promlib.h"   /* library */
```

```c
/*  procedures in PROMLIB.H
      *ToBin, *ToHex, IPower, WordToBinary, WordToHex,
      Input, Limit, Mask, IMask, UnMask, Mply, Roff,
      RToI, Slice, *OutFileName, BinPrint, HexPrint,
      HPrint, WriteBinFile       */ void main()
{
  IntData   IntAry1, IntAry2;    /* integer data array */
  RealData  RealAry;             /* real data array */
  SpecTable prom;                /* PROM specifications */
  char      ofname[LName];
  float     coef, max, min;
  int       ibit, fbit, loc, i;
  int       *ID1, *ID2, *ID3;
  float     *RD1;

/* define prom specifications */
/* KY, KC output LUTs: 512x8
     Works equivalently as Motion-Trak enable
       input:
         A8 : H/L as enable/disable
         A7..0 : 8-bit K data, zero or negative
       output:
         O7..0 : 8-bit K data
                   if A8=H, output = input,
                   if A8=L, output = 128   (K=-1.0)    */ prom.Kbit = 9;         /* no. of bits for address input */
  prom.Kmod = 8;         /* no. of bits for PROM module output, <=16 */
  prom.Kic = 8;          /* no. of bits for PROM chip output, <=8 */
  prom.Stadrs = 0;       /* input start address */
  prom.Ioffset = 0;      /* (input value)=(address)+Ioffset */
  prom.Nword = IPower(2, prom.Kbit);  /* no. of words to generate */
  prom.Csbit = 16;       /* bit length of check-sum data */ strcpy(prom.FNames[1], "N30_M01A.Bin");
  strcpy(prom.PNames[1], "KY, KC output LUTs, U12, U63");

/* generate prom code */

ID1 = IntAry1;
  for (i = 0; i < prom.Nword; i++, ID1++) {
    *ID1 = i % 256;   /* 8-bit congruency */
    if ((i & 256) != 256)
      *ID1 = 128;     /* force to 128 */
  }

/* Output */
  strcpy (ofname, OutFileName());  /* ask for output file name */ i = HexPrint(IntAry1, prom, ofname);
  printf("HexPrint.........%2d\n",i);
  i = WriteBinFile(IntAry1, prom);
  printf("WriteBinFile.....%2d\n",i);
}
```

```
/*-----------------------------------------------------------*/
/* Main program for PROM code generation                     */
/*        April 1987 (Fortran -> Pascal)                     */
/*        November 1990 (Pascal -> C)      Sohei Takemoto.   */
/*                                                           */
/*    PROMDEF.H and PROMLIB.H need to be included            */
/*    NR20B and NR30B boards, DIE125M project, Fall '92      */
/*-----------------------------------------------------------*/ include <stdio.h>
include <stdlib.h>
include <math.h> define MaxWord 1024   /* Max code words */
define LName   80     /* Max length of name string*/
#include "promdef.h"   /* type definitions */
include "promlib.h"   /* library */

/*   procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile    */ void main()
{
    IntData IntAry1, IntAry2;    /* integer data array */
    RealData RealAry;            /* real data array */
    SpecTable prom;              /* PROM specifications */
    char    ofname[LName];
    float   coef, max, min, mag, fval;
    int     ibit, fbit, loc, i, j, k, val;
    int     *ID1, *ID2, *ID3;
    float   *RD1;

/* define prom specifications */
/* Y log compressor: 512x8
     input:
       A8    : always L
       A7..0 : 8-bit C Motion filter output, pos only
     output:
       O7..0 : 8-bit compressed (to 127) data
                  out = in ** X
                     where X is the root of 255**X=127    */ prom.Kbit = 9;       /* no. of bits for address input */
    prom.Kmod = 8;       /* no. of bits for PROM module output, <=16 */
    prom.Kic = 8;        /* no. of bits for PROM chip output, <=8 */
    prom.Stadrs = 0;     /* input start address */
    prom.Ioffset = 0;    /* (input value)=(address)+ioffset */
    prom.Nword = IPower(2, prom.Kbit); /* no. of words to generate */
    prom.Csbit = 16;     /* bit length of check-sum data */ strcpy(prom.FNames[1], "N30_M02A.Bin");
    strcpy(prom.PNames[1], "Y log compressor, U28");

/* generate prom code */
```

```
    ID1 = IntAry1;
    for (i = 0; i < prom.Nword; i++, ID1++) {
      fval = i % 256;
      val = pow(fval, 0.874202616) + 0.5;
      if (val > 127)  val = 127;
      *ID1 = val;
    }

/* Output */
    strcpy (ofname, OutFileName());  /* ask for output file name */ i = HexPrint(IntAry1, prom, ofname);
    printf("HexPrint..........%2d\n",i);
    i = WriteBinFile(IntAry1, prom);
    printf("WriteBinFile......%2d\n",i);
}

/*----------------------------------------------------------------*/
/*   Main program for PROM code generation                        */
/*          April 1987 (Fortran -> Pascal)                        */
/*          November 1990 (Pascal -> C)        Sohei Takemoto     */
/*                                                                */
/*     PROMDEF.H and PROMLIB.H need to be included                */
/*     NR20B and NR30B boards, DIE125M project, Fall '92          */
/*----------------------------------------------------------------*/ include <stdio.h>
include <stdlib.h>
include <math.h> define MaxWord 1024    /* Max code words */
define LName    80     /* Max length of name string*/
#include "promdef.h"    /* type definitions */
include "promlib.h"    /* library */

/*  procedures in PROMLIB.H
          *ToBin, *ToHex, IPower, WordToBinary, WordToHex,
          Input, Limit, Mask, IMask, UnMask, Mply, Roff,
          RToI, Slice, *OutFileName, BinPrint, HexPrint,
          HPrint, WriteBinFile     */ void main()
{
    IntData IntAry1, IntAry2;   /* integer data array */
    RealData RealAry;           /* real data array */
    SpecTable prom;             /* PROM specifications */
    char    ofname[LName];
    float   coef, max, min, mag, fval, gain;
    int     ibit, fbit, loc, i, j, k, val;
    int     *ID1, *ID2, *ID3;
    float   *RD1;

/* define prom specifications */
    /* Y action measurement, input gain adjuster: 512x8
        input:
          A8  : L as active window of measurement
          A7..0 : 8-bit Y difference, pos only
        output:
```

```
         07..0 : 8-bit gain adjusted data
                 out = in * gain   if in the window
                 out = 0           if not              */ prom.Kbit = 9;        /* no. of bits for address input */
  prom.Kmod = 8;        /* no. of bits for PROM module output, <=16 */
  prom.Kic = 8;         /* no. of bits for PROM chip output, <=8 */
  prom.Stadrs = 0;      /* input start address */
  prom.Ioffset = 0;     /* (input value)=(address)+ioffset */
  prom.Nword = IPower(2, prom.Kbit);  /* no. of words to generate */
  prom.Csbit = 16;      /* bit length of check-sum data */ strcpy(prom.FNames[1], "N30_M03A.Bin");
  strcpy(prom.PNames[1], "Y adjuster/enable LUTs, U105");

/* generate prom code */

ID1 = IntAry1;
  gain = 0.75;
  for (i = 0; i < prom.Nword; i++, ID1++) {
    if (i >= 256)  *ID1 = 0;
    else {
       fval = i % 256;
       val = gain * fval + 0.5;
       if (val > 255)  val = 255;
       *ID1 = val;
    }
  }

/* Output */
  strcpy (ofname, OutFileName());  /* ask for output file name */ i = HexPrint(IntAry1, prom, ofname);
  printf("HexPrint..........%2d\n",i);
  i = WriteBinFile(IntAry1, prom);
  printf("WriteBinFile......%2d\n",i);
}

/*---------------------------------------------------------------*/
/*   Main program for PROM code generation                       */
/*         April 1987 (Fortran -> Pascal)                        */
/*         November 1990 (Pascal -> C)        Sohei Takemoto     */
/*                                                               */
/*     PROMDEF.H and PROMLIB.H need to be included               */
/*     NR20B and NR30B boards, DIE125M project, Fall '92         */
/*---------------------------------------------------------------*/ include <stdio.h>
include <stdlib.h>
include <math.h> define MaxWord 1024   /* Max code words */
define LName   80     /* Max length of name string*/
#include "promdef.h"   /* type definitions */
include "promlib.h"   /* library */

/*   procedures in PROMLIB.H
        *ToBin, *ToHex, IPower, WordToBinary, WordToHex,
        Input, Limit, Mask, IMask, UnMask, Mply, Roff,
```

```
        RToI, Slice, *OutFileName, BinPrint, HexPrint,
        HPrint, WriteBinFile         */ void main()
{
   IntData   IntAry1, IntAry2;    /* integer data array */
   RealData  RealAry;             /* real data array */
   SpecTable prom;                /* PROM specifications */
   char      ofname[LName];
   float     coef, max, min, mag, fval;
   int       ibit, fbit, loc, i, j, k, val;
   int       *ID1, *ID2, *ID3;
   float     *RD1;

/* define prom specifications */
/* C log compressor: 512x8
     input:
        A8   : always L
        A7..0 : 8-bit C Motion filter output, pos only
     output:
        O7..0 : 8-bit compressed (to 127) data
                out = in ** X
                     where X is the root of 255**X=127    */ prom.Kbit = 9;      /* no. of bits for address input */
   prom.Kmod = 8;      /* no. of bits for PROM module output, <=16 */
   prom.Kic = 8;       /* no. of bits for PROM chip output, <=8 */
   prom.Stadrs = 0;    /* input start address */
   prom.Ioffset = 0;   /* (input value)=(address)+ioffset */
   prom.Nword = IPower(2, prom.Kbit);  /* no. of words to generate */
   prom.Csbit = 16;    /* bit length of check-sum data */ strcpy(prom.FNames[1], "N30_M04A.Bin");
   strcpy(prom.PNames[1], "C log compressor, U109");

/* generate prom code */

ID1 = IntAry1;
   for (i = 0; i < prom.Nword; i++, ID1++) {
      fval = i % 256;
      val = pow(fval, 0.874202616) + 0.5;
      if (val > 127)  val = 127;
      *ID1 = val;
   }

/* Output */
   strcpy (ofname, OutFileName());  /* ask for output file name */ i = HexPrint(IntAry1, prom, ofname);
   printf("HexPrint.........%2d\n",i);
   i = WriteBinFile(IntAry1, prom);
   printf("WriteBinFile......%2d\n",i);
}
```

```c
/*--------------------------------------------------------------*/
/* Main program for PROM code generation                        */
/*      April 1987 (Fortran -> Pascal)                          */
/*      November 1990 (Pascal -> C)        Sohei Takemoto       */
/*                                                              */
/*   PROMDEF.H and PROMLIB.H need to be included                */
/*   NR20B and NR30B boards, DIE125M project, Fall '92          */
/*--------------------------------------------------------------*/ include <stdio.h>
include <stdlib.h>
include <math.h> define MaxWord 1024   /* Max code words */
define LName   80     /* Max length of name string*/
#include "promdef.h"   /* type definitions */
include "promlib.h"   /* library */

/*   procedures in PROMLIB.H
       *ToBin, *ToHex, IPower, WordToBinary, WordToHex,
       Input, Limit, Mask, IMask, UnMask, Mply, Roff,
       RToI, Slice, *OutFileName, BinPrint, HexPrint,
       HPrint, WriteBinFile        */ void main()
{
   IntData IntAry1, IntAry2;   /* integer data array */
   RealData RealAry;           /* real data array */
   SpecTable prom;             /* PROM specifications */
   char    ofname[LName];
   float   coef, max, min, mag, ATT;
   int     ibit, fbit, loc, i, j, k, val, VAct;
   int     *ID1, *ID2, *ID3;
   float   *RD1;

/* define prom specifications */
/* Y difference line-integrator output LUT
     input:
       A8    : 1 in V-active period
       A7..0 : 8-bit integrator output, zero or positive
               max=(42*700)/256=115
     output:
       O7..0 : 8-bit absolute value
               if A8=0, output=0
               if A8=1, output=input*128/115    */ prom.Kbit = 9;        /* no. of bits for address input */
   prom.Kmod = 8;        /* no. of bits for PROM module output, <=16 */
   prom.Kic = 8;         /* no. of bits for PROM chip output, <=8 */
   prom.Stadrs = 0;      /* input start address */
   prom.Ioffset = 0;     /* (input value)=(address)+ioffset */
   prom.Nword = IPower(2, prom.Kbit);  /* no. of words to generate */
   prom.Csbit = 16;      /* bit length of check-sum data */ strcpy(prom.FNames[1], "N30_M05A.Bin");
   strcpy(prom.PNames[1], "Y H-integrator output LUT, U122");

/* generate prom code */
```

```
  ATT = 128.0 / 115.0;        /* Attenuation factor!!! */
  ID1 = IntAry1;
  for (i = 0; i < prom.Nword; i++; ID1++) {
    VAct = i >> 8 & 1;         /* if 1 then active period */
    val = i & 255;             /* get 8-bit LSP */
    if (VAct == 0) val = 0;    /* 0 for inactive period */
    val = ATT * val + 0.5;
    if (val > 128) val = 128;  /* clip to 128 */
    *ID1 = val;
  }

/* Output */
  strcpy (ofname, OutFileName());  /* ask for output file name */ i = HexPrint(IntAry1, prom, ofname);
  printf("HexPrint..........%2d\n",i);
  i = WriteBinFile(IntAry1, prom);
  printf("WriteBinFile......%2d\n",i);
}

/*--------------------------------------------------------------------*/
/*   Main program for PROM code generation                            */
/*        April 1987 (Fortran -> Pascal)                              */
/*        November 1990 (Pascal -> C)          Sohei Takemoto         */
/*                                                                    */
/*   PROMDEF.H and PROMLIB.H need to be included                      */
/*   NR20B and NR30B boards, DIE125M project, Fall '92                */
/*--------------------------------------------------------------------*/ include <stdio.h>
include <stdlib.h>
include <math.h> define MaxWord 1024   /* Max code words */
define LName   80     /* Max length of name string*/
#include "promdef.h"   /* type definitions */
include "promlib.h"   /* library */

/*  procedures in PROMLIB.H
     *ToBin, *ToHex, IPower, WordToBinary, WordToHex,
     Input, Limit, Mask, IMask, UnMask, Mply, Roff,
     RToI, Slice, *OutFileName, BinPrint, HexPrint,
     HPrint, WriteBinFile       */ void main()
{
  IntData IntAry1, IntAry2;  /* integer data array */
  RealData RealAry;          /* real data array */
  SpecTable prom;            /* PROM specifications */
  char    ofname[LName];
  float   coef, max, min, mag, ATT;
  int     ibit, fbit, loc, i, j, k, val, HAct;
  int     *ID1, *ID2, *ID3;
  float   *RD1;

/* define prom specifications */
/* Y difference line-integrator input LUT
     input:
```

```
        A8    : 1 in H-active period
        A7..0 : 8-bit integrator input, zero or positive
                attenuated and limited to '42' (cf. N30_M21A)
    output:
        O7..0 : 8-bit absolute value
                if A8=0, output=0
                if A8=1, output=input limited to 42      */ prom.Kbit = 9;      /* no. of bits for address input */
    prom.Kmod = 8;      /* no. of bits for PROM module output, <=16 */
    prom.Kic = 8;       /* no. of bits for PROM chip output, <=8 */
    prom.Stadrs = 0;    /* input start address */
    prom.Ioffset = 0;   /* (input value)=(address)+ioffset */
    prom.Nword = IPower(2, prom.Kbit);  /* no. of words to generate */
    prom.Csbit = 16;    /* bit length of check-sum data */ strcpy(prom.FNames[1], "N30_M06A.Bin");
    strcpy(prom.PNames[1], "Y H-integrator input LUT, U131");

/* generate prom code */

ATT = 1.0;          /* Attenuation factor!!! */
    ID1 = IntAry1;
    for (i = 0; i < prom.Nword; i++, ID1++) {
        HAct = i >> 8 & 1;      /* if 1 then active period */
        val = i & 255;          /* get 8-bit LSP */
        if (HAct == 0) val = 0; /* 0 for inactive period */
        val = ATT * val + 0.5;
        if (val > 42) val = 42; /* clip to 42 */
        *ID1 = val;
    }

/* Output */
    strcpy (ofname, OutFileName());  /* ask for output file name */ i = HexPrint(IntAry1, prom, ofname);
    printf("HexPrint.........%2d\n",i);
    i = WriteBinFile(IntAry1, prom);
    printf("WriteBinFile.....%2d\n",i);
}

/*--------------------------------------------------------------------*/
/*  Main program for PROM code generation                             */
/*          April 1987 (Fortran -> Pascal)                            */
/*          November 1990 (Pascal -> C)        Sohei Takemoto         */
/*                                                                    */
/*  PROMDEF.H and PROMLIB.H need to be included                       */
/*  NR20B and NR30B boards, DIE125M project, Fall '92                 */
/*--------------------------------------------------------------------*/ include <stdio.h>
include <stdlib.h>
include <math.h> define MaxWord 1024    /* Max code words */
define LName   80      /* Max length of name string*/
#include "promdef.h"    /* type definitions */
include "promlib.h"    /* library */
```

```
/*  procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile      */ void main()
{
  IntData IntAry1, IntAry2;   /* integer data array */
  RealData RealAry;           /* real data array */
  SpecTable prom;             /* PROM specifications */
  char    ofname[LName];
  float   coef, max, min, mag, fval;
  int     ibit, fbit, loc, i, j, k, val, TV;
  int     *ID1, *ID2, *ID3;
  float   *RD1;

/* define prom specifications */
/* Y difference field-integrator output LUT
     input:
        A8   : 0/1 for 625/525 TV system
        A7..0 : 8-bit integrator output, zero or positive
                max=(128*280)/256=140.0 for 625
                   =(128*235)/256=117.5 for 525
     output:
        O7..0 : 8-bit absolute value, per line average
                if A8=0, 625, output=1+(256*input)/280
                if A8=1, 525, output=1+(256*input)/235      */ prom.Kbit = 9;      /* no. of bits for address input */
  prom.Kmod = 8;      /* no. of bits for PROM module output, <=16 */
  prom.Kic = 8;       /* no. of bits for PROM chip output, <=8 */
  prom.Stadrs = 0;    /* input start address */
  prom.Ioffset = 0;   /* (input value)=(address)+ioffset */
  prom.Nword = IPower(2, prom.Kbit);  /* no. of words to generate */
  prom.Csbit = 16;    /* bit length of check-sum data */ strcpy(prom.FNames[1], "N30_M07A.Bin");
  strcpy(prom.PNames[1], "Y field integrator output LUT, U183");
```

What is claimed is:

1. Apparatus for enhancement of digital video images, said apparatus connectable to a source of digital video signals operating at a video pixel rate and comprising:
a median filter including storage means for temporarily storing digital data to present simultaneously data representing pixels from a current video frame, a most recent video frame, and a next video frame;
user-selectable data cluster selection means associated with said median filter and operating on substantially every pixel in said current video frame, for identifying one of a plurality of clusters of digital data as a selected cluster from digital data stored in one or more of said current video frame, said most recent video frame, and said next video frame, each of said clusters comprising digital data representing said each pixel and ones of said pixels which are chosen from positional and temporal neighbors of the one of said each pixels being operated on, said selection means comprising means for weighting at least one of said digital data, and for presenting said clusters of digital data to said median filter;
motion detector means for detecting motion in a region of said current video frame containing said each pixel, and for producing a motion-sense signal proportional to the degree of motion in said region, and
first substitution means for substituting an output of said median filter for said each pixel in said current video frame only if said motion-sense signal is below a user-selected threshold.

2. The apparatus of claim 1, further including:
first means for generating, for each pixel, a deviation threshold signal if said each pixel deviates from the median value of said selected cluster by at least a selected threshold, said selected threshold being adjustable by a user;

second substitution means for substituting an output of said median filter for said each pixel in said current video frame in response to said deviation threshold signal.

3. The apparatus of claim 1, wherein said means for weighting comprises means for weighting with a weight other than one, and said plurality of clusters are chosen from the group including:

(1) said each pixel weighted twice, its upper and lower nearest neighbors, each weighted once, and its corresponding pixels in said most recent video frame and said next video frame, each weighted twice;

(2) said each pixel weighted twice, its left and right nearest neighbors, each weighted once, and its corresponding pixels in said most recent video frame and said next video frame, each weighted twice;

(3) said each pixel weighted twice, its upper, lower, left, and right nearest neighbors, each weighted once, and its corresponding pixels in said most recent video frame and said next video frame, each weighted twice;

(4) said each pixel weighted twice, its four diagonal nearest neighbors, each weighted once, and its corresponding pixels in said most recent video frame and said next video frame, each weighted twice;

(5) said each pixel weighted twice, its upper, lower, left, and right nearest neighbors, each weighted once, its corresponding pixels in said most recent video frame end said next video frame, each weighted twice, and their left and right nearest neighbors, each weighted once.

4. The apparatus of claim 1, further including a recursive filter having an input connected to said output of said median filter.

5. The apparatus of claim 4, wherein said recursive filter includes:
noise threshold setting means;
noise reduction level control means;
motion detector means for detecting motion in a region of said current video frame containing said each pixel, and for producing a motion-sense signal proportional to the degree of motion in said region; and
recursion control means, responsive to said motion-sense signal, said noise threshold setting means, and said noise reduction level control means, for controlling the magnitude of recursion produced by said filter.

6. A device for enhancing digital video images, comprising
a video data bus;
first, second, and third nodes coupled to said video data bus, said nodes comprising data indicative of spatially co-located pixels in a set of ordered frames of video data;
a rank-value circuit coupled to said first, second, and third nodes, said rank-value circuit comprising a control input, whereby said rank-value circuit computes a median value of a set selected from said data indicative of said spatially co-located pixels;
a motion detector circuit coupled to said first node and having an output node coupled to said control input, whereby said rank-value circuit is disabled in response to a signal at said output node.

7. A device as in claim 6, comprising a first frame delay coupled to said video data bus and to said second node; and a second frame delay coupled to said first frame delay and to said third node; whereby said first, second and third nodes comprise spatially co-located pixels in a set of successive frames of video data, delayed relative to one another by an integer number of frames.

8. A device as in claim 7, wherein
said rank-value circuit comprises a plurality of registers, and a median selector circuit coupled to said plurality of registers;
said plurality of registers are coupled to said first, second, and third nodes;
said first and second frame delays each comprises a plurality of partial delays whose total delay comprises a full frame; and
said plurality of registers are coupled to an output of at least one of said plurality of partial delays in said first and second frame delays, whereby said plurality of registers comprise data indicative of spatial and temporal neighbors of one pixel in said video data;
whereby said median selector circuit computes a median value of a set of data selected from said registers.

9. A device as in claim 8, wherein said plurality of registers includes a first and a second register coupled to identical nodes, whereby said first and said second registers comprise identical data, and whereby said median selector circuit computes a median value of a set of data in which a value indicated by said first and said second register is counted with a weight greater than one.

10. A device as in claim 8, wherein said plurality of registers includes at least one register having a mask bit for indicating a zero weight for said one register.

11. A device as in claim 8, comprising
a set of switches coupled to said registers, whereby said registers select for input a set of data indicative of said spatial and temporal neighbors of said one pixel in said video data;
a set of weighting circuits coupled to said registers, whereby said median selector circuit computes a median value of a set of data in said registers, in which a value indicated by at least one said register is counted with a weight greater than one.

12. A device as in claim 6, wherein said output of said motion detector circuit comprises a value indicative of whether a degree of motion in said set of ordered frames of video data exceeds a user-selected motion threshold.

13. A device as in claim 6, comprising
a comparator coupled to said rank-value circuit and to said second node, whereby said comparator computes a difference between said median value and a value indicative of said one pixel;
a switch coupled to said comparator, said rank-value circuit, and said second node, whereby said switch selects either said median value or said value indicative of said one pixel, in response to whether said difference exceeds a user-selected difference threshold.

14. A device as in claim 6, comprising a recursive filter coupled to said rank-value circuit.

15. A device as in claim 14, wherein said recursive filter comprises a nonlinear transfer block, said nonlinear transfer block itself being coupled to a noise threshold value; and a noise reduction level value and said output node of said motion detector circuit, and having a switch for selecting between said noise reduction level value and said output node;

wherein said nonlinear transfer block comprises a digital circuit having a transfer characteristic selecting said noise reduction threshold for a value of said output node less than said noise threshold value and selecting a function of said output node for a value of said output node greater than said noise threshold value.

16. A device as in claim 6, wherein said rank-value circuit and said motion detector circuit comprise a processor operating under software control.

17. In a device for enhancing video data, said video data comprising a sequence of frames each having a plurality of lines each having a plurality of pixels, a data structure comprising a plurality of weighted values indicative of a set of spatial and temporal neighbors of one of said pixels, at least some of said values having been weighted with weights other than zero and other than one;

a plurality of mask bits associated with said plurality of values and indicative of a selected and weighted cluster of said spatial and temporal neighbors; and associated with said plurality of values, a median value computed in response to said selected and weighted cluster.

* * * * *

UNITED STATES PATENT AND TRADEMARK OFFICE
CERTIFICATE OF CORRECTION

PATENT NO. : 5,446,501
DATED : August 29, 1995
INVENTOR(S) : Takemoto, et al

It is certified that error appears in the above-indentified patent and that said Letters Patent is hereby corrected as shown below:

In the Drawings:

Figure 4, should be deleted and replace with the Figure 4, as shown on the attached page.

Signed and Sealed this

Fourth Day of June, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,446,501

DATED : August 29, 1995

INVENTOR(S) : Takemoto, et al.

It is certified that error appears in the above-indentified patent and that said Letters Patent is hereby corrected as shown below:

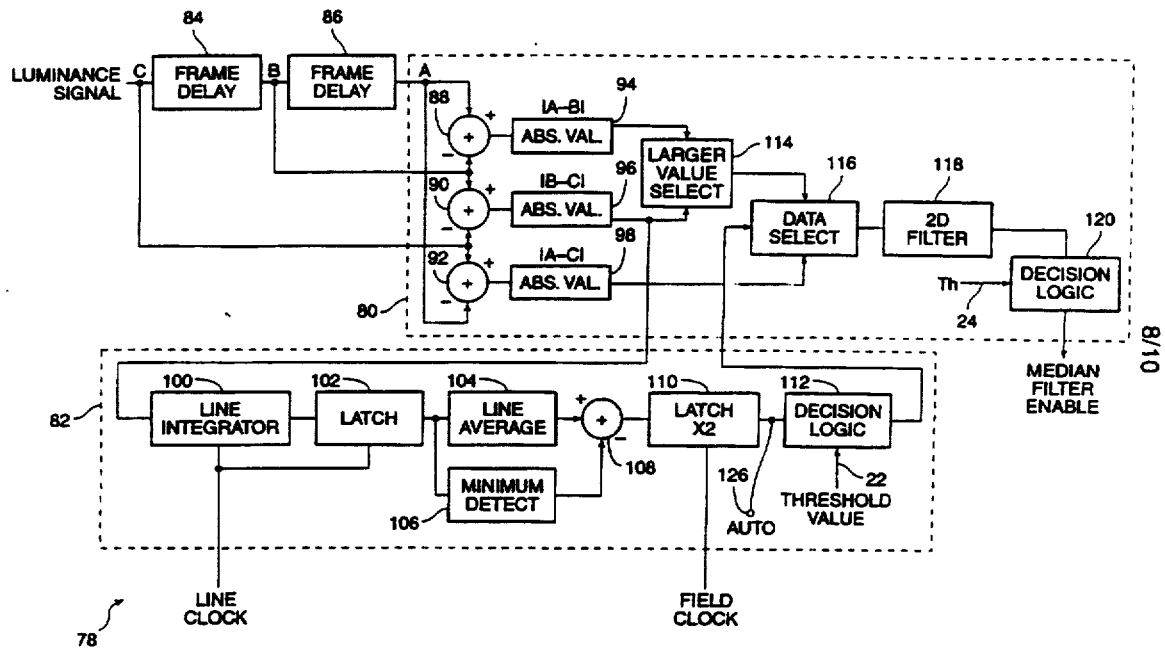

FIG. 4

UNITED STATES PATENT AND TRADEMARK OFFICE
CERTIFICATE OF CORRECTION

PATENT NO. : 5,446,501
DATED : August 29, 1995
INVENTOR(S) : Takemoto, et al.

It is certified that error appears in the above-indentified patent and that said Letters Patent is hereby corrected as shown below:

In the Specification:

On column 2, line 21, replace "tile" with --the--.

On column 4, lines 30-31, delete ",the input of delay element 32,".

On column 6, line 24, replace "IA-BI" with --|A-B|--.

On column 6, line 25, replace "IB-CI" with --|B-C|--.

On column 6, line 25, replace "IA-CI" with --|A-C|--.

On column 6, line 29, replace "IB-CI" with --|B-C|--.

On column 6, line 30, replace "IB-CI" with --|B-C|--.

On column 6, line 58, replace "IA-BI" with --|A-B|--.

On column 6, line 58, replace "IB-CI" with --|B-C|--.

On colume 6, line 59, replace "IA-CI" with --|A-C|--.

On column 6, line 67, replace "IA-CI" with --|A-C|--.

On column 8, line 27, replace "170" with --172--.

On column 63, line 23, insert the text from column 105, line 23 through column 107, line 26.

On column 89, line 41, insert the following two pages of text.

```
/*------------------------------------------------------------*/
/*   Main program for PROM code generation                    */
/*        April 1987 (Fortran -> Pascal)                      */
/*        November 1990 (Pascal -> C)      Sohei Takemoto     */
/*                                                            */
/*   PROMDEF.H and PROMLIB.H need to be included              */
/*   NR20B and NR30B boards, DIE125M project, Fall '92        */
/*------------------------------------------------------------*/ include <stdio.h>
include <stdlib.h>
include <math.h> define MaxWord 2048   /* Max code words */
define LName   80     /* Max length of name string*/
#include "promdef.h"   /* type definitions */
include "promlib.h"   /* library */

/*  procedures in PROMLIB.H
         *ToBin, *ToHex, IPower, WordToBinary, WordToHex,
         Input, Limit, Mask, DMask, UnMask, Mply, Roff,
         RToI, Slice, *OutFileName, BinPrint, HexPrint,
         HPrint, WriteBinFile       */ void main()
{
   IntData   IntAry1, IntAry2;   /* integer data array */
   RealData  RealAry;            /* real data array */
   SpecTable prom;               /* PROM specifications */
   char      ofname[LName];
   float     coef, max, min;
   int       ibit, fbit, loc, i;
   int       *ID1, *ID2, *ID3;
   float     *RD1;
   int       blank, tc, bc, val, out, black, bottom, top;
   int       TClip[4] = {254,254,254,240};
   int       BClip[4] = {1,1,1,16};

/* define prom specifications */
/* C Output LUTs: 2Kx8
      1. enforce blanking
      2. apply clipping
            level [16,240] as [0,100]% dynamic range
            cf. N20_m09a.c for Y clipping
      3. code conversion (MSB inversion)
      4. avoid 00 and FF output input:
      A10   : H for blanking
      A9..8 : clipping selection [0,3]
              0: [-6.7,106.3]% as [1,254], full 8-bit range
              1: [-6.7,106.3]% as [1,254]
              2: [-6.7,106.3]% as [1,254]
              3: [0,100]% as [16,240]
      A7..0 : 8-bit C signal input, pos/neg 2's complement
   output:
      O7..0 : 8-bit C signal output, natural binary       */ prom.Ebit = 11;     /* no. of bits for address input */
```

```
   prom.Kmod = 8;       /* no. of bits for PROM module output, <=16 */
   prom.Kic = 8;        /* no. of bits for PROM chip output, <=8 */
   prom.Stadrs = 0;     /* input start address */
   prom.Ioffset = 0;    /* (input value)=(address)+ioffset */
   prom.Nword = IPower(2, prom.Kbit);  /* no. of words to generate */
   prom.Csbit = 16;     /* bit length of check-sum data */ strcpy(prom.FNames[1], "N20_M10A.Bin");
   strcpy(prom.PNames[1], "C Output LUTs, U76");

/* generate prom code */ black = 128;   bottom = 16;   top = 240;
   ID1 = IntAry1;
   for (i = 0; i < prom.Nword; i++, ID1++) {
      blank = i >> 10 & 1;      /* if 1 then blanking period */
      tc = TClip[i >> 8 & 3];
      bc = BClip[i >> 8 & 3];
      val = (i & 255) ^ 128;    /* get 8-bit input and MSB invert */
      if (blank)  out = black;  /* blank level */
      else {
         out = val;
         if (val <= bc)  out = bc;   /* black clip */
         if (val >= tc)  out = tc;   /* white clip */
      }
      if (out == 0)    out = 1;     /* avoid 00 */
      if (out == 255)  out = 254;   /* avoid FF */
      *ID1 = out;
   }

/* Output */
   strcpy (ofname, OutFileName());  /* ask for output file name */ i = HexPrint(IntAry1, prom, ofname);
   printf("HexPrint..........%2d\n",i);
   i = WriteBinFile(IntAry1, prom);
   printf("WriteBinFile......%2d\n",i);
}
```

UNITED STATES PATENT AND TRADEMARK OFFICE
CERTIFICATE OF CORRECTION

PATENT NO. : 5,446,501  Page 6 of 122
DATED : August 29, 1995
INVENTOR(S) : Takemoto, et al.

It is certified that error appears in the above-indentified patent and that said Letters Patent is hereby corrected as shown below:

On column 105, line 23, through column 107, line 26, delete the text.
On column 205, line 36, insert the following 117 pages of text.

```c
      *ID1 >>= 2;
      *ID2 >>= 2;
    }

/* Output */
    strcpy (ofname, OutFileName());  /* ask for output file name */ i = HexPrint(IntAry1, prom, ofname);
    printf("HexPrint..........%2d\n",i);
    i = HexPrint(IntAry2, PR2, ofname);
    printf("HexPrint..........%2d\n",i);
    i = HexPrint(IA3, PR1, ofname);
    printf("HexPrint..........%2d\n",i);
    i = WriteBinFile(IntAry1, prom);
    printf("WriteBinFile......%2d\n",i);
    i = WriteBinFile(IntAry2, PR2);
    printf("WriteBinFile......%2d\n",i);
    i = WriteBinFile(IA3, PR1);
    printf("WriteBinFile......%2d\n",i);
}
```

```c
/*----------------------------------------------------------------*/
/*    Main program for PROM code generation                       */
/*         April 1987 (Fortran -> Pascal)                         */
/*         November 1990 (Pascal -> C)      Sohei Takemoto        */
/*                                                                */
/*    PROMDEF.H and PROMLIB.H need to be included                 */
/*    NR20B and NR30B boards, DIE125N project, Fall '92           */
/*----------------------------------------------------------------*/ include <stdio.h>
include <stdlib.h>
include <math.h> define MaxWord 2048   /* Max code words */
define LName   80     /* Max length of name string*/
#include "promdef.h"   /* type definitions */
include "promlib.h"   /* library */

/*  procedures in PROMLIB.H
          *ToBin, *ToHex, IPower, WordToBinary, WordToHex,
          Input, Limit, Mask, DMask, UnMask, Mply, Roff,
          RToI, Slice, *OutFileName, BinPrint, HexPrint,
          HPrint, WriteBinFile       */ void main()
{
   IntData   IA1, IA2, IA3;   /* integer data array */
   RealData  RA;              /* real data array */
   SpecTable prom, PR1, PR2;  /* PROM specifications */
   char      ofname[LName];
   float     coef, max, min;
   int       ibit, fbit, loc, i, j, k;
   int       *ID1, *ID2, *ID3;
   float     *RD1;
   int       ofset525, ofset625, id, idt, val1, val2, lh525, lh625;
   int       dly525, dly625, org;

/* define prom specifications */
/* Horizontal timing, PCTR decoder: 2Kx8; U5, U6
      input:
        A10  : H/L for 525/625 TV system
        A9..0 : 10-bit PCTR output, [0,857] or [0,863]
                "0" vs. pixel-0 be compensated by ofset525, ofset625
      output: U5
        (all pulses are for half-line delayed data)
        07   : H_CLK: 1T
        06   : H_ACTIVE: 700T
        05   : not used
        04   : HP: 1T-wide pos pulse to clock V-blanking
        03   : H for right-half blank
        02   : H for left-half blank
        01   : H for active analog video
        00   : H for active D1 video
      output: U6
        07   : not used
        06   : HINT
        05   : F_1H_RST-1
        04   : F_1H_RST-2
```

```
         03   : F_R_Y-, 388T
         02   : F_R_C-, 391T
         01   : BOAV-
         00   : AV-
                                 */ prom.Kbit = 11;       /* no. of bits for address input */
   prom.Kmod = 8;        /* no. of bits for PROM module output, <=16 */
   prom.Kic = 8;         /* no. of bits for PROM chip output, <=8 */
   prom.Stadrs = 0;      /* input start address */
   prom.Ioffset = 0;     /* (input value)=(address)+ioffset */
   prom.Nword = IPower(2, prom.Kbit);  /* no. of words to generate */
   prom.Csbit = 16;      /* bit length of check-sum data */

PR1 = prom;
   strcpy(prom.FNames[1], "N30_N11A.Bin");
   strcpy(prom.FNames[1], "H timing, PCTR decoder-1, U5");
   strcpy(PR1.FNames[1], "N30_N12A.Bin");
   strcpy(PR1.FNames[1], "H timing, PCTR decoder-2, U6");

/* generate prom code */ lh525 = 858;          /* pixels per H, 525 */
   lh625 = 864;          /* pixels per H, 625 */
   ofset525 = 1;         /* (pixel-number in 525) - [PCTR] */
   ofset625 = 1;         /* (pixel-number in 625) - [PCTR] */
   org = 70;

/* change those variables for the fine adjustment of comp-blank */
   dly525 = 443 - 7;                     /* ???? for 525 */
   dly625 = 443 - 7;                     /* ???? for 626 */

ID1 = IA1;
   ID2 = IA2;

for (i = 0; i < 2; i++) {   /* make 2 LUTs */ for (j = 0; j < 1024; j++) {
       val1 = val2 = 0;

if (i == 0) {    /* 625 timing */
         id = (lh625 + j + ofset625) % lh625;
         idt = (lh625 + j + ofset625 - dly625) % lh625;

/* U5 for 625
             07: H_CLK: 1T, H at org
             06: H_ACTIVE: 700T, H for [148,847]
             04: HP: [75]
             03: H for right-half blank, [503..863,0..72]
             02: H for left-half blank, [73..502]
             01: H for active analog video, [144+8..863-6]
             00: H for active D1 video, [144..863]      */ if (id == org)  val1 |= 128;
         if ((id >= 148) && (id <= 847))  val1 |= 64;
         if (idt == 75)  val1 |= 16;
         if ((idt >= 503) || (idt <= 72))  val1 |= 8;
         if ((idt >= 73) && (idt <= 502))  val1 |= 4;
         if ((idt >= 152) && (idt <= 857))  val1 |= 2;
```

```
        if ((idt >= 144) && (idt <= 863))  val1 |= 1;

/* U6 for 625
        06: HINT: L in [201..249]
        05: P_1H_RST-1, L at [10]
        04: P_1H_RST-2, L at [10]
        03: P_R_Y-, 388T, L at [10+388]
        02: P_R_C-, 391T, L at [10+391]
        01: BOAV-, L at [260]
        00: AV-, L in [271..799]         */ if (!((id >= 201) && (id <= 249)))  val2 |= 64;
        if (id != 10)   val2 |= 32;
        if (id != 10)   val2 |= 16;
        if (id != 398)  val2 |= 8;
        if (id != 401)  val2 |= 4;
        if (id != 260)  val2 |= 2;
        if (!((id >= 271) && (id <= 799)))  val2 |= 1;
    } else {           /* 525 timing */
        id = (lh525 + j + ofset525) % lh525;
        idt = (lh525 + j + ofset525 - dly525) % lh525;

/* U5 for 525
        07: H_CLK: 1T, H at org
        06: H_ACTIVE: 700T, H for [154,853]
        04: HP: [70]
        03: H for right-half blank, [497..867,0..69]
        02: H for left-half blank, [70..496]
        01: H for active analog video, [138+2..857-2]
        00: H for active D1 video, [138..857]       */ if (id == org)  val1 |= 128;
        if ((id >= 154) && (id <= 853))  val1 |= 64;
        if (idt == 70)  val1 |= 16;
        if ((idt >= 497) || (idt <= 69))  val1 |= 8;
        if ((idt >= 70) && (idt <= 496))  val1 |= 4;
        if ((idt >= 140) && (idt <= 855))  val1 |= 2;
        if ((idt >= 138) && (idt <= 857))  val1 |= 1;

/* U6 for 525
        06: HINT: L in [201..249]
        05: P_1H_RST-1, L at [10]
        04: P_1H_RST-2, L at [10]
        03: P_R_Y-, 388T, L at [10+388]
        02: P_R_C-, 391T, L at [10+391]
        01: BOAV-, L at [260]
        00: AV-, L in [271..799]         */ if (!((id >= 201) && (id <= 249)))  val2 |= 64;
        if (id != 10)   val2 |= 32;
        if (id != 10)   val2 |= 16;
        if (id != 398)  val2 |= 8;
        if (id != 401)  val2 |= 4;
        if (id != 260)  val2 |= 2;
        if (!((id >= 271) && (id <= 799)))  val2 |= 1;
    }
    *ID1++ = val1;
    *ID2++ = val2;
```

```
it */
/ (ofname, OutFileName());  /* ask for output file name */ xPrint(IA1, prom, ofname);
("HexPrint..........%2d\n",i);
xPrint(IA2, PR1, ofname);
("HexPrint..........%2d\n",i);
iteBinFile(IA1, prom);
("WriteBinFile......%2d\n",i);
iteBinFile(IA2, PR1);
("WriteBinFile......%2d\n",i);
```

```
/*--------------------------------------------------------------*/
/*   Main program for PROM code generation                      */
/*         April 1987 (Fortran -> Pascal)                       */
/*         November 1990 (Pascal -> C)       Sohei Takemoto     */
/*                                                              */
/*   PROMDEF.H and PROMLIB.H need to be included                */
/*   NR20B and NR30B boards, DIE125N project, Fall '92          */
/*--------------------------------------------------------------*/ include <stdio.h>
include <stdlib.h>
include <math.h> define MaxWord 2048    /* Max code words */
define LName   80      /* Max length of name string*/
#include "promdef.h"    /* type definitions */
include "promlib.h"    /* library */

/* procedures in PROMLIB.H
        *ToBin, *ToHex, IPower, WordToBinary, WordToHex,
        Input, Limit, Mask, IMask, OnMask, Mply, Roff,
        RToI, Slice, *OutFileName, BinPrint, HexPrint,
        HPrint, WriteBinFile      */ void main()
{
   IntData  IntAry1, IntAry2;   /* integer data array */
   RealData RealAry;            /* real data array */
   SpecTable prom;              /* PROM specifications */
   char     ofname[LName];
   float    coef, max, min;
   int      ibit, fbit, loc, i, j, k, val, nstep;
   int      *ID1, *ID2, *ID3;
   float    *RD1;
   float    fth, ith, fmagic, slope, fmag, lval, fval;

/* define prom specifications */
/* NR Y threshold level control: 2Kx8
      input:
        A10..7: 4-bit NR threshold level selection
                '0' is special to map anything to 127
                '15' is special to map anything to 0
        A6..0 : 7-bit processed motion data, positive only
      output:
        07    : not used
        06..0 : 7-bit data, positive only, [0,127]    */ prom.Kbit = 11;      /* no. of bits for address input */
   prom.Kmod = 8;       /* no. of bits for PROM module output, <=16 */
   prom.Kic  = 8;       /* no. of bits for PROM chip output, <=8 */
   prom.Stadrs = 0;     /* input start address */
   prom.Ioffset = 0;    /* (input value)=(address)+ioffset */
   prom.Nword = IPower(2, prom.Kbit); /* no. of words to generate */
   prom.Csbit = 16;     /* bit length of check-sum data */ strcpy(prom.FNames[1], "N30_M13A.Bin");
   strcpy(prom.PNames[1], "NR Y threshold level control, U8");
```

```
/* generate prom code */ fmagic = 1.296;      /* magic number to make step-size */
  slope = 6.0;         /* tangent of transition */
  nstep = 15;          /* no. of steps other than NR=0 */

ID1 = IntAry1;
  for (i = 0; i <= nstep; i++) {      /* nstep+1 LUTs to generate */
    fth = 2 * (pow(fmagic, i) - 1.0); /* i-th threshold value */
    for (j = 0; j < 128; j++, ID1++) { /* [0,127] -> [0,127] */
      lval = j;
      if (lval < fth)  val = 0;
      else  val = (lval - fth) * slope + 0.5;
      if (val > 127)  val = 127;
      if (i == 0) val = 127;
      if (i == nstep) val = 0;
      *ID1 = val;
    }
  }

/* Output */
  strcpy (ofname, OutFileName());  /* ask for output file name */ i = HexPrint(IntAry1, prom, ofname);
  printf("HexPrint..........%2d\n",i);
  i = WriteBinFile(IntAry1, prom);
  printf("WriteBinFile......%2d\n",i);
}
```

```c
/*--------------------------------------------------------------*/
/*   Main program for PROM code generation                      */
/*        April 1987 (Fortran -> Pascal)                        */
/*        November 1990 (Pascal -> C)         Sobei Takemoto    */
/*                                                              */
/*     PROMDEF.H and PROMLIB.H need to be included              */
/*     NR20B and NR30B boards, DIR125N project, Fall '92        */
/*--------------------------------------------------------------*/ include <stdio.h>
include <stdlib.h>
include <math.h> define MaxWord 2048  /* Max code words */
define LName    80   /* Max length of name string*/
#include "promdef.h"  /* type definitions */
#include "promlib.h"  /* library */

/* procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile       */ float NFLevel(float nfmax, float pwr, float n, float k)
   /* Noise reduction level for k-th step in n steps
        nfmax : maximum NR (db) to reach
                NF = 2K-1 db, unweighted
        pwr   : power factor to define a non-linear curve in db
        n     : total number of steps
        k     : current step number to find the NF factor
          nf = nfmax * pow(k / n, pwr)        */
   {
      float nf;
      if (k == 0)  nf = 0.0;
      else
         nf = nfmax * pow(k / n, pwr);
      return nf;
   } void main()
{
   IntData IntAry1, IntAry2;   /* integer data array */
   RealData RealAry;           /* real data array */
   SpecTable prom;             /* PROM specifications */
   char    ofname[LName];
   float   coef, max, min;
   int     ibit, fbit, loc, i, j, k, val, nstep;
   int     *ID1, *ID2, *ID3;
   float   *RD1;
   float   nrlimit, nrmax, pwr, nrl, lval, fval;

/* define prom specifications */
/* Y NR level control, KY LUTs: 2Kx8
     input:
        A10..7: 4-bit NR level selection
        A6..0 : 7-bit processed motion data, positive only
```

```
     output:
        07..0 : 8-bit data, negative 2's complement only
               [128..255,0] as KC in [-1.0,0.0]
   Non-linearity may be introduced by 'NFLevel'
   NR level may be limited to 'nrlimit'                */ prom.Kbit = 11;      /* no. of bits for address input */
   prom.Kmod = 8;       /* no. of bits for PROM module output, <=16 */
   prom.Kic = 8;        /* no. of bits for PROM chip output, <=8 */
   prom.Stadrs = 0;     /* input start address */
   prom.Ioffset = 0;    /* (input value)=(address)+ioffset */
   prom.Nword = IPower(2, prom.Kbit); /* no. of words to generate */
   prom.Csbit = 16;     /* bit length of check-sum data */ strcpy(prom.PNames[1], "N30_M14A.Bin");
   strcpy(prom.PNames[1], "Y NR level control, KY LUTs, U10");

/* generate prom code */ nrmax = 15.0;        /* maximum NR level, db un-weighted */
   nrlimit = 15.0;      /* limiting NR level */
   nstep = 15;          /* no. of steps other than NR=0 */
   pwr = 1.0;           /* if not 1.0, non-linear step */

ID1 = IntAry1;
   for (i = 0; i <= nstep; i++) {      /* nstep+1 LUTs to generate */
      nrl = NFLevel(nrmax, pwr, nstep, i);
      printf("pwr, i and nrl %f %2d %8.3f\n", pwr, i, nrl);
      if (nrl > nrlimit) nrl = nrlimit;
      lval = 128 * 2 / (pow(10, nrl / 10) + 1);
      for (j = 0; j < 128; j++, ID1++) { /* [0,127] -> [-128,0] */
         fval = j * 128.0 / 127.0;
         if (fval < lval)  fval = lval;
         val = fval + 0.5;
         if (val > 128) val = 128;
         *ID1 = -val;
      }
   }

/* Output */
   strcpy (ofname, OutFileName());  /* ask for output file name */ i = HexPrint(IntAry1, prom, ofname);
   printf("HexPrint..........%2d\n",i);
   i = WriteBinFile(IntAry1, prom);
   printf("WriteBinFile......%2d\n",i);
}
```

```c
/*----------------------------------------------------------*/
/*   Main program for PROM code generation                  */
/*       April 1987 (Fortran -> Pascal)                     */
/*       November 1990 (Pascal -> C)         Sobei Takemoto */
/*                                                          */
/*   PROMDEF.H and PROMLIB.H need to be included            */
/*   NR20B and NR30B boards, DIE125N project, Fall '92      */
/*----------------------------------------------------------*/ include <stdio.h>
include <stdlib.h>
include <math.h> define MaxWord 2048   /* Max code words */
define LName   80     /* Max length of name string*/
#include "promdef.h"   /* type definitions */
include "promlib.h"   /* library */

/* procedures in PROMLIB.H
         *ToBin, *ToHex, IPower, WordToBinary, WordToHex,
         Input, Limit, Mask, IMask, UnMask, Mply, Roff,
         RToI, Slice, *OutFileName, BinPrint, HexPrint,
         HPrint, WriteBinFile      */ void main()
{
   IntData IntAry1, IntAry2;   /* integer data array */
   RealData RealAry;           /* real data array */
   SpecTable prom;             /* PROM specifications */
   char     ofname[LName];
   float    coef, max, min, mag;
   int      ibit, fbit, loc, i, j, k, val, ilimit;
   int      *ID1, *ID2, *ID3;
   float    *RD1;
   float    a_coef[4] = {1.0, 0.7, 0.4, 0.6};

/* define prom specifications */
/* C difference rectifier
     input:
       A10..A9: mode selection
       A8..0 : 9-bit difference data, pos/neg 2's complement
     output:
       O7..0 : 8-bit absolute value
               limited to 32 (NR3 used 63)        */ prom.Kbit = 11;       /* no. of bits for address input */
   prom.Kmod = 8;        /* no. of bits for PROM module output, <=16 */
   prom.Kic  = 8;        /* no. of bits for PROM chip output, <=8 */
   prom.Stadrs = 0;      /* input start address */
   prom.Ioffset = 0;     /* (input value)=(address)+ioffset */
   prom.Nword = IPower(2, prom.Kbit); /* no. of words to generate */
   prom.Csbit = 16;      /* bit length of check-sum data */ strcpy(prom.FNames[1], "N30_M15A.Bin");
   strcpy(prom.PNames[1], "C difference rectifier and limiter, U18");

/* generate prom code */
/* ??? make sure that values in a_coef are right */
```

```
    ilimit = 82;
    ID1 = IntAry1;
    for (j = 0; j < 4; j++) {
      coef = a_coef[j];
      for (i = 0; i < prom.Nword / 4; i++) {
        val = i;
        if (i >= 256)  val = 512 - i;   /* negative value */
        val = coef * val + 0.5;
        if (val > ilimit)  val = ilimit;    /* clip to ilimit */
        *ID1++ = val;
      }
    }

/* Output */
    strcpy (ofname, OutFileName());   /* ask for output file name */ i = HexPrint(IntAry1, prom, ofname);
    printf("HexPrint..........%2d\n",i);
    i = WriteBinFile(IntAry1, prom);
    printf("WriteBinFile......%2d\n",i);
}
```

```
/*-----------------------------------------------------------*/
/*    Main program for PROM code generation                  */
/*        April 1987 (Fortran -> Pascal)                     */
/*        November 1990 (Pascal -> C)      Sobei Takemoto    */
/*                                                           */
/*    PROMDEF.H and PROMLIB.H need to be included            */
/*    NR20B and NR30B boards, DIR125M project, Fall '92      */
/*-----------------------------------------------------------*/ include <stdio.h>
include <stdlib.h>
include <math.h> define MaxWord 2048    /* Max code words */
define LName   80      /* Max length of name string*/
#include "promdef.h"    /* type definitions */
include "promlib.h"    /* library */

/*  procedures in PROMLIB.H
            *ToBin, *ToHex, IPower, WordToBinary, WordToHex,
            Input, Limit, Mask, DMask, UnMask, Mply, Roff,
            RToI, Slice, *OutFileName, BinPrint, HexPrint,
            HPrint, WriteBinFile      */ void main()
{
    IntData    IA1, IA2, IA3;   /* integer data array */
    RealData   RA;              /* real data array */
    SpecTable  prom, PR1, PR2;  /* PROM specifications */
    char       ofname[LName];
    float      coef, max, min;
    int        ibit, fbit, loc, i, j, k;
    int        *ID1, *ID2, *ID3;
    float      *RD1;
    int        ofset525, ofset625, id, val;

/* define prom specifications */
/* Vertical timing, LCTR decoder: 2Kx8; U53
    input:
      A10   : H/L for 525/625 TV system
      A9..0 : 10-bit LCTR output, [0,524] or [0,624]
              "0" vs. line-0 be compensated by ofset525, ofset625
    output:
      07    : VINT
      06    : FLD_CLK
      05    : V_INIT-
      04    : V_ACTIVE
      03..1 : LSEL2..0
      00    : FID                          */ prom.Kbit = 11;         /* no. of bits for address input */
    prom.Kmod = 8;          /* no. of bits for PROM module output, <=16 */
    prom.Kic  = 8;          /* no. of bits for PROM chip output, <=8 */
    prom.Stadrs = 0;        /* input start address */
    prom.Ioffset = 0;       /* (input value)=(address)+ioffset */
    prom.Nword = IPower(2, prom.Kbit);  /* no. of words to generate */
    prom.Csbit = 16;        /* bit length of check-sum data */
```

```
  strcpy(prom.FNames[1], "N30_N16A.Bin");
  strcpy(prom.PNames[1], "V timing, LCTR decoder, U24");

/* generate prom code */ ofset525 = 4;       /* (line-number in 525) - [LCTR] */
  ofset625 = 1;       /* (line-number in 625) - [LCTR] */

ID1 = IA1;

for (i = 0; i < 2; i++) {    /* make 2 LUTs */ for (j = 0; j < 1024; j++, ID1++) {
      val = 160;       /* 07=05=H */ if (i == 0) {    /* 625 timing */
        id = (625 + j + ofset625) % 625;

/* 07: VINT: L in {623..21, 310..334} in [0,624] for 625   */
        if ((id >= 623) || (id >= 0) && (id <= 21))
           val &= -128;         /* field1 VINT */
        if ((id >= 310) && (id <= 334))
           val &= -128;         /* field2 VINT */
    /* 06: FLD_CLK: H in {0,312} in [0,624] for 625   */
        if ((id == 0) || (id == 312))
           val |= 64;
    /* 05: V_INIT-: L in {26,338} in [0,624] for 625   */
        if ((id == 26) || (id == 338))
           val &= -32;
    /* 04: V_ACTIVE: H in {26..305, 338..617} in [0,624] for 625   */
        if ((id >= 26) && (id <= 305))
           val |= 16;
        if ((id >= 338) && (id <= 617))
           val |= 16;
    /* 03..1:LSEL2..0 */
        if ((id >= 623) || (id >= 0) && (id <= 21))
           val |= 6;            /* field1 full-H blank */
        if ((id >= 310) && (id <= 334))
           val |= 6;            /* field2 full-H blank */
        if (id == 622) val |= 2;  /* right-half blank */
        if (id == 22)  val |= 4;  /* left-half blank */
        if ((id >= 19) && (id <= 21))
           val |= 8;            /* field1 VITS */
        if ((id >= 332) && (id <= 334))
           val |= 8;            /* field2 VITS */
    /* 00: FID: H in {312..624} in [0,624] for 625   */
        if ((id >= 312) && (id <= 624))
           val |= 1;
      } /* if 625 timing */ else {           /* 525 timing */
        id = (525 + j + ofset525) % 525;

/* 07: VINT: L in {0..19, 263..281} in [0,524] for 525   */
        if ((id >= 0) && (id <= 19))
           val &= -128;         /* field1 VINT */
        if ((id >= 263) && (id <= 281))
           val &= -128;         /* field2 VINT */
```

```c
        /* 06: FLD_CLK: H in {3,265} in [0,524] for 525 */
            if ((id == 3) || (id == 265))
                val |= 64;
        /* 05: V_INIT-: L in {24,286} in [0,524] for 525 */
            if ((id == 24) || (id == 286))
                val &= -32;
        /* 04: V_ACTIVE: H in {24..258, 286..520} in [0,524] for 525 */
            if ((id >= 24) && (id <= 258))
                val |= 16;
            if ((id >= 286) && (id <= 520))
                val |= 16;
        /* 03..1:LSEL2..0 */
            if ((id >= 0) && (id <= 19))
                val |= 6;           /* field1 full-H blank */
            if ((id >= 263) && (id <= 281))
                val |= 6;           /* field2 full-H blank */
            if (id == 262) val |= 2;    /* right-half blank */
            if (id == 282) val |= 4;    /* left-half blank */
            if ((id >= 16) && (id <= 19))
                val |= 8;           /* field1 VITS */
            if ((id >= 279) && (id <= 282))
                val |= 8;           /* field2 VITS */
        /* 00: FID: H in {265..2} in [0,524] for 525 */
            if ((id >= 265) || (id <= 2))
                val |= 1;
        } /* if 525 timing */

*ID1 = val;
    }
  }

/* Output */
    strcpy (ofname, OutFileName());  /* ask for output file name */ i = HexPrint(IA1, prom, ofname);
    printf("HexPrint..........%2d\n",i);
    i = WriteBinFile(IA1, prom);
    printf("WriteBinFile......%2d\n",i);

}
```

```
/*------------------------------------------------------------*/
/*                                                            */
/*   Main program for PROM code generation                    */
/*        April 1987 (Fortran -> Pascal)                      */
/*        November 1990 (Pascal -> C)      Sobei Takemoto     */
/*                                                            */
/*   PROMDEF.H and PROMLIB.H need to be included              */
/*   MR20B and MR30B boards, DIE125N project, Fall '92        */
/*------------------------------------------------------------*/ include <stdio.h>
include <stdlib.h>
include <math.h> define MaxWord 2048    /* Max code words */
define LName   80      /* Max length of name string*/
#include "promdef.h"    /* type definitions */
include "promlib.h"    /* library */

/*  procedures in PROMLIB.H
            *ToBin, *ToHex, IPower, WordToBinary, WordToHex,
            Input, Limit, Mask, IMask, UnMask, Mply, Roff,
            RToI, Slice, *OutFileName, BinPrint, HexPrint,
            HPrint, WriteBinFile    */ void main()
{
    IntData  IntAry1, IntAry2;  /* integer data array */
    RealData RealAry;           /* real data array */
    SpecTable prom;             /* PROM specifications */
    char     ofname[LName];
    float    coef, max, min, mag;
    int      ibit, fbit, loc, i, j, k, val, ilimit;
    int      *ID1, *ID2, *ID3;
    float    *RD1;
    float    a_coef[4] = {1.0, 0.7, 0.4, 0.6};

/* define prom specifications */
/* Y difference rectifier
     input:
       A10..A9: mode selection
              {00,01,10,11} for {A1,A2,A3,manual}
       A8..0 : 9-bit difference data, pos/neg 2's complement
     output:
       O7..0 : 8-bit absolute value
              limited to 42                      */ prom.Kbit = 11;      /* no. of bits for address input */
    prom.Kmod = 8;       /* no. of bits for PROM module output, <=16 */
    prom.Kic  = 8;       /* no. of bits for PROM chip output, <=8 */
    prom.Stadrs = 0;     /* input start address */
    prom.Ioffset = 0;    /* (input value)=(address)+ioffset */
    prom.Nword = IPower(2, prom.Kbit);  /* no. of words to generate */
    prom.Csbit = 16;     /* bit length of check-sum data */ strcpy(prom.FNames[1], "M30_M17A.Bin");
    strcpy(prom.PNames[1], "Y difference rectifier and limiter, U38");

/* generate prom code */
```

```
/* ??? make sure that values in a_coef are right */ ilimit = 42;
  ID1 = IntAry1;
  for (j = 0; j < 4; j++) {
    coef = a_coef[j];
    for (i = 0; i < prom.Nword / 4; i++) {
      val = i;
      if (i >= 256) val = 512 - i;   /* negative value */
      val = coef * val + 0.5;
      if (val > ilimit) val = ilimit;    /* clip to ilimit */
      *ID1++ = val;
    }
  }

/* Output */
  strcpy (ofname, OutFileName());  /* ask for output file name */ i = HexPrint(IntAry1, prom, ofname);
  printf("HexPrint..........%2d\n",i);
  i = WriteBinFile(IntAry1, prom);
  printf("WriteBinFile......%2d\n",i);
}
```

```
/*----------------------------------------------------------------*/
/*   Main program for PROM code generation                        */
/*       April 1987 (Fortran -> Pascal)                           */
/*       November 1990 (Pascal -> C)        Sohei Takemoto        */
/*                                                                */
/*    PROMDEF.H and PROMLIB.H need to be included                 */
/*    NR20B and NR30B boards, DIE125N project, Fall '92           */
/*----------------------------------------------------------------*/ include <stdio.h>
include <stdlib.h>
include <math.h> define MaxWord 2048    /* Max code words */
define LName    80     /* Max length of name string*/
#include "promdef.h"    /* type definitions */
include "promlib.h"    /* library */

/*  procedures in PROMLIB.H
          *ToBin, *ToHex, IPower, WordToBinary, WordToHex,
          Input, Limit, Mask, IMask, UnMask, Mply, Roff,
          RToI, Slice, *OutFileName, BinPrint, HexPrint,
          HPrint, WriteBinFile       */ void main()
{
   IntData    IntAry1, IntAry2;   /* integer data array */
   RealData   RealAry;            /* real data array */
   SpecTable  prom;               /* PROM specifications */
   char       ofname[LName];
   float      coef, max, min, mag, fval;
   int        ibit, fbit, loc, i, j, k, val, pos, inmax, limit;
   int        *ID1, *ID2, *ID3;
   float      *RD1;
   float      MaxGain, MinGain, gain, fstep;

/* define prom specifications */
/* Y pos/neg asymmetry LUTs: 2Kx8
      input:
        A10   : H/L for pos/neg selection
        A9..6 : Y amplitude, pos/neg, 4-bit MSP
        A5..0 : 6-bit Y difference, pos only
      output:
        O7..0 : 8-bit data
                out = less for black and more for white  if A10=H
                out = more for black and less for white ,if A10=L
                also limit to 42                                  */ prom.Kbit = 11;     /* no. of bits for address input */
   prom.Kmod = 8;      /* no. of bits for PROM module output, <=16 */
   prom.Kic  = 8;      /* no. of bits for PROM chip output, <=8 */
   prom.Stadrs = 0;    /* input start address */
   prom.Ioffset = 0;   /* (input value)=(address)+ioffset */
   prom.Nword = IPower(2, prom.Kbit);   /* no. of words to generate */
   prom.Csbit = 16;    /* bit length of check-sum data */ strcpy(prom.FNames[1], "N30_M18A.Bin");
   strcpy(prom.PNames[1], "Y pos/neg assymetry and limit, U60");
```

```c
/* generate prom code */

MaxGain = 1.5;
   MinGain = 0.5;
   fstep   = 15.0;
   imax    = 64;     /* maximum limit of input value */
   limit   = 42;     /* maximum limit of output value */

ID1 = IntAry1;
   for (i = 0; i < 32; i++) {        /* 32 LUTs to generate */
      pos = i >> 4 & 1;              /* if 1, white enhancement */
      mag = (i & 15) ^ 8;            /* Y AMP to natural binary */
      if (pos)
         gain = (MaxGain - MinGain) * (mag / fstep) + MinGain;
      else
         gain = MaxGain - (MaxGain - MinGain) * (mag / fstep);

for (j = 0; j < imax; j++) {
         val = j * gain + 0.5;
         if (val > limit )  val = limit;      /* limit to limit */
         *ID1++ = val;
      }
   }

/* Output */
   strcpy (ofname, OutFileName());  /* ask for output file name */ i = HexPrint(IntAry1, prom, ofname);
   printf("HexPrint..........%2d\n",i);
   i = WriteBinFile(IntAry1, prom);
   printf("WriteBinFile......%2d\n",i);
}
```

```
/*----------------------------------------------------------*/
/*    Main program for PROM code generation                 */
/*         April 1987 (Fortran -> Pascal)                   */
/*         November 1990 (Pascal -> C)      Sohei Takemoto  */
/*                                                          */
/*    PROMDEF.H and PROMLIB.H need to be included           */
/*    MR20B and MR30B boards, DIK125M project, Fall '92     */
/*----------------------------------------------------------*/ include <stdio.h>
include <stdlib.h>
include <math.h> define MaxWord 2048    /* Max code words */
define LName   80      /* Max length of name string*/
#include "promdef.h"    /* type definitions */
include "promlib.h"    /* library */

/* procedures in PROMLIB.H
         *ToBin, *ToHex, IPower, WordToBinary, WordToHex,
         Input, Limit, Mask, IMask, UnMask, Mply, Roff,
         RToI, Slice, *OutFileName, BinPrint, HexPrint,
         HPrint, WriteBinFile       */ void main()
{
   IntData  IntAry1, IntAry2;   /* integer data array */
   RealData RealAry;            /* real data array */
   SpecTable prom;              /* PROM specifications */
   char     ofname[LName];
   float    coef, max, min;
   int      ibit, fbit, loc, i, j, k, val, nstep;
   int      *ID1, *ID2, *ID3;
   float    *RD1;
   float    fth, ith, fmagic, slope, fmag, lval, fval;

/* define prom specifications */
/* MR C threshold level control: 2Kx8
     input:
        A10..7: 4-bit MR threshold level selection
                '0' is special to map anything to 127
                '15' is special to map anything to 0
        A6..0 : 7-bit processed motion data, positive only
     output:
        O7    : not used
        O6..0 : 7-bit data, positive only, [0,127]     */ prom.Kbit = 11;       /* no. of bits for address input */
   prom.Kmod = 8;        /* no. of bits for PROM module output, <=16 */
   prom.Kic  = 8;        /* no. of bits for PROM chip output, <=8 */
   prom.Stadrs = 0;      /* input start address */
   prom.Ioffset = 0;     /* (input value)=(address)+ioffset */
   prom.Nword = IPower(2, prom.Kbit);  /* no. of words to generate */
   prom.Csbit = 16;      /* bit length of check-sum data */ strcpy(prom.FNames[1], "M30_M19A.Bin");
   strcpy(prom.PNames[1], "MR C threshold level control, U84");
```

```c
/* generate prom code */ fmagic = 1.296;      /* magic number to make step-size */
  slope = 6.0;         /* tangent of transition */
  nstep = 15;          /* no. of steps other than NR=0 */

ID1 = IntAry1;
  for (i = 0; i <= nstep; i++) {        /* nstep+1 LUTs to generate */
     fth = 2 * (pow(fmagic, i) - 1.0);  /* i-th threshold value */
     for (j = 0; j < 128; j++, ID1++) { /* [0,127] -> [0,127] */
        lval = j;
        if (lval < fth)  val = 0;
        else  val = (lval - fth) * slope + 0.5;
        if (val > 127)  val = 127;
        if (i == 0) val = 127;
        if (i == nstep) val = 0;
        *ID1 = val;
     }
  }

/* Output */
  strcpy (ofname, OutFileName());  /* ask for output file name */ i = HexPrint(IntAry1, prom, ofname);
  printf("HexPrint..........%2d\n",i);
  i = WriteBinFile(IntAry1, prom);
  printf("WriteBinFile......%2d\n",i);
}
```

```c
/*----------------------------------------------------------*/
/*  Main program for PROM code generation                   */
/*       April 1987 (Fortran -> Pascal)                     */
/*       November 1990 (Pascal -> C)     Sohei Takemoto     */
/*                                                          */
/*    PROMDEF.H and PROMLIB.H need to be included           */
/*    NR20B and NR30B boards, DIK125M project, Fall '92     */
/*----------------------------------------------------------*/ include <stdio.h>
include <stdlib.h>
include <math.h> define MaxWord 2048    /* Max code words */
define LName   80      /* Max length of name string*/
#include "promdef.h"    /* type definitions */
include "promlib.h"    /* library */

/*  procedures in PROMLIB.H
        *ToBin, *ToHex, IPower, WordToBinary, WordToHex,
        Input, Limit, Mask, IMask, OnMask, Mply, Roff,
        RToI, Slice, *OutFileName, BinPrint, HexPrint,
        HPrint, WriteBinFile      */ float NFLevel(float nfmax, float pwr, float n, float k)
  /* Noise reduction level for k-th step in n steps
        nfmax : maximum NR (db) to reach
                NF = 2K-1  db, unweighted
        pwr   : power factor to define a non-linear curve in db
        n     : total number of steps
        k     : current step number to find the NF factor
          nf = nfmax * pow(k / n, pwr)        */
  {
    float  nf;
    if (k == 0)  nf = 0.0;
    else
       nf = nfmax * pow(k / n, pwr);
    return nf;
  } void main()
{
  IntData  IntAry1, IntAry2;    /* integer data array */
  RealData RealAry;             /* real data array */
  SpecTable prom;               /* PROM specifications */
  char      ofname[LName];
  float     coef, max, min;
  int       ibit, fbit, loc, i, j, k, val, nstep;
  int       *ID1, *ID2, *ID3;
  float     *RD1;
  float     nrlimit, nrmax, pwr, nrl, lval, fval;

/* define prom specifications */
/* C NR level control, KC LUTs: 2Kx8
    input:
      A10..7: 4-bit NR level selection
      A6..0 : 7-bit processed motion data, positive only
```

```
                output:
                    O7..0 : 8-bit data, negative 2's complement only
                            [128..255,0] as KC in [-1.0,0.0]
                  Non-linearity may be introduced by 'NFLevel'
                  NR level may be limited to 'nrlimit'          */ prom.Kbit = 11;      /* no. of bits for address input */
    prom.Kmod = 8;       /* no. of bits for PROM module output, <=16 */
    prom.Kic = 8;        /* no. of bits for PROM chip output, <=8 */
    prom.Stadrs = 0;     /* input start address */
    prom.Ioffset = 0;    /* (input value)=(address)+ioffset */
    prom.Nword = IPower(2, prom.Kbit);  /* no. of words to generate */
    prom.Csbit = 16;     /* bit length of check-sum data */ strcpy(prom.FNames[1], "N30_N20A.Bin");
    strcpy(prom.PNames[1], "C NR level control, KC LUTs, U86");

/* generate prom code */ nrmax = 15.0;        /* maximum NR level, db un-weighted */
    nrlimit = 15.0;      /* limiting NR level */
    nstep = 15;          /* no. of steps other than NR=0 */
    pwr = 1.0;           /* if not 1.0, non-linear step */

ID1 = IntAry1;
    for (i = 0; i <= nstep; i++) {       /* nstep+1 LUTs to generate */
        nrl = NFLevel(nrmax, pwr, nstep, i);
        printf("pwr, i and nrl %f %2d %8.3f\n", pwr, i, nrl);
        if (nrl > nrlimit) nrl = nrlimit;
        lval = 128 * 2 / (pow(10, nrl / 10) + 1);
        for (j = 0; j < 128; j++, ID1++) {  /* [0,127] -> [-128,0] */
            fval = j * 128.0 / 127.0;
            if (fval < lval)  fval = lval;
            val = fval + 0.5;
            if (val > 128) val = 128;
            *ID1 = -val;
        }
    }

/* Output */
    strcpy (ofname, OutFileName());  /* ask for output file name */ i = HexPrint(IntAry1, prom, ofname);
    printf("HexPrint.........%2d\n",i);
    i = WriteBinFile(IntAry1, prom);
    printf("WriteBinFile.....%2d\n",i);
}
```

```
/*--------------------------------------------------------------*/
/*   Main program for PROM code generation                      */
/*         April 1987 (Fortran -> Pascal)                       */
/*         November 1990 (Pascal -> C)       Sohei Takemoto     */
/*                                                              */
/*      PROMDEF.H and PROMLIB.H need to be included             */
/*      HR20B and HR30B boards, DIR125M project, Fall '92       */
/*--------------------------------------------------------------*/ include <stdio.h>
include <stdlib.h>
include <math.h> define MaxWord 2048    /* Max code words */
define LName   80      /* Max length of name string*/
#include "promdef.h"    /* type definitions */
include "promlib.h"    /* library */

/*   procedures in PROMLIB.H
         *ToBin, *ToHex, IPower, WordToBinary, WordToHex,
         Input, Limit, Mask, IMask, UnMask, Mply, Roff,
         RToI, Slice, *OutFileName, BinPrint, HexPrint,
         HPrint, WriteBinFile      */ void main()
{
   IntData IntAry1, IntAry2;   /* integer data array */
   RealData RealAry;           /* real data array */
   SpecTable prom;             /* PROM specifications */
   char    ofname[LName];
   float   coef, max, min, mag, ATT;
   int     ibit, fbit, loc, i, j, k, val, sign, ilimit;
   int     *ID1, *ID2, *ID3;
   float   *RD1;
   float   A_ATT [4] = {1.0, 0.7, 0.4, 0.6};

/* define prom specifications */
/* Y difference rectifier/attenuator/limiter, U176,U177,U180
      input:
         A10..A9: mode selection
                  (00,01,10,11) for {A1,A2,A3,manual}
         A8..0 : 9-bit difference data, pos/neg 2's complement
                 A8 is inversed sign bit
                    if 1, positive A7..A0
                    if 0, negative 2's complement
      output:
         O7..0 : 8-bit absolute value
                 attenuated by factor ATT and
                 limited to 42                     */ prom.Kbit = 11;      /* no. of bits for address input */
   prom.Kmod = 8;       /* no. of bits for PROM module output, <=16 */
   prom.Kic = 8;        /* no. of bits for PROM chip output, <=8 */
   prom.Stadrs = 0;     /* input start address */
   prom.Ioffset = 0;    /* (input value)=(address)+ioffset */
   prom.Nword = IPower(2, prom.Kbit);  /* no. of words to generate */
   prom.Csbit = 16;     /* bit length of check-sum data */ strcpy(prom.FNames[1], "H30_M21A.Bin");
```

```c
    strcpy(prom.PNames[1], "Y difference rectifier and limiter");

/* generate prom code */
/* ??? make sure that values in A_ATT are right */ ilimit = 42;
  ID1 = IntAry1;
  for (j = 0; j < 4; j++) {
    ATT = A_ATT [j];
    for (i = 0; i < prom.Nword / 4; i++) {
      val = i;
      if (i < 256)  val = 256 - i;   /* negative value */
      else val -= 256;               /* positive value */
      val = ATT * val + 0.5;
      if (val > ilimit)  val = ilimit;    /* clip to ilimit */
      *ID1++ = val;
    }
  }

/* Output */
  strcpy (ofname, OutFileName());  /* ask for output file name */ i = HexPrint(IntAry1, prom, ofname);
  printf("HexPrint..........%2d\n",i);
  i = WriteBinFile(IntAry1, prom);
  printf("WriteBinFile......%2d\n",i);
}
```

```c
/*------------------------------------------------------------------*/
/*    Main program for PROM code generation                         */
/*         April 1987 (Fortran -> Pascal)                           */
/*         November 1990 (Pascal -> C)       Sohei Takemoto         */
/*                                                                  */
/*    PROMDEF.H and PROMLIB.H need to be included                   */
/*    MR20B and MR30B boards, DIE125M project, Fall '92             */
/*------------------------------------------------------------------*/ include <stdio.h>
include <stdlib.h>
include <math.h> define MaxWord 4096    /* Max code words */
define LName   80      /* Max length of name string*/
#include "promdef.h"    /* type definitions */
include "promlib.h"    /* library */

/*   procedures in PROMLIB.H
          *ToBin, *ToHex, IPower, WordToBinary, WordToHex,
          Input, Limit, Mask, IMask, UnMask, Mply, Roff,
          RToI, Slice, *OutFileName, BinPrint, HexPrint,
          HPrint, WriteBinFile      */ void main()
{
   IntData IntAry1, IntAry2;    /* integer data array */
   RealData RealAry;            /* real data array */
   SpecTable prom;              /* PROM specifications */
   char    ofname[LName];
   float   coef, max, min;
   int     ibit, fbit, loc, i, j, k, val, nstep, th1, th2, lval;
   int     *ID1, *ID2, *ID3;
   float   *RD1;
   float   fm11, fm12, fm21, fm22, fval;

/* define prom specifications */
/* median filter, field motion measurement, threshold control: 4Kx4
   Rev-B: better range for M05A LUT, 8/3/92
     input:
       A11..8: 4-bit motion threshold level selection
       A7..0 : 8-bit processed motion level data, positive only
     output:
       O3..2 : not used
       O1    : 0 for type-2 motion validation
       O0    : 0 for type-1 motion validation
               O0=0, O1=1 if motion_level < threshold_level
               O0=1, O1=0 otherwise
            special conditions:
              1. O0 is always 1 in 16-th LUT            */ prom.Kbit = 12;       /* no. of bits for address input */
   prom.Kmod = 4;        /* no. of bits for PROM module output, <=16 */
   prom.Kic  = 4;        /* no. of bits for PROM chip output, <=8 */
   prom.Stadrs = 0;      /* input start address */
   prom.Ioffset = 0;     /* (input value)=(address)+ioffset */
   prom.Nword = IPower(2, prom.Kbit);  /* no. of words to generate */
   prom.Csbit = 16;      /* bit length of check-sum data */
```

```
    strcpy(prom.FNames[1], "M30_M22A.Bin");
    strcpy(prom.PNames[1], "MF, motion measure, threshold control, 0185");

/* generate prom code */ fm11 = 1.152000625;
    fm21 = 4.0;       /* fm21*(fm11**14-1)=25, for type-1 */
    fm12 = 1.320533181;
    fm22 = 4.0;       /* fm22*(fm12**15-1)=255, for type-2 */
    nstep = 15;       /* no. of steps other than NR=0 */

ID1 = IntAry1;
    for (i = 0; i <= nstep; i++) {      /* nstep+1 LUTs to generate */
       th1 = i;                         /* threshold value */
       if (i == nstep) th1 = 256;       /* special condition-1 */
       th2 = fm22 * (pow(fm12, i) - 1.0) + 0.5; /* threshold value */
       for (j = 0; j < 256; j++, ID1++) {    /* [0,255] -> [1 or 2] */
          lval = j;
          val = 0;
          if (lval < th1)  val |= 2;    /* O1=0,O2=1 */
          else  val |= 1;               /* O1=1,O2=0 */
          *ID1 = val;
       }
    }

/* Output */
    strcpy (ofname, OutFileName());  /* ask for output file name */ i = HexPrint(IntAry1, prom, ofname);
    printf("HexPrint..........%2d\n",i);
    i = WriteBinFile(IntAry1, prom);
    printf("WriteBinFile......%2d\n",i);
}
```

```c
/*----------------------------------------------------------------*/
/*    Main program for PROM code generation                       */
/*         April 1987 (Fortran -> Pascal)                         */
/*         November 1990 (Pascal -> C)        Sohei Takemoto      */
/*                                                                */
/*    PROMDEF.H and PROMLIB.H need to be included                 */
/*    NR20B and NR30B boards, DIR125M project, Fall '92           */
/*----------------------------------------------------------------*/ include <stdio.h>
include <stdlib.h>
include <math.h> define MaxWord 4096   /* Max code words */
define LName   80     /* Max length of name string*/
#include "promdef.h"   /* type definitions */
include "promlib.h"   /* library */

/*   procedures in PROMLIB.H
          *ToBin, *ToHex, IPower, WordToBinary, WordToHex,
          Input, Limit, Mask, IMask, UnMask, Mply, Roff,
          RToI, Slice, *OutFileName, BinPrint, HexPrint,
          HPrint, WriteBinFile      */ void main()
{
   IntData  IntAry1, IntAry2;   /* integer data array */
   RealData RealAry;            /* real data array */
   SpecTable prom;              /* PROM specifications */
   char     ofname[LName];
   float    coef, max, min;
   int      ibit, fbit, loc, i, j, k, val, nstep, fth;
   int      *ID1, *ID2, *ID3;
   float    *RD1;
   float    ith, fmagic1, fmagic2, slope, fmag, lval, fval;

/* define prom specifications */
/* median filter, two-frame motion threshold control: 4Kx4
     input:
       A11..8: 4-bit motion threshold level selection
       A7..0 : 8-bit processed motion data, positive only
     output:
       O3..1 : not used
       O0    : 1/0 for median filter enable/disable     */ prom.Kbit = 12;     /* no. of bits for address input */
   prom.Kmod = 4;      /* no. of bits for PROM module output, <=16 */
   prom.Kic  = 4;      /* no. of bits for PROM chip output, <=8 */
   prom.Stadrs = 0;    /* input start address */
   prom.Ioffset = 0;   /* (input value)=(address)+ioffset */
   prom.Nword = IPower(2, prom.Kbit);  /* no. of words to generate */
   prom.Csbit = 16;    /* bit length of check-sum data */ strcpy(prom.FNames[1], "N30_M23A.Bin");
   strcpy(prom.PNames[1], "MF, motion threshold control, U190");

/* generate prom code */
```

```
    fmagic1 = 1.320533181;
    fmagic2 = 4.0;         /* fmagic2*(fmagic1**15-1)=255 */
    nstep = 15;            /* no. of steps other than MR=0 */

ID1 = IntAry1;
    for (i = 0; i <= nstep; i++) {        /* nstep+1 LUTs to generate */
       fth = fmagic2 * (pow(fmagic1, i) - 1.0) + 0.5; /* threshold value */
       printf ("I = %2d,  Thld = %3d \n", i, fth);
       for (j = 0; j < 256; j++, ID1++) { /* [0,255] -> [0 or 1] */
          lval = j;
          if (lval <= fth)  val = 1;    /* MP enable */
          else  val = 0;                /* MP disable */
          *ID1 = val;
       }
    }

/* Output */
    strcpy (ofname, OutFileName());  /* ask for output file name */ i = HexPrint(IntAry1, prom, ofname);
    printf("HexPrint..........%2d\n",i);
    i = WriteBinFile(IntAry1, prom);
    printf("WriteBinFile......%2d\n",i);
 }
```

MODULE N30_L01_A flag '-r3'
TITLE '10-Bit binary counter with reset
NR30B, copied from ICM4224 Keyer
Sohei Takemoto    12/28/90, 3/15/91, 4/1/92, 9/24/92'

"DESCRIPTION

"This is 10-bit binary counter, experimental design
"T04A: edge sensitive reset
*       HID line count with FID reset
*       13.5MHz pixel count with HID reset
"L04A: 3/15/91 for U131, pixel counter
"L01A: 4/1/92 for NR30 U17 PCTR
"L01A: 9/24/92 for NR30 Rev-B

* 1. Assume that clear pulse width is less than 512 clock cycles.
*       (for stable count cycle)
* 2. Assume that any one count cycle is longer than 512 clock cycles.
*       (for eventual detection of clear pulse edge)
* No cell is available to detect the desired edge of the clear pulse,
*   thus a logical combination such as (esel & clear & Q9) is used to
*   fill in for the desired edge. Therefore, reset pulses may reflect
*   not clear pulse edge but Q9 positive edge. But this makes one count
*   cycle of 512 clocks which is shorter than the clear cycle. Hence
*   reset points eventually move to the desired edge of the clear pulse.
*
* inputs are,
*   clk     : 13.5MHz
*   clear   : HID (FID) reset with positive edge
* outputs are,
*   Q[0..9] : 10-bit count bits
*

"DECLARATIONS

N30_L01A    device  'P22V10';

clk,clear               pin 1,2;
    Q0,Q1,Q2,Q3,Q4          pin 23,22,21,20,19;
    Q9,Q8,Q7,Q6,Q5          pin 14,15,16,17,18;

Q0,Q1,Q2,Q3,Q4,Q5,Q6,Q7,Q8    ISTYPE  'neg';

C,X,Z,H,L   =   .C.,.X.,.Z.,1,0;
    CTR         =   [Q9..Q0];
    CAny        =   [X,X,X,X,X,X,X,X,X,X];

EQUATIONS
    Q0  :=  !(clear & Q9)
          & !Q0;
    Q1  :=  !(clear & Q9)
          & (Q1 & !Q0 # !Q1 & Q0);
    Q2  :=  !(clear & Q9)
          & (Q2 & (!Q1 # !Q0) # !Q2 & Q1 & Q0);
    Q3  :=  !(clear & Q9)
          & (Q3 & (!Q2 # !Q1 # !Q0) # !Q3 & Q2 & Q1 & Q0);
    Q4  :=  !(clear & Q9)
          & (Q4 & (!Q3 # !Q2 # !Q1 # !Q0) # !Q4 & Q3 & Q2 & Q1 & Q0);
    Q5  :=  !(clear & Q9)
          & (Q5 & (!Q4 # !Q3 # !Q2 # !Q1 # !Q0)

```
                    / !Q5 & Q4 & Q3 & Q2 & Q1 & Q0);
        Q6 := !(clear & Q9)
              & (Q6 & (!Q5 / !Q4 / !Q3 / !Q2 / !Q1 / !Q0)
                 / !Q6 & Q5 & Q4 & Q3 & Q2 & Q1 & Q0);
        Q7 := !(clear & Q9)
              & (Q7 & (!Q6 / !Q5 / !Q4 / !Q3 / !Q2 / !Q1 / !Q0)
                 / !Q7 & Q6 & Q5 & Q4 & Q3 & Q2 & Q1 & Q0);
        Q8 := !(clear & Q9)
              & (Q8 & (!Q7 / !Q6 / !Q5 / !Q4 / !Q3 / !Q2 / !Q1 / !Q0)
                 / !Q8 & Q7 & Q6 & Q5 & Q4 & Q3 & Q2 & Q1 & Q0);
        Q9 := !(clear & Q9)
              & (Q9 / !Q9 & Q8 & Q7 & Q6 & Q5 & Q4 & Q3 & Q2 & Q1 & Q0);

TEST_VECTORS
([clk,clear] -> CTR)
[0,1] ->   511;
[C,0] ->   512;
[C,0] ->   513;
[C,0] ->   514;
[C,0] ->   515;
[C,1] ->     0;
[C,1] ->     1;
[C,1] ->     2;
[C,1] ->     3;
[C,1] ->     4;
[C,1] ->     5;
[C,1] ->     6;
[C,1] ->     7;
@REPEAT 10 {[C,1] -> CAny;}
[C,1] ->    18;
[C,1] ->    19;
@REPEAT 12 {[C,1] -> CAny;}
[C,0] ->    32;
"@REPEAT 512 {[C,0] -> CAny;}   too many to repeat
"[C,1] ->    0;
"[C,1] ->    1;
"[C,1] ->    2;
"[C,1] ->    3;
"[C,1] ->    4;
"[C,1] ->    5;
"[C,1] ->    6;
"[C,1] ->    7;

END N30_L01_A++
```

```
          MODULE N30_L02_A flag '-r3'
TITLE '10-Bit binary counter with reset
NR30B, copied from ICM4224 Keyer
Sohei Takemoto    12/28/90, 3/15/91, 4/1/92, 9/24/92'

"DESCRIPTION

"This is 10-bit binary counter, experimental design
"T04A: edge sensitive reset
"      HID line count with FID reset
"      13.5MHz pixel count with HID reset
"L05A: 3/15/91 for U132, line counter
"L02A: 4/1/92 for NR30 U35, LCTR
"L02A: 9/24/92 for NR30 Rev-B " 1. Assume that clear pulse width is less than 512 clock cycles.
"       (for stable count cycle)
" 2. Assume that any one count cycle is longer than 512 clock cycles.
"       (for evantual detection of clear pulse edge)
"   No cell is available to detect the desired edge of the clear pulse,
"     thus a logical combination such as (esel & clear & Q9) is used to
"     fill in for the desired edge. Therefore, reset pulses may reflect
"     not clear pulse edge but Q9 positive edge. But this makes one count
"     cycle of 512 clocks which is shorter than the clear cycle. Hence
"     reset points eventually move to the desired edge of the clear pulse.
"
" inputs are,
"    clk     : HID positive edge
"    clear   : FID reset at negative edge
" outputs are,
"    Q[0..9] : 10-bit count bits
"

"DECLARATIONS

N30_L02A      device   'P22V10';

clk,clear           pin 1,2;
    Q0,Q1,Q2,Q3,Q4      pin 23,22,21,20,19;
    Q9,Q8,Q7,Q6,Q5      pin 14,15,16,17,18;

Q0,Q1,Q2,Q3,Q4,Q5,Q6,Q7,Q8   ISTYPE 'neg';

C,X,Z,H,L    =    .C.,.X.,.Z.,1,0;
    CTR          =    [Q9..Q0];
    CAny         =    [X,X,X,X,X,X,X,X,X,X];

EQUATIONS
    Q0 := !(!clear & Q9)
          & !Q0;
    Q1 := !(!clear & Q9)
          & (Q1 & !Q0 # !Q1 & Q0);
    Q2 := !(!clear & Q9)
          & (Q2 & (!Q1 # !Q0) # !Q2 & Q1 & Q0);
    Q3 := !(!clear & Q9)
          & (Q3 & (!Q2 # !Q1 # !Q0) # !Q3 & Q2 & Q1 & Q0);
    Q4 := !(!clear & Q9)
          & (Q4 & (!Q3 # !Q2 # !Q1 # !Q0) # !Q4 & Q3 & Q2 & Q1 & Q0);
    Q5 := !(!clear & Q9)
          & (Q5 & (!Q4 # !Q3 # !Q2 # !Q1 # !Q0)
```

```
                    / !Q5 & Q4 & Q3 & Q2 & Q1 & Q0);
         Q6  := !(!clear & Q9)
                & (Q6 & (!Q5 / !Q4 / !Q3 / !Q2 / !Q1 / !Q0)
                    / !Q6 & Q5 & Q4 & Q3 & Q2 & Q1 & Q0);
         Q7  := !(!clear & Q9)
                & (Q7 & (!Q6 / !Q5 / !Q4 / !Q3 / !Q2 / !Q1 / !Q0)
                    / !Q7 & Q6 & Q5 & Q4 & Q3 & Q2 & Q1 & Q0);
         Q8  := !(!clear & Q9)
                & (Q8 & (!Q7 / !Q6 / !Q5 / !Q4 / !Q3 / !Q2 / !Q1 / !Q0)
                    / !Q8 & Q7 & Q6 & Q5 & Q4 & Q3 & Q2 & Q1 & Q0);
         Q9  := !(!clear & Q9)
                & (Q9 / !Q9 & Q8 & Q7 & Q6 & Q5 & Q4 & Q3 & Q2 & Q1 & Q0);

TEST_VECTORS
([clk,clear] -> CTR)
[0,X] ->   511;
[C,1] ->   512;
[C,1] ->   513;
[C,1] ->   514;
[C,1] ->   515;
[C,0] ->     0;
[C,0] ->     1;
[C,0] ->     2;
[C,0] ->     3;
[C,0] ->     4;
[C,0] ->     5;
[C,0] ->     6;
[C,0] ->     7;
@REPEAT 10 {[C,0] -> CAny;}
[C,0] ->    18;
[C,0] ->    19;
@REPEAT 12 {[C,0] -> CAny;}
[C,0] ->    32;
"@REPEAT 512 {[C,1] ->   CAny;}    too many to repeat
"[C,0] ->     0;
"[C,0] ->     1;
"[C,0] ->     2;
"[C,0] ->     3;
"[C,0] ->     4;
"[C,0] ->     5;
"[C,0] ->     6;
"[C,0] ->     7;

END N30_L02_A
```

```
            MODULE N30_L03_A flag '-r3'
TITLE 'Composite blanking logic
NR30B
Sohei Takemoto    3/7/92, 4/1/92, 9/24/92 '

"DESCRIPTION

"A: 3/7/92, 4/1/92
"L03A: 9/24/92 C_BLNK modified

"This PLD generates composite blanking pulse.
 *  It takes care of following conditions,
 *    D1 or analog: H and V blanking
 *       (analog H blanking is wider than D1)
 *       (analog V blanking has half-line blanking)
 *    On or off of vertical letter-box blanking
 *       (start and stop line pulse of letter-box is given)
 *
 *  Basic elements are,
 *    1. 3-bit line identification code,
 *         (none, full, left-half and right-half blanking lines)
 *    2. 2-type H blanking pulses, (analog and D1)
 *    3. 2-type half-line blanking pulses, (left and right half)
 *    4. 2-bit line-wide pulses for start and stop of V letter-box
 *    5. 2-bit mode control.
 *
 *  Inputs are,
 *    1. clk: 13.5MHz
 *    2. BTM   : L for the last line of the V letter-box
 *    3. TOP   : L for the first line of the V letter-box
 *    4. LSEL0..2 : 3-bit line identification bits
 *    5. H_AVD  : H for active line period for D1
 *    6. H_AVA  : H for active line period for analog
 *    7. HB_LH  : H for left half-line blanking
 *    8. HB_RH  : H for right half-line blanking
 *    9. A_D-   : H/L for selection of analog/D1 blanking
 *    10. LBOX_EN : H to enable V letter-box blanking
 *    11. HP    : H 1-clock wide line pulse to H-synchronize v-blanking
 *
 *  Outputs are,
 *    1. C_BLNK : H for blank, composite blanking pulse
 *
 *  All the LCTR related timing need H re-clocking to assure accurate
 *  pulse composition of the composite blanking which is abour half
 *  line off from the Reference Sync timing.

"DECLARATIONS

N30_L03A           device    'P22V10';

clk,BTM,TOP                  pin 1,2,3;
    LSEL0,LSEL1,LSEL2            pin 4,5,6;
    H_AVD,H_AVA,HB_LH,HB_RH      pin 7,8,9,10;
    A_D-,LBOX_EN                 PIN 11,13;
    HP                           PIN 14;
    sl0,sl1,sl2                  pin 23,22,21;
    C_BLNK                       pin 17;
    PP_BOX,V_BLNK,H_BLNK         pin 18,19,20;
```

```
HP          ISTYPE    'feed_pin';
C,I,Z,H,L    =        .C. , .I. , .Z. , 1,0;
```

"SET DEFINITIONS

```
EQUATIONS
    sl0      := LSEL0 & HP # !HP & sl0;
    sl1      := LSEL1 & HP # !HP & sl1;
    sl2      := LSEL2 & HP # !HP & sl2;
    FF_BOX   := !TOP & HP
              # !(!TOP & HP # !BTM & HP) & FF_BOX;
    V_BLNK   := !sl2 & sl1 & sl0                      "full-line for D1
              # A_D-                                  "half-line, analog
                & (!sl2 &  sl1 & !sl0 & HB_LH         "left half-line
                 # !sl2 & !sl1 &  sl0 & HB_RH)        "right half-line
              # LBOX_EN & !FF_BOX;                    "V letter-box
    H_BLNK   := A_D- & !H_AVA
              # !A_D- & !H_AVD;
    C_BLNK   := !sl2 & V_BLNK # H_BLNK;      "sl2 is for VITS lines TEST_VECTORS   "test FF_BOX"
 ([clk,HP,!TOP,!BTM] -> FF_BOX)
   [I,I,I,I] -> 0;
   [C,0,0,0] -> 0;
   [C,0,1,0] -> 0;
   [C,1,1,I] -> 1;    "TOP & HP
   [C,0,1,0] -> 1;
   [C,0,0,0] -> 1;
   [C,1,0,0] -> 1;
   [C,0,0,1] -> 1;
   [C,0,0,1] -> 1;
   [C,1,1,0] -> 1;
   [C,0,0,1] -> 1;
   [C,0,0,0] -> 1;
   [C,1,0,0] -> 1;
   [C,0,0,0] -> 1;
   [C,0,0,1] -> 1;
   [C,1,0,1] -> 0;    "BTM & HP
   [C,0,0,1] -> 0;
   [C,0,1,0] -> 0;
   [C,1,0,0] -> 0;
   [C,0,0,0] -> 0;
   [C,0,1,0] -> 0;
   [C,1,1,I] -> 1;
   [C,0,1,0] -> 1;
   [C,0,0,0] -> 1;

END N30_L03_A
```

```
;              ACCOM Automatic Noise Threshold    -    V1.03         6-30-89
;
;
;              Accom, Inc.
;              1430-F O'Brien Drive
;              Menlo Park, Ca  94025
;              (415)328-3818
;
;****************************************************************
;
;              REVISION HISTORY
;
;              1.00    12-20-88    INITIAL PROGRAM ENTRY
;
;              1.01    01-04-89    IMPROVE THRESHOLD CALCULATION
;                                  Released : 02/02/89  Rev: B
;
;              1.02    02-28-89    INCREASE MAX THRESHOLD AND AGGRESSIVENESS
;
;              1.03    06-30-89    ADD ADJUSTMENT OF NOISE READING BASED ON
;                                  AMOUNT OF NOISE REDUCTION BEING DONE
;
;              1.04    10-13-92    CHANGE IO REG TO DIE-125M CONFIGURATION
;
;****************************************************************
;
TRUE          EQU     -1
FALSE         EQU     0
;
SND_DATA      EQU     TRUE
;SND_DATA     EQU     FALSE
;
;             I/O BIT ASSIGNMENTS
;
TEST_H        EQU     P1.0
TEST_V        EQU     P1.1
TEST_OUT      EQU     P1.3
;
;             Bit Variables
;
TX_FLG        EQU     00H         ;RAM Addr 20H - BIT 0
IN_CHR        EQU     01H         ;             - BIT 1
DELTA_FLG     EQU     02H         ;             - BIT 2
RDY2SEND      EQU     03H         ;             - BIT 3
POS_DELTA     EQU     04H         ;             - BIT 4
CHG_FLAG      EQU     05H         ;             - BIT 5
;
;             OUTPUT Addresses
;
INTLIN_OUT    EQU     8000H
NTHR_OUT      EQU     8001H
NR_OUT        EQU     8002H
AUX_OUT       EQU     8003H
;
;             INPUT Addresses
;
INT_IN        EQU     8004H
MIN_IN        EQU     8005H
NR_IN         EQU     8006H
AUX_IN        EQU     8007H
```

```
;
;               VARIABLES
;
DIVIDEND_L  EQU   00H       ;BANK 0 : REG 0
DIVIDEND_H  EQU   01H       ;BANK 0 : REG 1
DIVISOR     EQU   02H       ;BANK 0 : REG 2
REM         EQU   03H       ;BANK 0 : REG 3
LINE_CNT    EQU   04H       ;BANK 0 : REG 4
PRINT_CNT   EQU   05H       ;BANK 0 : REG 5
INTVAL      EQU   06H       ;BANK 0 : REG 6
MINVAL      EQU   07H       ;BANK 0 : REG 7
;
CHR_BUF     EQU   10H
Q_L         EQU   11H
Q_H         EQU   12H
AVG         EQU   13H
ACC_TEMP    EQU   14H
AVG_F2      EQU   15H
AVG_F1      EQU   16H
MOTION_LVL  EQU   17H
NOISE_LVL   EQU   18H
MOTION_CNT  EQU   19H
AVG_THR     EQU   1AH
FIELD_CNT   EQU   1BH
AVG_F3      EQU   1CH
AVG_F4      EQU   1DH
LEVEL_CNT   EQU   1EH

MIN_BUF     EQU   21H
INT_BUF     EQU   22H
INTSUM_L    EQU   23H
INTSUM_H    EQU   24H
MINSUM_L    EQU   25H
MINSUM_H    EQU   26H
NUMMIN      EQU   27H
MINAVG      EQU   28H
NTHR        EQU   29H
NTHR_F1     EQU   2AH
NTHR_F2     EQU   2BH
NTHR_F3     EQU   2CH
NTHR_F4     EQU   2DH

LEVEL       EQU   30H
MIN_H       EQU   31H
MIN_L       EQU   32H
INT_H       EQU   33H
INT_L       EQU   34H
NUM         EQU   35H
OLD_NTHR    EQU   36H
THR         EQU   37H
MIN_INTVAL  EQU   38H
MAX_INTVAL  EQU   39H
MIN_VAL     EQU   3AH
MAX_VAL     EQU   3BH
F_MULT      EQU   3CH
MOTION_RD   EQU   3DH
NOISE_RD    EQU   3EH
NTHR_USED   EQU   3FH
LEVEL_USED  EQU   40H
;
```

```
;               UART CONFIGURATION CONSTANTS
;
SP8BITS     EQU     01010010B       ;DATA TO INITIALIZE SP FOR 8 DATA BITS
TMR1INIT    EQU     00100001B       ;CONFIG TMR 1 FOR SP, 0 AS 16 BIT TMR
INIT9600    EQU     -3              ;TIMER INITIALIZATION DATA FOR 9600 BAUD
;                                   ( 9.216x10E5 / (9600 x 32) )
;
;               TMR0 SETUP CONSTANTS
;
TMR0_MSK    EQU     0F0H            ;MASK TO CLR TMR0 BITS IN TMOD
T0MODE1     EQU     1               ;SELECT TMR0 MODE 1
T0MODE2     EQU     2               ;SELECT TMR0 MODE 2
TH_1L       EQU     0FFH            ;HI BYTE OF TIMER LOAD FOR 1 LINE DELAY
TL_1L       EQU     0C6H            ;LOW BYTE OF TIMER LOAD FOR 1 LINE DELAY
;
LF          EQU     0AH
CR          EQU     0DH
SPACE       EQU     20H
CHR0        EQU     "0"
UCA         EQU     "A"
UCB         EQU     "B"
UCI         EQU     "I"
UCL         EQU     "L"
UCM         EQU     "M"
UCN         EQU     "N"
UCT         EQU     "T"
UCX         EQU     "X"
;
MIN_THR     EQU     3               ;MINIMUM THRESHOLD TO USE IN AUTOMATIC
MAX_THR     EQU     14              ;MAXIMUM "                           "
MIN_LEVEL   EQU     1               ;MINIMUM NOISE REDUCTION LEVEL
MOTN_SCALE  EQU     5               ;MOTION SCALER VALUE TO USE
;
            DEFSEG  XASMSEG,ABSOLUTE
            SEG     XASMSEG
;
            ORG     0
            JMP     RST_ADDR
;
;           SET VERTICAL INTERRUPT SERVICE ROUTINE VECTOR
;
            ORG     3
            JMP     EX0_ISR
;
            ORG     9
            DB      "AUTO NR"
;
;
;           SET HORIZONTAL INTERRUPT SERVICE ROUTINE VECTOR
;
            ORG     13H
            JMP     EX1_ISR
;
            DB      "10/21/92"
            DB      "U101E"
;
;           SET SERIAL PORT INTERRUPT SERVICE ROUTINE VECTOR
;
            ORG     23H
            JMP     HWSP_ISR
```

```
;
;
;               SET TMR0 FOR 1 MILLISECOND DURATION
;
DELAY_1L    PUSH    TH0
            PUSH    TMOD
            ANL     TMOD,#TMR0_MSK          ;CLR TMR0 MODE BITS IN TMOD
            ORL     TMOD,#T0MODE1           ;SET TMR0 TO MODE 1
DELAY_1L0   CLR     TR0                     ;STOP TMR
            CLR     TF0                     ;CLR TIMER OVERFLOW FLAG
            MOV     TL0,#TL_1L              ;LOAD TMR0 LOW BYTE FOR 1 LINE DELAY
            MOV     TH0,#TH_1L              ;LOAD TMR0 HIGH BYTE FOR 1 LINE DELAY
            SETB    TR0                     ;START TMR
            JNB     TF0,$                   ;WAIT FOR TIMER OVERFLOW
            DJNZ    ACC,DELAY_1L0           ;DEC ACC AND JUMP IF <> 0
            POP     TMOD
            POP     TH0
            RET
;
ADJ_VALUE   PUSH    ACC                     ;SAVE THE VALUE TO BE ADJUSTED
            MOV     A,LEVEL_USED            ;LOAD ACC WITH THE REDUCTION LEVEL
            ADD     A,OLD_NTHR              ;ADD IN THE THRESHOLD USED
            CLR     C
            RRC     A                       ;GET THE AVG OF NR COMPONENTS
TST_NR      MOV     DPTR,#ADJUST_TBL        ;SET PTR TO ADJUSTMENT TABLE
            CLR     C
            RLC     A                       ;MULTIPLY THE PTR BY 2
            PUSH    ACC
            MOVC    A,@A+DPTR               ;GET THE MULTIPLER FROM THE TABLE
            MOV     B,A                     ;LOAD THE MULTIPLIER IN B
            POP     ACC
            INC     A                       ;INCREMENT THE TABLE PTR
            MOVC    A,@A+DPTR               ;GET THE DIVISOR
            MOV     DIVISOR,A               ;LOAD THE DIVISOR WITH THE VALUE
            POP     ACC                     ;RELOAD ACC WITH THE VALUE TO BE ADJUSTED
            MUL     AB                      ;MULTIPLY NOISE LEVEL BY FRACTIONAL ADJUST
            MOV     DIVIDEND_H,B            ;LOAD DIVIDEND_H WITH THE HIGH BYTE
            MOV     DIVIDEND_L,A            ;LOAD DIVIDEND_L WITH THE LOW BYTE
DIV16BITS   PUSH    ACC
            PUSH    B
            MOV     Q_L,#0
            MOV     Q_H,#0
            MOV     A,DIVISOR               ;LOAD ACC WITH THE DIVISOR
            JZ      EXIT_DIV                ;IF DIVISOR = 0, DON'T DIVIDE
            MOV     A,DIVIDEND_H            ;LOAD ACC WITH HI BYTE OF DIVIDEND
            JNZ     DIV16B0                 ;IF HI BYTE <> 0, GOTO DIV16B0
            MOV     A,DIVIDEND_L            ;LOAD ACC WITH LOW BYTE OF DIVIDEND
            JZ      EXIT_DIV                ;IF LOW BYTE ALSO = 0, EXIT
DIV16B0     MOV     A,DIVIDEND_L            ;LOAD ACC WITH LOW BYTE OF DIVIDEND
            MOV     B,DIVISOR               ;LOAD B WITH THE DIVISOR
            DIV     AB                      ;DIVIDE THE LOW BYTE
            MOV     Q_L,A                   ;LOAD LOW BYTE OF QUOTIENT WITH RESULT
            MOV     Q_H,#0                  ;CLEAR HIGH BYTE
            MOV     REM,B                   ;SAVE REMAINDER IN REM
            MOV     A,DIVIDEND_H            ;LOAD ACC WITH THE HIGH BYTE OF DIVIDEND
            JZ      EXIT_DIV                ;IF HIGH BYTE IS 0, EXIT
DIV_LOOP    MOV     B,DIVISOR               ;LOAD B WITH THE DIVISOR
            MOV     A,#0FFH                 ;LOAD ACC WITH FF (255)
            DIV     AB                      ;DIVIDE
            ADD     A,Q_L                   ;ADD THE RESULT AND Q_L
```

```
              MOV     Q_L,A                   ;UPDATE Q_L
              JNC     NO_QC                   ;IF NO CARRY, GOTO NO_QC
              INC     Q_H                     ;INCREMENT THE HI BYTE OF QUOTIENT
NO_QC         MOV     A,B                     ;LOAD ACC WITH THE REMAINDER
              ADD     A,REM                   ;ADD NEW REMAINDER INTO SUM
              INC     A                       ;INCREMENT THE REMAINDER SUM (256-255=1)
              PUSH    ACC
              CLR     C
              SUBB    A,DIVISOR               ;SUBTRACT THE DIVISOR FROM THE REMAINDER SUM
              JC      DIV_GT_REM              ;IF BORROW, GOTO DIV_GT_REM
              MOV     REM,A                   ;UPDATE THE REMAINDER SUM
              POP     ACC
              MOV     A,Q_L                   ;LOAD ACC WITH Q_L
              ADD     A,#1                    ;ADD 1 TO THE QUOTIENT
              MOV     Q_L,A                   ;UPDATE Q_L
              JNC     DIV_LOOP0               ;IF NO CARRY, GOTO DIV_LOOP0
              INC     Q_H
              SJMP    DIV_LOOP0

DIV_GT_REM    POP     REM                     ;RETRIEVE REMAINDER SUM
DIV_LOOP0     DJNZ    DIVIDEND_H,DIV_LOOP     ;LOOP DIVIDEND_H TIMES
EXIT_DIV      POP     B
              POP     ACC
              RET
;
SND_CHR       JB      TI_FLG,$                ;IF TRANSMITTING, WAIT TO FINISH
              SETB    TI_FLG                  ;SET TRANSMITTING FLAG
              MOV     SBUF,A                  ;MOVE CHAR TO TRANSMIT BUFFER
              RET
;
;             HARDWARE SERIAL PORT INTERRUPT SERVICE ROUTINE
;
HWSP_ISR      JBC     RI,SP_RCV               ;IF RECEIVE FLAG SET GOTO SP_RCV
              CLR     TI                      ;INT WAS CAUSED BY XMIT, CLR FLAG
              CLR     TI_FLG                  ;TRANSMIT COMPLETE, CLEAR FLAG
              RETI

SP_RCV        MOV     CHR_BUF,SBUF            ;LOAD CHAR BUFFER WITH RCVD CHAR
              SETB    IN_CHR                  ;SET NEW CHARACTER RCVD FLAG
              RETI
;
CONV2HEX      PUSH    B
              PUSH    ACC
              CLR     C
              SUBB    A,#10
              JNC     CONV2HEX0               ;IF DIGIT IS > 10, GOTO CONV2HEX0
              POP     ACC
              ADD     A,#CHR0                 ;CONVERT THE DIGIT TO CHAR
              SJMP    CONV2HEX1

CONV2HEX0     POP     B
              ADD     A,#0CA                  ;CONVERT TO HEX
CONV2HEX1     POP     B
              RET
;
DGT2HEX       PUSH    ACC
              PUSH    B
              MOV     B,#16
              DIV     AB
              CALL    CONV2HEX                ;CONVERT THE DIGIT TO HEX CHAR
```

```
              CALL    SND_CHR
              MOV     A,B
              CALL    CONV2HEX        ;CONVERT THE DIGIT TO HEX CHAR
              CALL    SND_CHR
              POP     B
              POP     ACC
              RET
;
RST_ADDR      MOV     SP,#50H
              SETB    EA
              CLR     ET0
              CLR     ET1
              SETB    PX1             ;HORIZONTAL INTERRUPT GETS HIGH PRIORITY
              CLR     PX0
              SETB    EX0
              SETB    EX1
              SETB    IT0
              CLR     IT1             ;USE LEVEL SENSITIVE FOR HORIZONTALS
              CLR     REN
              CLR     PS
              CLR     RS0
              CLR     RS1
              CLR     TX_FLG          ;CLEAR TRANSMIT FLAG
              CLR     IN_CHR
              CLR     RDY2SEND
              MOV     SCON,#SP8BITS   ;CONFIGURE SP FOR 8 BIT MODE (8DATA BITS)
              MOV     TCON,#11010010B ;CONFIGURE TMR CONTROL
              MOV     TMOD,#TMR1INIT  ;SET UP TMR1 FOR SERIAL PORT USE
              MOV     TH1,#INIT9600   ;LOAD HW SP TMR FOR 9600 BAUD
              SETB    TR1             ;START TMR
              CLR     TR0             ;STOP TMR0
              ANL     TMOD,#TMR0_MSK  ;CLR TMR0 MODE BITS
              ORL     TMOD,#T0MODE2   ;SET TMR0 FOR 8 BIT AUTO-RELOAD MODE
              SETB    TR0             ;START TMR0
              CLR     ET0             ;DISABLE TMR0 INTERRUPTS
              MOV     A,#MIN_THR      ;INIT ALL FIELD THRESHOLD BUFFERS TO MIN
              MOV     NTHR,A
              MOV     NTHR_F1,A
              MOV     NTHR_F2,A
              MOV     NTHR_F3,A
              MOV     NTHR_F4,A
              MOV     NTHR_USED,A
              CLR     A
              MOV     PRINT_CNT,A
              MOV     FIELD_CNT,A
              MOV     LEVEL_CNT,A
              MOV     AVG_THR,A
              SETB    TEST_OUT
              SETB    ES
;
MAINLOOP
              $IF     SND_DATA

JNB     RDY2SEND,$      ;WAIT UNTIL READY TO SEND DATA
;             MOV     A,#UCL
;             CALL    SND_CHR
;             MOV     A,LEVEL_USED
;             CALL    DGT2HEX
;             MOV     A,#SPACE
;             CALL    SND_CHR
```

```
;       MOV     A,#UCT
;       CALL    SND_CHR
;       MOV     A,OLD_WTHR
;       CALL    DGT2HEX
;       MOV     A,#SPACE
;       CALL    SND_CHR

;       MOV     A,#UCI
;       CALL    SND_CHR         ;SEND THE CHAR
;       MOV     A,INT_H
;       CALL    DGT2HEX
;       MOV     A,INT_L
;       CALL    DGT2HEX
;       MOV     A,#SPACE
;       CALL    SND_CHR
;       MOV     A,#UCM
;       CALL    SND_CHR
;       MOV     A,MIN_H
;       CALL    DGT2HEX
;       MOV     A,MIN_L
;       CALL    DGT2HEX
;       MOV     A,#SPACE
;       CALL    SND_CHR
;       MOV     A,#UCN
;       CALL    SND_CHR
;       MOV     A,NUM
;       CALL    DGT2HEX
;       MOV     A,#SPACE
;       CALL    SND_CHR
;       MOV     A,#"m"
;       CALL    SND_CHR
;       MOV     A,MOTION_RD
;       CALL    DGT2HEX
;       MOV     A,#SPACE
;       CALL    SND_CHR
;       MOV     A,#"M"
;       CALL    SND_CHR
        MOV     A,MOTION_LVL
        CALL    DGT2HEX
        MOV     A,#SPACE
        CALL    SND_CHR
;       MOV     A,#"n"
;       CALL    SND_CHR
;       MOV     A,NOISE_RD
;       CALL    DGT2HEX
;       MOV     A,#SPACE
;       CALL    SND_CHR
;       MOV     A,#"N"
;       CALL    SND_CHR
        MOV     A,NOISE_LVL
        CALL    DGT2HEX
        MOV     A,#SPACE
        CALL    SND_CHR
;       MOV     A,#UCT
;       CALL    SND_CHR
        MOV     A,THR
        CALL    DGT2HEX
;       MOV     A,#SPACE
;       CALL    SND_CHR
;       MOV     A,#UCY
```

```
;           CALL    SND_CHR
;           MOV     A,MAX_VAL
;           CALL    DGT2HEX
SND_CR      MOV     A,#CR
            CALL    SND_CHR
            MOV     A,#LF
            CALL    SND_CHR
            CLR     RDY2SEND
            MOV     PRINT_CNT,#0

%ENDIF

JMP     MAINLOOP
;
EX1_ISR     CPL     TEST_H
            MOV     ACC_TEMP,A          ;SAVE THE ACC IN ACC_TEMP
            PUSH    PSW
            PUSH    DPL
            JNB     P3.2,EX1_RET        ;IF STILL IN VERTICAL, JUST EXIT
            INC     LINE_CNT            ;INCREMENT THE LINE COUNTER
            CJNE    R4,#28,CHK_START    ;TEST LINE_CNT
CHK_START   JC      EX1_RET             ;IF NOT YET TO LINE 50, EXIT
            CJNE    R4,#219,CHK_END     ;TEST LINE_CNT
CHK_END     JNC     EX1_RET             ;IF PAST LINE 240, EXIT
            MOV     A,R6                ;LOAD ACC WITH THE INTVAL FROM LAST LINE
            ADD     A,INTSUM_L          ;ADD INTEGRATED VAL TO INTSUM_L
            MOV     INTSUM_L,A          ;UPDATE INTSUM_L
            CLR     A
            ADDC    A,INTSUM_H          ;ADD CARRY BIT TO HIGH BYTE OF INTSUM
            MOV     INTSUM_H,A          ;UPDATE INTSUM_H
            MOV     A,R7                ;LOAD ACC WITH THE MINVAL FROM LAST LINE
            ADD     A,MINSUM_L          ;ADD MIN VAL TO THE MINSUM_L
            MOV     MINSUM_L,A          ;UPDATE MINSUM_L
            CLR     A
            ADDC    A,MINSUM_H          ;ADD CARRY BIT TO HIGH BYTE OF MINSUM
            MOV     MINSUM_H,A          ;UPDATE MINSUM_H

RD_VALUES   INC     NUMMIN
            MOV     DPTR,#MIN_IN        ;SET PTR TO MINIMUM VALUE LATCH ADDR
            MOVX    A,@DPTR             ;READ MIN VAL FOR THIS LINE
            MOV     R7,A                ;SAVE THE MINIMUM VALUE IN MINVAL
            MOV     DPTR,#INT_IN        ;SET PTR TO INTEGRATED VALUE LATCH ADDR
            MOVX    A,@DPTR             ;READ INTEGRATED VAL FOR THIS LINE
            MOV     R6,A                ;SAVE THE INTEGRATED VALUE IN INTVAL
EX1_RET
            SETB    IT1
;           POP     DPL
            POP     PSW
            MOV     A,ACC_TEMP
            RETI
;
EX0_ISR     CPL     TEST_V
            PUSH    ACC
            PUSH    B
            PUSH    PSW
            PUSH    DPH
            PUSH    DPL
            CLR     EX1
            MOV     A,#10
            CALL    DELAY_1L            ;DELAY FOR 10 LINES
```

```
        $IF     1               ; K.A.W.

MOV     DPTR,#AUX_IN    ;get Y threshold and level
        MOVX    A,@DPTR
        ANL     A,#00001111B    ;ensure 4bit level
        MOV     LEVEL,A         ;save it
        MOV     B,A
        MOV     DPTR,#NTHR_OUT
        MOV     OLD_NTHR,NTHR_USED  ;update stores
        MOV     A,NTHR_F4       ;new value
        MOV     NTHR_USED,A
        ANL     A,#00001111B    ;ensure 4bits only
        SWAP    A
        ORL     A,B             ;threshold+level combo
        MOVX    @DPTR,A         ;output chrominance
        MOV     DPTR,#NR_OUT
        MOVX    @DPTR,A         ;output luminance
        MOV     A,NTHR_USED     ;current threshold value $ELSE MOV     DPTR,#NR_IN
        MOVX    A,@DPTR
        MOV     LEVEL,A         ;STORE THE NR LEVEL IN LEVEL
        MOV     DPTR,#NR_OUT
        MOVX    @DPTR,A
        MOV     DPTR,#NTHR_OUT
        MOV     OLD_NTHR,NTHR_USED
        MOV     A,NTHR_F4
        MOVX    @DPTR,A
        MOV     NTHR_USED,A $ENDIF SWAP    A               ;SWAP THE LOW NIBBLE UP
        MOV     B,A
        MOV     A,P1
        ANL     A,#00001111B    ;MASK OFF THE HIGH NIBBLE
        ORL     A,B             ;OR IN THE NEW THRESHOLD DATA
        MOV     P1,A            ;RELOAD THE OUTPUT BYTE
        CPL     CHG_FLAG        ;TOGGLE THE CHANGE FLAG
        JB      CHG_FLAG,CALC_NTHR  ;IF FLAG SET, GOTO CALC NTHR
        INC     PRINT_CNT       ;INCREMENT THE PRINT COUNT
        JMP     CLR_SUMSO       ;DON'T CALCULATE A NEW THRESHOLD THIS FRAME CALC_NTHR MOV   DIVIDEND_H,INTSUM_H ;LOAD THE DIVIDEND WITH THE INT SUM
        MOV     DIVIDEND_L,INTSUM_L
        MOV     DIVISOR,NUMMIN  ;LOAD DIVISOR WITH THE NBR OF LINES
        CALL    DIV16BITS       ;DIVIDE TO GET AVERAGE MOTION LEVEL
        MOV     A,Q_L           ;LOAD ACC WITH LOW BYTE OF MOTION AVG
        MOV     MOTION_RD,A CALL    ADJ_VALUE       ;ADJUST THE MOTION LEVEL
        MOV     MOTION_LVL,Q_L  ;LOAD MOTION_LVL WITH THE LOW BYTE OF AVG MOV     DIVIDEND_H,MINSUM_H ;LOAD THE DIVIDEND WITH THE MIN SUM
        MOV     DIVIDEND_L,MINSUM_L
        MOV     DIVISOR,NUMMIN  ;LOAD DIVISOR WITH THE NBR OF LINES
        CALL    DIV16BITS       ;DIVIDE TO GET AVERAGE NOISE LEVEL
```

```
            MOV     A,Q_L               ;LOAD ACC WITH LOW BYTE OF NOISE AVG
            MOV     NOISE_RD,A

CALL    ADJ_VALUE           ;ADJUST THE NOISE LEVEL
            MOV     NOISE_LVL,Q_L       ;LOAD NOISE_LVL WITH LOW BYTE OF AVG

MOV     NTHR,#MIN_THR       ;INITIALIZE NTHR TO MINIMUM
            MOV     DPTR,#LOOKUP_TBL-1  ;SET PTR TO THRESHOLD LOOKUP TBL
GET_TBLVAL  CALL    GET_TBL             ;GET A NOISE LEVEL FROM TABLE
            CJNE    A,NOISE_LVL,TST_TBL ;TEST IF TABLE VAL < NOISE_LVL
TST_TBL     JC      GET_TBLVAL          ;IF TBL VAL < NOISE AVG, GOTO GET_TBLVAL
            CLR     A
            MOVC    A,@A+DPTR           ;GET CORRESPONDING THRESHOLD FROM TABLE
CHK_DELTA   MOV     NTHR,A              ;LOAD NEW THRESHOLD WITH THE THRESHOLD
            MOV     A,NOISE_LVL         ;LOAD ACC WITH THE NOISE LEVEL
            SETB    DELTA_FLG
            CLR     C
            SUBB    A,AVG_F2            ;SUBTRACT LAST FRAME'S AVERAGE
            JNC     TST_DELTA           ;IF NO BORROW, DELTA IS POSITIVE
            CLR     DELTA_FLG
            MOV     A,AVG_F2            ;LOAD ACC WITH THE LAST FRAME'S AVG
            CLR     C
            SUBB    A,NOISE_LVL         ;SUBTRACT OFF THE NEW NOISE LEVEL

TST_DELTA   CJNE    A,#4,TST_DELTA2     ;TEST THE AVERAGE DELTA
TST_DELTA0  JC      TST_DELTA1          ;IF DELTA < 4, USE RECEIVED LEVEL
            MOV     A,NOISE_LVL         ;LOAD ACC WITH THE NOISE LEVEL
            CJNE    A,MOTION_LVL,USE_OLD ;IF NOT THE SAME, USE OLD THRESHOLD VALUES
            CLR     TEST_OUT
            MOV     LEVEL_CNT,#10       ;HOLD LOW LEVEL FOR 5 FRAMES
            MOV     PRINT_CNT,#1
            MOV     A,NTHR_F2           ;LOAD ACC WITH THRESHOLD FROM LAST FRAME
            MOV     NTHR,A
            MOV     NTHR_F1,A
            MOV     NTHR_F2,A
            MOV     NTHR_F3,A
            SJMP    SET_SCALE

TST_DELTA1  CJNE    A,#2,TST_DELTA2     ;TEST THE AVERAGE DELTA
TST_DELTA2  JC      TST_ITHR            ;IF DELTA < 2, USE THE RECEIVED VALUES
USE_OLD     MOV     A,NTHR_F2           ;LOAD ACC WITH THRESHOLD FROM LAST FRAME
USE_OLD0    MOV     NTHR,A
            MOV     NTHR_F1,A
            MOV     NTHR_F2,A
            MOV     NTHR_F3,A
            MOV     MOTION_CNT,#4
            MOV     FIELD_CNT,#15       ;RESET FIELD CNT FOR 15 FIELDS
            MOV     A,AVG_THR           ;LOAD ACC WITH THE INT THRESHOLD
            JNZ     SET_SCALE           ;IF VALUE ALREADY SET, GOTO SET_SCALE
            MOV     AVG_THR,AVG_F2      ;SET AVG_THR TO LAST FRAME'S NOISE AVG
            MOV     C,DELTA_FLG         ;LOAD C WITH THE DELTA POLARITY
            MOV     POS_DELTA,C         ;SET POLARITY FLAG ACCORDINGLY
            SJMP    SET_SCALE
;
TST_ITHR    MOV     A,AVG_THR           ;LOAD ACC WITH THE AVERAGE THRESHOLD
            JZ      SET_SCALE           ;IF AVG_THR = 0, GOTO SET_SCALE
            DJNZ    FIELD_CNT,TST_ITHRC ;DEC FIELD CNT AND JMP IF <> 0
            SJMP    CLR_ITHR            ;WAITED 1/4 SECOND FOR MOTION CHANGE, EXIT

TST_ITHRC   MOV     A,NOISE_LVL         ;LOAD ACC WITH THE NOISE AVG
```

```
              CJNE     A,#7,TEST_NOISE      ;TEST IF NOISE LEVEL IS BELOW MAXIMUM
TEST_NOISE    JC       CLR_ITHR             ;IF < MAX, GO CLEAR THE TRANSITION THR
              CJNE     A,AVG_THR,TST_ITHR1  ;TEST NOISE LEVEL vs. AVG THR
TST_ITHR1     JB       POS_DELTA,TST_ITHR_L ;IF POSITIVE DELTA, CHECK IF <
              JC       EXO_ELSE1            ;IF NOISE LEVEL < AVG_THR USE CURRENT THR
              SJMP     CLR_ITHR             ;CLEAR THE INT THR

TST_ITHR_L    JNC      EXO_ELSE1            ;IF NOISE LEVEL > AVG_THR USE CURRENT THR
CLR_ITHR      MOV      AVG_THR,#0           ;CLEAR THE NOISE AVERAGE THRESHOLD
              SJMP     SET_SCALE

EXO_ELSE1     MOV      A,NTHR_F4
              MOV      NTHR,A
              MOV      NTHR_F1,A
              MOV      NTHR_F2,A
              MOV      NTHR_F3,A
              MOV      MOTION_CNT,#4
SET_SCALE     MOV      A,NOISE_LVL          ;LOAD ACC WITH THE NOISE AVG
              CJNE     A,#5,MIN_NOISE       ;TEST IF NOISE LEVEL IS LOW ENOUGH
MIN_NOISE     JC       EXO_RET0             ;TO DISREGARD MOTION
              CLR      C
              MOV      A,MOTION_LVL         ;LOAD ACC WITH THE MOTION AVG
              SUBB     A,NOISE_LVL          ;SUBTRACT THE NOISE FLOOR TO GET PURE MOTION
              JNC      TST_RAD              ;IF MOTION > NOISE GOTO TST_RAD
              MOV      A,NOISE_LVL          ;LOAD ACC WITH THE NOISE LEVEL
              CLR      C
              SUBB     A,MOTION_LVL         ;SUBTRACT MOTION LEVEL FROM NOISE LEVEL
              CJNE     A,#MOTN_SCALE,TST_LDIFF ;SEE IF MOTION < 5 LESS THAN NOISE
TST_LDIFF     JC       EXO_RET0             ;IF SO, NO BIAS (FALSE MOTION READING)
              MOV      A,NOISE_LVL          ;LOAD ACC WITH THE NOISE LEVEL
              MOV      B,#4
              DIV      AB                   ;DIVIDE THE NOISE LEVEL
              MOV      B,A
              MOV      A,MOTION_LVL         ;LOAD ACC WITH THE MOTION LEVEL
              CLR      C
              SUBB     A,B                  ;SEE IF MOTION CAUSED BY FADE
TST_FADE      JC       EXO_RET              ;IF MOTION < NOISE/2, USE THRESHOLD
              SJMP     SET_SCALE0           ;USE MOTION - NOISE/2 AS MOTION LEVEL

TST_RAD       CJNE     A,#30,TST_PNOISE     ;TEST IF RADICAL MOTION (SCENE CHANGE)
TST_PNOISE    JC       SET_SCALE0           ;IF NOT RADICAL MOTION, GOTO SET_SCALE0
              MOV      LEVEL_CNT,#10        ;HOLD LEVEL LOW FOR 5 FRAMES
;             MOV      PRINT_CNT,#2
              CLR      TEST_OUT
SET_SCALE0    MOV      B,#MOTN_SCALE        ;SET THE MOTION SCALER
              DIV      AB                   ;DIVIDE THE PURE MOTION SIGNAL BY SCALER
              JZ       EXO_RET0             ;IF MOTION SCALE IS 0, GOTO EXO_RET0
              MOV      B,A                  ;SAVE THE RESULT IN B
              MOV      A,NTHR               ;LOAD ACC WITH THE NEW THRESHOLD
              CJNE     A,B,TST_DIFF         ;TEST THE DIFFERENCE vs. THE AVG
TST_DIFF      JC       USE_MIN              ;IF AVG OF NOISE < MOTION DIFFERENCE, USE MIN
              CLR      C
              SUBB     A,B                  ;SUBTRACT MOTION DIFFERENCE FROM AVERAGE
              CJNE     A,#MIN_THR,TST_NTHR  ;TEST IF RESULT IS < MIN
TST_NTHR      JNC      NEW_NTHR             ;IF > MIN, USE NEW VALUE
USE_MIN       MOV      A,#MIN_THR           ;USE THE MIN THRESHOLD
NEW_NTHR      MOV      NTHR,A               ;USE THE RESULT AS THE NEW THRESHOLD
EXO_RET       MOV      A,MOTION_CNT         ;LOAD ACC WITH THE POST MOTION FIELD CNT
              JZ       EXO_RET0             ;IF CNT = 0, THEN UPDATE FIELD BUFFERS
              DJNZ     MOTION_CNT,NTHR_SET0 ;DEC CNT AND JUMP IF <> 0
```

```
EXO_RET0     MOV     NTHR_F4,NTHR_F3
             MOV     NTHR_F3,NTHR_F2
             MOV     NTHR_F2,NTHR_F1
             MOV     A,NTHR              ;LOAD ACC WITH THE NEW THRESHOLD
             CJNE    A,#MAX_THR-1,TST_OUTTHR ;TEST IF OUT THRESHOLD IS < MAX
TST_OUTTHR   JC      SET_NTHR            ;IF NTHR < MAX THEN USE IT
             MOV     NTHR,#MAX_THR       ;USE THE MAX THR FOR OUT THR
SET_NTHR
;            MOV     A,LEVEL
;            MOV     B,#5                ;LOAD B WITH THE LEVEL BIAS ADJUST
;            DIV     AB                  ;CALCULATE LEVEL BIAS
;            ADD     A,NTHR              ;ADD THE LEVEL BIAS TO THRESHOLD
;            MOV     NTHR,A

MOV     A,NTHR
             CLR     C
             SUBB    A,NTHR_F1           ;SUBTRACT LAST FIELD'S THRESHOLD
             JC      EXO_RET1            ;IF NTHR < NTHR_F1, GOTO EXO_RET1
             JZ      NTHR_SET            ;IF THE NTHR = NTHR_F1, GOTO NTHR_SET
             INC     NTHR_F1             ;INCREMENT LAST FIELD'S THRESHOLD
             SJMP    NTHR_SET

EXO_RET1     DEC     NTHR_F1             ;DECREMENT LAST FIELD'S THRESHOLD
NTHR_SET     MOV     A,NTHR_F1           ;LOAD ACC WITH THE NOISE THRESHOLD
             CJNE    A,#0FH,TST4_MAX     ;TEST IF THE THRESHOLD IS TOO HIGH
TST4_MAX     JC      TST4_MIN            ;IF NTHR < 0FH, TEST FOR MIN
             MOV     A,#MAX_THR          ;LOAD NTHR WITH MAXIMUM USABLE THRESHOLD
             SJMP    NTHR_OK

TST4_MIN     CJNE    A,#MIN_THR,TST4_MINO ;TEST IF < MIN
TST4_MINO    JNC     NTHR_OK             ;IF > MIN, USE THE THRESHOLD
             MOV     A,#MIN_THR          ;USE MIN THRESHOLD INSTEAD
NTHR_OK      MOV     NTHR_F1,A           ;UPDATE THE NEXT FIELD'S THRESHOLD
NTHR_SET0    MOV     A,LEVEL_CNT         ;LOAD ACC WITH THE LEVEL CNT
             JZ      NTHR_SET2           ;IF NOT WAITING FOR TIME-OUT, JUMP
             DJNZ    LEVEL_CNT,NTHR_SET1 ;DEC LEVEL_CNT AND JMP IF <> 0
             SETB    TEST_OUT
             SJMP    NTHR_SET2

NTHR_SET1    MOV     A,#MIN_LEVEL
             MOV     LEVEL,A             ;HOLD LEVEL DOWN FOR A WHILE $IF     1                   ;K.A.W.

MOV     B,A                 ;save level
             MOV     A,NTHR_USED         ;current threshold
             SWAP    A                   ;in hi nibble
             ORL     A,B                 ;threshold+level
             MOV     DPTR,#NR_OUT        ;output luminance channel
             MOVX    @DPTR,A
             MOV     DPTR,#NTHR_OUT      ;output chrominance channel
             MOVX    @DPTR,A $ELSE

MOV     DPTR,#NR_OUT
             MOVX    @DPTR,A $ENDIF
```

```
NTHR_SET2   INC     PRINT_CNT
            MOV     LEVEL_USED,LEVEL
;           CJNE    R5,#2,CLR_SUMS          ;IF FIELD CNT <> 4, GOTO CLR_SUMS
SET_READY   SETB    RDY2SEND
            SETB    CHG_FLAG
            MOV     THR,NTHR_F1
            MOV     MIN_H,MINSUM_H
            MOV     MIN_L,MINSUM_L
            MOV     INT_H,INTSUM_H
            MOV     INT_L,INTSUM_L
            MOV     NUM,NUMMIN
            MOV     MIN_VAL,MIN_INTVAL
            MOV     MAX_VAL,MAX_INTVAL
            MOV     AVG,NOISE_LVL

CLR_SUMS    MOV     AVG_F4,AVG_F3           ;SHIFT THE MIN AVERAGE FIELD BUFFER VALUES
            MOV     AVG_F3,AVG_F2           ;SHIFT THE MIN AVERAGE FIELD BUFFER VALUES
            MOV     AVG_F2,AVG_F1           ;SHIFT THE MIN AVERAGE FIELD BUFFER VALUES
            MOV     AVG_F1,NOISE_LVL        ;SHIFT THE MIN AVERAGE FIELD BUFFER VALUES
CLR_SUMS0   CLR     A
            MOV     INTSUM_L,A
            MOV     INTSUM_H,A
            MOV     MINSUM_L,A
            MOV     MINSUM_H,A
            MOV     LINE_CNT,A
            MOV     MAX_INTVAL,A
            MOV     MINVAL,A
            MOV     INTVAL,A
            MOV     NUMMIN,#0

MOV     MIN_INTVAL,#0FFH

SETB    EX1
            SETB    IT0
            POP     DPL
            POP     DPH
            POP     PSW
            POP     B
            POP     ACC
            RETI
;
GET_TBL     CLR     A
            INC     DPTR                    ;MOVE PTR TO NOISE AVERAGE VALUE
            MOVC    A,@A+DPTR               ;GET TABLE DATA
            INC     DPTR                    ;MOVE PTR TO THRESHOLD ADDR
            RET
;
LOOKUP_TBL  DB      2                       ;SUM AVG RCVD: 0-2
            DB      03H                     ;USE THRESHOLD OF 3

DB      3                       ;SUM AVG RCVD: 3
            DB      04H                     ;USE THRESHOLD OF 4

DB      5                       ;SUM AVG RCVD: 4
            DB      05H                     ;USE THRESHOLD OF 5

DB      -                       ;SUM AVG RCVD: 5
            DB      07H                     ;USE THRESHOLD OF 7

DB      10                      ;SUM AVG RCVD: 6
```

```
              DB      08H              ;USE THRESHOLD OF 8

DB      14               ;SUM AVG RCVD: 7-8
              DB      09H              ;USE THRESHOLD OF 9

DB      18               ;SUM AVG RCVD: 9-12
              DB      0AH              ;USE THRESHOLD OF 10

DB      23               ;SUM AVG RCVD: 13-18
              DB      0BH              ;USE THRESHOLD OF 11

DB      28               ;SUM AVG RCVD: 19-26
              DB      0CH              ;USE THRESHOLD OF 12 (0CH)

DB      33               ;SUM AVG RCVD: 27-34
              DB      0DH              ;USE THRESHOLD OF 13 (0DH)

DB      255              ;SUM AVG RCVD: 35-255
              DB      0EH              ;USE THRESHOLD OF 14 (0EH)
;
ADJUST_TBL    DB      5                ;NR = 0, .707  (5/7 = .714)
              DB      7

DB      3                ;NR = 1, .746  (3/4 = .750)
              DB      4

DB      7                ;NR = 2, .783  (7/9 = .777)
              DB      9

DB      9                ;NR = 3, .816  (9/11 = .818)
              DB      11

DB      59               ;NR = 4, .846  (59/70 = .843)
              DB      70

DB      7                ;NR = 5, .872  (7/8 = .875)
              DB      8

DB      8                ;NR = 6, .894  (8/9 = .888)
              DB      9

DB      10               ;NR = 7, .913  (10/11 = .909)
              DB      11

DB      13               ;NR = 8, .929  (13/14 = .929)
              DB      14

DB      16               ;NR = 9, .942  (16/17 = .941)
              DB      17

DB      20               ;NR = 10, .953  (20/21 = .952)
              DB      21

DB      26               ;NR = 11, .963  (26/27 = .963)
              DB      27

DB      32               ;NR = 12, .970  (32/33 = .970)
              DB      33

DB      41               ;NR = 13, .976  (41/42 = .976)
```

```
DB    42

DB    49            ;NR = 14, .980  (49/50 = .980)
DB    50

DB    62            ;NR = 15, .984  (62/63 = .984)
DB    63
```

END

```
/* generate prom code */

ID1 = IntAry1;
  for (i = 0; i < prom.Nword; i++, ID1++) {
    TV = i >> 8 & 1;              /* 0/1 for 625/525 system */
    fval = i & 255;               /* get 8-bit LSP */
    if (TV == 0)  val = 1 + 256 * fval / 280;
    else  val = 1 + 256 * fval / 235;
    if (val > 250)  val = 250;    /* clip to 250 */
    *ID1 = val;
  }

/* Output */
  strcpy (ofname, OutFileName());  /* ask for output file name */ i = HexPrint(IntAry1, prom, ofname);
  printf("HexPrint..........%2d\n",i);
  i = WriteBinFile(IntAry1, prom);
  printf("WriteBinFile......%2d\n",i);
}
```

```c
/*-----------------------------------------------------------*/
/*   Main program for PROM code generation                   */
/*         April 1987 (Fortran -> Pascal)                    */
/*         November 1990 (Pascal -> C)      Sohei Takemoto   */
/*                                                           */
/*   PROMDEF.H and PROMLIB.H need to be included             */
/*   NR20B and NR30B boards, DIE125M project, Fall '92       */
/*-----------------------------------------------------------*/ include <stdio.h>
include <stdlib.h>
include <math.h> define MaxWord 2048    /* Max code words */
define LName   80      /* Max length of name string*/
#include "promdef.h"    /* type definitions */
include "promlib.h"    /* library */

/*    procedures in PROMLIB.H
        *ToBin, *ToHex, IPower, WordToBinary, WordToHex,
        Input, Limit, Mask, IMask, UnMask, Mply, Roff,
        RToI, Slice, *OutFileName, BinPrint, HexPrint,
        HPrint, WriteBinFile      */ void main()
{
   IntData  IntAry1, IntAry2, IA3;   /* integer data array */
   RealData RealAry;                 /* real data array */
   SpecTable prom, PR1, PR2;         /* PROM specifications */
   char     ofname[LName];
   float    coef, max, min;
   int      ibit, fbit, loc, i, j, k;
   int      *ID1, *ID2, *ID3;
   float    *RD1;
   int      mtop[4] = {23, 336, 21, 283},
            mbtm[4] = {310, 623, 263, 525};
   int      ptop, pbtm, ofset525, ofset625, id;

/* define prom specifications */
/* Vertical letter-box blanking LUTs: 1Kx8
      input:
        A9   : H/L for 525/625 TV system
        A8   : L/H for field 1/2
        A7..0 : box height selection, [0,255]
                0 for full open, 255 narrowest
      output:
        U70: O7..0 : MSP 8-bit of TOP, top-most line no.
        U71: O3..2 : LSP 2-bit of TOP
             O1..0 : LSP 2-bit of BOTTOM
        U72: O7..0 : MPS 8-bit of BOTTOM, bottom-most line no.   */ prom.Kbit = 10;      /* no. of bits for address input */
   prom.Kmod = 8;       /* no. of bits for PROM module output, <=16 */
   prom.Kic  = 8;       /* no. of bits for PROM chip output, <=8 */
   prom.Stadrs = 0;     /* input start address */
   prom.Ioffset = 0;    /* (input value)=(address)+ioffset */
   prom.Nword = IPower(2, prom.Kbit);  /* no. of words to generate */
```

```
    PR1 = PR2 = prom;

strcpy(prom.FNames[1], "N30_M08A.Bin");
    strcpy(prom.PNames[1], "V L-box TOP MSP 8-bit, U70");
    strcpy(PR1.FNames[1], "N30_M09A.Bin");
    strcpy(PR1.PNames[1], "V L-box TOP/BOTTOM LSP 2-bit, U71");
    strcpy(PR2.FNames[1], "N30_M10A.Bin");
    strcpy(PR2.PNames[1], "V L-box BOTTOM MSP 8-bit, U72");

/* generate prom code */ ofset525 = -5;        /* [LCTR] - line-number in 525 */
    ofset625 = -2;        /* [LCTR] - line-number in 625 */

ID1 = IntAry1;
    ID2 = IntAry2;

for (i = 0; i < 4; i++) {    /* make 4 LUTs */
       if (i > 1) {
          ptop = mtop[i] + ofset525;
          pbtm = mbtm[i] + ofset525;
       }
       else {
           ptop = mtop[i] + ofset625;
           pbtm = mbtm[i] + ofset625;
       } for (j = 0; j < 256; j++, ID1++, ID2++) {
          if (j != 0) {
             id = j % 4;
             switch (id) {
                case 1:
                   if (i == 3) ptop += 1;   /* 525: ptop+1 in field2 */
                   if (i == 0) ptop += 1;   /* 625: ptop+1 in field1 */
                   break;
                case 2:
                   if (i == 2) pbtm -= 1;  /* 525: pbtm-1 in field1 */
                   if (i == 1) pbtm -= 1;  /* 625: pbtm-1 in field2 */
                   break;
                case 3:
                   if (i == 2) ptop += 1;   /* 525: ptop+1 in field1 */
                   if (i == 1) ptop += 1;   /* 625: ptop+1 in field2 */
                   break;
                case 0:
                   if (i == 3) pbtm -= 1;  /* 525: pbtm-1 in field2 */
                   if (i == 0) pbtm -= 1;  /* 625: pbtm-1 in field1 */
                   break;
             }
          }
          *ID1 = ptop;
          *ID2 = pbtm;
       }
    }

/* splice */
    ID1 = IntAry1; ID2 = IntAry2; ID3 = IA3;
    for (i = 0; i < prom.Nword; i++, ID1++, ID2++, ID3++) {
```

```c
/*
**      NEW.c - Code for the DIE-125M
**
**      Specification Notes:-
**
**      NR20 and NR30 Board Design Note: NR_13D.MS - September 10, 1992
**
**      Product Design Notes: NR_22.MS - September 10, 1992
**
**                            NR_13E.MS - October 1, 1992
**
**      First Implementation: 09/21/92 K.A.Woodhouse
**
**      N.B.  This code has been written to minimize RAM usage,
**            there is very little available....
**
**
**      For correct operation this code must be compiled with
**      "char" defaulting to "unsigned char". This is /J option
**      for Microsoft compiler, and the default for Archimedes C-51
**
*/ define PC              0       /* 8051=0, PC=1 */ if PC
include <stdio.h> define bit             char
define data
define code define TR(a)   {putcur(20,1,0); printf("              \r");printf("%s", a); putcur(22,1,0);} unsigned short Pot1V = 0x11;
unsigned short Pot2V = 0x22;
unsigned short Pot3V = 0x33;
unsigned short Pot4V = 0x44;

#define BTN_FREEZE              'f'
#define BTN_STEP                't'
#define BTN_POSITIVE            'p'
#define BTN_ENHANCE             'e'
#define BTN_AUTOMATIC           'a'
#define BTN_RECURSIVE           'r'
#define BTN_MEDIAN              'm'
#define BTN_SPLIT               'S'
#define BTN_LONG_RECURSIVE      'R'
#define BTN_LONG_MEDIAN         'M'
#define BTN_INPUT1              'i'
#define BTN_INPUT2              'j'
#define BTN_INPUT3              'k'
#define BTN_SOFT                's'
define BTN_SLAVE               'l' char Event;
char Button;

#else
#include <io51.h>
```

```c
#define BTN_ENHANCE     0
#define BTN_AUTOMATIC   1
#define BTN_RECURSIVE   2
#define BTN_MEDIAN      3
#define BTN_FREEZE      4
#define BTN_POSITIVE    5
#define BTN_SOFT        6
define BTN_STEP        7 define BTN_SLAVE       8    /* N.B. this is a dummy button press */ define BTN_SPLIT       9
define BTN_INPUT1     10
#define BTN_INPUT2     11
define BTN_INPUT3     12 define BTN_LONG_RECURSIVE  (BTN_RECURSIVE+LONG_BIT)
define BTN_LONG_MEDIAN     (BTN_MEDIAN+LONG_BIT)

endif   /* PC */ define KEYWORD        0xAC  /* EEROM signature */ define LONG_BIT       0x10
define LAST_PLUS_ONE  13    /* non existant button */
define MAX_DELAY      0x15  /* wait before long depression registered */ data char LEDClock;          /* controls LED pulsations */
data char Event;
data char Button;
data char TEMP_BUF;          /* temporary usage */ define BtnUp   1            /* event types */
define BtnDn   2
#define NoChg   3

/*========================================================================*/
/*
** System environmental variables - and general purpose CONSTANTS
*/ enum  /* bit settings */
{
   OFF,
   ON
};

enum  /* logical settings */
{
   FALSE,
   TRUE
};

enum  /* possible (local) states of the user interface */
{
   RECURS_ENTRY,
   MEDIAN_ENTRY,
   AUTO_ENTRY
```

```c
};

enum   /* possible choises for INPUT */
{
   INPUT1,         /* analog RGB input source */
   INPUT2,         /* analog Y (R-Y) (B-Y) input source */
   INPUT3          /* D1 input source */
};

enum   /* Motion Trak: auto-manual (register) threshold selection */
{
   AUTO_1,         /* h/w selection auto style 1 */
   AUTO_2,         /* h/w selection auto style 2 */
   AUTO_3,         /* h/w selection auto style 3 */
   MANUAL          /* h/w selection for manual style */
};

enum   /* automatic styles of user interface */
{
   ASTYLE_0,       /* recursive filter disabled */
   ASTYLE_1,       /* automatic style one */
   ASTYLE_2,       /* automatic style two */
   ASTYLE_3        /* automatic style three */
};

enum   /* choises for output clipping */
{
   NO_CLIP,        /* no output clipping */
   LOW_Y_CLIP,     /* Y only clip at 103% */
   EXT_Y_CLIP,     /* Y only clip at -3% and 103% */
   YC_CLIP         /* Y and C clip at 0% and 100% */
};

enum   /* choises for aperture compensation, peak frequency */
{
   MEDIUM_HZ,      /* peak frequency 5.0 MHz */
   HIGH_HZ,        /* peak frequency 6.75 MHz */
   LOW_HZ,         /* peak frequency 3.5 MHz */
   MEDIUM_HZ2      /* peak frequency 5.0 MHz */
};

/*========================================================================*/
/*
** controls available through DIE-M front panel
**
** NB. if you change this you must rewrite "HndlExStatus()" .....
*/ struct CtrlPanelState
{
   char  UiState       : 2 ;
   char  AutoStyle     : 2 ;
   char  EnhanceOn     : 1 ;
   char  RecursiveOn   : 1 ;
   char  MedianOn      : 1 ;
   char  PositiveOn    : 1 ;

char  Aperture      : 4 ;
   char  Skew          : 4 ;
```

```c
    char Level      : 4 ;
    char Threshold  : 4 ;

char MotionIndx : 4 ;
    char MedianType : 4 ;

char FreezeOn   : 1 ;
    char SoftenOn   : 1 ;
    char AutoOn     : 1 ;
};

typedef struct CtrlPanelState CpSt;

/*==========================================================================*/
/*
** remote controls NOT available through DIE-M front panel
*/ struct ExtendedState
{
    char InputSel   : 2 ;
    char SplitOn    : 1 ;
    char SplitL2R   : 1 ;
    char AdvlH      : 1 ;
    char MfBypass   : 1 ;
    char FrzHiActv  : 1 ;
    char FrzLevSen  : 1 ;

char FrzPosEdge : 1 ;
    char FlushOn    : 1 ;
    char ObRfYEn    : 1 ;
    char ObRfCEn    : 1 ;
    char ObMfYEn    : 1 ;
    char ObMfCEn    : 1 ;
    char LBoxBlnkEn : 1 ;
    char HBlnkWAnl  : 1 ;

char OutClip    : 2 ;
    char ApPkFreq   : 2 ;

char LBoxBlnkW;
};

typedef struct ExtendedState ExSt;

/*==========================================================================*/
/*
** system control data block
*/ struct SystemState
{
    char LocalOn    : 1 ;   * global state *
    char SplitOn    : 1 ;
    char InputSel   : 2 ;
    char ExtenOn    : 1 ;

CpSt Local;     * local control panel state *
    CpSt Remote;    * remote control panel state *
    ExSt Exten;     * extended control functions *
```

```c
    char    KeyWord;    /* location must agree with KEY_ADR in main.s03 */
};

typedef struct SystemState SYS;

SYS     Sys;    /* RAM copy of environment */

/*==========================================================================*/
/*
** Bit states in RAM
*/ bit InSyncPOT1;
bit InSyncPOT2;
bit POT1Over;
bit POT2Over;
bit FlashAfLed;
bit TimerWait;
bit SyncWait;
bit LocalCp;
bit StepFlag;           /* step request flag */
bit SyncRcvd;           /* sync received flag */
bit Uninitialized;      /* init change of Master-Slave state */
bit CtrlDown;           /* Master-Slave button already down */
bit ExWait;             /* extended command active */
bit LBoxHi;             /* Letter Box width command active */
bit NewSys;             /* new remote system status received */
bit UpdateWait;         /* register update pending */

/*==========================================================================*/
/*
** Hardware control bits
*/
if PC data char OUT2_BUF;

static char NR20_R2 = 0;
static char NR20_R3 = 0;
static char NR20_R4 = 0;

static char NR30_R2 = 0;
static char NR30_R3 = 0;
static char NR30_R4 = 0;
static char NR30_R5 = 0;

typedef union
{
    char    by;
    struct
    {
        char b0 :1;
        char b1 :1;
        char b2 :1;
        char b3 :1;
        char b4 :1;
        char b5 :1;
        char b6 :1;
```

```c
    char  b7 :1;

} bt;

} REG;

/* P1 - register */ static REG P1 = { 0 };

define    BTNS_IN           P1.bt.b0
#define    BTNS_CLK          P1.bt.b1
#define    BTNS_LD           P1.bt.b2
#define    CNTROL_BTN        P1.bt.b3
#define    ADC_EOC           P1.bt.b4
#define    TEST1             P1.bt.b5
#define    STD_REMOTE        P1.bt.b6
#define    TEST_OUT          P1.bt.b7

/* P3 - register */ static REG P3 = { 0 };

define    FRAME_SYNC        P3.bt.b2
#define    TEST2             P3.bt.b4

/* OUT0 Buffer */ static REG OUT0 = { 0 };

define    OUT0_BUF          OUT0.by define    SoftOut           OUT0.bt.b6
define    AutoOut           OUT0.bt.b5
#define    FrzOut            OUT0.bt.b4
#define    HfOut             OUT0.bt.b3
#define    RfOut             OUT0.bt.b2
#define    PosOut            OUT0.bt.b1
#define    EnhanceOut        OUT0.bt.b0

/* OUT1 Buffer */ static REG OUT1 = { 0 };

define    OUT1_BUF          OUT1.by define    Input2Led         OUT1.bt.b6
define    Input1Led         OUT1.bt.b5
#define    RemoteLed         OUT1.bt.b4
#define    Input3Out         OUT1.bt.b3
#define    Input1Out         OUT1.bt.b2
#define    SplitOut          OUT1.bt.b1

/* NR20 - Reg 1 */ static REG NR20R1 = { 0 };

define    NR20_R1           NR20R1.by define    Local20En         NR20R1.bt.b7
```

```c
#define     AnlEn               NR20R1.bt.b6
#define     ApSoft              NR20R1.bt.b5
#define     ApEn                NR20R1.bt.b4
#define     FrzEn               NR20R1.bt.b3
#define     SplitEn             NR20R1.bt.b2
#define     RfYEn               NR20R1.bt.b1
#define     RfCEn               NR20R1.bt.b0

/* NR20 - Reg 5 */ static REG NR20R5 = { 0 };

define     NR20_R5             NR20R5.by define     RmSplitL2R          NR20R5.bt.b7
define     RmAdv1H             NR20R5.bt.b6
#define     RmMfBypass          NR20R5.bt.b5
#define     RmFrzHiActv         NR20R5.bt.b3
#define     RmFrzPosEdge        NR20R5.bt.b2
#define     RmFrzLevSen         NR20R5.bt.b1
#define     RmFlushOn           NR20R5.bt.b0

/* NR20 - Reg 6 */ static REG NR20R6 = { 0 };

define     NR20_R6             NR20R6.by define     RmRfYEn             NR20R6.bt.b3
define     RmRfCEn             NR20R6.bt.b2
#define     RmMfYEn             NR20R6.bt.b1
#define     RmMfCEn             NR20R6.bt.b0

/* NR30 - Reg 1 */ static REG NR30R1 = { 0 };

define     NR30_R1             NR30R1.by define     Local30En           NR30R1.bt.b7
define     RmLBoxBlnkEn        NR30R1.bt.b6
#define     RmHBlnkWAnl         NR30R1.bt.b5
#define     RfYEn               NR30R1.bt.b4
#define     RfCEn               NR30R1.bt.b3
define     RfPositive          NR30R1.bt.b2 else / NOT SIMULATION /

/*===========================================================================*/
/*
**          I/O BIT ASSIGNMENTS
*/ define BTNS_IN                 P1.0
define BTNS_CLK                P1.1
#define BTNS_LD                 P1.2
#define CtrlOff                 P1.3
#define ADC_EOC                 P1.4
#define TEST1                   P1.5
#define STD_REMOTE              P1.6
```

```c
define  TEST_OUT              P1.7 define  FRAME_SYNC            P3.2
define  TEST2                 P3.4

/*==========================================================================*/
/*
** BYTE VARIABLES
*/ sfr OUT0_BUF  = 0x23;  /* bit intensive use */
sfr OUT1_BUF  = 0x24;
sfr NR20_R1   = 0x25;
sfr NR20_R5   = 0x26;
sfr NR20_R6   = 0x27;
sfr NR30_R1   = 0x28;

data char OUT2_BUF;

data char NR20_R2;
data char NR20_R3;
data char NR20_R4;

data char NR30_R2;
data char NR30_R3;
data char NR30_R4;
data char NR30_R5;

/* OUT0 Buffer */ define   SoftOut            OUT0_BUF.6
define   AutoOut            OUT0_BUF.5
#define   FrzOut             OUT0_BUF.4
#define   MfOut              OUT0_BUF.3
#define   RfOut              OUT0_BUF.2
#define   PosOut             OUT0_BUF.1
#define   EnhanceOut         OUT0_BUF.0

/* OUT1 Buffer */ define   Input2Led          OUT1_BUF.6
define   Input1Led          OUT1_BUF.5
#define   RemoteLed          OUT1_BUF.4
#define   Input3Out          OUT1_BUF.3
#define   Input1Out          OUT1_BUF.2
#define   SplitOut           OUT1_BUF.1

/* NR20 - Reg 1 */ define   Local20En          NR20_R1.7
define   AnlEn              NR20_R1.6
#define   ApSoft             NR20_R1.5
#define   ApEn               NR20_R1.4
#define   FrzEn              NR20_R1.3
#define   SplitEn            NR20_R1.2
#define   MfYEn              NR20_R1.1
#define   MfCEn              NR20_R1.0

/* NR20 - Reg 5 */
```

```
#define     RmSplitL2R          NR20_R5.7
#define     RmAdv1H             NR20_R5.6
#define     RmMfBypass          NR20_R5.5
#define     RmFrzHiActv         NR20_R5.3
#define     RmFrzPosEdge        NR20_R5.2
#define     RmFrzLevSen         NR20_R5.1
#define     RmFlushOn           NR20_R5.0

/* NR20 - Reg 6 */ define     RmRfYEn             NR20_R6.3
define     RmRfCEn             NR20_R6.2
#define     RmMfYEn             NR20_R6.1
#define     RmMfCEn             NR20_R6.0

/* NR30 - Reg 1 */ define     Local30En           NR30_R1.7
define     RmLBoxBlnkEn        NR30_R1.6
#define     RmHBlnkWAnl         NR30_R1.5
#define     RfYEn               NR30_R1.4
#define     RfCEn               NR30_R1.3
define     RfPositive          NR30_R1.2 endif      / NOT SIMULATION /

/*==========================================================================*/
/*
** Indexed values for Median adjustment
*/ code char MfKernel[8]    = { 0,1,5,7,10,11,12,13 };
code char MfYXlat[16]    = { 0,0,0,0,0,0,0,0,0,0,0,0,0,0,0,0 };
code char MfCXlat[16]    = { 0,0,0,0,0,0,0,0,0,0,0,0,0,0,0,0 };
code char MfMotXlat[16]  = { 0,1,2,3,4,5,6,7,8,9,10,11,12,13,14,15 };
code char MfModXlat[16]  = { 0,3,4,4,5,5,6,6,7,7,8,8,9,9,10,15 };
code char AutoRemap[4]   = { MANUAL, AUTO_1, AUTO_2, AUTO_3 };

/*==========================================================================*/
/*
** Register bit manipulation macros to keep source more transparent
*/ define  SetSkew(val)         ( NR20_R2 = (NR20_R2 & 0x0F) | ((val) << 4) )
define  GetSkew()            ( NR20_R2 >> 4 )
#define  SetAperture(val)     ( NR20_R2 = (NR20_R2 & 0xF0) | (val) )
#define  GetAperture()        ( NR20_R2 & 0x0F )
#define  SetAuto(val)         ( NR30_R1 = (NR30_R1 & -MANUAL) | AutoRemap[(val)] )

#define  SetMfType(val)       ( NR20_R4 = MfKernel[(val)] )
#define  SetMfYThrhld(val)    ( NR20_R3 = (NR20_R3 & 0x0F) | (MfYXlat[(val)] << 4) )
#define  SetMfCThrhld(val)    ( NR20_R3 = (NR20_R3 & 0xF0) | MfCXlat[(val)] )
#define  SetMfMotThrhld(val)  ( NR30_R4 = (NR30_R4 & 0x0F) | (MfMotXlat[(val)] << 4) )
#define  SetMfModThrhld(val)  ( NR30_R4 = (NR30_R4 & 0xF0) | MfModXlat[(val)] )

#define  SetRfYThrhld(val)    ( NR30_R2 = (NR30_R2 & 0x0F) | ((val) << 4) )
#define  SetRfYLevel(val)     ( NR30_R2 = (NR30_R2 & 0xF0) | (val) )

#define  SetRfCThrhld(val)    ( NR30_R3 = (NR30_R3 & 0x0F) | ((val) << 4) )
#define  SetRfCLevel(val)     ( NR30_R3 = (NR30_R3 & 0xF0) | (val) )
```

```c
#define SetSplitL2R(val)    ( NR20_R5 = (val) ? (NR20_R5 | 0x80) : (NR20_R5 & -0x80) )
#define SetAdvlH(val)       ( NR20_R5 = (val) ? (NR20_R5 | 0x40) : (NR20_R5 & -0x40) )
#define SetHfBypass(val)    ( NR20_R5 = (val) ? (NR20_R5 | 0x20) : (NR20_R5 & -0x20) )
#define SetFrzHiActv(val)   ( NR20_R5 = (val) ? (NR20_R5 | 0x80) : (NR20_R5 & -0x80) )
#define SetFrzPosEdge(val)  ( NR20_R5 = (val) ? (NR20_R5 | 0x40) : (NR20_R5 & -0x40) )
#define SetFrzLevSen(val)   ( NR20_R5 = (val) ? (NR20_R5 | 0x20) : (NR20_R5 & -0x20) )
#define SetFlushOn(val)     ( NR20_R5 = (val) ? (NR20_R5 | 0x10) : (NR20_R5 & -0x10) )

#define SetOutClip(val)     ( NR20_R6 = (NR20_R6 & 0xC0) | (((val) & 3) << 6) )
#define SetApPkFreq(val)    ( NR20_R6 = (NR20_R6 & 0x30) | (((val) & 3) << 4) )
#define SetObRfYEn(val)     ( NR20_R6 = (val) ? (NR20_R6 | 0x08) : (NR20_R6 & -0x08) )
#define SetObRfCEn(val)     ( NR20_R6 = (val) ? (NR20_R6 | 0x04) : (NR20_R6 & -0x04) )
#define SetObMfYEn(val)     ( NR20_R6 = (val) ? (NR20_R6 | 0x02) : (NR20_R6 & -0x02) )
#define SetObMfCEn(val)     ( NR20_R6 = (val) ? (NR20_R6 | 0x01) : (NR20_R6 & -0x01) )

#define SetLBoxBlnkEn(val)  ( NR30_R1 = (val) ? (NR30_R1 | 0x40) : (NR30_R1 & -0x40) )
#define SetHBlnkWAnl(val)   ( NR30_R1 = (val) ? (NR30_R1 | 0x20) : (NR30_R1 & -0x20) )

#define SetLBoxBlnkW(val)   ( NR30_R5 = (val) )

/*==========================================================================*/
/*
** User interface control module prototypes
*/ typedef void (* PART)( void );

typedef struct { PART init; PART process; } CTRL;

static CTRL *current;

static void Idle_INIT( void );
static void Idle_PROC( void );
static void Slav_INIT( void );
static void Slav_PROC( void );
static void Manu_INIT( void );
static void Manu_PROC( void );
static void Auto_INIT( void );
static void Auto_PROC( void );
static void Medi_INIT( void );
static void Medi_PROC( void );
static void ChkM_INIT( void );
static void ChkM_PROC( void );

code CTRL Idle_CTRL = { Idle_INIT, Idle_PROC };
code CTRL Slav_CTRL = { Slav_INIT, Slav_PROC };
code CTRL Manu_CTRL = { Manu_INIT, Manu_PROC };
code CTRL Auto_CTRL = { Auto_INIT, Auto_PROC };
code CTRL Medi_CTRL = { Medi_INIT, Medi_PROC };
code CTRL ChkM_CTRL = { ChkM_INIT, ChkM_PROC };

/*==========================================================================*/
/*
** function prototypes and foreward references.
*/
void InitSys( void );
void EstabExten( void );
void EstabSys( void );
void SetUiState( void );
```

```c
void TestMaster( void );
void TestSlave( void );
void TestRemote( void );
void GetNextEvent( void );
void WriteCtrl( void );

static void NewCTRL( CTRL *next );
static void TurnEnhaOff( void );
static void EstabInput( char Choise );
static void EstabSplit( char Choise );
static void EstabCp( CpSt *Cp );
static void SetEnhance( bit EnhanceOn );
static void SetAutoStyle( bit RfOn, char Style );
static void CheckPOT3and4( void );
static void ToggleRecursive( void );
static void ToggleMedian( bit BwOn );
static void ToggleFreeze( void );
static void SelectInput( char Button );
static void ToggleSoften( void );
static void ToggleSplit( bit BwOn );
static void TogglePositive( void );
static void ToggleAuto( void );
static void ToggleMaster( void );
static void ChkCommon( void );
static void SendExStatus( void );
static void InitSlave( void );
static void InitMaster( void );
static void WaitMsecs( char Msecs );
static void LastSys( void );
static void ChkEEROM( void );
static void InitEEROM( void );

/*
** POT truncation shifts
*/ define TruncMotionIndx     4
define TruncMedianType     5
#define TruncRfLevel        4
#define TruncRfThrhld       4
#define TruncAutoStyle      6

/*============================================================================*/
/*
** Start of POT macros
*/
#define InitPOT1( var, trunc)   ( POT1Over = ((ReadPOT1() >> trunc) > (var)) )

#define InitPOT2( var, trunc)   ( POT2Over = ((ReadPOT2() >> trunc) > (var)) )

#define LoadFromTEMP_BUF( var )   ( var = TEMP_BUF )

#define TestPOT1( var, trunc )                              \
   if ( (TEMP_BUF = ReadPOT1()) >> trunc) > (var) )         \
      TEMP_BUF = (TEMP_BUF - 3) >> trunc;                   \
   else                                                     \
      TEMP_BUF >>= trunc;

#define TestPOT2( var, trunc )
```

```c
      if( ((TEMP_BUF = ReadPOT2()) >> trunc) > (var) )       \
         TEMP_BUF = (TEMP_BUF - 3) >> trunc;                 \
      else                                                    \
         TEMP_BUF >>= trunc;

#define ChkSyncPOT1( var, trunc )                            \
                                                              \
   InSyncPOT1 = POT1Over ?                                   \
   ((ReadPOT1() >> trunc) <= (var)) : ((ReadPOT1() >> trunc) >= (var))

#define ChkSyncPOT2( var, trunc )                            \
                                                              \
   InSyncPOT2 = POT2Over ?                                   \
   ((ReadPOT2() >> trunc) <= (var)) : ((ReadPOT2() >> trunc) >= (var))

/* End of POT macros */

/*============================================================*/
/*
** switch controlling process
*/
   static void
NewCTRL( CTRL *next )
{
   (*next->init)();
   current = next;
}

/*============================================================*/
/*
** This routine generates the button events.
** initialization: BtnIsDown = FALSE, BtnIsLong = FALSE
*/ static bit BtnIsDown;
static bit BtnIsLong;

static data char EventDelay;

void
GetNextEvent( void )
{
   extern data char Event;
   extern data char Button;

data char counter;

BTNS_LD = OFF;          /* load button shift registers */
   BTNS_LD = ON;           /* end load of shift registers */ if( BtnIsDown )         /* already down? */
   {
      counter = Button & ~LONG_BIT;

while( counter-- )
      {
         BTNS_CLK = ON;
         BTNS_CLK = OFF;
```

```c
      if( BTNS_IN )        /* still down? */
      {
         if( BtnIsLong || (-+EventDelay < MAX_DELAY) )  /* already declared long? */
         {
            Event = NoChg;
            return;
         }
         else  /* depression declared long */
         {
            Event = BtnDn;
            Button |= LONG_BIT;
            BtnIsLong = TRUE;
            return;
         }
      }
      else                  /* has been released */
      {
         Event = BtnUp;
         BtnIsDown = FALSE;
         BtnIsLong = FALSE;
         return;
      }
   }
   else                     /* button still up? */
   {
      for( counter = 0; counter < LAST_PLUS_ONE; counter++ )
      {
         if( BTNS_IN )
         {
            Event = BtnDn;
            Button = counter;
            EventDelay = 0;
            BtnIsDown = TRUE;
            BtnIsLong = FALSE;
            return;
         }
         BTNS_CLK = ON;
         BTNS_CLK = OFF;
      }
      Event = NoChg;
   }
}

/*============================================================================*/
/*
** Dummy POT read routines
*/
if PC static unsigned char ReadPOT1( void ) { return Pot1V; }
static unsigned char ReadPOT2( void ) { return Pot2V; }
static unsigned char ReadPOT3( void ) { return Pot3V; }
static unsigned char ReadPOT4( void ) { return Pot4V; } else  /* Actual Potentiometer code */

/*============================================================================*/
/*
** potentiometer port addresses
*/
```

```c
#define POT1    (*(char *) 0x01C000)
#define POT2    (*(char *) 0x01C001)
#define POT3    (*(char *) 0x01C002)
#define POT4    (*(char *) 0x01C003)

/*==========================================================================*/
/*
** Read out setting of Potentiometer
*/
   char
ReadPOT1( void )
{
start:

POT1 = 0;      /* start conversion */

SyncRcvd = 0;

while( ADC_EOC )
      if( SyncRcvd )
         goto start;

while( !ADC_EOC )
      if( SyncRcvd )
         goto start;

return POT1;
}
/*==========================================================================*/
/*
** Read out setting of Potentiometer
*/
   char
ReadPOT2( void )
{
start:

POT2 = 0;      /* start conversion */

SyncRcvd = 0;

while( ADC_EOC )
      if( SyncRcvd )
         goto start;

while( !ADC_EOC )
      if( SyncRcvd )
         goto start;

return POT2;
}
/*==========================================================================*/
/*
** Read out setting of Potentiometer
*/
   char
ReadPOT3( void )

start:
```

```c
      POT3 = 0;      /* start conversion */

SyncRcvd = 0;

while( ADC_EOC )
      if( SyncRcvd )
         goto start;

while( !ADC_EOC )
      if( SyncRcvd )
         goto start;

return POT3;
}
/*============================================================================*/
/*
** Read out setting of Potentiometer
*/
   char
ReadPOT4( void )
{
start:

POT4 = 0;      /* start conversion */

SyncRcvd = 0;

while( ADC_EOC )
      if( SyncRcvd )
         goto start;

while( !ADC_EOC )
      if( SyncRcvd )
         goto start;

return POT4;
}
#endif   /* Potentiometer code */

/*============================================================================*/
/*
** output ports to DIE hardware registers
*/ define PORT0         (*(char *) 0x018000)
define PORT1         (*(char *) 0x018001)
#define PORT2         (*(char *) 0x018002)
#define PORT3         (*(char *) 0x018003)

/*============================================================================*/
/*
* remapped register addresses
*/ define RM20_R1      0x02
define RM20_R2      0x03
#define RM20_R3      0x04
#define RM20_R4      0x05
```

```c
#define RM20_R5         0x06
define RM20_R6         0x07 define RM30_R1         0x10
define RM30_R2         0x11
#define RM30_R3         0x12
#define RM30_R4         0x13
#define RM30_R5         0x14

/*
** STROBE, SET DATA and WRITE DATA register commands
*/ define ADDR_STROBE_ON    0x60
define ADDR_STROBE_OFF   0x40
#define SET_DATA          0x40
define WRITE_DATA        0x00 define NR20_R1_ON      (ADDR_STROBE_ON  | RM20_R1)
define NR20_R1_OFF     (ADDR_STROBE_OFF | RM20_R1)
#define NR20_R2_ON      (ADDR_STROBE_ON  | RM20_R2)
#define NR20_R2_OFF     (ADDR_STROBE_OFF | RM20_R2)
#define NR20_R3_ON      (ADDR_STROBE_ON  | RM20_R3)
#define NR20_R3_OFF     (ADDR_STROBE_OFF | RM20_R3)
#define NR20_R4_ON      (ADDR_STROBE_ON  | RM20_R4)
#define NR20_R4_OFF     (ADDR_STROBE_OFF | RM20_R4)
#define NR20_R5_ON      (ADDR_STROBE_ON  | RM20_R5)
#define NR20_R5_OFF     (ADDR_STROBE_OFF | RM20_R5)
#define NR20_R6_ON      (ADDR_STROBE_ON  | RM20_R6)
#define NR20_R6_OFF     (ADDR_STROBE_OFF | RM20_R6)

#define NR30_R1_ON      (ADDR_STROBE_ON  | RM30_R1)
#define NR30_R1_OFF     (ADDR_STROBE_OFF | RM30_R1)
#define NR30_R2_ON      (ADDR_STROBE_ON  | RM30_R2)
#define NR30_R2_OFF     (ADDR_STROBE_OFF | RM30_R2)
#define NR30_R3_ON      (ADDR_STROBE_ON  | RM30_R3)
#define NR30_R3_OFF     (ADDR_STROBE_OFF | RM30_R3)
#define NR30_R4_ON      (ADDR_STROBE_ON  | RM30_R4)
#define NR30_R4_OFF     (ADDR_STROBE_OFF | RM30_R4)
#define NR30_R5_ON      (ADDR_STROBE_ON  | RM30_R5)
#define NR30_R5_OFF     (ADDR_STROBE_OFF | RM30_R5)

#define BIT3            (1 << 3)

#define LoNibble(val)   {temp = val; if((temp &= 0xF)&BIT3) temp ^= 0x18; }
#define HiNibble(val)   {temp = (val)>>4; if((temp &= 0xF)&BIT3) temp ^= 0x18; }

/*========================================================================*/
/*
** Reads last Sys from EEROM if keyword valid - else sets to factory preset
*/
define EEROM           0x010100 static void
LastSys( void )
{
    SYS *ROM = (SYS *) EEROM;

if(ROM->KeyWord == KEYWORD)
        Sys = *ROM;
```

```c
      else
         InitSys();
   }
/*===========================================================================*/
/*
** Writes a new byte to EEROM storage if needed
*/
   void
ChkEEROM( void )
{
   char i, *To = (char *) EEROM, *From = (char *) &Sys;

for( i = 0; i < sizeof( SYS ); i++, To++, From++ )
   {
      if( *To != *From )
      {
         *To = *From;
         return;
      }
   }
}
/*===========================================================================*/
/*
** Writes all new bytes to EEROM storage then exits
*/
   void
InitEEROM( void )
{
   char i, *To = (char *) EEROM, *From = (char *) &Sys;

for( i = 0; i < sizeof( SYS ); i++, To++, From++ )
   {
      if( *To != *From )
      {
         *To = *From;
         do {} while( *To != *From );
      }
   }
}
/*===========================================================================*/
/*
** Routine updates all the DIE control registers.
** Minimises stack and data usage.
*/
   void
WriteCtrl( void )
{
   #define  PERIOD     0x20      /* LED pulse period */ extern SYS Sys;               /* RAM copy of environment */ static data char temp;        /* CARE!!! needed due to lack of reentrancy */
   extern data char LEDClock;

LEDClock = (--LEDClock) % PERIOD;   /* another tick */

/* update CTRL registers 0,1 & 2 */ define  RfBit      (1 << 2)
   #define  MfBit      (1 << 3)
```

```c
#define AutoBit    (1 << 5)

#define BLANK      (1 << 6)
#define AUTO       (2 << 6)

if( EnhanceOut )
{
   if( FlashMfLed )
   {
      PORT0 = (LEDClock < PERIOD/2 ) ? ((OUT0_BUF & ~AutoBit) | MfBit) : (OUT0_BUF & ~(MfBit | AutoBit));
      PORT2 = OUT2_BUF;
   }
   else if( AutoOut )   /* cycle display:- NUM...BLANK...A...BLANK... */
   {
      PORT0 = OUT0_BUF;
      if( LEDClock < PERIOD * 3/8 )
         PORT2 = OUT2_BUF;
      else if( LEDClock < PERIOD /2 )
         PORT2 = OUT2_BUF | BLANK;
      else if( LEDClock < PERIOD * 7/8 )
         PORT2 = OUT2_BUF | AUTO;
      else
         PORT2 = OUT2_BUF | BLANK;
   }
   else /* enhanced, but neither median adjustment nor auto style */
   {
      PORT0 = OUT0_BUF;
      PORT2 = OUT2_BUF;
   }
}
else  /* not enhanced */
{
   PORT0 = OUT0_BUF;
   PORT2 = OUT2_BUF;
}
PORT1 = OUT1_BUF;

if( LocalCp )
{
   /* update NR20 register 1 */

PORT3 = ADDR_STROBE_ON;
   PORT3 = ADDR_STROBE_OFF;

LoNibble( NR20_R1 )

if( StepFlag )   /* unfreeze for one frame if STEP on */
   {
      temp &= ~0x10;
      StepFlag = OFF;
   }

PORT3 = SET_DATA | temp;
   PORT3 = WRITE_DATA | temp;

PORT3 = ADDR_STROBE_ON+1;
   PORT3 = ADDR_STROBE_OFF+1;

HiNibble( NR20_R1 )
```

```
    PORT3 = SET_DATA | temp;
    PORT3 = WRITE_DATA | temp;

PORT3 = NR20_R1_ON;
    PORT3 = NR20_R1_OFF;
    PORT3 = SET_DATA;
    PORT3 = WRITE_DATA;

/* update NR20 register 2 */

PORT3 = ADDR_STROBE_ON;
    PORT3 = ADDR_STROBE_OFF;

LoNibble( NR20_R2 )

PORT3 = SET_DATA | temp;
    PORT3 = WRITE_DATA | temp;

PORT3 = ADDR_STROBE_ON+1;
    PORT3 = ADDR_STROBE_OFF+1;

HiNibble( NR20_R2 )

PORT3 = SET_DATA | temp;
    PORT3 = WRITE_DATA | temp;

PORT3 = NR20_R2_ON;
    PORT3 = NR20_R2_OFF;
    PORT3 = SET_DATA;
    PORT3 = WRITE_DATA;

/* update NR20 register 3 */

PORT3 = ADDR_STROBE_ON;
    PORT3 = ADDR_STROBE_OFF;

LoNibble( NR20_R3 )

PORT3 = SET_DATA | temp;
    PORT3 = WRITE_DATA | temp;

PORT3 = ADDR_STROBE_ON+1;
    PORT3 = ADDR_STROBE_OFF+1;

HiNibble( NR20_R3 )

PORT3 = SET_DATA | temp;
    PORT3 = WRITE_DATA   temp;

PORT3 = NR20_R3_ON;
    PORT3 = NR20_R3_OFF;
    PORT3 = SET_DATA;
    PORT3 = WRITE_DATA;

/* update NR20 register 4 */

PORT3 = ADDR_STROBE_ON;
    PORT3 = ADDR_STROBE_OFF;

LoNibble( NR20_R4 )
```

```c
    PORT3 = SET_DATA | temp;
    PORT3 = WRITE_DATA | temp;

PORT3 = ADDR_STROBE_ON+1;
    PORT3 = ADDR_STROBE_OFF-1;

HiNibble( NR20_R4 )

PORT3 = SET_DATA | temp;
    PORT3 = WRITE_DATA | temp;

PORT3 = NR20_R4_ON;
    PORT3 = NR20_R4_OFF;
    PORT3 = SET_DATA;
    PORT3 = WRITE_DATA;

/* update NR20 register 5 */

PORT3 = ADDR_STROBE_ON;
    PORT3 = ADDR_STROBE_OFF;

LoNibble( NR20_R5 )

PORT3 = SET_DATA | temp;
    PORT3 = WRITE_DATA | temp;

PORT3 = ADDR_STROBE_ON+1;
    PORT3 = ADDR_STROBE_OFF+1;

HiNibble( NR20_R5 )

PORT3 = SET_DATA | temp;
    PORT3 = WRITE_DATA | temp;

PORT3 = NR20_R5_ON;
    PORT3 = NR20_R5_OFF;
    PORT3 = SET_DATA;
    PORT3 = WRITE_DATA;

/* update NR20 register 6 */

PORT3 = ADDR_STROBE_ON;
    PORT3 = ADDR_STROBE_OFF;

LoNibble( NR20_R6 )

PORT3 = SET_DATA | temp;
    PORT3 = WRITE_DATA | temp;

PORT3 = ADDR_STROBE_ON+1;
    PORT3 = ADDR_STROBE_OFF+1;

HiNibble( NR20_R6 )

PORT3 = SET_DATA | temp;
    PORT3 = WRITE_DATA | temp;

PORT3 = NR20_R6_ON;
    PORT3 = NR20_R6_OFF;
```

```
    PORT3 = SET_DATA;
    PORT3 = WRITE_DATA;

/* update NR30 register 1 */

PORT3 = ADDR_STROBE_ON;
    PORT3 = ADDR_STROBE_OFF;

LoNibble( NR30_R1 )

PORT3 = SET_DATA | temp;
    PORT3 = WRITE_DATA | temp;

PORT3 = ADDR_STROBE_ON+1;
    PORT3 = ADDR_STROBE_OFF+1;

HiNibble( NR30_R1 )

PORT3 = SET_DATA | temp;
    PORT3 = WRITE_DATA | temp;

PORT3 = NR30_R1_ON;
    PORT3 = NR30_R1_OFF;
    PORT3 = SET_DATA;
    PORT3 = WRITE_DATA;

/* update NR30 register 2 */

PORT3 = ADDR_STROBE_ON;
    PORT3 = ADDR_STROBE_OFF;

LoNibble( NR30_R2 )

PORT3 = SET_DATA | temp;
    PORT3 = WRITE_DATA | temp;

PORT3 = ADDR_STROBE_ON+1;
    PORT3 = ADDR_STROBE_OFF+1;

HiNibble( NR30_R2 )

PORT3 = SET_DATA | temp;
    PORT3 = WRITE_DATA | temp;

PORT3 = NR30_R2_ON;
    PORT3 = NR30_R2_OFF;
    PORT3 = SET_DATA;
    PORT3 = WRITE_DATA;

/* update NR30 register 3 */

PORT3 = ADDR_STROBE_ON;
    PORT3 = ADDR_STROBE_OFF;

LoNibble( NR30_R3 )

PORT3 = SET_DATA | temp;
    PORT3 = WRITE_DATA | temp;

PORT3 = ADDR_STROBE_ON+1;
```

```
    PORT3 = ADDR_STROBE_OFF+1;

HiNibble( NR30_R3 )

PORT3 = SET_DATA   temp;
    PORT3 = WRITE_DATA | temp;

PORT3 = NR30_R3_ON;
    PORT3 = NR30_R3_OFF;
    PORT3 = SET_DATA;
    PORT3 = WRITE_DATA;

/* update NR30 register 4 */

PORT3 = ADDR_STROBE_ON;
    PORT3 = ADDR_STROBE_OFF;

LoNibble( NR30_R4 )

PORT3 = SET_DATA | temp;
    PORT3 = WRITE_DATA | temp;

PORT3 = ADDR_STROBE_ON+1;
    PORT3 = ADDR_STROBE_OFF+1;

HiNibble( NR30_R4 )

PORT3 = SET_DATA   temp;
    PORT3 = WRITE_DATA   temp;

PORT3 = NR30_R4_ON;
    PORT3 = NR30_R4_OFF;
    PORT3 = SET_DATA;
    PORT3 = WRITE_DATA;

/* update NR30 register 5 */

PORT3 = ADDR_STROBE_ON;
    PORT3 = ADDR_STROBE_OFF;

LoNibble( NR30_R5 )

PORT3 = SET_DATA | temp;
    PORT3 = WRITE_DATA | temp;

PORT3 = ADDR_STROBE_ON+1;
    PORT3 = ADDR_STROBE_OFF+1;

HiNibble( NR30_R5 )

PORT3 = SET_DATA   temp;
    PORT3 = WRITE_DATA   temp;

PORT3 = NR30_R5_ON;
    PORT3 = NR30_R5_OFF;
    PORT3 = SET_DATA;
    PORT3 = WRITE_DATA;
                              * end of Local Only code *

*=============================================================================*
```

```c
/*
** Routine initializes all state variables.
*/
    void
InitSys( void )
{
    Sys.LocalOn             = TRUE;
    Sys.SplitOn             = FALSE;
    Sys.InputSel            = INPUT3;
    Sys.ExtenOn             = FALSE;

Sys.Local.UiState       = RECURS_ENTRY;
    Sys.Local.EnhanceOn     = FALSE;
    Sys.Local.AutoStyle     = ASTYLE_1;
    Sys.Local.RecursiveOn   = FALSE;
    Sys.Local.MedianOn      = FALSE;
    Sys.Local.PositiveOn    = TRUE;
    Sys.Local.Aperture      = 0;
    Sys.Local.Skew          = 8;
    Sys.Local.Level         = 6;
    Sys.Local.Threshold     = 6;
    Sys.Local.MotionIndx    = 6;
    Sys.Local.MedianType    = 1;
    Sys.Local.FreezeOn      = FALSE;
    Sys.Local.SoftenOn      = FALSE;
    Sys.Local.AutoOn        = FALSE;

Sys.Remote = Sys.Local;

Sys.Exten.InputSel      = INPUT3;
    Sys.Exten.SplitOn       = FALSE;
    Sys.Exten.SplitL2R      = OFF;
    Sys.Exten.AdvlH         = OFF;
    Sys.Exten.MfBypass      = OFF;
    Sys.Exten.FrzHiActv     = OFF;
    Sys.Exten.FrzLevSen     = OFF;
    Sys.Exten.FrzPosEdge    = OFF;
    Sys.Exten.FlushOn       = OFF;
    Sys.Exten.ObRfYEn       = ON;
    Sys.Exten.ObRfCEn       = ON;
    Sys.Exten.ObMfYEn       = ON;
    Sys.Exten.ObMfCEn       = ON;
    Sys.Exten.LBoxBlnkEn    = OFF;
    Sys.Exten.HBlnkWAnl     = OFF;

Sys.Exten.OutClip       = NO_CLIP;
    Sys.Exten.ApPkFreq      = HIGH_HZ;

Sys.Exten.LBoxBlnkW     = 0;

Sys.KeyWord             = KEYWORD;
}
/*===========================================================================*
*
** Sets local automatic modes - overridden by the Recursive ON/OFF state
*/
    static void
SetAutoStyle( bit RfOn, char Style )
{
    if( RfOn && Style != ASTYLE_0 )
```

```c
   {
      RfYEn = ON;
      RfCEn = ON;
   }
   else
   {
      RfYEn = OFF;
      RfCEn = OFF;
   }
   SetAuto( Style );
}
/*==========================================================================*/
/*
** Switches off all image enhancement
*/
   static void
TurnEnhaOff( void )
{
   Sys.Local.EnhanceOn = FALSE;    /* disable Image Enhancement */

EnhanceOut  = OFF;     /* Turn off LED */
   FlashMfLed  = OFF;     /* stop Mf flashing */

AutoOut  = OFF;
   SplitEn  = OFF;
   ApEn     = OFF;        /* master disable */
   MfYEn    = OFF;
   MfCEn    = OFF;
}
/*==========================================================================*/
/*
** Routine sets hardware to the input requested
*/
   static void
EstabInput( char Choise )
{
   switch( Choise )       /* setup input selection */
   {
      case INPUT1:                  /* RGB */
         Input1Out  = ON;
         Input3Out  = ON;
         Input1Led  = ON;
         Input2Led  = OFF;
         AnlEn      = ON;
         break;

case INPUT2:                  /* Y (R-Y) (B-Y) */
         Input1Out  = OFF;
         Input3Out  = ON;
         Input1Led  = OFF;
         Input2Led  = ON;
         AnlEn      = ON;
         break;

case INPUT3:                  /* D1 */
         Input1Out  = OFF;
         Input3Out  = OFF;
         Input1Led  = OFF;
         Input2Led  = OFF;
         AnlEn      = OFF;
```

```c
      break;

default:
      break;
  }
}
/*============================================================================*/
/*
** Routine sets hardware for split screen mode
*/
  static void
EstabSplit( char Choise )
{
  if( Choise )           /* split screen setting */
  {
    SplitOut = ON;
    SplitEn  = ON;
  }
  else
  {
    SplitOut = OFF;
    SplitEn  = OFF;
  }
}
/*============================================================================*/
/*
** Routine sets hardware to choises given by CpSt data block
*/
  static void
EstabCp( CpSt *Cp )
{
  SetRfYLevel( Cp->Level );
  SetRfCLevel( Cp->Level );
  SetRfYThrhld( Cp->Threshold );
  SetRfCThrhld( Cp->Threshold );
  SetAperture( Cp->Aperture );
  SetSkew( Cp->Skew );

if( Cp->FreezeOn )      /* freeze setting */
  {
    FrzOut = ON;
    FrzEn  = ON;
  }
  else
  {
    FrzOut = OFF;
    FrzEn  = OFF;
  } if( Cp->PositiveOn )    /* positive - negative setting */
  {
    PosOut     = ON;
    RfPositive = ON;
  }
  else
  {
    PosOut     = OFF;
    RfPositive = OFF;
```

```
if( Cp->RecursiveOn )       /* recursive filter setting */
{
   RfOut = ON;
   RfYEn = ON;
   RfCEn = ON;
}
else
{
   RfOut = OFF;
   RfYEn = OFF;
   RfCEn = OFF;
}
                            /* median filter setting */
SetMfType( Cp->MedianType );
SetMfYThrhld( Cp->MotionIndx );
SetMfCThrhld( Cp->MotionIndx );
SetMfMotThrhld( Cp->MotionIndx );
SetMfModThrhld( Cp->MotionIndx );

if( Cp->MedianOn )
{
   MfYEn = ON;
   MfCEn = ON;
   MfOut = ON;
}
else
{
   MfYEn = OFF;
   MfCEn = OFF;
   MfOut = OFF;
} if( Cp->AutoOn )            /* automatic motion compensation */
{
   AutoOut = ON;
   SetAutoStyle( Cp->RecursiveOn, Cp->AutoStyle );
}
else
{
   AutoOut = OFF;
   SetAuto( OFF );
} if( Cp->SoftenOn )          /* soften - sharpen selection */
{
   SoftOut = ON;
   ApSoft  = ON;
}
else
{
   SoftOut = OFF;
   ApSoft  = OFF;
} if( Cp->EnhanceOn )
{
   ApEn       = ON;
   EnhanceOut = ON;
}
else
```

```c
    {
        ApEn      = OFF;
        EnhanceOut = OFF;
        AutoOut   = OFF;
        MfYEn     = OFF;
        MfCEn     = OFF;
    }
}
/*============================================================================*/
/*
** Routine overides on board switch settings
*/
    void
EstabExten( void )
{
    SetSplitL2R( Sys.Exten.SplitL2R );
    SetAdv1H( Sys.Exten.Adv1H );
    SetMfBypass( Sys.Exten.MfBypass );
    SetFrzHiActv( Sys.Exten.FrzHiActv );
    SetFrzPosEdge( Sys.Exten.FrzPosEdge );
    SetFrzLevSen( Sys.Exten.FrzLevSen );
    SetFlushOn( Sys.Exten.FlushOn );

SetOutClip( Sys.Exten.OutClip );
    SetApPkFreq( Sys.Exten.ApPkFreq );
    SetObRfYEn( Sys.Exten.ObRfYEn );
    SetObRfCEn( Sys.Exten.ObRfCEn );
    SetObMfYEn( Sys.Exten.ObMfYEn );
    SetObMfCEn( Sys.Exten.ObMfCEn );

SetLBoxBlnkEn( Sys.Exten.LBoxBlnkEn );
    SetHBlnkWAnl( Sys.Exten.HBlnkWAnl );

SetLBoxBlnkW( Sys.Exten.LBoxBlnkW );
}
/*============================================================================*/
/*
** Routine sets hardware registers according to system settings.
*/
    void
EstabSys( void )
{
    RfYEn = ON;         /* always enabled */
    RfCEn = ON;

if( Sys.LocalOn )                   /* LOCAL CONTROL */
    {
        EstabInput( Sys.InputSel );
        EstabSplit( Sys.SplitOn );
        EstabCp( &Sys.Local );
        Local2OEn = ON;
        Local3OEn = ON;
        RemoteLed = OFF;
    }
    else if( Sys.ExtenOn )              /* EXTENDED REMOTE */
    {
        EstabInput( Sys.Exten.InputSel );
        EstabSplit( Sys.Exten.SplitOn );
        EstabCp( &Sys.Remote );
        EstabExten();
```

```c
      Local20En = OFF;
      Local30En = OFF;
      RemoteLed = ON;
   }
   else                                /* REDUCED REMOTE */
   {
      EstabInput( Sys.InputSel );
      EstabSplit( Sys.SplitOn );
      EstabCp( &Sys.Remote );
      Local20En = ON;
      Local30En = ON;
      RemoteLed = ON;
   }
}
/*==========================================================================*/
/*
** Routine to schedule correct entry state of User Interface.
*/
   void
SetUiState( void )
{
   EstabSys();                  /* reset hardware values */ if( Sys.LocalOn )            /* reset user interface */
   {
      if( Sys.Local.EnhanceOn )
      {
         LEDClock    = 0;       /* restart any pulsing */
         EnhanceOut  = ON;      /* enable Image Enhancement. Turn on LED */ switch( Sys.Local.UiState )
         {
            case RECURS_ENTRY:
               NewCTRL( &Manu_CTRL );
               break;

case AUTO_ENTRY:
               NewCTRL( &Auto_CTRL );
               break;

case MEDIAN_ENTRY:
               NewCTRL( &Medi_CTRL );
               break;
         }
      }
      else
         NewCTRL( &Idle_CTRL );
   }
   else
      NewCTRL( &Slav_CTRL );
}
/*==========================================================================*/
/*
** Routine to schedule correct entry state of User Interface through ENHANCE.
*/
   static void
SetEnhance( bit EnhanceOn )
{
   if( EnhanceOn )
```

```c
            Sys.Local.EnhanceOn = ON;   /* update data structure */

EstabSys();                /* reset hardware values */
            LEDClock    = 0;           /* restart any pulsing */
            EnhanceOut  = ON;          /* enable Image Enhancement. Turn on LED */ switch( Sys.Local.UiState )
            {
               case RECURS_ENTRY:
                  NewCTRL( &Manu_CTRL );
                  break;

case AUTO_ENTRY:
                  NewCTRL( &Auto_CTRL );
                  break;

case MEDIAN_ENTRY:
                  NewCTRL( &Medi_CTRL );
                  break;
            }
        }
        else
        {
            Sys.Local.EnhanceOn = OFF;
            NewCTRL( &Idle_CTRL );
        }
}
/*==========================================================================*/
/*
** Checks POT3 and POT4, which are always synchronized: SKEW & APERTURE
*/
    static void
CheckPOT3and4( void )
{
    /* H/V skew value */
    NR20_R2 = (((TEMP_BUF = ReadPOT3()) & 0xF0) > (NR20_R2 & 0xF0)) ?
                            (((TEMP_BUF-3) & 0xF0) | (NR20_R2 & 0x0F)) :
                                    ((TEMP_BUF & 0xF0) | (NR20_R2 & 0x0F));
    /* aperture value */
    NR20_R2 = (((TEMP_BUF = ReadPOT4()) >> 4) > (NR20_R2 & 0x0F)) ?
                            (((TEMP_BUF-3) >> 4) | (NR20_R2 & 0xF0)) :
                                    ((TEMP_BUF >> 4) | (NR20_R2 & 0xF0));

Sys.Local.Skew      = GetSkew();
    Sys.Local.Aperture  = GetAperture();
}

/*==========================================================================*/
/*
** Routine toggles RECURSIVE to opposite state
*/
    static void
ToggleRecursive( void )
{
    if( Sys.Local.RecursiveOn )
    {
        Sys.Local.RecursiveOn = FALSE;

RfVEn = OFF;
        RfCEn = OFF;
```

```c
         RfOut = OFF;
      }
      else
      {
         Sys.Local.RecursiveOn = TRUE;

RfYEn = ON;
         RfCEn = ON;
         RfOut = ON;
      }
}
/*========================================================================*/
/*
** Routine toggles MEDIAN FILTER ON/OFF to opposite state. If Median Hw off,
** only the LED and data structures are set to on.
*/
   static void
ToggleMedian( bit HwOn )
{
   if( Sys.Local.MedianOn )
   {
      Sys.Local.MedianOn = FALSE;

MfOut = OFF;
      MfCEn = OFF;
      MfYEn = OFF;
   }
   else
   {
      Sys.Local.MedianOn = TRUE;

MfOut = ON;

if( HwOn )
      {
         MfCEn = ON;
         MfYEn = ON;
      }
   }
}
/*========================================================================*/
/*
** Routine toggles FREEZE ON/OFF to opposite state
*/
   static void
ToggleFreeze( void )
{
   if( Sys.Local.FreezeOn )
   {
      Sys.Local.FreezeOn = FALSE;

FrzOut   = OFF;
      FrzEn    = OFF;
   }
   else
   {
      Sys.Local.FreezeOn = TRUE;

FrzOut   = ON;
      FrzEn    = ON;
```

```c
/*============================================================================*/
/*
** Reset the input selection as determined by the button push.
*/
   static void
SelectInput( char Button )
{
   if( Sys.LocalOn | Sys.ExtenOn == OFF )
   {
      switch( Button )
      {
         case BTN_INPUT1:
            Sys.InputSel = INPUT1;
            break;

case BTN_INPUT2:
            Sys.InputSel = INPUT2;
            break;

case BTN_INPUT3:
            Sys.InputSel = INPUT3;
            break;
      }
      EstabInput( Sys.InputSel );
   }
}
/*============================================================================*/
/*
** Routine toggles SOFTEN / SHARPEN state
*/
   static void
ToggleSoften( void )
{
   if( Sys.Local.SoftenOn )
   {
      Sys.Local.SoftenOn = FALSE;

SoftOut = OFF;
      ApSoft  = OFF;
   }
   else
   {
      Sys.Local.SoftenOn = TRUE;

SoftOut = ON;
      ApSoft  = ON;
   }
}
/*============================================================================*/
/*
** Routine toggles SPLIT SCREEN state. If Hw disabled, only LED and data changed
*/
   static void
ToggleSplit( bit HwOn )
{
   if( Sys.LocalOn | Sys.ExtenOn == OFF )
   {
      if( Sys.SplitOn )
```

```c
      {
         Sys.SplitOn = FALSE;

SplitOut = OFF;
         SplitEn  = OFF;
      }
      else
      {
         Sys.SplitOn = TRUE;

SplitOut = ON;
         SplitEn  = HvOn ? ON : OFF;
      }
   }

/*===========================================================================*/
/*
 * Routine toggles POSITIVE ON/OFF.
 */
   static void
TogglePositive( void )
{
   if( Sys.Local.PositiveOn )
   {
      Sys.Local.PositiveOn = FALSE;

PosOut     = OFF;
      RfPositive = OFF;
   }
   else
   {
      Sys.Local.PositiveOn = TRUE;

PosOut     = ON;
      RfPositive = ON;
   }
}

/*===========================================================================*/
/*
 * Routine switches between AUTO and MANUAL modes
 */
   static void
ToggleAuto( void )
{
   if( Sys.Local.AutoOn )
   {
      Sys.Local.AutoOn = FALSE;
      NewCTRL( &Manu_CTRL );
   }
   else
   {
      Sys.Local.AutoOn = TRUE;
      NewCTRL( &Auto_CTRL );
   }
}

/*===========================================================================*/
/*
 * Change of MASTER controller
 */
   static void
```

```c
oggleMaster( void )

Sys.LocalOn = Sys.LocalOn ? FALSE : TRUE;

Uninitialized = TRUE;

if PC
  SetUiState();
endif
/*==========================================================================*/
*
* Routine checks for common button presses and processes them
*/
  static void
ikCommon( void )

switch( Button )
  {
    case BTN_FREEZE:
       ToggleFreeze();
       break;

case BTN_STEP:
       if( Sys.LocalOn && Sys.Local.FreezeOn )
          StepFlag = ON;
       break;

case BTN_SOFT:
       ToggleSoften();
       break;

case BTN_SPLIT:
       ToggleSplit( ON );
       break;

case BTN_POSITIVE:
       TogglePositive();
       break;

case BTN_INPUT1:
    case BTN_INPUT2:
    case BTN_INPUT3:
       SelectInput( Button );
       break;

case BTN_SLAVE:          /* change of MASTER */
       ToggleMaster();
       break;

default:
       break;
  }

/*==========================================================================*/
*
* Initialization routine for IDLE state - all image enhancements are turned OFF static void
Ile_INIT( void )
```

```c
#if PC
   TR( "IDLE    " )
#endif

TurnEnhaOff();    /* stop all image enhancement */
}
/*============================================================================*/
/*
** Process control driver for IDLE state - all image enhancements are turned OFF
*/
   static void
Idle_PROC( void )
{
   switch( Event )
   {
      case BtnDn:
         switch( Button )
         {
            case BTN_ENHANCE:         /* turn on enhancements */
               SetEnhance( ON );
               break;

case BTN_RECURSIVE:       /* toggle recursive filter enable-disable */
               ToggleRecursive();
               break;

case BTN_MEDIAN:          /* this turns on/off median */
               ToggleMedian( OFF );
               break;

case BTN_FREEZE:          /* allow freeze control */
               ToggleFreeze();
               break;

case BTN_INPUT1:          /* allow input changes */
            case BTN_INPUT2:
            case BTN_INPUT3:
               SelectInput( Button );
               break;

case BTN_SOFT:            /* toggle between soften & sharpen */
               ToggleSoften();
               break;

case BTN_SPLIT:           /* allow split screen */
               ToggleSplit( OFF );
               break;

case BTN_POSITIVE:        /* allow positive - negative */
               TogglePositive();
               break;

case BTN_SLAVE:           /* change of MASTER */
               ToggleMaster();
               break;

default:
               break;
```

```c
            }
            break;

case NoChg:
            break;

case BtnUp:
            break;

default:
            break;
      }
}
/*============================================================================*/
/*
** Initialization routine for SLAVE state - only LOCAL button and Rx monitoring
*/
   static void
Slav_INIT( void )
{
#if PC
   TR( "SLAVE    " )
endif LEDClock = 0;
}
/*============================================================================*/
/*
** Process control driver for SLAVE state - only LOCAL button and Rx monitoring
*/
   static void
Slav_PROC( void )
{
   switch( Event )
   {
      case BtnDn:
         switch( Button )
         {
            case BTN_SLAVE:              /* change of MASTER */
               ToggleMaster();
               break;

case BTN_INPUT1:             /* allow input changes */
            case BTN_INPUT2:
            case BTN_INPUT3:
               SelectInput( Button );
               break;

default:
               break;
         }
         break;

case NoChg:     /* use displays and LEDs to show remote's status */ if( Sys.Remote.EnhanceOn
         {
            switch( Sys.Remote.DiState )
            {
               case RECURS_ENTRY:
```

```c
                    FlashMfLed = OFF;
                    OUT2_BUF = Sys.Remote.Level | (Sys.Remote.Threshold << 4);
                    break;

case AUTO_ENTRY:
                    FlashMfLed = OFF;
                    OUT2_BUF = Sys.Remote.Level | (Sys.Remote.AutoStyle << 4);
                    break;

case MEDIAN_ENTRY:
                    FlashMfLed = ON;     /* start Mf flashing */
                    OUT2_BUF = Sys.Remote.MotionIndx | (Sys.Remote.MedianType << 4);
                    break;
                }
            }
            else
            {
                FlashMfLed = OFF;
                EnhanceOut = OFF;
            }
            break;

case BtnUp:
            break;

default:
            break;
    }
}

/*===========================================================================*/
/*
** Initialization routine for ENHANCE - MANUAL mode control.
*/
static void
Manu_INIT( void )
{
#if PC
    TR( "MANUAL   " )
endif InSyncPOT1 = OFF;       /* unsynchronize POTs 1 & 2 */
    InSyncPOT2 = OFF;

InitPOT1( Sys.Local.Level, TruncRfLevel );

InitPOT2( Sys.Local.Threshold, TruncRfThrhld );

Sys.Local.UiState = RECURS_ENTRY;

AutoOut    = OFF;
    FlashMfLed = OFF;       /* stop Mf flashing */
    LEDClock   = 0;         /* restart any LED oscillations */

SetAuto( OFF );
}

/*===========================================================================*/
/*
** Process control driver for ENHANCE - MANUAL mode.
```

```c
*/
    static void
Manu_PROC( void )
{
    switch( Event )
    {
        case BtnDn:
            switch( Button )
            {
                case BTN_ENHANCE:           /* enhancement off */
                    SetEnhance( OFF );
                    break;

case BTN_AUTOMATIC:         /* select automatic modes */
                    ToggleAuto();
                    break;

case BTN_RECURSIVE:
                    ToggleRecursive();      /* toggle recursive filter enable */
                    break;

case BTN_MEDIAN:
                    ToggleMedian( ON );     /* toggle median ON/OFF */
                    NewCTRL( &ChkM_CTRL );  /* check for a long depression */
                    break;

case BTN_LONG_MEDIAN:       /* (Safety) Median key held down long time */
                    NewCTRL( &Medi_CTRL );  /* switch to Median Filter control mode */
                    break;

default:
                    ChkCommon();
                    break;
            }
            break;

case BtnUp:
            break;

case NoChg:

if( InSyncPOT1 )  /* set Y & C Levels together */
            {
                TestPOT1( Sys.Local.Level, TruncRfLevel );
                LoadFromTEMP_BUF( Sys.Local.Level );

SetRfYLevel( Sys.Local.Level );
                SetRfCLevel( Sys.Local.Level );
            }
            else
                ChkSyncPOT1( Sys.Local.Level, TruncRfLevel );

if( InSyncPOT2 )  /* set Y & C Threshold together */
            {
                TestPOT2( Sys.Local.Threshold, TruncRfThrhld );
                LoadFromTEMP_BUF( Sys.Local.Threshold );

SetRfYThrhld( Sys.Local.Threshold );
                SetRfCThrhld( Sys.Local.Threshold );
            }
```

```c
        else
            ChkSyncPOT2( Sys.Local.Threshold, TruncRfThrhld );

OUT2_BUF = NR30_R2;    /* update the displays */
        break;

default:
        break;
    }
  }
}

/*=========================================================================*/
/*
** Initialization routine for AUTOMATIC THRESHOLDING mode control.
*/
  static void
Auto_INIT( void )
{
#if PC
  TR( "AUTO    " )
endif InSyncPOT1 = OFF;            /* loss of POT sync */
  InSyncPOT2 = OFF;

InitPOT1( Sys.Local.Level, TruncRfLevel );
  InitPOT2( Sys.Local.AutoStyle, TruncAutoStyle );

Sys.Local.UiState = AUTO_ENTRY;

AutoOut    = ON;
  FlashMfLed = OFF;            /* stop Mf flashing */
  LEDClock   = 0;              /* restart any LED oscillations */

SetAutoStyle( Sys.Local.RecursiveOn, Sys.Local.AutoStyle );
}

/*=========================================================================*/
/*
** Process control driver for AUTOMATIC THRESHOLDING mode.
*/
  static void
Auto_PROC( void )
{
  switch( Event )
  {
    case BtnDn:
      switch( Button )
      {
        case BTN_ENHANCE:        /* ENHANCE OFF */
          SetEnhance( OFF );
          break;

case BTN_AUTOMATIC:      /* select manual mode */
          ToggleAuto();
          break;

case BTN_RECURSIVE:
          ToggleRecursive();     /* toggle recursive filter enable */
          SetAutoStyle( Sys.Local.RecursiveOn, Sys.Local.AutoStyle );
```

```c
                break;

case BTN_MEDIAN:
                ToggleMedian( ON );      /* toggle median ON/OFF */
                NewCTRL( &ChkM_CTRL );   /* check for a long depression */
                break;

case BTN_LONG_MEDIAN:       /* (Safety) median button down long time */
                NewCTRL( &Medi_CTRL );   /* switch to Median Filter control mode */
                break;

default:
                ChkCommon();
                break;
            }
            break;

case BtnUp:
            break;

case NoChg:

if( InSyncPOT1 )  /* set Y & C Levels together */
            {
                TestPOT1( Sys.Local.Level, TruncRfLevel );
                LoadFromTEMP_BUF( Sys.Local.Level );

SetRfYLevel( Sys.Local.Level );
                SetRfCLevel( Sys.Local.Level );
            }
            else
                ChkSyncPOT1( Sys.Local.Level, TruncRfLevel );

if( InSyncPOT2 )  /* set Automatic Style */
            {
                TestPOT2( Sys.Local.AutoStyle, TruncAutoStyle );

if( TEMP_BUF != Sys.Local.AutoStyle )  /* restart LED oscillations */
                    LEDClock  = 0;

LoadFromTEMP_BUF( Sys.Local.AutoStyle );

SetAutoStyle( Sys.Local.RecursiveOn, Sys.Local.AutoStyle );
            }
            else
                ChkSyncPOT2( Sys.Local.AutoStyle, TruncAutoStyle );

OUT2_BUF = Sys.Local.Level | (Sys.Local.AutoStyle << 4);  /* update the displays */
            break;

default:
            break;
    }

/*============================================================================
**
** Initialization routine for MEDIAN FILTER ADJUSTMENT mode.
*/
    static void
```

```c
Medi_INIT( void )
{
#if PC
    TR( "MEDIAN    " )
#endif

InSyncPOT1 = OFF;              /* unsynchronize POTs 1 & 2 */
    InSyncPOT2 = OFF;

/* ensure that median is ON if this mode entered */ if( !Sys.Local.MedianOn )
        ToggleMedian( ON );

InitPOT1( Sys.Local.MotionIndx, TruncMotionIndx );
    InitPOT2( Sys.Local.MedianType, TruncMedianType );

Sys.Local.UiState = MEDIAN_ENTRY;

AutoOut    = OFF;    /* disable segment display recoding */
    LEDClock   = 0;      /* restart any LED oscillations */
    FlashMfLed = ON ;    /* start Mf flashing */
}

/*==========================================================================*/
/*
** Process control driver for MEDIAN FILTER ADJUSTMENT mode.
*/
static void
Medi_PROC( void )
{
    switch( Event )
    {
    case BtnDn:
        switch( Button )
        {
        case BTN_ENHANCE:                   /* disable noise reduction */
            SetEnhance( OFF );
            break;

case BTN_LONG_MEDIAN:                /* return to previous CTRL */
            if( Sys.Local.AutoOn )
                NewCTRL( &Auto_CTRL );
            else
                NewCTRL( &Manu_CTRL );
            break;

case BTN_RECURSIVE:
            ToggleRecursive();              /* toggle recursive filter enable */
            break;

default:
            ChkCommon();
            break;
        }
        break;

case NoChg:

if( InSyncPOT1    * set Median Motion Index *
```

```c
        {
            TestPOT1( Sys.Local.MotionIndx, TruncMotionIndx );
            LoadFromTEMP_BUF( Sys.Local.MotionIndx );

SetMfYThrhld( Sys.Local.MotionIndx );
            SetMfCThrhld( Sys.Local.MotionIndx );
            SetMfMotThrhld( Sys.Local.MotionIndx );
            SetMfModThrhld( Sys.Local.MotionIndx );
        }
        else
            ChkSyncPOT1( Sys.Local.MotionIndx, TruncMotionIndx );

if( InSyncPOT2 )   /* set up median filter shape */
        {
            TestPOT2( Sys.Local.MedianType, TruncMedianType );
            LoadFromTEMP_BUF( Sys.Local.MedianType );

SetMfType( Sys.Local.MedianType );
        }
        else
            ChkSyncPOT2( Sys.Local.MedianType, TruncMedianType );

OUT2_BUF = Sys.Local.MotionIndx | (Sys.Local.MedianType << 4); /* update the displays */
        break;

default:
        break;
    }
}

/*===========================================================================*/
/*
** Initialization STUB to check whether MEDIAN key depression is a long one.
*/
    static void
ChkM_INIT( void )
{
#if PC
    TR( "CHK MEDIAN" );
#endif
}

/*===========================================================================*/
/*
** Process control STUB to check whether MEDIAN key depression is a long one.
*/
    static void
ChkM_PROC( void )
{
    switch( Event )
    {
    case BtnDn:
        switch( Button )
        {
        case BTN_LONG_MEDIAN:       /* MEDIAN key held down long time */
            ToggleMedian( ON );     /* restore MEDIAN button state*/
            NewCTRL( &Medi_CTRL );  /* switch to median adjustments */
            break;

default:
```

```c
                    break;
            }
            break;

case BtnUp:
            switch( Button )
            {
                case BTN_MEDIAN:            /* short press return ehanced mode */
                    if( Sys.Local.AutoOn )
                        NewCTRL( &Auto_CTRL );  /* bypass initialization */
                    else
                        NewCTRL( &Manu_CTRL );  /* bypass initialization */
                    break;
            }
            break;

default:
            break;
    }
}

/*==========================================================================*/
/*
 * Routine dumps output flags to screen
 */ if PC static void
dump( void )

#define  d0(a,b)   {putcur(a, 1,0); printf("%c %fb, b?'*':' ');}
#define  d1(a,b)   {putcur(a,20,0); printf("%c %fb, b?'*':' ');}
#define  d2(a,b)   {putcur(a,40,0); printf("%c %fb, b?'*':' ');}
define  d3(a,b)   {putcur(a,60,0); printf("%c %fb, b?'*':' ');} d0( 0, PosOut );
  d0( 1, AutoOut );
  d0( 2, PrzOut );
  d0( 3, MfOut );
  d0( 4, RfOut );
  d0( 5, SoftOut );
  d0( 6, EnhanceOut );

d0( 8, Input2Led );
  d0( 9, Input1Led );
  d0( 10, RemoteLed );
  d0( 11, Input3Out );
  d0( 12, Input1Out );
  d0( 13, SplitOut );

d1( 0, Local20En );
  d1( 1, AnlEn );
  d1( 2, ApSoft );
  d1( 3, ApEn );
  d1( 4, PrzEn );
  d1( 5, SplitEn );
  d1( 6, MfYEn );
  d1( 7, MfCEn );
```

```
    d1( 8, Local30En );
    d1( 9, RmLBoxBlnkEn );
    d1( 10, RmBBlnkWAnl );
    d1( 11, RfYEn );
    d1( 12, RfCEn );
    d1( 13, RfPositive );

d2( 0, RmSplitL2R );
    d2( 1, RmAdv1H );
    d2( 2, RmMfBypass );
    d2( 3, RmFrzHiActv  );
    d2( 4, RmFrzPosEdge );
    d2( 5, RmFrzLevSen  );
    d2( 6, RmFlushOn );

d2( 7, RmRfYEn );
    d2( 8, RmRfCEn );
    d2( 9, RmMfYEn );
    d2( 10, RmMfCEn );

putcur(15,1,0);

printf("Out0=%0.2X Out1=%0.2X Out2=%0.2X\n",
        (unsigned char) OUT0_BUF,
        (unsigned char) OUT1_BUF,
        (unsigned char) OUT2_BUF);

printf("(20)r1=%0.2X (20)r2=%0.2X (20)r3=%0.2X (20)r4=%0.2X (20)r5=%0.2X (20)r6=%0.2X\n",
        (unsigned char) NR20_R1,
        (unsigned char) NR20_R2,
        (unsigned char) NR20_R3,
        (unsigned char) NR20_R4,
        (unsigned char) NR20_R5,
        (unsigned char) NR20_R6);

printf("(30)r1=%0.2X (30)r2=%0.2X (30)r3=%0.2X (30)r4=%0.2X (30)r5=%0.2X\n",
        (unsigned char) NR30_R1,
        (unsigned char) NR30_R2,
        (unsigned char) NR30_R3,
        (unsigned char) NR30_R4,
        (unsigned char) NR30_R5);

printf("\nEnh=%d",Sys.Local.EnhanceOn );
    printf(" SIZE=%d", sizeof( SYS ) );

putcur( 22, 1, 0);

*============================================================================*/ main()

define NORMAL 7 clrscn( NORMAL );
    putcur( 22, 1, 0);

Event = 2;   * init *
    InitSys();
    EstabSys();
```

```c
   SetUiState();

CheckPOT3and4();

dump();

while( 1 )
   {
      Event = BtnDn;

printf( "Btn=   " ); putcur( 22,5,0); scanf("%c", &Button );
      if(Button == '1' )
      {
         putcur(22,1,0);
         printf("PT1=   "); putcur( 22,5,0); scanf("%x",&Pot1V); Pot1V &= 0xFF;
      }
      else if(Button == '2' )
      {
         putcur(22,1,0);
         printf("PT2=   "); putcur( 22,5,0); scanf("%x",&Pot2V); Pot2V &= 0xFF;
      }
      else if(Button == '3' )
      {
         putcur(22,1,0);
         printf("PT3=   "); putcur( 22,5,0); scanf("%x",&Pot3V); Pot3V &= 0xFF;
      }
      else if(Button == '4' )
      {
         putcur(22,1,0);
         printf("PT4=   "); putcur( 22,5,0); scanf("%x",&Pot4V); Pot4V &= 0xFF;
      }
      if( Button == '1' || Button == '2' || Button == '3' || Button == '4' || Button ==    )
         Event = NoChg;

if( Button == 'u' )
      {
         Button = 'n';
         Event = BtnUp;
      }

(*current->process)();

CheckPOT3and4();

dump();
   } else /* not PC */

/*=========================================================================*/
/*
 * generates events and processes them.
 */
   void
TestMaster( void )

if( CtrlOff          /* see if a change of MASTER requested */ if( CtrlDown
```

```c
         WaitMsecs( 10 );     /* debounce button */
         if( !CtrlOff )
         {
            CtrlDown = TRUE;
            Event    = BtnDn;
            Button   = BTN_SLAVE;
            (*current->process)();
         }
      }
   }
   else
   {
      CtrlDown = FALSE;
      GetNextEvent();
      (*current->process)();
      CheckPOT3and4();
   }

/*========================================================================*/
*
* generates events and processes them.
*/
  void
estSlave( void )

if( !CtrlOff )         /* see if a change of MASTER requested */
  {
     if( !CtrlDown )
     {
        WaitMsecs( 10 );     /* debounce button */
        if( !CtrlOff )
        {
           CtrlDown = TRUE;
           Event    = BtnDn;
           Button   = BTN_SLAVE;
           (*current->process)();
        }
     }
  }
  else
  {
     CtrlDown = FALSE;
     GetNextEvent();
     (*current->process)();
  }

/*========================================================================*/
*
* generates events and processes them.

void
estRemote( void )

GetNextEvent();
  (*current->process)();
  CheckPOT3and4();

endif   /* PC */
```

```c
/*============================================================================*/
/*
** Remote Command Protocol
*/ define  RCP_ENHANCE         0x00
define  RCP_AUTO_THR        0x10
#define  RCP_LUMINANCE       0x20
#define  RCP_CHROMINANCE     0x30
#define  RCP_FREEZE          0x40
#define  RCP_SPLIT           0x50
#define  RCP_POSITIVE        0x60
#define  RCP_STEP            0x70
#define  RCP_EX_REQ          0x80
#define  RCP_1HADV           0x90
#define  RCP_INPUT_SEL       0xA0
#define  RCP_LEVEL           0xB0
#define  RCP_THRESHOLD       0xC0
#define  RCP_SKEW            0xD0
#define  RCP_APERTURE        0xE0
define  RCP_EX_DATA         0xF0 define  EX_HEADER           0x00
define  EX_RECURSIVE        0x01
#define  EX_MEDIAN           0x02
#define  EX_MEDIAN_TYPE      0x03
#define  EX_MEDIAN_LEVEL     0x04
#define  EX_SKEW             0x05
#define  EX_APERTURE         0x06
#define  EX_AUTO_STYLE       0x07
#define  EX_SOFTEN           0x08
#define  EX_LBOX_WIDTH       0x09
#define  EX_SETTINGS_1       0x0A
#define  EX_SETTINGS_2       0x0B
#define  EX_SETTINGS_3       0x0C
#define  EX_SETTINGS_4       0x0D
#define  EX_SETTINGS_5       0x0E
define  EX_RESET            0x0F if PC
/*============================================================================*/
/*
** Sends one byte to the Tx serial port
*/
   static void
SendByte( char Value )
{
}
else /* not PC */
/*============================================================================*/
/*
** Sends one byte to the Tx serial port
*/
   static void
SendByte( char Value )
{
   do {} while( !TI );

TI = OFF;
```

```c
    SBUF = Value;
}
#endif

/*==========================================================================*/
/*==========================================================================*/
/*
**
** NB.    Owing to the rather stupid way in which this compiler has implemented
**       bit field manipulations through (VERY SLOW) library routines, together
**       with the severe limitations imposed on interrupt routines, I have had
**       to implement my own bit manipulations to make the software go fast
**       enough. This means that any changes to the structure "Sys" will need
**       changes to these interrupt routines.
**                                                            K.A.W.
*/
/*==========================================================================*/
/*
** code frag for remote protocol -- vector straight to handler
*/ typedef void (* CMD )( void );

static void HndlEnha( void );
static void HndlAuto( void );
static void HndlNoAction( void );
static void HndlFrz( void );
static void HndlSplit( void );
static void HndlPos( void );
static void HndlStep( void );
static void HndlExCmd( void );
static void HndlInSel( void );
static void HndlNrLevel( void );
static void HndlNrThrhld( void );
static void HndlSkew( void );
static void HndlApComp( void );
static void HndlExData( void );

code CMD Cmd[16] =
{
    &HndlEnha,        /* (0) enhance enable */
    &HndlAuto,        /* (1) auto threshold on off */
    &HndlNoAction,    /* (2) luminance noise reduction.. obsolete */
    &HndlNoAction,    /* (3) chrominance noise reduction.. obsolete */
    &HndlFrz,         /* (4) freeze - unfreeze requests */
    &HndlSplit,       /* (5) split screen requests */
    &HndlPos,         /* (6) positive - negative polarity */
    &HndlStep,        /* (7) step frame */
    &HndlExCmd,       /* (8) extended command */
    &HndlNoAction,    /* (9) 1H advance.. obsolete */
    &HndlInSel,       /* (A) input selection */
    &HndlNrLevel,     /* (B) NR Level adjustment */
    &HndlNrThrhld,    /* (C) NR threshold adjustment */
    &HndlSkew,        /* (D) coarse form of skew */
    &HndlApComp,      /* (E) corse form of aperture compensation */
    &HndlExData       /* (F) extended data */
};

static void HndlExStatus( void );
static void HndlExRf( void );
```

```c
static void HndlExMf( void );
static void HndlExMfType( void );
static void HndlExMfLevel( void );
static void HndlExSkew( void );
static void HndlExApComp( void );
static void HndlExAutoStyle( void );
static void HndlExSoft( void );
static void HndlExLBox( void );
static void HndlExSwtch1( void );
static void HndlExSwtch2( void );
static void HndlExSwtch3( void );
static void HndlExSwtch4( void );
static void HndlExSwtch5( void );
static void HndlExReset( void );

code CMD ExCmd[16] =
{
    &HndlExStatus,      /* (0) remote status from Accom remote panel */
    &HndlExRf,          /* (1) recursive filter on/off toggle */
    &HndlExMf,          /* (2) median filter on/off toggle */
    &HndlExMfType,      /* (3) select median filter type */
    &HndlExMfLevel,     /* (4) set median filter level */
    &HndlExSkew,        /* (5) fine adjustment for skew */
    &HndlExApComp,      /* (6) fine adjustment for aperture compensation */
    &HndlExAutoStyle,   /* (7) set automatic style */
    &HndlExSoft,        /* (8) soften/sharpen toggle */
    &HndlExLBox,        /* (9) letter box blanking width */
    &HndlExSwtch1,      /* (A) remote (on board) switches - 1 */
    &HndlExSwtch2,      /* (B) remote (on board) switches - 2 */
    &HndlExSwtch3,      /* (C) remote (on board) switches - 3 */
    &HndlExSwtch4,      /* (D) remote (on board) switches - 4 */
    &HndlExSwtch5,      /* (E) remote (on board) switches - 5 */
    &HndlExReset        /* (F) extended reset request */
};

data char Aux;          /* Current Rx byte */
data char LastEx;       /* save area for last extended request code */

/*============================================================================*/
/*
** No Action stub
*/
    static void
HndlNoAction( void )
{
    ExWait = OFF;
}
/*============================================================================*/
/*
** Enhance enable handler
*/
    static void
HndlEnha( void )
{
    ExWait = OFF;

if( Sys.Remote.EnhanceOn = Aux & 1 )
        SetUiState();
    else
    {
```

```c
      EnhanceOut = OFF;
      AutoOut    = OFF;
      SplitEn    = OFF;
      ApEn       = OFF;
      MfYEn      = OFF;
      MfCEn      = OFF;
   }
}
/*============================================================================*/
/*
** Auto threshold selection
*/
   static void
HndlAuto( void )
{
   ExWait = OFF;

if( Sys.Remote.AutoOn = Aux & 1 )
   {
      AutoOut = ON;
      SetAutoStyle( Sys.Remote.RecursiveOn, Sys.Remote.AutoStyle );
      Sys.Remote.UiState = AUTO_ENTRY;
   }
   else
   {
      AutoOut = OFF;
      SetAuto( OFF );
      Sys.Remote.UiState = RECURS_ENTRY;
   }
}
/*============================================================================*/
/*
** Freeze ON / OFF requests
*/
   static void
HndlFrz( void )
{
   ExWait = OFF;
   if( Sys.Remote.FreezeOn = Aux & 1 )
   {
      FrzOut = ON;
      FrzEn  = ON;
   }
   else
   {
      FrzOut = OFF;
      FrzEn  = OFF;
   }
}
/*============================================================================*/
/*
** split screen requests
*/
   static void
HndlSplit( void )
{
   ExWait = OFF;
   EstabSplit( Sys.Exten.SplitOn = Aux & 1 );
}
/*============================================================================*/
```

```c
/*
** positive - negative polarity
*/
   static void
HndlPos( void )
{
   ExWait = OFF;
   if( Sys.Remote.PositiveOn = Aux & 1 )
   {
      PosOut    = ON;
      RfPositive = ON;
   }
   else
   {
      PosOut    = OFF;
      RfPositive = OFF;
   }
}
/*==========================================================================*/
/*
** Step request - only available in freeze mode
*/
   static void
HndlStep( void )
{
   if( !Sys.LocalOn && Sys.Remote.FreezeOn )
      StepFlag = ON;

ExWait = OFF;
}
/*==========================================================================*/
/*
** Select input source
*/
   static void
HndlInSel( void )
{
   ExWait = OFF;
   EstabInput( Sys.Exten.InputSel = Aux & 3 );
}
/*==========================================================================*/
/*
** NR Level adjustment
*/
   static void
HndlNrLevel( void )
{
   ExWait = OFF;
   Sys.Remote.Level = Aux & 0xF;
   SetRfYLevel( Sys.Remote.Level );
   SetRfCLevel( Sys.Remote.Level );

Sys.Remote.UiState = Sys.Remote.AutoOn ? AUTO_ENTRY : RECURS_ENTRY;
}
/*==========================================================================*/
/*
** NR Threshold adjustment
*/
   static void
HndlNrThrhld( void )
```

```c
{
    ExWait = OFF;
    Sys.Remote.Threshold = Aux & 0xF;
    SetRfYThrhld( Sys.Remote.Threshold );
    SetRfCThrhld( Sys.Remote.Threshold );
    Sys.Remote.UiState = RECURS_ENTRY;
}
/*==========================================================================*/
/*
** Coarse form of Skew adjustment
*/
    static void
HndlSkew( void )
{
    ExWait = OFF;
    SetSkew( Sys.Remote.Skew = (Aux & 7) << 1 );
}
/*==========================================================================*/
/*
** Coarse form of aperture compensation
*/
    static void
HndlApComp( void )
{
    ExWait = OFF;
    SetAperture( Sys.Remote.Aperture = (Aux & 7) << 1 );
}
/*==========================================================================*/
/*
** Extended Command request
*/
    static void
HndlExCmd( void )
{
    ExWait = ON;        /* extended command waiting for corresponding data */
    LastEx = Aux & 0xF; /* save the extended request code */
    LBoxHi = OFF;       /* not waiting for Hi nibble of letter box width */
}
/*==========================================================================*/
/*
** Extended Data packet - note: LBox blanking width waits for 2 data bytes.
** To save RAM use the Lo nibble of LBox B.W. to keep in most significant
** nibble of LastEx byte until the Hi nibble is received. For remote status
** there are 9 nibbles of data. The data nibble count is kept in most
** significant nibble of LastEx, while active.
*/
    static void
HndlExData( void )
{
    if( ExWait )    /* ensure an Ex command is active */
    {
        if( (LastEx & 0xF) == EX_HEADER )   /* check for remote status command */
        {
            Aux = (Aux & 0xF) | (LastEx & 0xF0);
            HndlExStatus();
            LastEx += 0x10;             /* increment nibble count */
        }
        else if( (LastEx & 0xF) == EX_LBOX_WIDTH )  /* check for letter box blanking data */
        {
            if( LBoxHi
```

```c
            {
               Aux = (Aux << 4) | (LastEx >> 4);
               HndlExLBox();
               ExWait = OFF;
            }
            else
            {
               LastEx |= (Aux & 0xF) << 4;    /* save low nibble in LastEx MSN */
               LBoxHi = ON;
            }
         }
         else
         {
            ExWait = OFF;

Aux &= 0xF;

(*ExCmd[LastEx & 0xF])();          /* get handler */
         }
      }
}
/*============================================================================*/
/*
** Remote control panel status packet. Hi nibble is data count, Lo is data.
*/
   static void
HndlExStatus( void )
{
   if( UpdateWait )       /* waiting for register update */
      return;

switch( Aux >> 4 )     /* branch on nibble count */
   {
      case 0:
#if 1
         (* (char *) &Sys.Remote) &= 0xF0;
         (* (char *) &Sys.Remote) |= Aux & 0xF;
#else
         Sys.Remote.UiState = Aux & 0x3;
         Sys.Remote.AutoStyle = (Aux >> 2) & 0x3;
#endif
         break;

case 1:
#if 1
         (* (char *) &Sys.Remote) &= 0xF;
         (* (char *) &Sys.Remote) |= Aux << 4;
#else
         Sys.Remote.EnhanceOn = Aux & 0x1;
         Sys.Remote.RecursiveOn = (Aux >> 1) & 0x1;
         Sys.Remote.MedianOn = (Aux >> 2) & 0x1;
         Sys.Remote.PositiveOn = (Aux >> 3) & 0x1;
#endif
         break;

case 2:
#if 1
         (* (((char *) &Sys.Remote) - 1)) &= 0xF0;
         (* (((char *) &Sys.Remote) - 1)) = Aux & 0xF;
#else
```

```
            Sys.Remote.Aperture = Aux & 0xF;
#endif
        break;

case 3:
#if 1
        (* (((char *) &Sys.Remote) - 1)) &= 0xF;
        (* (((char *) &Sys.Remote) - 1)) |= Aux << 4;
#else
        Sys.Remote.Skew = Aux & 0xF;
#endif
        break;

case 4:
#if 1
        (* (((char *) &Sys.Remote) - 2)) &= 0xF0;
        (* (((char *) &Sys.Remote) + 2)) |= Aux & 0xF;
#else
        Sys.Remote.Level = Aux & 0xF;
#endif
        break;

case 5:
#if 1
        (* (((char *) &Sys.Remote) + 2)) &= 0xF;
        (* (((char *) &Sys.Remote) + 2)) |= Aux << 4;
#else
        Sys.Remote.Threshold = Aux & 0xF;
#endif
        break;

case 6:
#if 1
        (* (((char *) &Sys.Remote) - 3)) &= 0xF0;
        (* (((char *) &Sys.Remote) - 3)) |= Aux & 0xF;
#else
        Sys.Remote.MotionIndx = Aux & 0xF;
#endif
        break;

case 7:
#if 1
        (* (((char *) &Sys.Remote) - 3)) &= 0xF;
        (* (((char *) &Sys.Remote) - 3)) |= Aux << 4;
#else
        Sys.Remote.MedianType = Aux & 0xF;
#endif
        break;

case 8:
#if 1
        (* (((char *) &Sys.Remote) - 4)) &= 0xF8;
        (* (((char *) &Sys.Remote) - 4)) |= Aux & 0x7;
#else
        Sys.Remote.FreezeOn = Aux & 0x1;
        Sys.Remote.SoftenOn = (Aux >> 1) & 0x1;
        Sys.Remote.AutoOn = (Aux >> 2) & 0x1;
endif ExWait = OFF;    /* end of full status string */
```

```c
            NewSys = TRUE;    /* queue for register update */
            break;

default:          /* internal error */
            break;
    }
}
/*==========================================================================*/
/*
** Recursive filter On/Off request
*/
    static void
HndlExRf( void )
{
    if( Sys.Remote.RecursiveOn = Aux & 1 )
    {
        RfYEn = ON;
        RfCEn = ON;
        RfOut = ON;
    }
    else
    {
        RfYEn = OFF;
        RfCEn = OFF;
        RfOut = OFF;
    }
    Sys.Remote.UiState = RECURS_ENTRY;
}
/*==========================================================================*/
/*
** Median filter On/Off request
*/
    static void
HndlExMf( void )
{
    if( Sys.Remote.MedianOn = Aux & 1 )
    {
        MfOut = ON;

if( Sys.Remote.EnhanceOn )
        {
            MfCEn = ON;
            MfYEn = ON;
        }
    }
    else
    {
        MfOut = OFF;
        MfCEn = OFF;
        MfYEn = OFF;
    }
    Sys.Remote.UiState = RECURS_ENTRY;
}
/*==========================================================================*/
/*
** Select Median filter type
*/
    static void
HndlExMfType( void )
```

```c
    Sys.Remote.MedianType = Aux & 0xF;
    SetMfType( Sys.Remote.MedianType );
    Sys.Remote.UiState = MEDIAN_ENTRY;
}
/*==========================================================================*/
/*
** Set NR level for median filter
*/
    static void
HndlExMfLevel( void )
{
    Sys.Local.MotionIndx = Aux & 0xF;

SetMfYThrhld( Sys.Local.MotionIndx );
    SetMfCThrhld( Sys.Local.MotionIndx );
    SetMfMotThrhld( Sys.Local.MotionIndx );
    SetMfModThrhld( Sys.Local.MotionIndx );

Sys.Remote.UiState = Sys.Remote.AutoOn ? AUTO_ENTRY : RECURS_ENTRY;
}
/*==========================================================================*/
/*
** Fine adjustment for Skew
*/
    static void
HndlExSkew( void )
{
    SetSkew( Sys.Remote.Skew = Aux & 0xF );
}
/*==========================================================================*/
/*
** Fine adjustment for aperture compensation
*/
    static void
HndlExApComp( void )
{
    SetAperture( Sys.Remote.Aperture = Aux & 0xF );
}
/*==========================================================================*/
/*
** Set automatic threshold style
*/
    static void
HndlExAutoStyle( void )
{
    Sys.Remote.AutoStyle = Aux & 3;

if( Sys.Remote.AutoOn )
    {
        AutoOut = ON;
        SetAutoStyle( Sys.Remote.RecursiveOn, Sys.Remote.AutoStyle );
        Sys.Remote.UiState = AUTO_ENTRY;
    }
    else
    {
        AutoOut = OFF;
        SetAuto( OFF );
        Sys.Remote.UiState = RECURS_ENTRY;
    }
```

```c
/*============================================================================*/
/*
** Soften/Sharpen selection
*/
    static void
HndlExSoft( void )
{
    if( Sys.Remote.SoftenOn = Aux & 1 )
    {
        SoftOut  = ON;
        ApSoft   = ON;
    }
    else
    {
        SoftOut  = OFF;
        ApSoft   = OFF;
    }
}
/*============================================================================*/
/*
** Letter box blanking width
*/
    static void
HndlExLBox( void )
{
    Sys.ExtenOn = ON;
}
/*============================================================================*/
/*
** Set remote (on board) switch settings (1)
*/
    static void
HndlExSwtch1( void )
{
    Sys.Exten.ObRfCEn = Aux & 1;  Aux >>= 1;
    Sys.Exten.ObRfYEn = Aux & 1;  Aux >>= 1;
    Sys.Exten.ObMfCEn = Aux & 1;  Aux >>= 1;
    Sys.Exten.ObMfYEn = Aux & 1;

if( Sys.ExtenOn )
    {
        SetObRfYEn( Sys.Exten.ObRfYEn );
        SetObRfCEn( Sys.Exten.ObRfCEn );
        SetObMfYEn( Sys.Exten.ObMfYEn );
        SetObMfCEn( Sys.Exten.ObMfCEn );
    }
    else
    {
        Sys.ExtenOn = ON;
        EstabSys();
    }
}
/*============================================================================*/
/*
** Set remote (on board) switch settings (2)
*/
    static void
HndlExSwtch2( void )
{
    Sys.Exten.ApPkFreq  = Aux & 3;  Aux >>= 2;
```

```c
      Sys.Exten.OutClip   = Aux & 3;

if( Sys.ExtenOn )
      {
         SetOutClip( Sys.Exten.OutClip );
         SetApPkFreq( Sys.Exten.ApPkFreq );
      }
      else
      {
         Sys.ExtenOn = ON;
         EstabSys();
      }
   }
/*========================================================================*/
/*
** Set remote (on board) switch settings (3)
*/
   static void
HndlExSwtch3( void )
{
   Sys.Exten.FrzHiActv  = Aux & 1;  Aux >>= 1;
   Sys.Exten.FrzLevSen  = Aux & 1;  Aux >>= 1;
   Sys.Exten.FrzPosEdge = Aux & 1;  Aux >>= 1;
   Sys.Exten.FlushOn    = Aux & 1;

if( Sys.ExtenOn )
   {
      SetFrzHiActv( Sys.Exten.FrzHiActv );
      SetFrzLevSen( Sys.Exten.FrzLevSen );
      SetFrzPosEdge( Sys.Exten.FrzPosEdge );
      SetFlushOn( Sys.Exten.FlushOn );
   }
   else
   {
      Sys.ExtenOn = ON;
      EstabSys();
   }
}
/*========================================================================*/
/*
** Set remote (on board) switch settings (4)
*/
   static void
HndlExSwtch4( void )
{
   Sys.Exten.KfBypass   = Aux & 1;  Aux >>= 1;
   Sys.Exten.AdvlH      = Aux & 1;  Aux >>= 1;
   Sys.Exten.HBlnkWAnl  = Aux & 1;  Aux >>= 1;
   Sys.Exten.LBoxBlnkEn = Aux & 1;

if( Sys.ExtenOn )
   {
      SetKfBypass( Sys.Exten.KfBypass );
      SetAdvlH( Sys.Exten.AdvlH );
      SetHBlnkWAnl( Sys.Exten.HBlnkWAnl );
      SetLBoxBlnkEn( Sys.Exten.LBoxBlnkEn );
   }
   else
   {
      Sys.ExtenOn = ON;
```

```c
        EstabSys();
    }
}
/*============================================================================*/
/*
** Set remote (on board) switch settings (5)
*/
    static void
HndlExSwtch5( void )
{
    Sys.Exten.SplitL2R = Aux & 1;

if( Sys.ExtenOn )
        SetSplitL2R( Sys.Exten.SplitL2R );
    else
    {
        Sys.ExtenOn = ON;
        EstabSys();
    }
}
/*============================================================================*/
/*
** Reset local/remote switch setting requests
*/
    static void
HndlExReset( void )
{
    switch( Aux & 0xF )
    {
        case 0:                         /* use local "on board" switch settings */
            Sys.ExtenOn = OFF;
            EstabSys();
            break;

case 1:                         /* use current remote settings */
            Sys.ExtenOn = ON;
            EstabSys();
            break;

case 2:                         /* set remote settings to factory preset */
            Sys.Exten.SplitL2R    = OFF;
            Sys.Exten.AdvlH       = OFF;
            Sys.Exten.KfBypass    = OFF;
            Sys.Exten.PrzHiActv   = OFF;
            Sys.Exten.PrzLevSen   = OFF;
            Sys.Exten.PrzPosEdge  = OFF;
            Sys.Exten.FlushOn     = OFF;
            Sys.Exten.ObRfYEn     = ON;
            Sys.Exten.ObRfCEn     = ON;
            Sys.Exten.ObMfYEn     = ON;
            Sys.Exten.ObMfCEn     = ON;
            Sys.Exten.LBoxBlnkEn  = OFF;
            Sys.Exten.HBlnkWAnl   = OFF;
            Sys.Exten.OutClip     = NO_CLIP;
            Sys.Exten.ApPkFreq    = HIGH_HZ;

Sys.ExtenOn = ON;
            EstabSys();
            break;
```

```c
      default:                /* try reading the manual... */
         break;
   }
}
/*==========================================================================*/
/*
** Control panel status packet -- Must match HndlExStatus() - ExCmd byte.
*/ define CYCLE     10        /* Accom remote status protocol - 10 bytes */ static char SeqNo = 0;

static void
SendExStatus( void )
{
   switch( SeqNo )
   {
      case 0:
         SendByte( RCP_EX_REQ | EX_HEADER );    /* start sequence with Ex command code */
         break;

case 1:
         SendByte( RCP_EX_DATA | (Sys.Local.AutoStyle << 2) | Sys.Local.UiState );
         break;

case 2:
         SendByte( RCP_EX_DATA | (Sys.Local.PositiveOn << 3) |
                   (Sys.Local.MedianOn << 2) | (Sys.Local.RecursiveOn << 1) |
                       Sys.Local.EnhanceOn );
         break;

case 3:
         SendByte( RCP_EX_DATA | Sys.Local.Aperture );
         break;

case 4:
         SendByte( RCP_EX_DATA | Sys.Local.Skew );
         break;

case 5:
         SendByte( RCP_EX_DATA | Sys.Local.Level );
         break;

case 6:
         SendByte( RCP_EX_DATA | Sys.Local.Threshold );
         break;

case 7:
         SendByte( RCP_EX_DATA | Sys.Local.MotionIndx );
         break;

case 8:
         SendByte( RCP_EX_DATA | Sys.Local.MedianType );
         break;

case 9:
         SendByte( RCP_EX_DATA | (Sys.Local.AutoOn << 2) |
                   (Sys.Local.SoftenOn << 1) | Sys.Local.FreezeOn );
         break;
```

```c
    }
    SeqNo = ++SeqNo % CYCLE;    /* 10 sequence cycle */
} if !PC
/*========================================================================*/ define MODE1       0x01    /* 16 bit timer */
define MODE2       0x02    /* 8 bit auto reload */ define BAUD_RATE   -3      /* 9600 baud */
define LINE_TYPE   0x50    /* 8 bit UART */ define HilMsec     0xFC    /* timer values for 1 millisecond */
define LolMsec     0x67 define Hi40Msec    0x70    /* timer values for 40 millisecond */
define Lo40Msec    0x00

/*========================================================================*/
/*
** Interrupt Service Routine for the internal clock timer
*/
interrupt [0xB] void TimerISR( void )
{
    TimerWait = OFF;
}

/*========================================================================*/
/*
** Interrupt Service Routine for the Serial Rx/Tx port
*/
interrupt [0x23] void SerialISR( void )
{
    if( RI )
    {
        RI = OFF;

Aux = SBUF;

(*Cmd[ Aux >> 4 ])();   /* get handler */
    }
    else
        TI = OFF;               /* UFO */
}

/*========================================================================*/
/*
** Interrupt Service Routine for the external frame sync signal
*/
interrupt [0x3] void FrameISR( void )
{
    SyncWait = OFF;     /* for counting interrupts */
    SyncRcvd = ON;      /* for analog to digital conversions */
}

/*========================================================================*/
/*
** Routine sets up a timed delay of 40ms
```

```c
*/
   static void
PrimeTimer( void )
{
   TR0 = OFF;           /* stop clock */

TH0 = Hi40Msec;      /* load 40ms wait */
   TL0 = Lo40Msec;

TR0 = ON;            /* start clock */
}

/*===========================================================================*/
/*
** routine waits for the number of milliseconds requested
*/
   static void
WaitMsecs( char Msecs )
{
   while( Msecs-- )
   {
      TR0 = OFF;            /* stop timer */
      TF0 = OFF;            /* clear overflow flag */

TL0 = LoMsec;         /* load timer for 1 millisec */
      TH0 = HiMsec;

TR0 = ON;             /* start timer */ do{}while( !TF0 );    /* wait for overflow */
   }
}

/*===========================================================================*/
/*
** Initialize the Control to "Master"
*/
   static void
InitMaster( void )
{
   EA = OFF;                /* disable interrupts */
   ES = OFF;                /* disable serial interrupt */

REN = OFF;               /* disable Rx on serial port */

BtnIsDown = FALSE;       /* initialize button controls */
   BtnIsLong = FALSE;

SetUiState();            /* switch to current setup */

Uninitialized = FALSE;

EA = ON;                 /* enable interrupts */
}

/*===========================================================================*/
/*
** Initialize the Control to "Slave"
*/
   static void
InitSlave( void )
```

```c
   EA = OFF;              /* disable interrupts */

REN = ON;              /* enable Rx on serial port */

RI = OFF;              /* clear last byte */
   TI = OFF;
   ES = ON;               /* enable serial interrupt */

UpdateWait = FALSE;    /* no register update pending */
   NewSys = FALSE;        /* no new remote status */

ExWait = OFF;          /* restart Rx control flags */
   LBoxHi = OFF;

SetUiState();          /* switch to current setup */

Uninitialized = FALSE;

EA = ON;               /* enable interrupts */
}
/*==========================================================================*/
   void
main( void )
{
   IT0  = ON;     /* trigger on frame sync edge */

ET0  = ON;     /* enable timer interrupt */
   TMOD = MODE1;  /* timer zero - 16 bit timer */

EA = ON;       /* enable interrupts */

/* look for Frame Sync to determine whether Local or Remote */
   {
      data char Count;
      data char i;

SyncWait = ON;

for( i = 0, Count = 0, EX0 = ON; i < 10; i++ )
      {
         PrimeTimer();
         TimerWait = ON;

do
         {
            if( !SyncWait )
            {
               ++Count;
               SyncWait =ON;
            }

} while( TimerWait );
      }

EA = OFF;          /* disable interrupts */

/* should receive approx 10 12 for PAL/NTSC */

LocalCp = (Count > 5) ? TRUE : FALSE;
```

```c
  } if( LocalCp )    /* ======= set up for LOCAL CONTROL PANEL ======= */
  {
    TMOD = (MODE2 << 4)    MODE1;
    TH1  = BAUD_RATE;

SCON = LINE_TYPE;      /* line characteristics */
    TR0  = OFF;            /* stop clock zero */
    TR1  = ON;             /* start clock one */

EX0  = ON;             /* enable external frame sync */
    ET0  = OFF;            /* disable timer interrupt */

LastSys();             /* restore last system setup */

Uninitialized = TRUE;

for(;;)
    {
      if( Sys.LocalOn )    /* ==== Local is Master ==== */
      {
        if( Uninitialized )
          InitMaster();

SyncWait = ON;
        do {} while( SyncWait );

WriteCtrl();       /* update registers */
        TestMaster();
        ChkEEROM();        /* keep EEROM up to date */
      }
      else                 /* ==== Local is Slave ===== */
      {
        if( Uninitialized )
          InitSlave();

SyncWait = ON;
        do
        {
          if( NewSys )
          {
            EstabSys();
            NewSys = FALSE;
            UpdateWait = TRUE;
            SyncWait = ON;
          }
        }
        while( SyncWait );

WriteCtrl();              /* update registers */
        UpdateWait = FALSE;

TestSlave();
        ChkEEROM();       /* keep EEROM up to date */
      }
    }
  }
  else             /* ======= set up for REMOTE CONTROL PANEL ======= */
  {
```

```
data char i;

TMOD  = (MODE2 << 4) | MODE1;
TH1   = BAUD_RATE;

SCON  = LINE_TYPE;    /* line characteristics */
TR0   = OFF;          /* stop clock zero */
TR1   = ON;           /* start clock one */
TI    = ON;           /* start with buffer empty */

EX0   = OFF;          /* no external frame sync */
ET0   = ON;           /* enable timer interrupt */

LastSys();            /* restore last system setup */

SetUiState();

EA    = ON;           /* enable interrupts */

SyncRcvd = 0;         /* no sync signal for remote */

BtnIsDown = FALSE;    /* initialize button controls */
BtnIsLong = FALSE;

for(;;)
{
   PrimeTimer();
   TimerWait = ON;

WriteCtrl();

for( i = 0; i < CYCLE; i++ )
      SendExStatus();

if( StepFlag )     /* request unfreeze for one frame */
   {
      SendByte( RCP_STEP | ON );
      StepFlag = OFF;
   }

TestRemote();

ChkEEROM();

do {} while( TimerWait );
}
}
}
/*==============================================================*/
#endif
```